(12) United States Patent
Cummings et al.

(10) Patent No.: US 7,239,669 B2
(45) Date of Patent: Jul. 3, 2007

(54) ASYNCHRONOUS SYSTEM-ON-A-CHIP INTERCONNECT

(75) Inventors: Uri Cummings, Oak Park, CA (US); Andrew Lines, Calabasas, CA (US)

(73) Assignee: Fulcrum Microsystems, Inc., Calabasas, CA (US)

( * ) Notice: Subject to any disclaimer, the term of this patent is extended or adjusted under 35 U.S.C. 154(b) by 213 days.

(21) Appl. No.: 10/634,597

(22) Filed: Aug. 4, 2003

(65) Prior Publication Data

US 2004/0151209 A1 Aug. 5, 2004

Related U.S. Application Data

(63) Continuation-in-part of application No. 10/212,574, filed on Aug. 1, 2002, now Pat. No. 6,950,959, and a continuation-in-part of application No. 10/136,025, filed on Apr. 30, 2002.

(60) Provisional application No. 60/444,820, filed on Feb. 3, 2003.

(51) Int. Cl.
*H04L 27/04* (2006.01)
(52) U.S. Cl. ............... 375/295; 710/317; 370/360
(58) Field of Classification Search ......... 375/295, 375/370; 710/107, 111, 112, 113, 116, 305, 710/309, 316, 317; 370/357–358, 230, 235, 370/360, 362
See application file for complete search history.

(56) References Cited

U.S. PATENT DOCUMENTS

| | | | | |
|---|---|---|---|---|
| 4,773,066 A | | 9/1988 | Kirkman ..................... 370/85 | |
| 4,849,751 A | * | 7/1989 | Barber et al. .......... 340/825.02 | |
| 5,517,495 A | | 5/1996 | Lund | |
| 5,517,662 A | * | 5/1996 | Coleman et al. ............ 709/201 | |
| 5,752,070 A | | 5/1998 | Martin et al. | |
| 5,802,055 A | | 9/1998 | Krein et al. ................ 370/402 | |
| 5,832,303 A | | 11/1998 | Murase et al. | |
| 5,838,684 A | * | 11/1998 | Wicki et al. ................ 370/416 | |
| 5,875,338 A | * | 2/1999 | Powell ....................... 710/240 | |
| 6,002,861 A | * | 12/1999 | Butts et al. ................... 703/16 | |

(Continued)

OTHER PUBLICATIONS

Andrew Matthew Lines, *Pipelined Asynchronous Circuits*, Jun. 1995, revised Jun. 1998, pp. 1-37.

(Continued)

*Primary Examiner*—Khanh Tran
(74) *Attorney, Agent, or Firm*—Beyer Weaver & Thomas, LLP

(57) ABSTRACT

Methods and apparatus are described relating to a system-on-a-chip which includes a plurality of synchronous modules, each synchronous module having an associated clock domain characterized by a data rate, the data rates comprising a plurality of different data rates. The system-on-a-chip also includes a plurality of clock domain converters. Each clock domain converter is coupled to a corresponding one of the synchronous modules, and is operable to convert data between the clock domain of the corresponding synchronous module and an asynchronous domain characterized by transmission of data according to an asynchronous handshake protocol. An asynchronous crossbar is coupled to the plurality of clock domain converters, and is operable in the asynchronous domain to implement a first-in-first-out (FIFO) channel between any two of the clock domain converters, thereby facilitating communication between any two of the synchronous modules.

36 Claims, 75 Drawing Sheets

U.S. PATENT DOCUMENTS

| | | | |
|---|---|---|---|
| 6,038,656 | A | 3/2000 | Martin et al. |
| 6,044,061 | A | 3/2000 | Aybay et al. |
| 6,101,565 | A * | 8/2000 | Nishtala et al. ............. 710/307 |
| 6,112,016 | A * | 8/2000 | MacWilliams et al. ..... 710/107 |
| 6,175,023 | B1 * | 1/2001 | Liu ............................. 549/510 |
| 6,230,228 | B1 | 5/2001 | Eskandari et al. .......... 710/129 |
| 6,279,065 | B1 | 8/2001 | Chin et al. .................. 710/129 |
| 6,301,630 | B1 | 10/2001 | Chen et al. ................. 710/129 |
| 6,324,180 | B1 * | 11/2001 | Du ........................ 370/395.53 |
| 6,327,253 | B1 | 12/2001 | Frink |
| 6,374,307 | B1 * | 4/2002 | Ristau et al. ............... 709/249 |
| 6,377,579 | B1 * | 4/2002 | Ofek ....................... 370/395.4 |
| 6,546,451 | B1 * | 4/2003 | Venkataraman et al. .... 710/317 |
| 6,721,324 | B1 * | 4/2004 | Shinohara ................ 370/395.1 |
| 6,763,418 | B1 * | 7/2004 | Chou et al. ................. 710/317 |
| 2002/0021694 | A1 * | 1/2002 | Benayoun et al. .......... 370/386 |
| 2002/0034185 | A1 * | 3/2002 | Benayoun et al. ....... 370/395.6 |

OTHER PUBLICATIONS

Alain J. Martin, *Compiling Communicating Processes into Delay-Insenstivie VLSI Circuits*, Dec. 31, 1985, Department of Computer Science California Institute of Technology, Pasadena, California, pp. 1-16.

Alain J. Martin, *Erratum: Synthesis of Asynchronous VLSI Circuits*, Mar. 22, 2000, Department of Computer Science California Institute of Technology, Pasadena, California, pp. 1-143.

U.V. Cummings, et al. *An Asynchronous Pipelined Lattice Structure Filter*, Department of Computer Science California Institute of Technology, Pasadena, California, pp. 1-8.

Alain J. Martin, et al. *The Design of an Asynchronous MIPS R3000 Microprocessor*, Department of Computer Science California Institute of Technology, Pasadena, California, pp. 1-18.

C.L. Seitz, *System Timing*, chapter 7, pp. 218-262.

F.U. Rosemberger et al., *Internally Clocked Delay-Insensitive Modules*, IEEE Trans., Computers, vol. 37, No. 9, pp. 1005-1018, Sep. 1998.

U.S. Appl. No. 09/501,638, filed on Feb. 10, 2000, entitled, *Reshuffled Communications Processes in Pipelined Asynchronous Circuits*.

Lee et al., *Crossbar-Based Gigabit Packet Switch with an Input-Polling Shared Bus Arbitration Mechanism*, Sep. 21, 1997, XVI World Telecom Congress Proceedings, Interactive Session 3—Systems Technology & Engineering, pp. 435-441.

Ghosh et al., *Distributed Control Schemes for Fast Arbitration in Large Crossbar Networks*, Mar. 1994, IEEE Transactions on Very Large Scale Integration (VLSI) Systems, vol. 2, No. 1, pp. 55-67.

Office Action mailed Jul. 20, 2006 in U.S. Appl. No. 10/136,025, filed Apr. 30, 2002.

\* cited by examiner

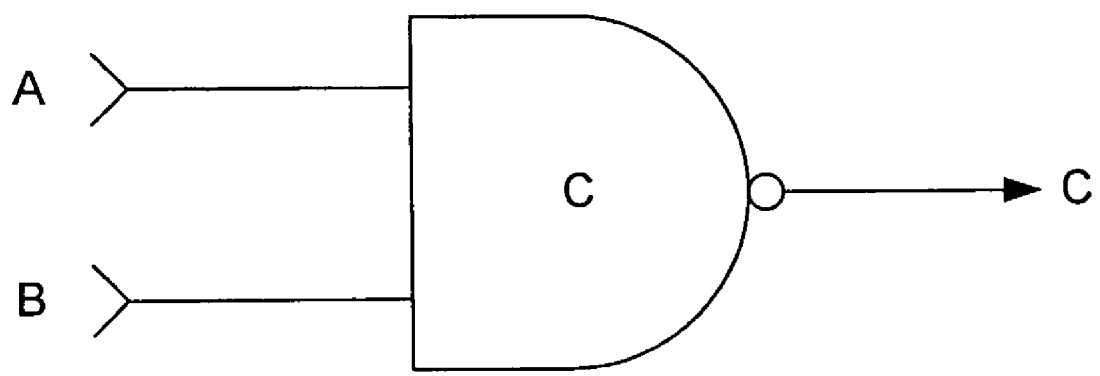
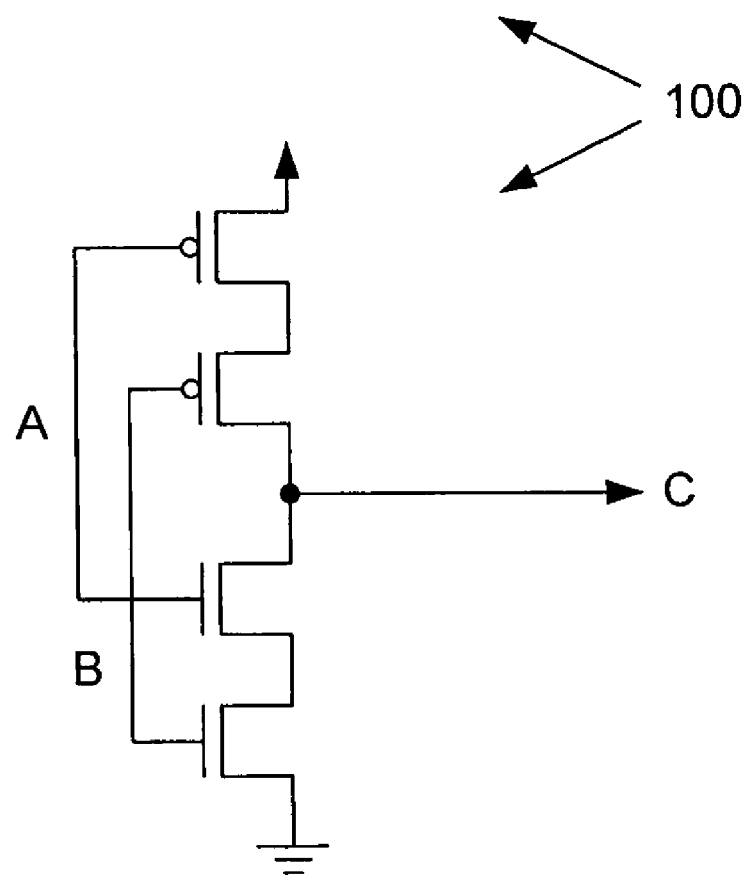
Fig. 1

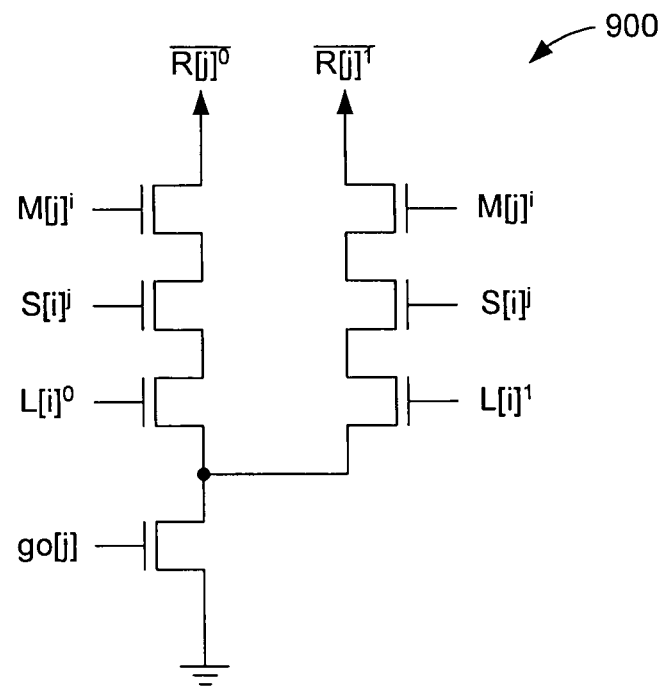
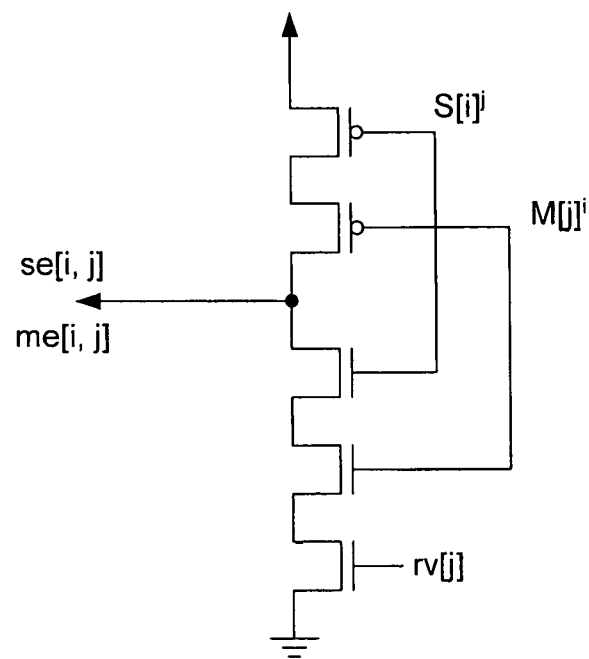
Fig. 9

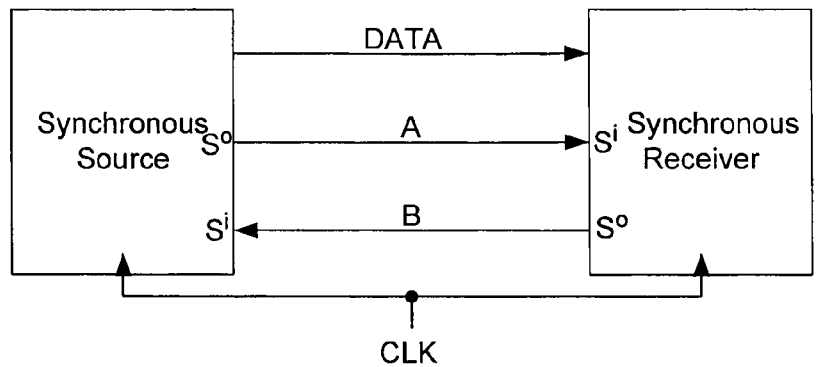
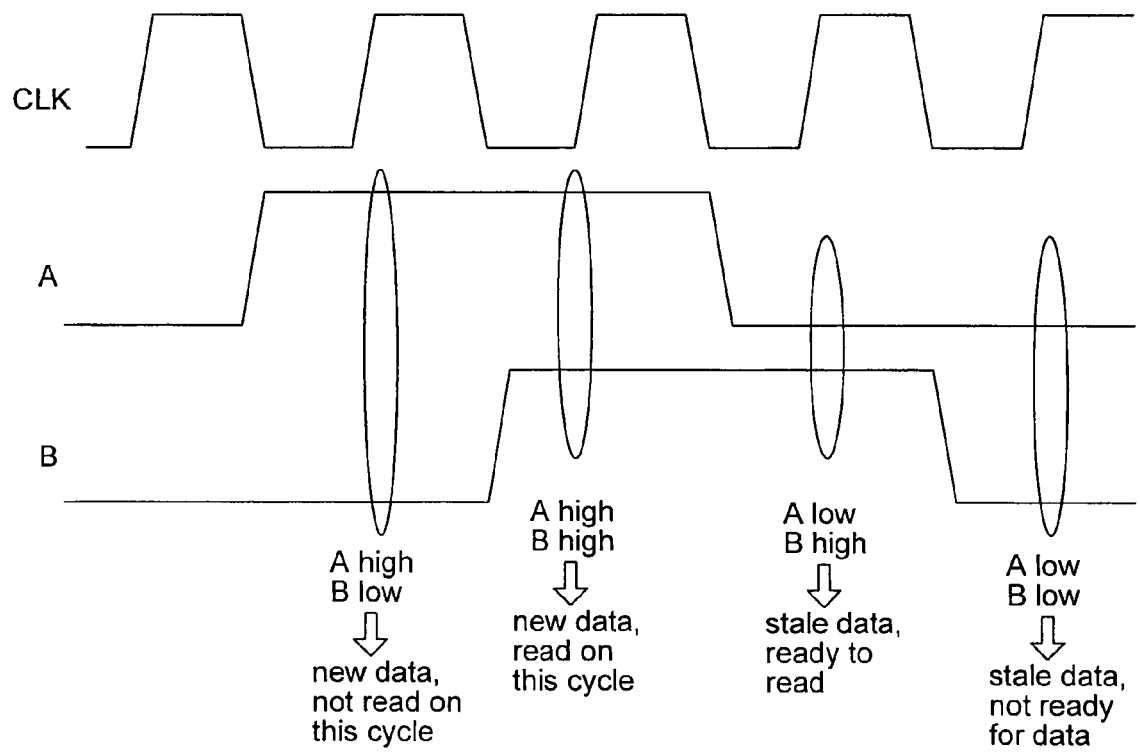
*FIG. 27*

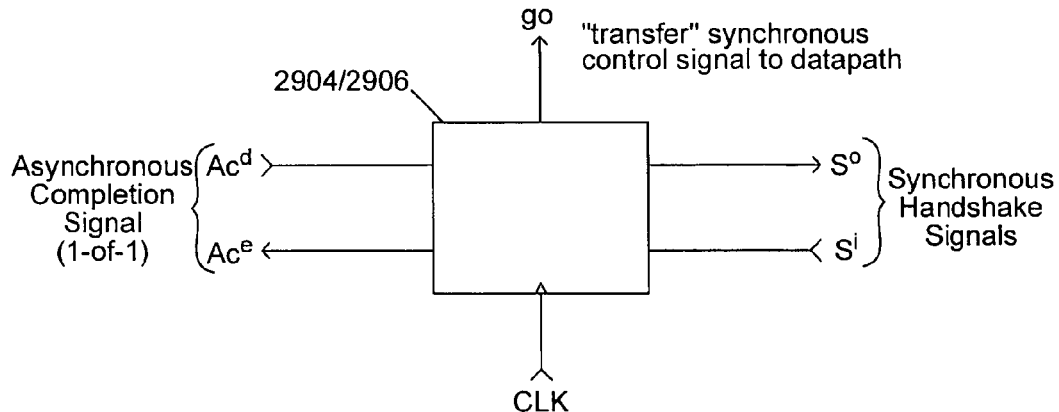
FIG. 30
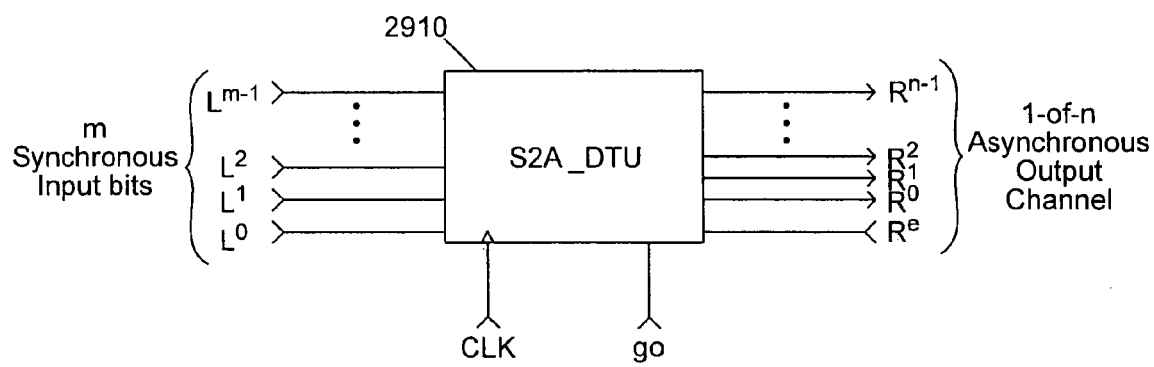
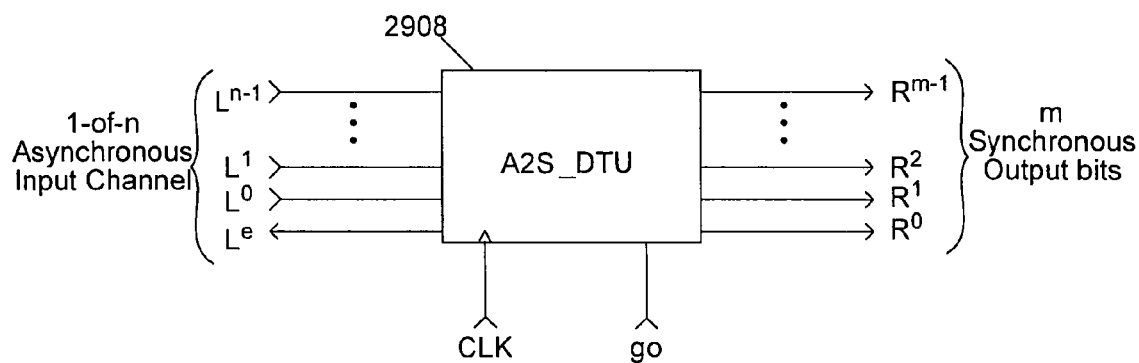
FIG. 31

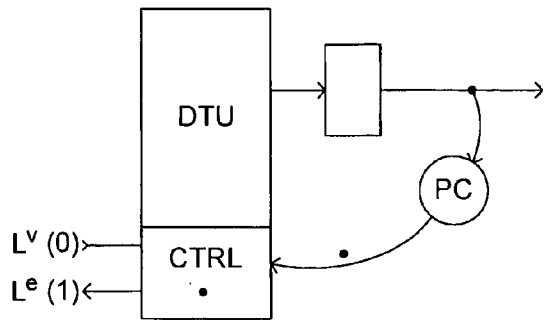
(A) Reset Condition
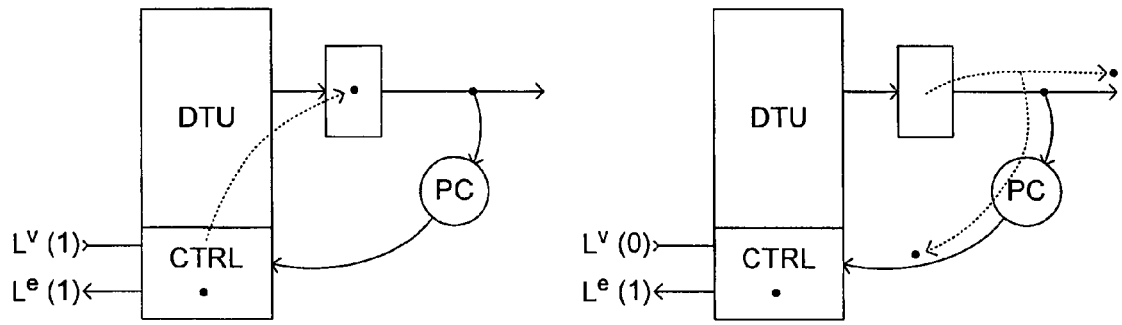
(B) Normal Operation
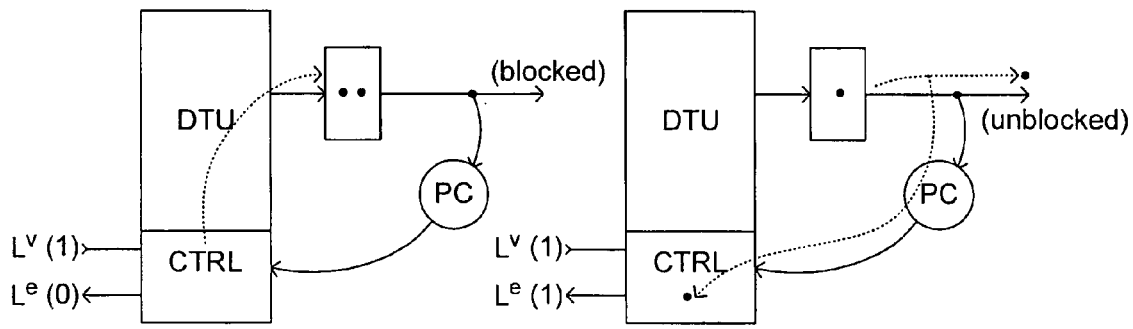
(C) Stall Condition
(Asynchronous Side Stalls)
FIG. 32

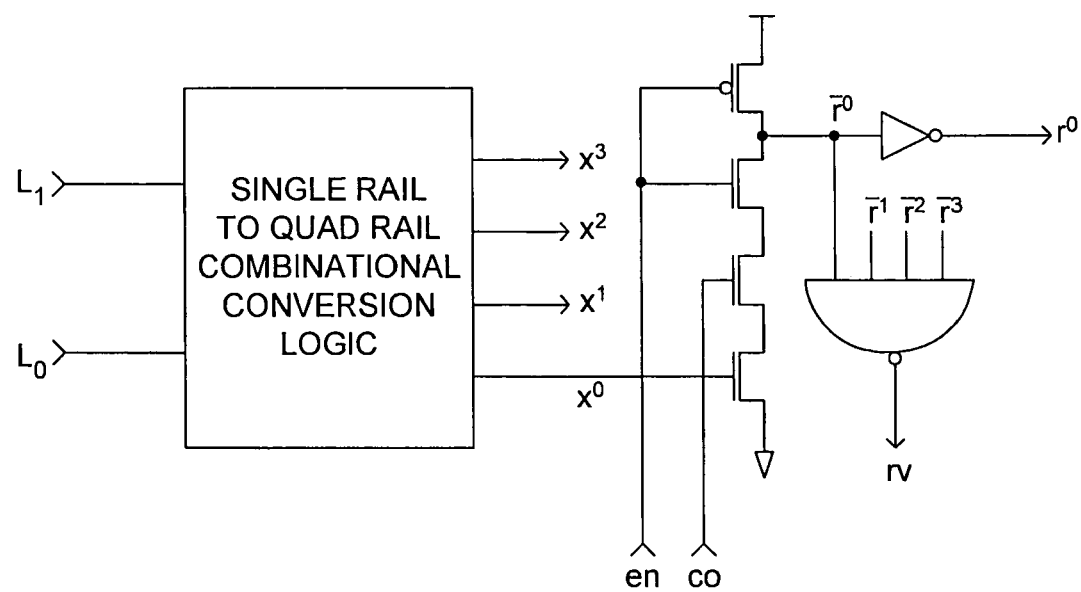
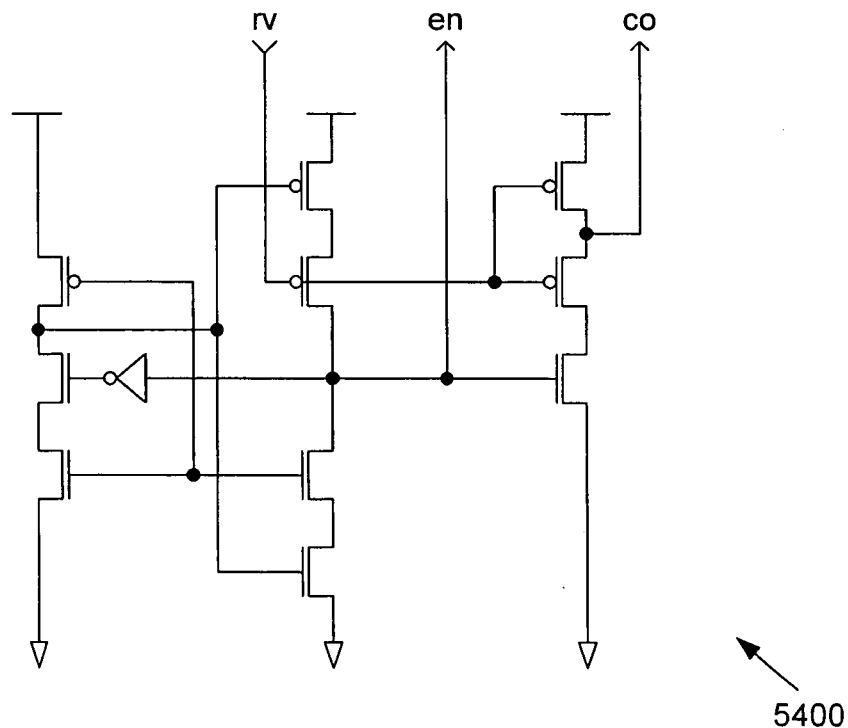
FIG. 54

DTU-S2A
(1-of-4 version)

FIG. 56  Message segmentation MAX_LEN=4

FIG. 57  Burst Transfer Protocol

DECIMATE2 1 of 1
Weak-condition output logic:
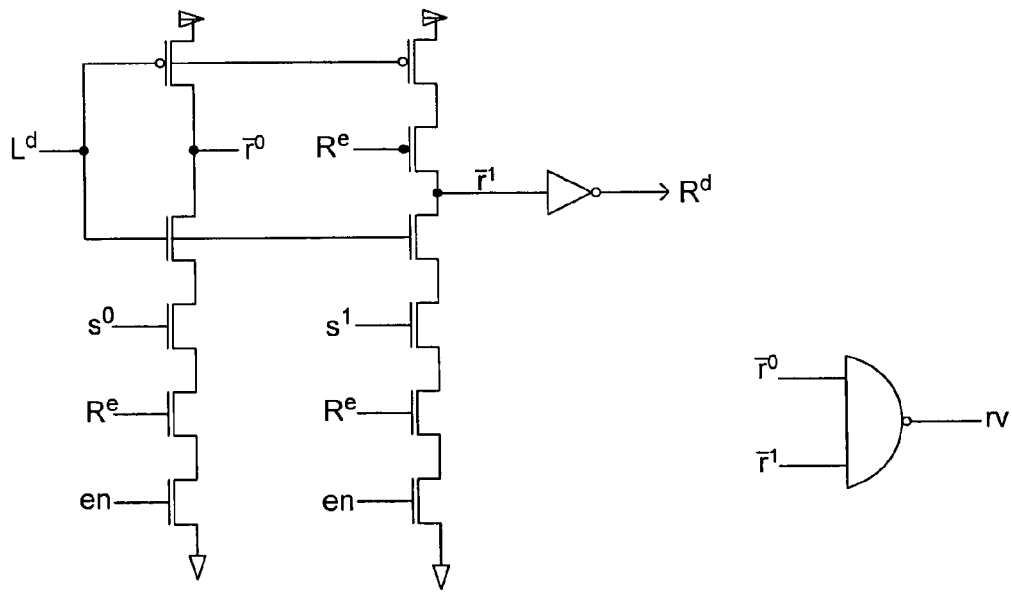
State Logic:
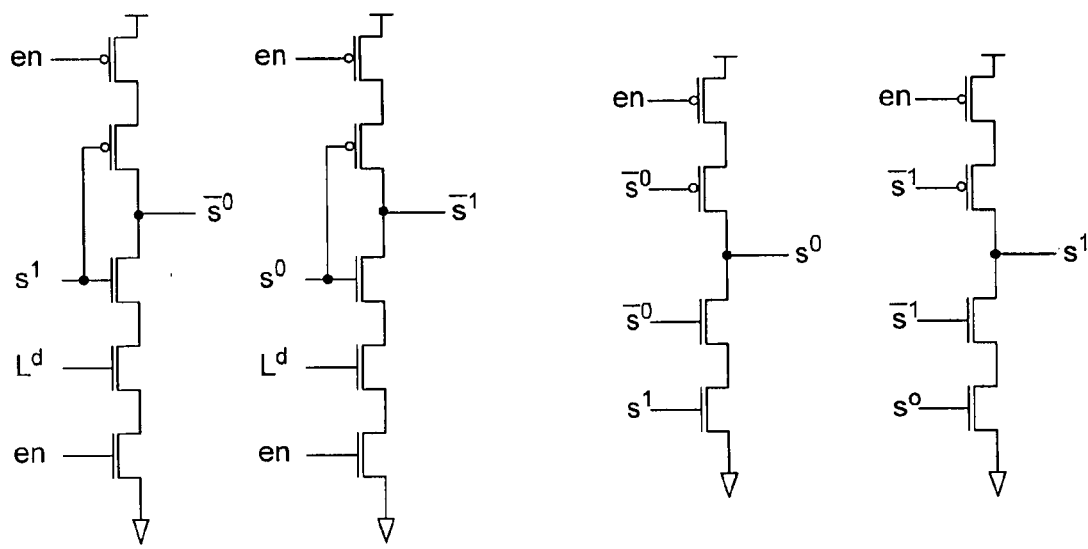
Acknowledge Logic:
FIG. 62

A2S_DDR_DTU ≡
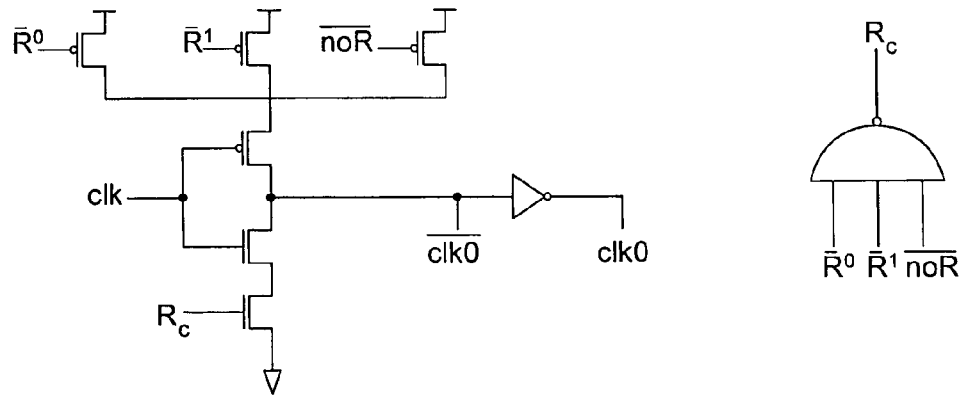
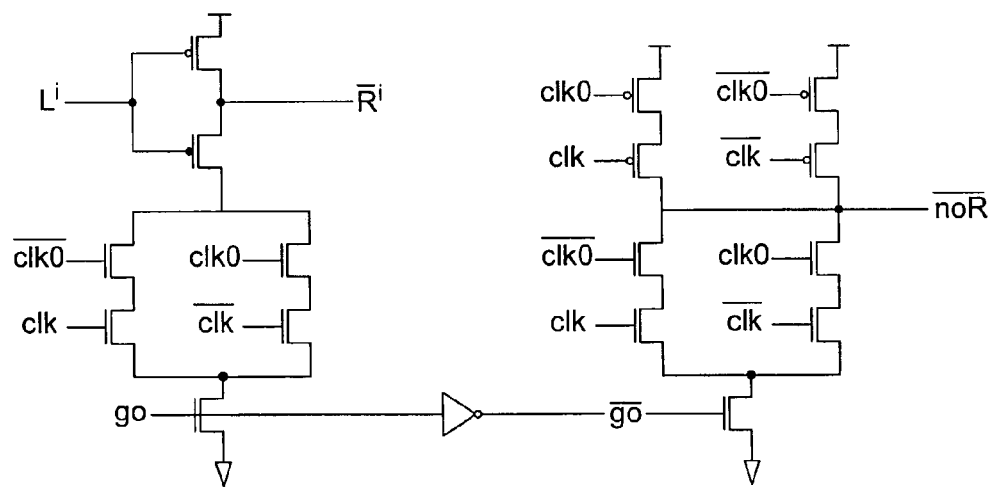
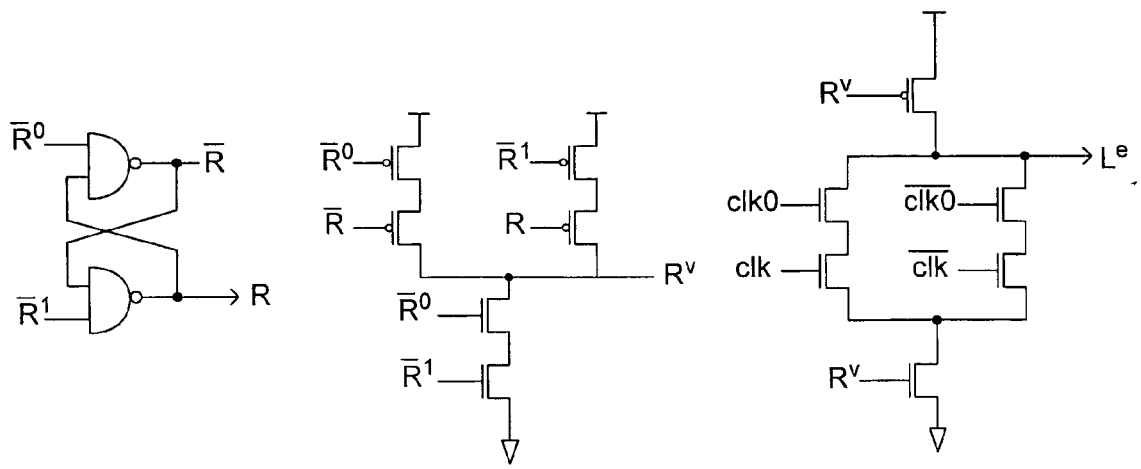
FIG. 63

SLAVE_A2S ==
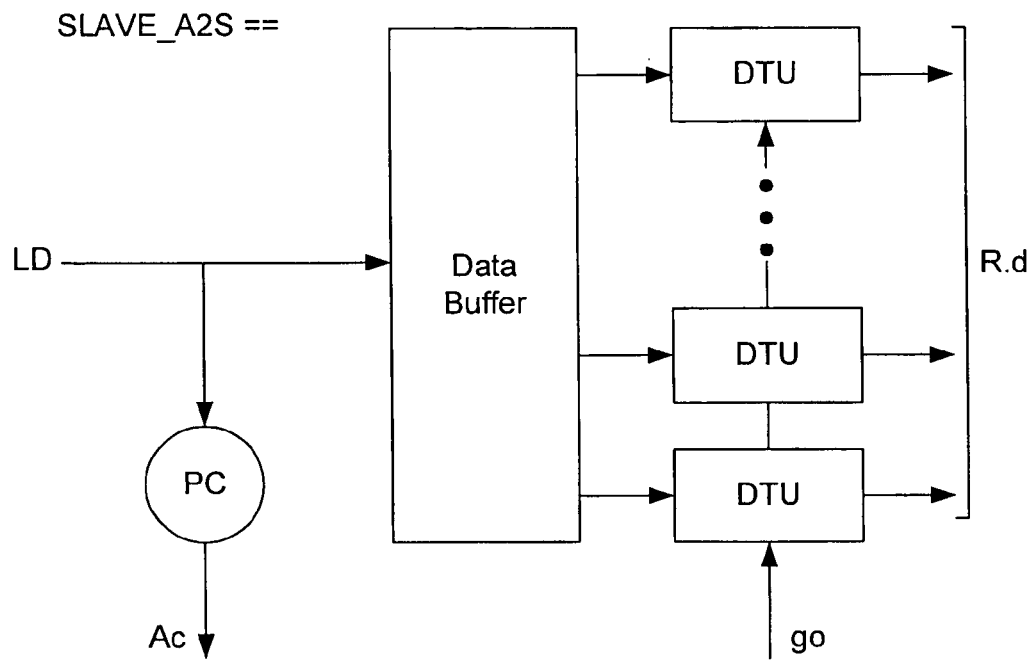
SLAVE_S2A ==
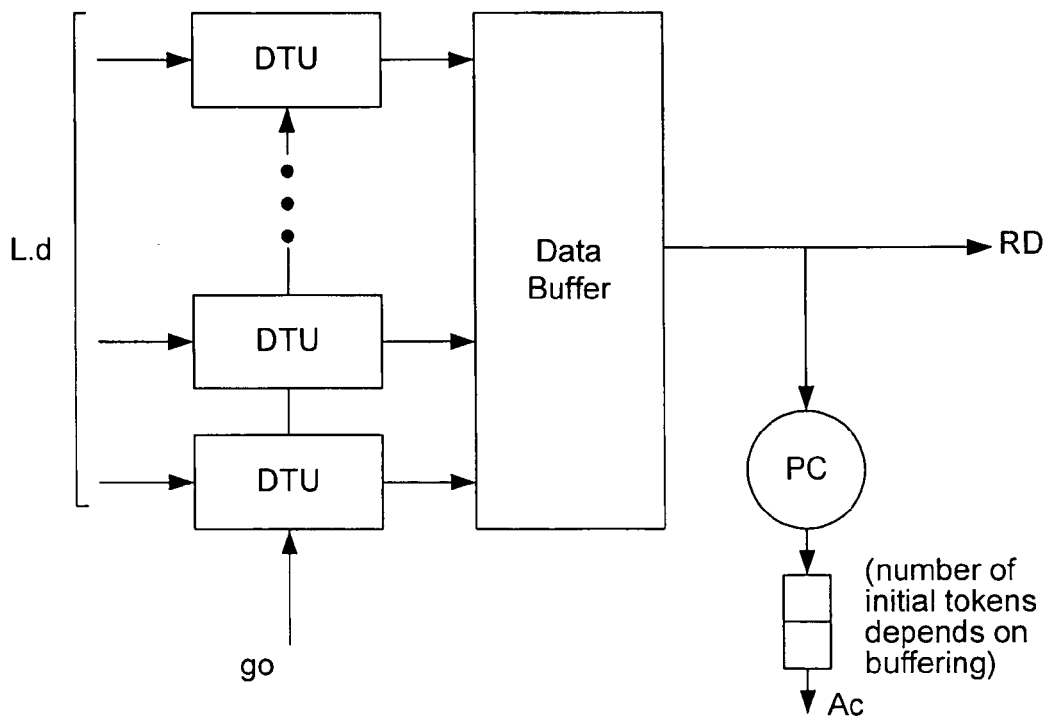
*FIG. 65*

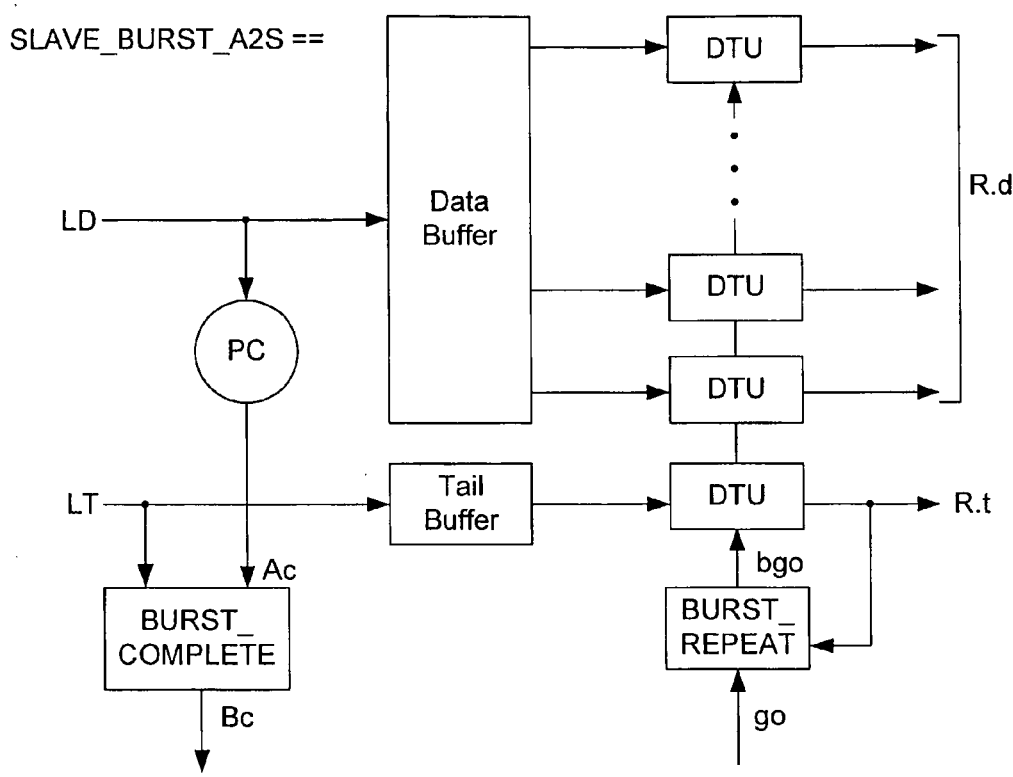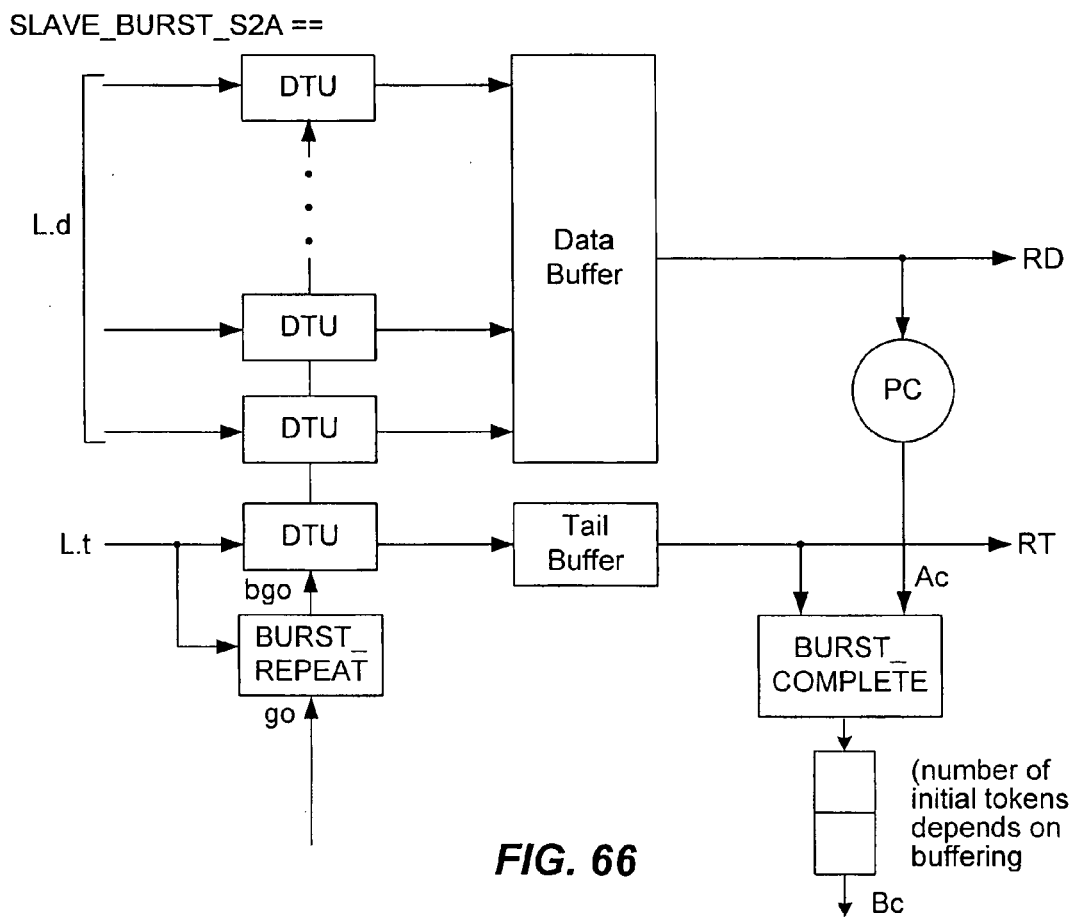
FIG. 66

| Bits | Field | Usage |
|---|---|---|
| v_td[3:0] | SecondNode | Defines the second node of the path to test. |
| v_td[7:4] | Length | Defines the length of the transaction excluding the first word. |
| v_td[15:8] | Pattern | Defines the 8-bit data pattern used to fill up the transaction. |
| v_td[31:16] | RepeatCount | The number of times that the same transaction will be sent. |
| v_td[32:32] | Echo | Forces the BIST to echo the data on v_td, v_to and v_ttail back to the receiver v_rd, v_from and v_rtail respectively without running any test. This is used to test the connection between the scan register and the BIST circuit. |
| v_td[33:33] | WaitData | Forces the BIST to wait for a transaction before issuing another one. |
| v_td[35:34] | NotUsed | |
| v_to[3:0] | FirstNode | Defines the first destination node |
| v_ttail | Tail | End of transaction. |

Fig. 76A

| Bits | Field | Usage |
|---|---|---|
| v_rd[3:0] | FirstNode | Will contain the first node id. |
| v_rd[7:4] | Length | Length of the transaction. |
| v_rd[15:8] | Pattern | 8-bit data pattern used to fill up the transaction. |
| v_rd[31:16] | RepeatCount | Number of times that the same transaction as been sent until an error was encountered. |
| v_rd[32:32] | Echo | Indicates that the transaction was echoed. |
| v_rd[33:33] | Pass | Indicates if the test has been executed successfully or not. |
| v_rd[35:34] | NotUsed | |
| v_from[3:0] | FirstNode | Defines the first destination node |
| v_rtail | Tail | End of transaction. |

Fig. 76B

| 72 64 | 63 56 | 55 48 | 47 40 | 39 32 | 31 24 | 23 16 | 15 8 | 7 0 |
|---|---|---|---|---|---|---|---|---|
| X | X | X | X | X | X | X | X | nextnode |
| pattern | pattern | pattern | pattern | pattern | pattern | pattern | pattern | pattern |
| pattern | pattern | pattern | pattern | pattern | pattern | pattern | pattern | pattern |
| ... | ... | ... | ... | ... | ... | ... | ... | ... |
| pattern | pattern | pattern | pattern | pattern | pattern | pattern | pattern | pattern |

Fig. 76C

ASYNCHRONOUS SYSTEM-ON-A-CHIP INTERCONNECT

RELATED APPLICATION DATA

The present application claims priority from U.S. Provisional Patent Application No. 60/444,820 for ASYNCHRONOUS INTERCONNECT SYSTEM filed on Feb. 3, 2003, the entire disclosure of which is incorporated herein by reference. The present application also claims priority from U.S. patent application Ser. No. 10/136,025 for ASYNCHRONOUS CROSSBAR CIRCUIT WITH DETERMINISTIC OR ARBITRATED CONTROL filed on Apr. 30, 2002, and U.S. patent application Ser. No. 10/212,574 for TECHNIQUES FOR FACILITATING CONVERSION BETWEEN ASYNCHRONOUS AND SYNCHRONOUS DOMAINS filed on Aug. 1, 2002, the entire disclosures of both of which are incorporated herein by reference for all purposes.

BACKGROUND OF THE INVENTION

The present invention relates to asynchronous digital circuit design and in particular to asynchronous circuitry for interconnecting a variety of system resources in the context of a system-on-a-chip.

A so called "system-on-a-chip" (SOC) is typically designed with a number of modules, each of which has its own clock. For example, such a system might include a memory controller, an I/O interface (e.g., PCI or HyperTransport), internal peripherals (e.g., SRAM or computing logic), computing resources (e.g., one or more CPUs), and some kind of interconnect for allowing the modules to interact with each other. In a typical SOC, the memory controller might operate at 300 MHz, the I/O interface at 400 MHz, the internal peripherals at 600 MHz, and each of the CPUs at 1.1 GHz. This makes it very difficult to implement an efficient interconnect solution.

Conventional approaches to this problem involve the use of a high speed synchronous bus in which transmissions to and from the various system modules on the bus are synchronized. That is, such a bus typically employs a clock signal the value of which is constrained by specific ratios with the clock signals being synchronized. Not only is this synchronization difficult to achieve, as soon as the performance of any of the modules (which are typically associated with different vendors) changes, i.e., clock speed increases, the ratios of the synchronization solution no longer apply, and a completely new solution must be implemented.

In view of the foregoing, it is desirable to provide an interconnect solution for implementing SOCs which allows various system modules having independent clock domains to communicate effectively and efficiently. It is also desirable that any such interconnect solution be flexible with regard to changes in individual system module performance.

SUMMARY OF THE INVENTION

According to the present invention, a system interconnect solution is provided which is operable to interconnect system modules having different clock domains in a manner which is insensitive to variations in system module performance.

According to various embodiments, the present invention provides methods and apparatus relating to an integrated circuit which includes a plurality of synchronous modules, each synchronous module having an associated clock domain characterized by a data rate, the data rates comprising a plurality of different data rates. The integrated circuit also includes a plurality of clock domain converters. Each clock domain converter is coupled to a corresponding one of the synchronous modules, and is operable to convert data between the clock domain of the corresponding synchronous module and an asynchronous domain characterized by transmission of data according to an asynchronous handshake protocol. An asynchronous crossbar is coupled to the plurality of clock domain converters, and is operable in the asynchronous domain to implement a first-in-first-out (FIFO) channel between any two of the clock domain converters, thereby facilitating communication between any two of the synchronous modules. According to a more specific embodiment of the invention, the integrated circuit includes at least one repeater. Each repeater is coupled between a selected one of the clock domain converters and the asynchronous crossbar.

According to various implementations, the integrated circuit may comprise a wide variety of system types including, for example, multi-processor data processing systems, and synchronous optical network (SONET) interconnect switches.

A further understanding of the nature and advantages of the present invention may be realized by reference to the remaining portions of the specification and the drawings.

BRIEF DESCRIPTION OF THE DRAWINGS

FIG. 1 illustrates a Mueller consensus element.

FIG. 9 is a schematic representation of a first implementation of a router cell.

FIGS. 27-45 illustrate various components of specific implementations of an A2S interface and an S2A interface according to various specific embodiments of the invention.

FIGS. 46-55 illustrate various components of specific implementations of an A2S interface and an S2A interface according to various other specific embodiments of the invention.

FIGS. 56-64 illustrate various implementations of A2S and S2A burst-mode interfaces according to specific embodiments of the invention.

FIGS. 65-69 illustrate various implementations of A2S and S2A burst-mode interfaces according to other specific embodiments of the invention.

FIGS. 76A-76C illustrate exemplary test vector and transaction formats according to a particular embodiment.

DETAILED DESCRIPTION OF SPECIFIC EMBODIMENTS

Figure 2:
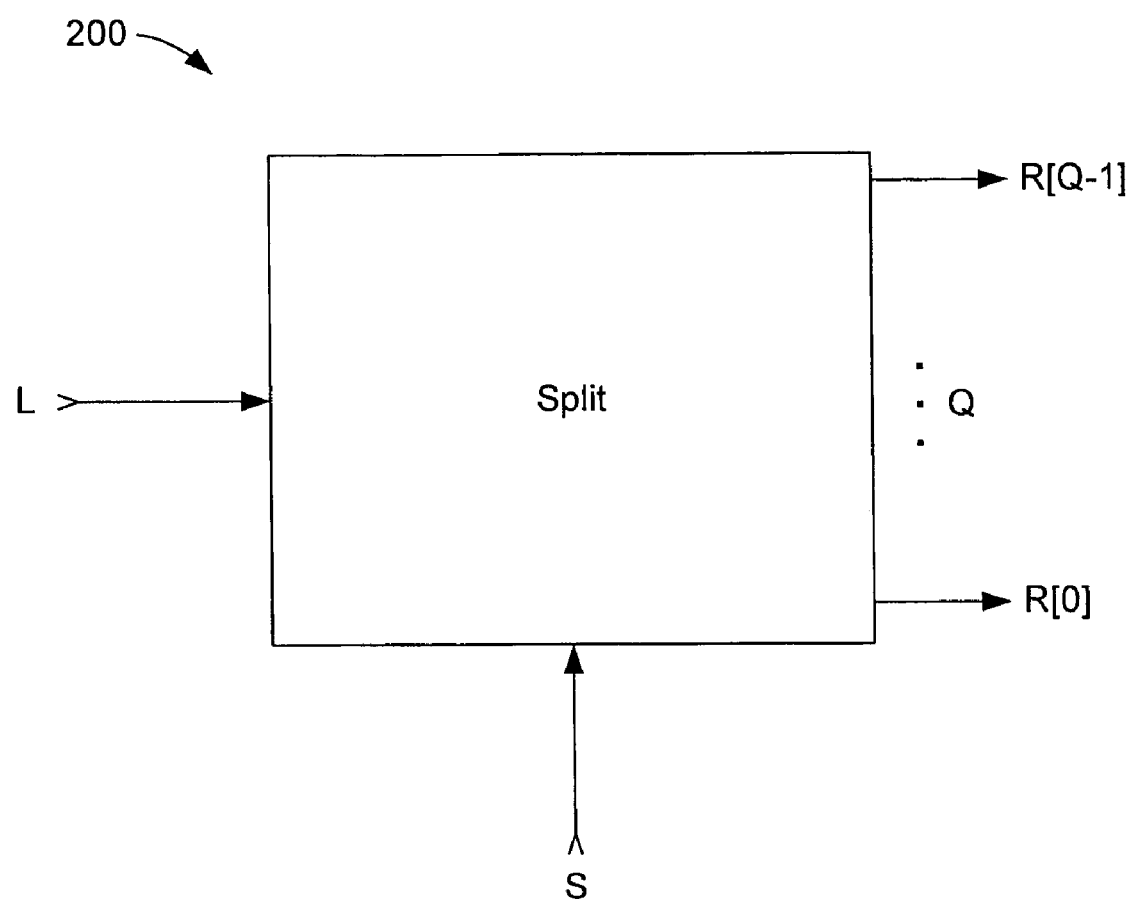
FIG. 2 is a representation of a Q-way split.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In addition, well known process operations have not been described in detail in order not to unnecessarily obscure the present invention.

Asynchronous VLSI is an active area of research and development in digital circuit design. It refers to all forms of digital circuit design in which there is no global clock synchronization signal. Delay-insensitive asynchronous designs, by their very nature are insensitive to the signal propagation delays which have become the single greatest obstacle to the advancement of traditional design paradigms. That is, delay-insensitive circuit design maintains the property that any transition in the digital circuit could have an unbounded delay and the circuit will still behave correctly. The circuits enforce sequencing but not absolute timing. This design style avoids design and verification difficulties that arise from timing assumptions, glitches, or race conditions.

For background information regarding delay-insensitive asynchronous digital design, please refer to the following papers: A. J. Martin, "Compiling Communicating Processes into Delay-Insensitive Circuits," *Distributed Computing*, Vol.1, No. 4, pp. 226-234, 1986; U. V. Cummings, A. M. Lines, A. J. Martin, "An Asynchronous Pipelined Lattice Structure Filter." *Advanced Research in Asynchronous Circuits and Systems*, IEEE Computer Society Press, 1994; A. J. Martin, A. M. Lines, et al, "The Design of an Asynchronous MIPS R3000 Microprocessor." *Proceedings of the 17th Conference on Advanced Research* in VLSI, IEEE Computer Society Press, 1997; and A. M. Lines, "Pipelined Asynchronous Circuits." *Caltech Computer Science Technical Report* CS-TR-95-21, Caltech, 1995; the entire disclosure of each of which is incorporated herein by reference for all purposes.

See also U.S. Pat. No. 5,752,070 for "Asynchronous Processors" issued May 12, 1998, and U.S. Pat. No. 6,038,656 for "Pipelined Completion for Asynchronous Communication" issued on Mar. 14, 2000, the entire disclosure of each of which is incorporated herein by reference for all purposes.

At the outset, it should be noted that many of the techniques and circuits described in the present application are described and implemented as delay-insensitive asynchronous VLSI. However it will be understood that many of the principles and techniques of the invention may be used in other contexts such as, for example, non-delay insensitive asynchronous VLSI and synchronous VLSI.

It should also be understood that the various embodiments of the invention may be implemented in a wide variety of ways without departing from the scope of the invention. That is, the asynchronous processes and circuits described herein may be represented (without limitation) in software (object code or machine code), in varying stages of compilation, as one or more netlists, in a simulation language, in a hardware description language, by a set of semiconductor processing masks, and as partially or completely realized semiconductor devices. The various alternatives for each of the foregoing as understood by those of skill in the art are also within the scope of the invention. For example, the various types of computer-readable media, software languages (e.g., Verilog, VHDL), simulatable representations (e.g., SPICE netlist), semiconductor processes (e.g., CMOS, GaAs, SiGe, etc.), and device types (e.g., FPGAs) suitable for designing and manufacturing the processes and circuits described herein are within the scope of the invention.

The present application also employs the pseudo-code language CSP (concurrent sequential processes) to describe high-level algorithms. CSP is typically used in parallel programming software projects and in delay-insensitive VLSI. It will be understood that the use of this particular language and notation is merely exemplary and that the fundamental aspects of the present invention may be represented and implemented in a wide variety of ways without departing from the scope of the invention.

In addition, transformation of CSP specifications to transistor level implementations for various aspects of the circuits described herein may be achieved according to the techniques described in "Pipelined Asynchronous Circuits" by A. Lines (incorporated by reference above). However, it should be understood that any of a wide variety of asynchronous design techniques may also be used for this purpose.

The CSP used herein has the following structure and syntax. A process is static and sequential and communicates with other processes through channels. Together a plurality of processes constitute a parallel program. The [and] demark if statements, and a *[and] demark loops.

Multiple choices can be made by adding pairs of B→S inside an if statement or a loop, separated by a □ (indicates deterministic selection) or a I (indicates non-deterministic selection), where B is a Boolean expression and S is a statement. Thus [B1→S1□B2→S2] means if expression B1 is true, execute S1 or if expression B2 is true, execute S2. If neither B1 or B2 is true, this statement will wait until one is (unlike an if-else construct). The shorthand *[S] means repeat statement S infinitely. The shorthand [B] means wait for Boolean expression B to be true. Local variables are assumed to be integers, and can be assigned to integer expressions as in x:=y+1. The semicolon separates statements with strict sequencing. The comma separates statements with no required sequencing. The question mark and exclamation point are used to denote receiving from and sending to a channel, respectively. Thus *[A?x; y:=x+1; B!y] means receive integer x from channel A, then assign integer y to the expression x+1, then send y to channel B, then repeat forever.

According to various specific embodiments of the invention, the latching of data happens in channels instead of registers. Such channels implement a FIFO (first-in-first-out) transfer of data from a sending circuit to a receiving circuit. Data wires run from the sender to the receiver, and an enable (i.e., an inverted sense of an acknowledge) wire goes backward for flow control. According to specific ones of these embodiments, a four-phase handshake between neighboring circuits (processes) implements a channel. The four phases are in order: 1) Sender waits for high enable, then sets data valid; 2) Receiver waits for valid data, then lowers enable; 3) Sender waits for low enable, then sets data neutral; and 4) Receiver waits for neutral data, then raises enable. It should be noted that the use of this handshake protocol is for illustrative purposes and that therefore the scope of the invention should not be so limited.

According to specific embodiments, the delay-insensitive encoding of data is dual rail, also called 1of2. In this encoding, 2 wires (rails) are used to represent 2 valid states and a neutral state. When both wires are low, the data is neutral. When the first wire is high the data is valid 0. When the second wire is high the data is a valid 1. Both wires aren't allowed to be high at once. The wires associated with channel X are written $X^0$, $X^1$ for the data, and $X^e$ for the enable.

According to other embodiments, larger integers are encoded by more wires, as in a 1of3 or 1of4 code. For much larger numbers, multiple 1of N's are used together with different numerical significance. For example, 32 bits can be represented by 32 1of2 codes or 16 1of4 codes. In this case, a subscript indicates the significance of each 1ofN code, i.e., $L_g^r$ is the rth wire of the gth bit (or group), and $L_g^e$ is the associated enable.

According to still other embodiments, several related channels may be organized into a 1-D or 2-D array, such as L[i] or V [i, j]. To identify individual wires in such embodiments, the notation $L[i]^r$ or $L[i]_g^r$ is used.

According to a specific embodiment, the design of a crossbar according to the invention employs a method described in U.S. Pat. No. 6,038,656 (incorporated herein by reference above) to improve the speed of large datapaths. This method describes a way of breaking up the datapath into multiple datapaths of smaller bit sizes, for example, reducing one thirty-two bit datapath into four eight bit datapaths, while preserving insensitivity to delays.

Some of the figures in this disclosure include box and arrow diagrams and transistor diagrams. In the box diagrams, the boxes represent circuits or processes and the arrows represent FIFO channels between the boxes. FIFO channels may also exist within the boxes. Any channel or wire with the same name is intended to be connected, even when no connection is drawn. Sometimes the "internal" port names of a circuit are drawn inside the box next to an incoming or outgoing channel.

In the transistor diagrams, arrows (or lines) represent individual wires. Standard gate symbols are used wherever possible, with the addition of a C-element, drawn like a NAND gate with a "C" on it. This gate is a standard asynchronous gate, also called a Mueller C-element or a consensus element. A gate representation and a transistor level implementation of a C-element 100 are shown in FIG. 1.

It should be noted that for the purpose of clarity, certain features are omitted from the circuit diagrams. For example, some circuit nodes are "dynamic" which means that they are not always driven high or low, and are expected to hold their state indefinitely. This requires a "staticizer," i.e., a pair of small cross-coupled inverters attached to the node. Staticizers are omitted, but can be inferred to exist on any node where the pull-up and pull-down networks are not logical complements (essentially all non-standard gates and C-elements). In addition, most of these pipelined circuits must be reset to an initial state when the chip boots, which requires a few extra transistors using Reset and $\overline{\text{Reset}}$ signals. Usually the reset state is achieved by forcing the left enables low while Reset is asserted.

Figure 3:
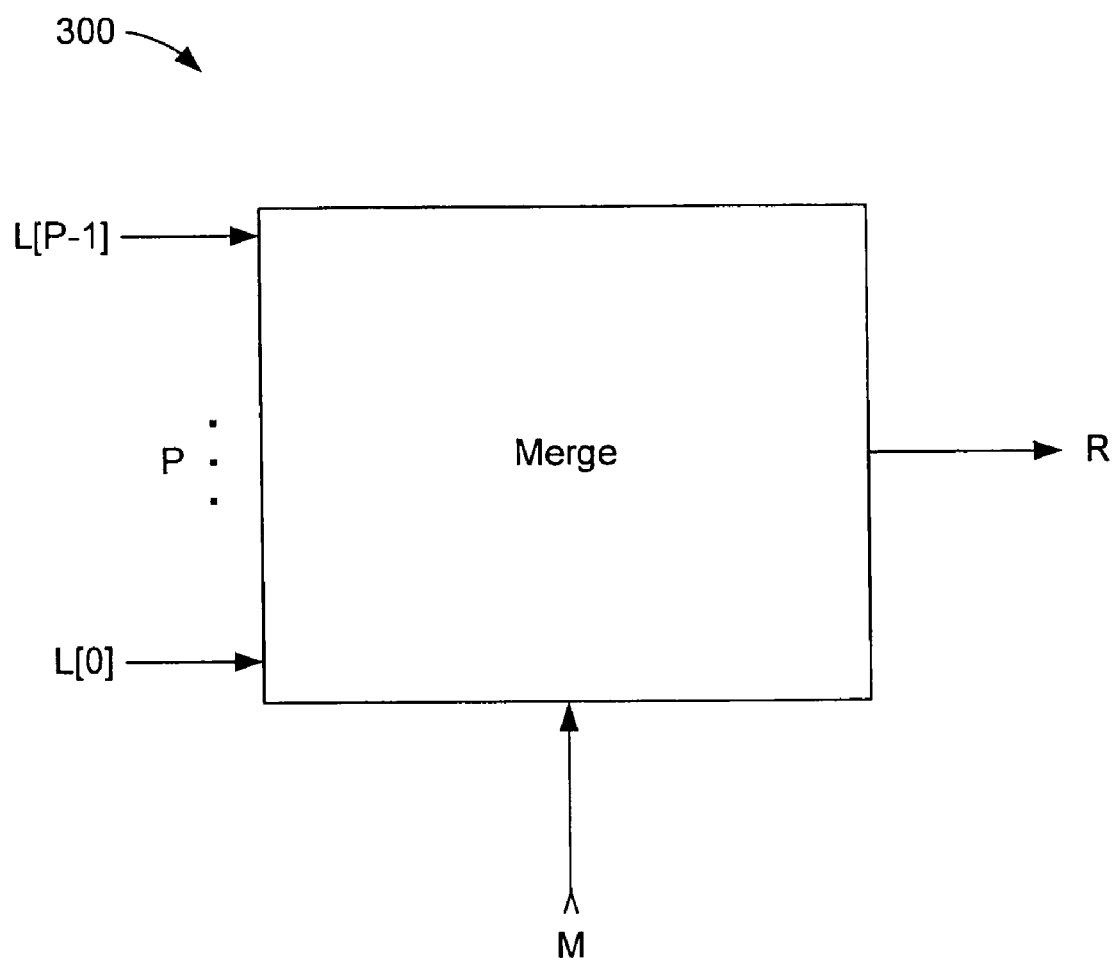
FIG. 3 is a representation of a P-way merge.

As described herein, a Split is a 1 to Q bus which reads a control channel S, reads one token of input data from a single L channel, then sends the data to one of Q output channels selected by the value read from S. A Merge is a P to 1 bus which reads a control channel M, then reads a token of data from one of P input channels as selected by the value read from M, then sends that data to a single output channel R. FIG. 2 shows a basic block diagram of a Split 200. FIG. 3 shows a basic block diagram of a Merge 300. See also "Pipelined Asynchronous Circuits" by A. Lines incorporated by reference above.

Figure 4:
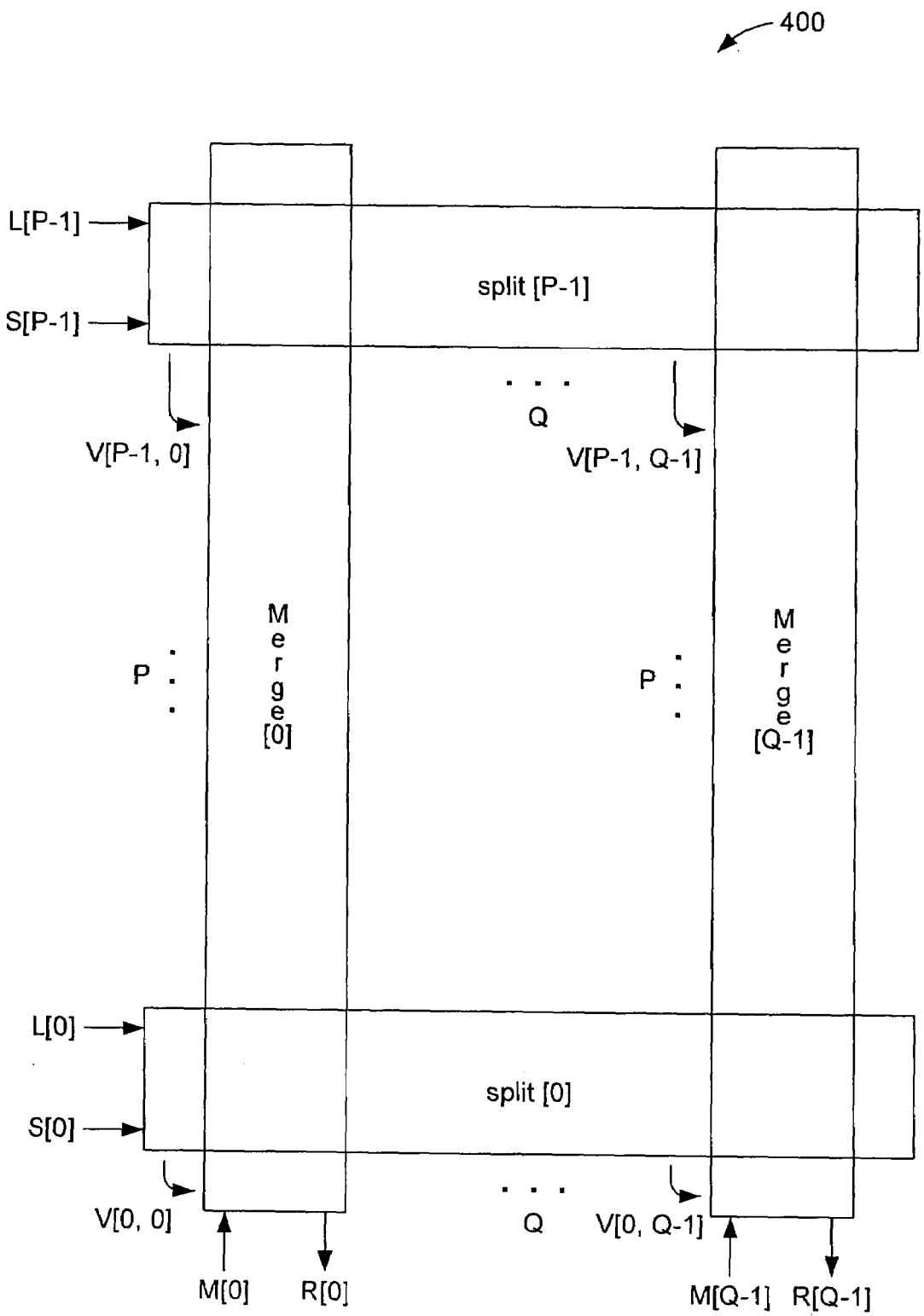
FIG. 4 is a simplified representation of an asynchronous crossbar.

According to various embodiments of the invention, a P to Q crossbar 400 may be constructed from P Q-way splits and Q P-way merges as shown in FIG. 4. The ith of the P split busses, i.e., split[i], runs the program *[S[i]?j, L[i]?x; V[i,j]!x]. The jth of the Q merge busses, i.e., merges[j], runs the program *[M[j]?i; V[i,j]?x; R[j]!x]. According to a first asynchronous crossbar design which may be employed with various embodiments of the invention, the V[i,j] represent intermediate data channels between the split data outputs and the merge data inputs. According to specific embodiments of the invention described below, these channels have been eliminated.

Crossbar 400 is controlled from both the input and output sides via the S[i] and M[j] control channels. Based on the information in these control channels, the sequence of tokens sent through each channel is completely deterministic with respect to the input and output channels, but not with respect to any larger group of channels. That is, the timing of communications on unrelated channels is unconstrained. Any two unrelated pairs of input/output ports can communicate in parallel without any contention. If two input/output transfers refer to the same input or output port, the control stream associated with that port will unambiguously determine the ordering. Various techniques for generating the information in these control channels are described below.

As mentioned earlier in this document, one type of asynchronous crossbar designed according to the present invention includes actual channels V[i,j] for passing information from a split bus to the designated merge bus. These channels may be used to advantage in a variety of ways. For example, varying amounts of buffering may be added to the intermediate channels associated with each link to achieve various performance objectives. However, because of these channels and the associated handshaking overhead, the size and/or power consumption of an asynchronous crossbar designed in such manner could be prohibitive depending upon the magnitude of either P or Q.

Thus, a specific embodiment of the invention provides a crossbar design which eliminates at least some of these channels by combining at least a portion of the split and merge functionalities into a single router cell (the notation router_cell is also used herein). The externally visible behavior of an asynchronous crossbar designed according to this embodiment is virtually identical to that of the same size (i.e., P to Q) crossbar including the V[i,j] channels except that the enhanced crossbar design has one stage less slack (i.e., pipeline depth).

A specific embodiment of a crossbar designed according to the present invention will now be described with reference to FIGS. 5-8. According to this implementation, each split bus includes one split_env part and Q split_cell parts, and each merge bus includes one merge_env part and P merge_cell parts. The split_cell contains the part of the split bus replicated for each output channel, and the split_env contains the rest of the circuitry. Likewise, the merge_cell contains the part of the merge bus replicated for each input channel. As will be discussed with reference to FIG. 9, and according to a specific embodiment, the functionalities of each pair of split_cell and merge_cell corresponding to a particular input/output combination is combined into a single router_cell, thus eliminating the intervening channels between the split and merge busses.

Figure 5:
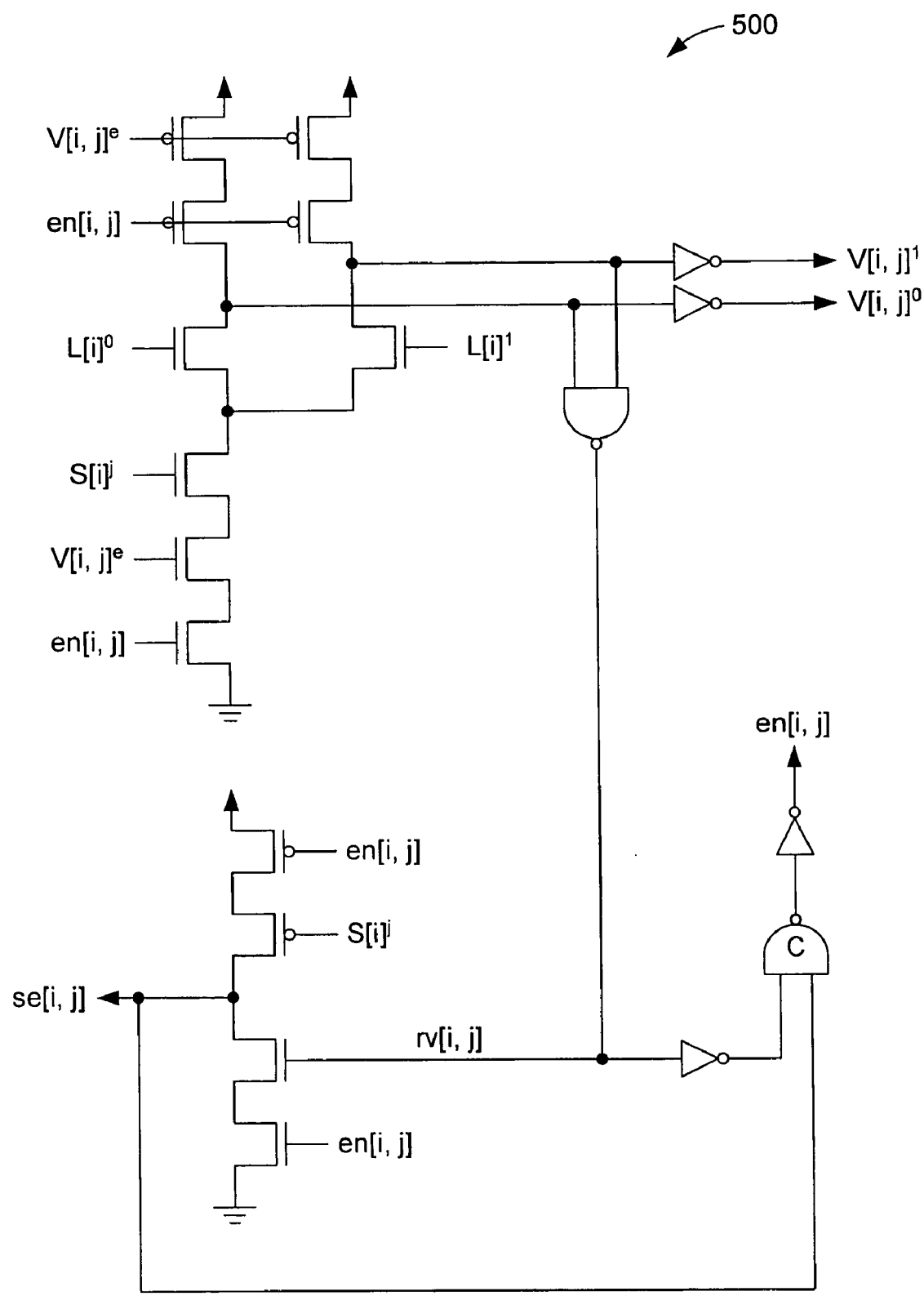
FIG. 5 is a schematic representation of a first portion of split bus.

Functionally, each split_cell[i,j] waits for S[i] to be valid and checks that the value of S[i] equals j (that is, $S[i]^j$ is true). If so, it checks the enable from its output $V[i,j]^e$ and when that is high, it copies the valid data from L[i] to V[i,j]. Once the data are copied to V[i,j], the split_cell[i,j] lowers its enable to the $split_{13}$ env, se[i, j]. Eventually, the S[i], L[i], and $V[i,j]^e$ return to neutral, so that the split_cell[i,j] can reset the data and raise se[i,j] again. A schematic for a split_cell 500 with 1-bit data and 1-bit control (both encoded as 1of2 codes) is shown in FIG. 5.

Figure 6:
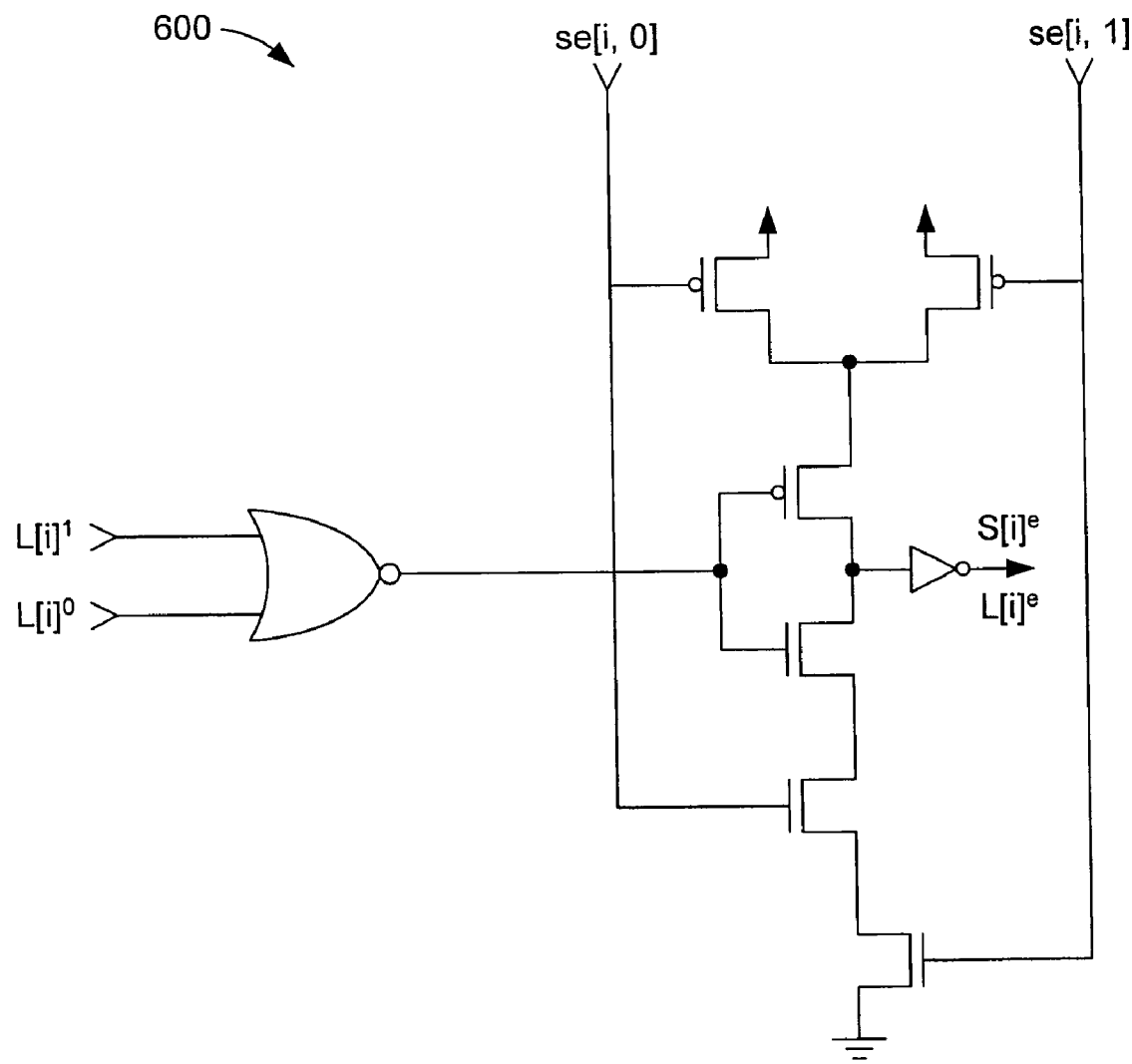
FIG. 6 is a schematic representation of a second portion of a split bus.

The split_env[i] tests the validity and neutrality of the L[i] channel, computes the logical AND of the se[i, 0 . . . Q-1]'s from the split_cell's, and produces an acknowledge for the S[i] and L[i] input channels. The validity and neutrality of the S[i] channel is implied by the acknowledges from the split_cell's. A schematic for a split_env 600 for 1-bit data and 2 split_cell's is shown in FIG. 6.

Figure 7:
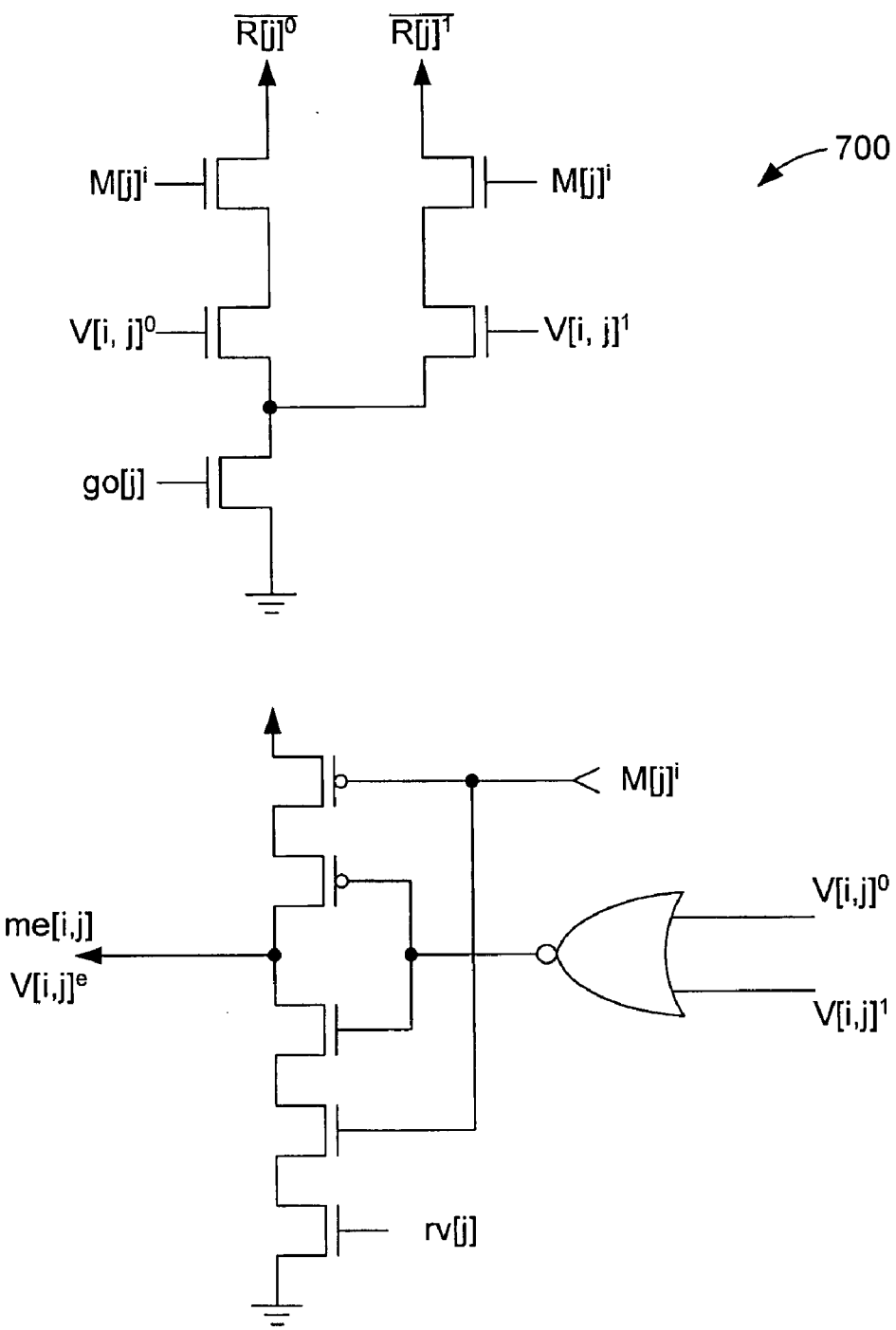
FIG. 7 is a schematic representation of a first portion of a merge bus.

Each merge_cell[i,j] waits for M[j] to be valid and checks that the value of M[j] equals i (that is, $M[j]^i$ is true). If so, it waits for a go [j] signal from the merge_env (which includes the readiness of the output enable $R[j]^e$) and for the input data V[i,j] to be valid. When this happens, it copies the value of V[i,j] to R[j]. The merge_env checks the validity of R[j] and broadcasts this condition back to all the merge_cells 's by setting rv[j] high. Next, the merge_cell lowers its enables me[i,j] and $V[i,j]^e$. Once the M[j] and V[i,j] data return to neutral, and go[j] is lowered, the R[U] is returned to neutral, rv[j] is lowered, and the merge_cell raises the enables me[i,j] and $V[i,j]^e$. A schematic for a merge_cell 700 with 1-bit data and 1-bit control (encoded as 1of2 codes) is shown in FIG. 7.

Figure 8:
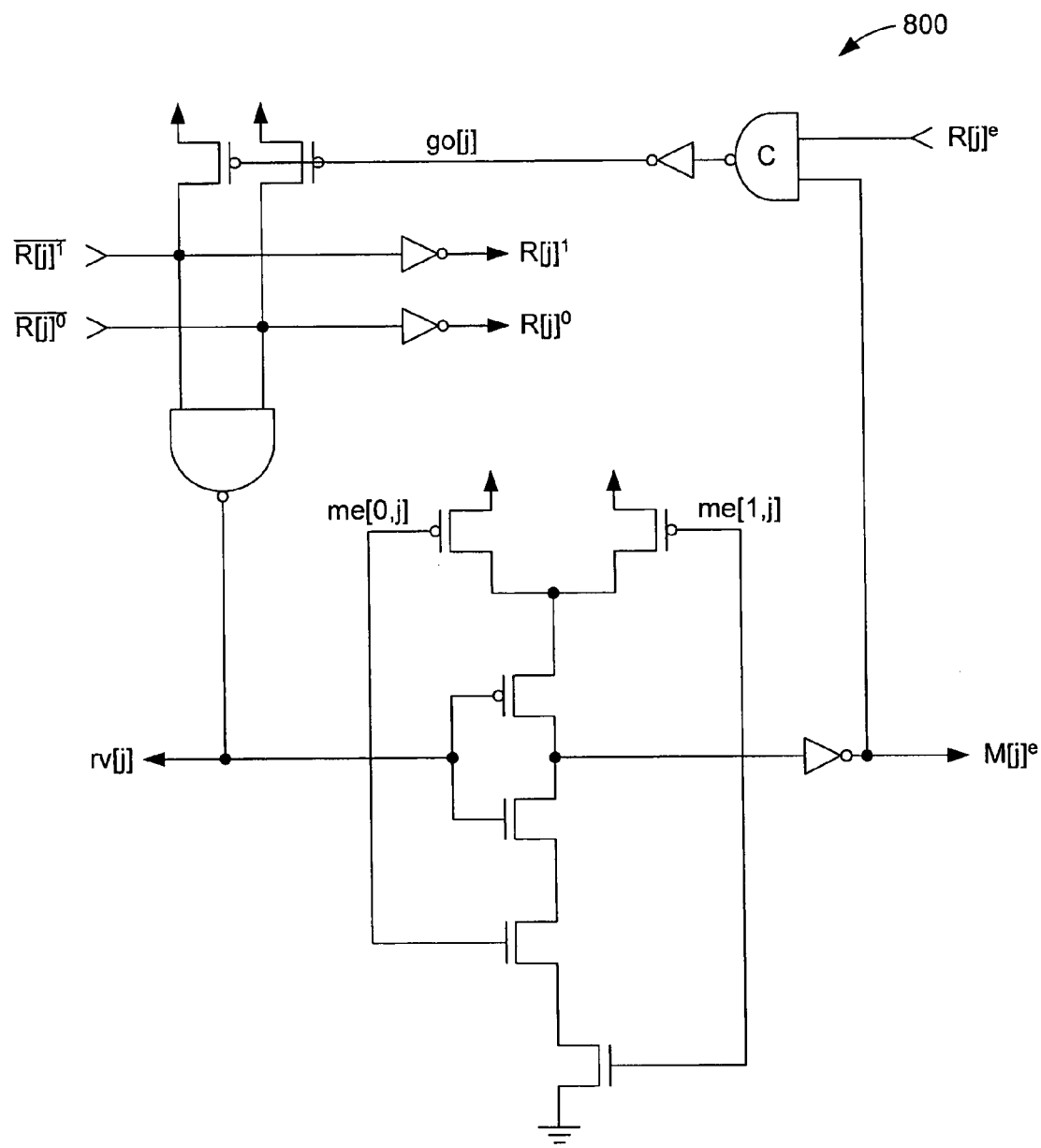
FIG. 8 is a schematic representation of a second portion of a merge bus.

The merge_env checks the readiness of the R[j] acknowledge and raises go[j]. The M[j] goes directly to the merge_cell's, one of which responds by setting R[j] to a new valid value. The merge_env then raises rv[j], after which the merge_cell replies with me[i,j]. The merge_env[j] checks the completion of these actions, and then acknowledges M[j]. Once M[j] has become neutral again and R[j] has acknowledged, the merge_env[j] lowers go[j], which causes the merge_cell's to reset me[i,j]. The merge_env[j] also resets R[j] to the neutral value. Once these actions have been completed, the merge_env[j] lowers the acknowledge of M[j]. A schematic for a merge_env 800 for 1-bit data and 2 merge cells is shown in FIG. 8.

According to another specific embodiment of the invention, at each grid in a crossbar (i.e., for each combination of i and j) there is a router_cell[i,j] which combines the functionalities of one split_cell[i,j] and one merge_cell[i,j] as described above. The split_env[i] and merge_env[j] communicate with their router_cell's using the handshaking protocol described above. The router_cell waits for the superset of all conditions of the separate split_cell and merge_cell and performs the actions of both with respect to their env's.

It should be noted that embodiments of the invention are envisioned in which only selected links are implemented with the router_cell of the present invention. According to such embodiments, other links are implemented using the split_cell and merge_cell of FIGS. 5 and 7 and their associated intermediate channels V [i,j]. Such embodiments might be useful where, for example, additional buffering is desired on one or more specific links, but it is undesirable to pay the area penalty associated with having intermediate channels for every link.

According to an even more specific embodiment, the router_cell does the following. It waits for its S[i] input to be valid and equal to j, for its M[j] input to be valid and equal to i, for L[i] to be valid, and for go[j] from the merge_env to be high. Once all this happens, the router_cell[i,j] copies L[i] directly to R[j] without an intermediate V[i,j] channel. The merge_env[j] detects that the R[j] has been set, and signals that by raising rv[j]. Then the router_cell[i,j] can lower its enables to the env's, se[i,j] and me[i,j], which can be the same signal.

The reset phase proceeds symmetrically. The router_cell waits for S[i] and M[j] to be neutral and go[j] to go down. The merge_env[j] will reset the R[j] to neutral, and then signal the completion by lowering rv[j]. Finally, the router_cell[i,j] raises its enables to both env's. The schematic for a router_cell 900 with 1-bit data and 1-bit S[i] and M[j] is shown in FIG. 9. According to a specific embodiment, the split_env and merge_env employed with router_cell 900 may be the same as those used with separate split_cell's and merge_cell's (see FIGS. 6 and 8 above).

As will be understood and according to various embodiments, either of the basic crossbar implementations can be extended to different data sizes and P and Q values. There are also several circuit variations which may improve area or speed described subsequently. That is, various different data encodings, router cell circuit implementations, and other circuit implementation variations described subsequently represent various tradeoffs between area and speed.

According to various embodiments, the S[i] may be encoded with a 1 ofQ channel to select among Q possible split_cells. This increases the fanout on the S wires, and requires a larger AND tree to combine the se[i,j]'s in the split_env. Likewise, the M[j] may be encoded with a 1 ofP channel to select among P possible merge_cell's. The number of control wires scales linearly with P and Q, which is suitable for smaller crossbars, e.g., 8 by 8 or smaller. According to even more specific embodiments, the AND trees for se and me are physically distributed across the datapath to reduce wiring.

For larger crossbars, e.g., 16 by 16 or larger, the S[i] and M[j] can each be encoded with a pair of 1ofN codes 1ofA by 1ofB, which yields A*B possibilities. The least and most significant halves of the S control are called $S[i]_0$ and $S[i]_1$. Likewise for $M[j]_0$ and $M[j]_1$. The wiring cost of this encoding scales with the $\sqrt{P}$ or $\sqrt{Q}$, and works well up to 64 by 64 crossbars. In a delay-insensitive design, it is possible to check only one of the $S[i]_0/S[i]_1$ pair for neutrality in the router_cell, provided the split_env checks the other one. Likewise for the $M[j]_0/M[j]_1$ pair.

Figure 10:
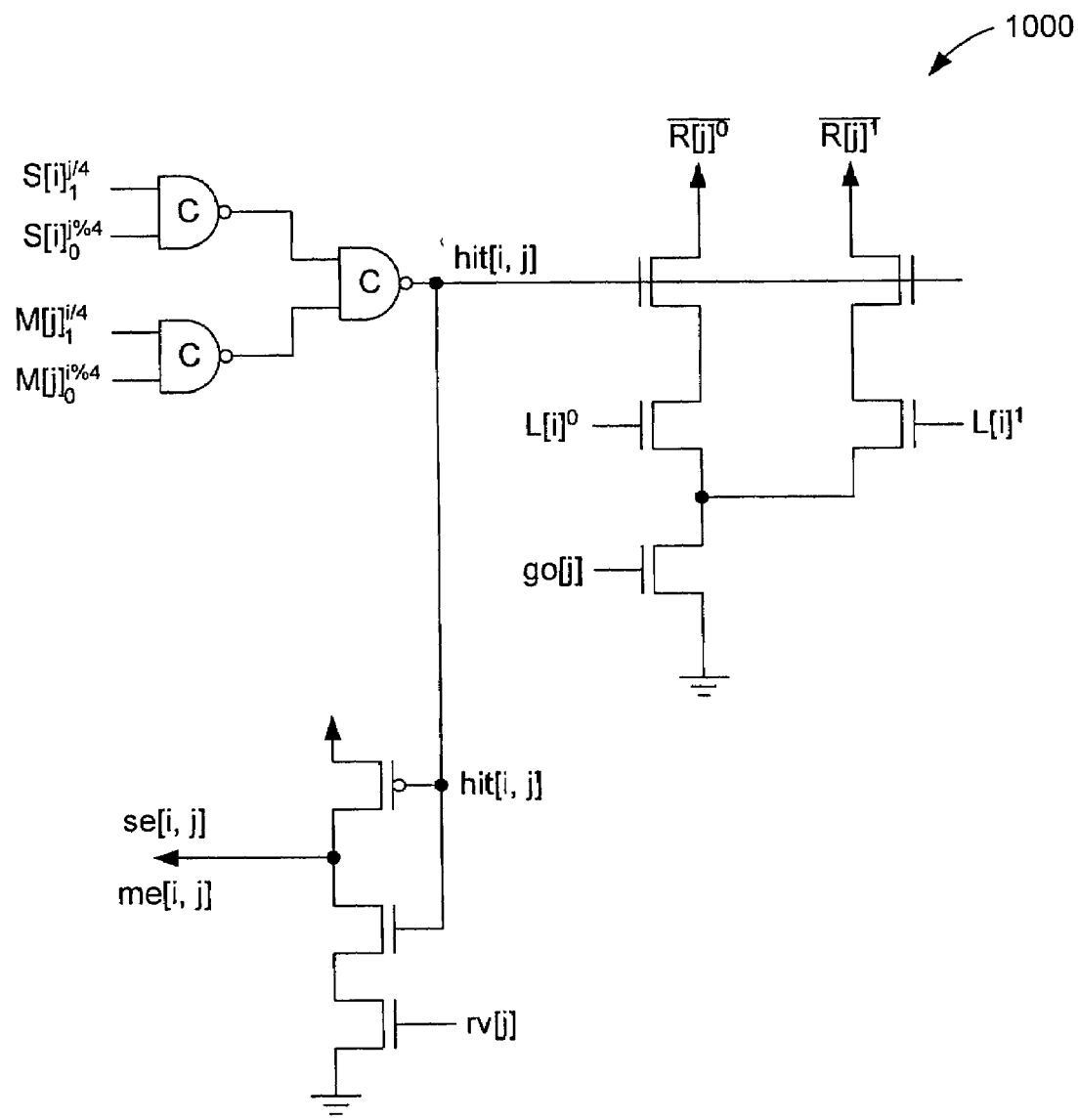
FIG. 10 is a schematic representation of a second implementation of a router cell.
Figure 11:
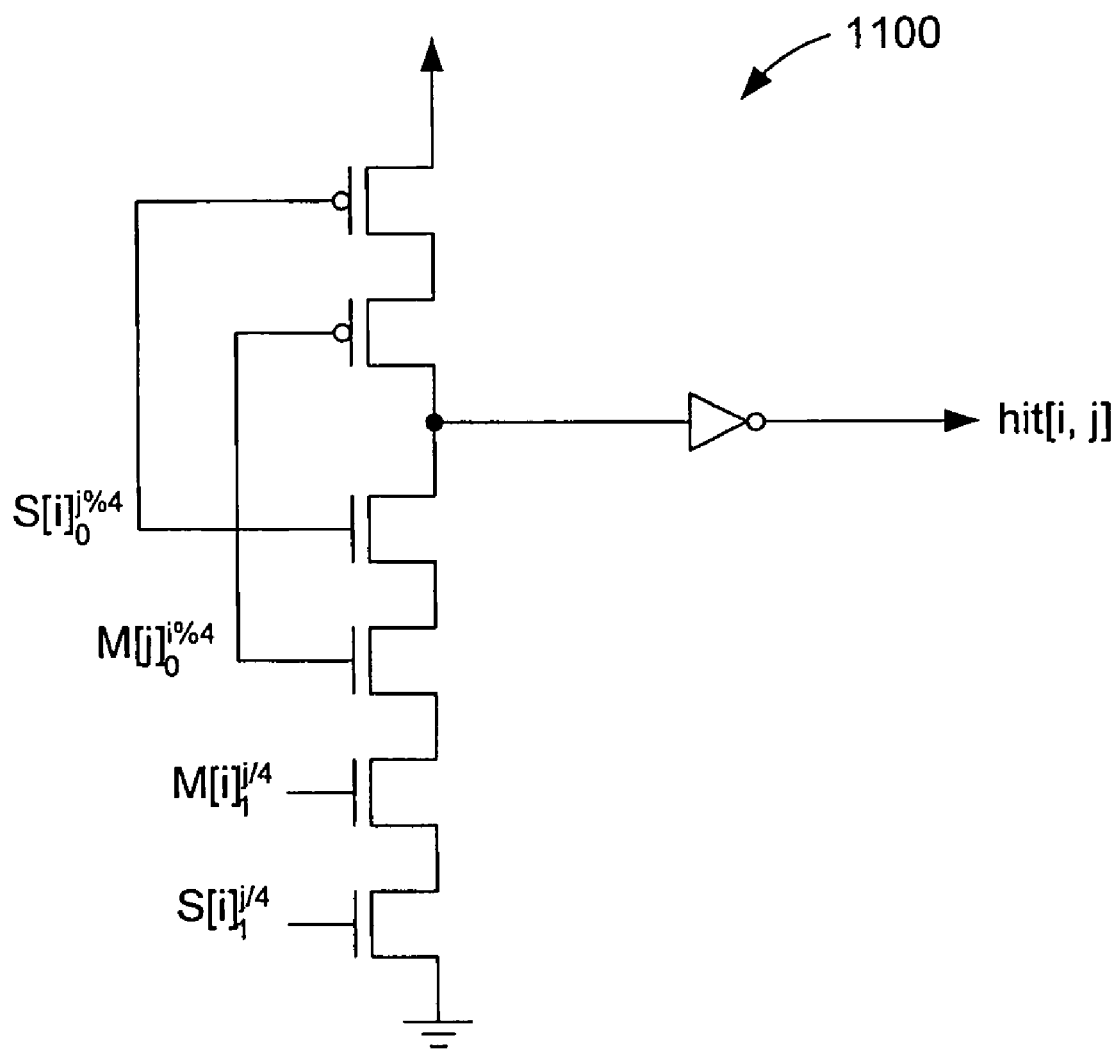
FIG. 11 is a schematic representation of a third implementation of a router cell.

With a large P or Q, the number of transistors used to detect when a certain router_cell is selected (also referred to as a "hit") becomes increasingly complicated, and this cost is duplicated for all data wires. Therefore, according to one embodiment for a crossbar having a large P, Q, or data size, a hit[i,j] signal is computed in a single bit circuit rather than using the S and M wires directly. An example router_cell 1000 with 1-bit data and 2×1 of4 control using a symmetric hit circuit is shown in FIG. 10. An alternate router_cell 1100 using an asymmetric hit circuit which does not check neutrality of $S[i]_1$ or $M[j]_1$ is shown in FIG. 11. The asymmetric hit circuit requires that the split_env and merge_env are modified to check the neutrality of $S[i]_1$ and $M[j]_1$, respectively.

Figure 12:
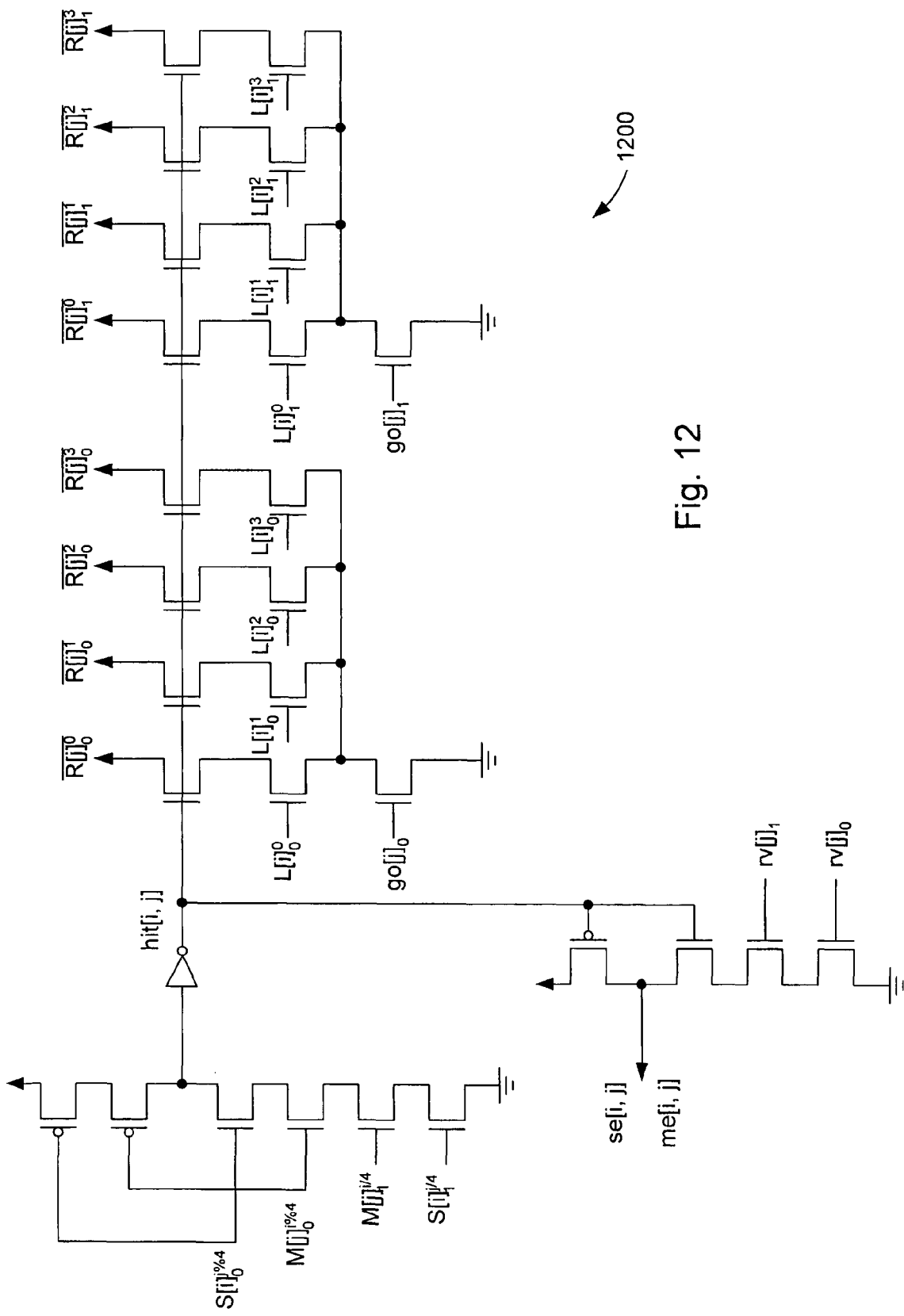
FIG. 12 is a schematic representation of a fourth implementation of a router cell

According to various embodiments, it is straightforward to modify the data encoding to other 1 ofN codes, e.g., from a 1 of1 to signal an event, to 1 of4 for a good low power encoding of 2 bits, and so on. According to embodiments with larger data sizes, multiple 1 ofN codes may be employed. FIG. 12 shows a router_cell 1200 with 4-bit data and control encoded with 2×1 of4 channels, using the asymmetric hit circuit of FIG. 11. It is possible to use different $rv[j]_0/rv[j]_1$ and $go[j]_0/go[j]_1$ wires corresponding to each 1of4, as shown, or to combine them into single rv[j] and go[j] from the merge_env.

According to various specific embodiments, multicast may be supported in a crossbar designed according to the present invention. According to one such embodiment, the S[0 . . . P−1] control is changed from a 1 ofQ code to a bit vector S[0 . . . P−1, 0 . . . Q−1] of 1 of2 codes. Each S[i,j] bit goes directly to the router_cell[i,j]'s, where the $S[i,j]^1$ wire is used in the hit circuit instead of $S[i]^j$. In the split_env, the se[i,j] signals are first AND'ed with the inverse of $S[i,j]^0$ and then combined with a C-element tree instead of an AND tree. Essentially, multiple simultaneous hit's can occur for one input, and the split_env must check that they all complete. The merge side is controlled as before. It should be noted that implementations of the dispatch and arbiter circuits described subsequently herein may be configured to control such a multicast crossbar.

Various embodiments of an asynchronous crossbar designed according to the present invention are organized into several parallel chunks of less than the datapath size. Assuming the datapath size is B bits (which requires 2*B wires for the delay-insensitive code in this embodiment), the number of additional control wires used in a split is s, and the number of additional control wires used in merge is m (for an embodiment which uses 1-hot control encoding), if the datapath is broken up into chunks of C bits, then the wiring limited area of the crossbar will be (B/C)*P*Q*(2*C+s)*(2*C+m). Thus, the optimum C is $$\frac{\sqrt{s*m}}{2}.$$

Using this formula, a 32-bit datapath with 12 wires of split control overhead and 14 wires of merge control overhead should be broken into a chunk size of about 6 to 7 bits. In practice, other factors come into consideration, such as the desired speed of the circuit (which favors smaller chunks) and the convenience of various chunk sizes. For example, depending upon such considerations, a 32-bit crossbar could be implemented as 8 chunks of 4 bits (faster) or 4 chunks of 8 bits (smaller). Other chunk sizes might have unacceptable area, speed, or inconvenience penalties but are still within the scope of the present invention.

Various techniques for generating the S[i] and M[j] control channels for an asynchronous crossbar will now be described. It will be understood that such techniques may be applied to any of a variety of asynchronous crossbar architectures including, for example, the different crossbars described above. That is, the dispatch and arbiter circuits described herein may be employed not only to control any of the crossbar circuits designed according to the invention, but any type of crossbar circuit having the basic functionality of interconnecting P input channels with Q output channels. According to various embodiments, control of multicast crossbars and two-way transactions may also be provided by specific implementations of these circuits.

According to various embodiments of the invention, the partial (or projected) order of the data transfers in a P to Q crossbar, i.e., the order of operations when projected on a given channel, should be deterministic. That is, the order of operations which involve a certain channel happen in a deterministic order, but operations on different channels can happen in any order relationship to each other. Thus, according to one such embodiment, a dispatcher is provided which solves the following problem: Given an ordered sequence of input instructions on channels L[0 . . . P−1], route each instruction to one of R[0 . . . Q−1] output channels specified by a TO[0 . . . P−1] channel for that instruction.

The dispatcher must maintain the order of instructions to each output channel. However, it is not required that instructions to different output channels are delivered in order. This allows internal pipelining in the implementation, arbitrary buffering on all channels, and multiple simultaneous transfers.

Where P is 1, a straightforward implementation of dispatcher is just an Q-way split bus, using L, and TO as S, and R[0 . . . Q–1]. According to an even more specific embodiment, additional buffering may be provided on the output channels to allow later instructions to be issued despite an earlier stalled instruction to a different R.

According to another embodiment, multiple instructions are issued in parallel with proper ordering using a crossbar. The L[i] and R[j] data channels of the dispatcher connect directly to the crossbar. The TO[i] of the dispatcher is copied to the crossbar's S[i]. The M[j] crossbar control channels are derived from the TO[i]'s such that they maintain the program order projected on each output channel. According to one embodiment, this is accomplished in the following manner.

Figure 13:
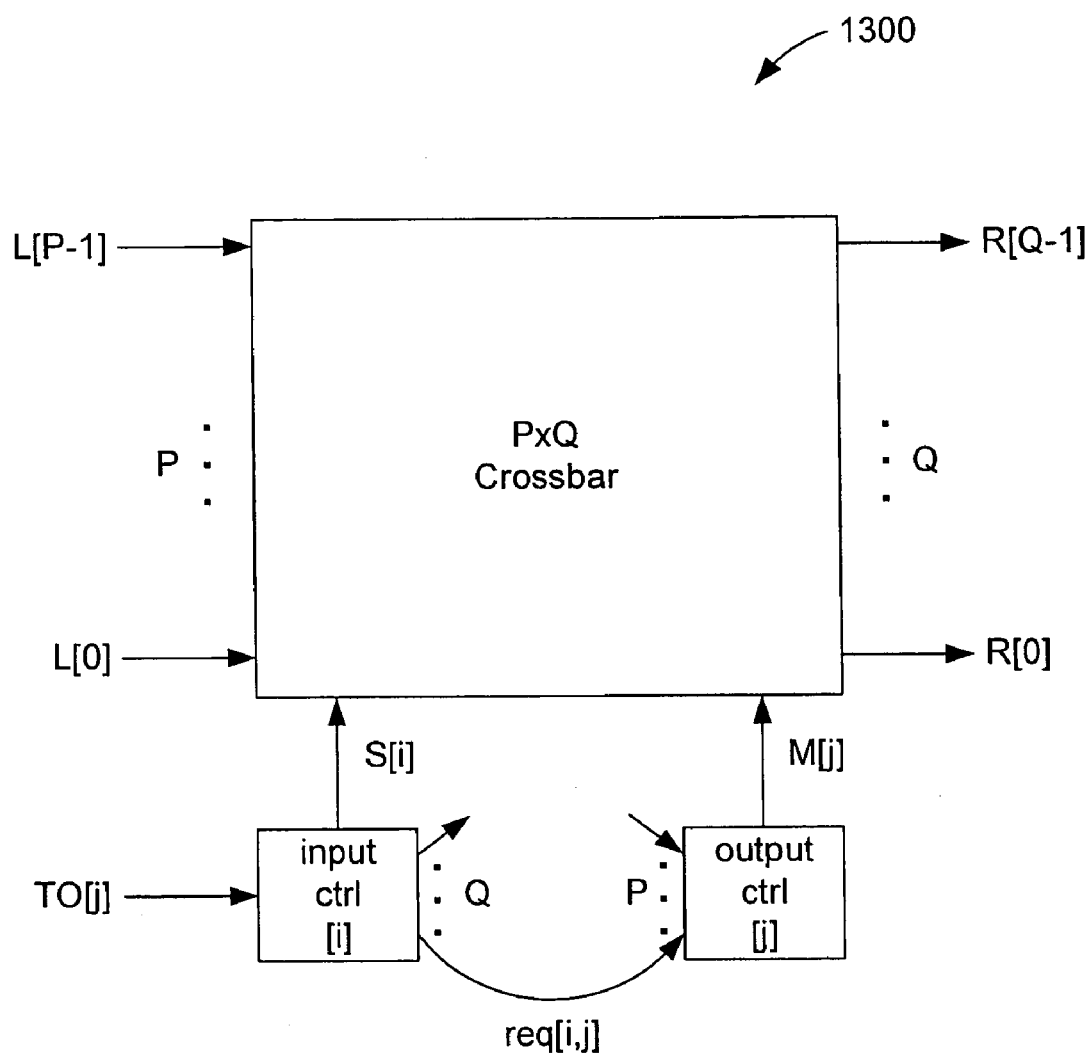
FIG. 13 is a representation of a dispatcher for use with any of a variety of crossbar circuits.

Referring to dispatcher 1300 of FIG. 13, each input_ctrl[i] sends a request bit req[i,j] (e.g., a 1 of2 code) to each output_ctrl[j] indicating whether or not this input wishes to go to that output based on TO[i]. Then each output_ctrl[j] collects these bits from all input_ctrl's and determines the indices of each 1 in cyclic order. These indices control the M[j] channel of the crossbar. The crossbar then transfers the payload.

The input controller, e.g., the input_ctrl[i] circuit, to produce the req[i,j] bits and copy TO[i] to S[i] may be derived using the approach described in "Pipelined Asynchronous Circuits" by A. Lines incorporated by reference above.

Each output controller (also referred to herein as a combine) accepts a bit vector and reads off the positions of all 1's in cyclic order from input 0 to P–1. According to one embodiment, this is achieved using a binary tree structure. Each stage in the tree receives the number of 1's on its lower significance L input, then from its higher significance H input, and outputs the sum to the next stage of the tree. These numbers are encoded serially with a 1 of3 code with the states: zero, last, and not-last. For example, 3 is represented by the sequence: not-last, not-last, last.

Each tree stage also outputs a 1 of2 channel to indicate whether the 1 came from the low (0) or high (1) sides. This extra channel becomes the MSB bit of the index so far. The LSB bits so far are obtained by a 2-way merge of the index from either the low or high previous stage, controlled by the current MSB bit. The final 1 of3 bit sum of the tree is discarded, and the accumulated index bits become the M control for the crossbar.

Figure 14:
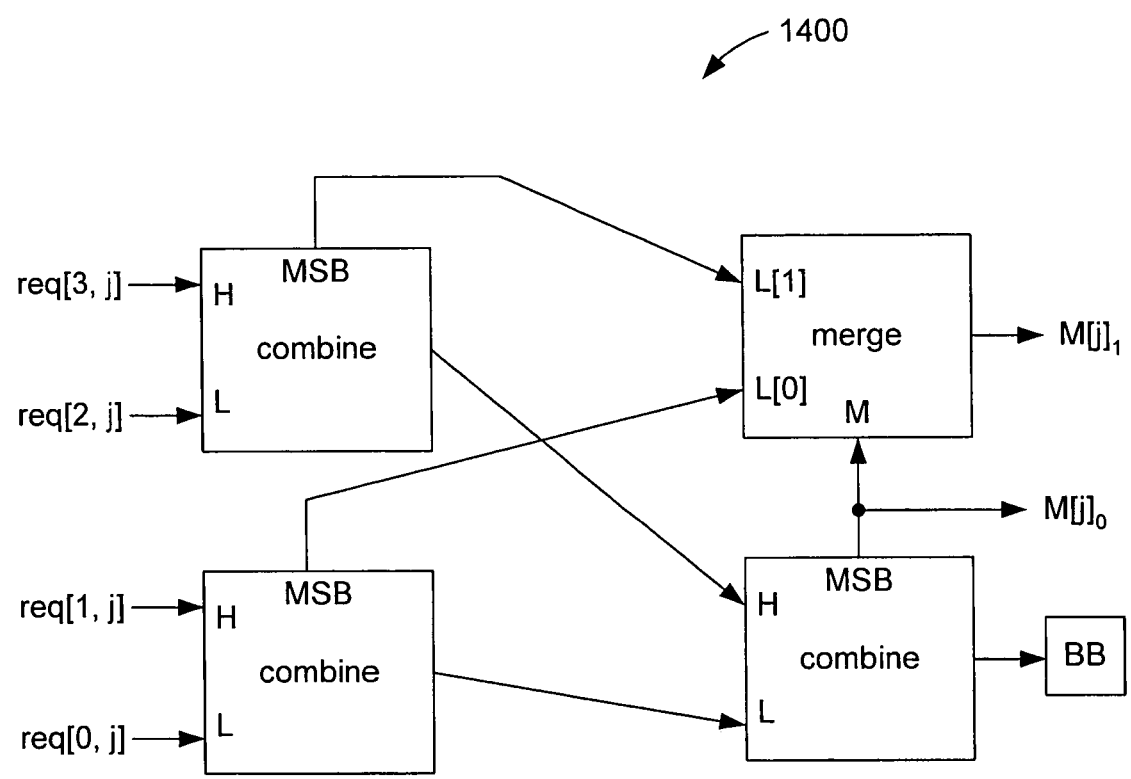
FIG. 14 is a representation of an output controller portion of a dispatcher.

According to various specific embodiments of the invention, the combine may be implemented using the approach described in "Pipelined Asynchronous Circuits" by A. Lines incorporated by reference above. In such embodiments, one internal state bit is provided to distinguish sequences coming from the left or right sides. FIG. 14 shows a 4-way tree combine 1400. The CSP for a specific embodiment of such a combine circuit is as follows:

```
"zero":=0, "notlast":=1, "last":=2;
*[L?l;
  [ l="zero" -> H?h;
    [ h="zero"    -> R!"zero",    done:=true
    [ ]h="notlast" -> R!"notlast", M!1, done:=false
    [ ]h="last"    -> R!"last",    M!1, done:=true
```

-continued

```
    ];
    *[~done -> H?h;
      [ ]h="notlast" -> R!"notlast", M!1
      [ ]h="last"    -> R!"last",    M!1, done:=true
      ]
    ]
  [ ]l="notlast" -> R!"notlast", M!0
  [ ]l="last" -> M!0, H?h;
    [ h="zero"    -> R!"last",
done:=true
    [ ]h="notlast" -> R!"notlast", R!"notlast", M!1,
done:=false
    [ ]h="last"    -> R!"notlast", R!"last",  M!1,
done:=true
    ];
    *[~done -> H?h;
      [ ]h="notlast" -> R!"notlast", M!1
      [ ]h="last"    -> R!"last",    M!1, done:=true
      ]
    ]
  ]
]
```

L and H are input request counts encoded serially with 1 of3 codes. R is the output request count encoded serially. M is the most-significant-bit of the next index so far and controls the merge of the accumulated least-significant-bits from previous stages.

Although the combine can be implemented as a tree using existing techniques, a smaller implementation which may be advantageous for large fan ins is also provided which uses a rippling ring circuit which inspects each input request in cyclic order, driving a corresponding 1 ofN data rail if its input is 1, or skipping ahead if the input is 0. The rails of this 1 ofN code must be kept exclusive. This version of the combine has irregular throughput and latency characteristics, and may only be valuable for its area savings for large fan ins.

According to various specific embodiments, a crossbar is used to execute a series of "move" instructions, each of which specifies an input port and an output port of the crossbar and transfers several tokens across that link. In one such embodiment, the move instruction identifies the input port, the output port, and a repeat count. According to an even more specific embodiment, an ordered sequence of these move instructions is issued in parallel via two dispatch circuits. It will be understood that the repeat count is merely one mechanism which this embodiment may employ.

Figure 15:
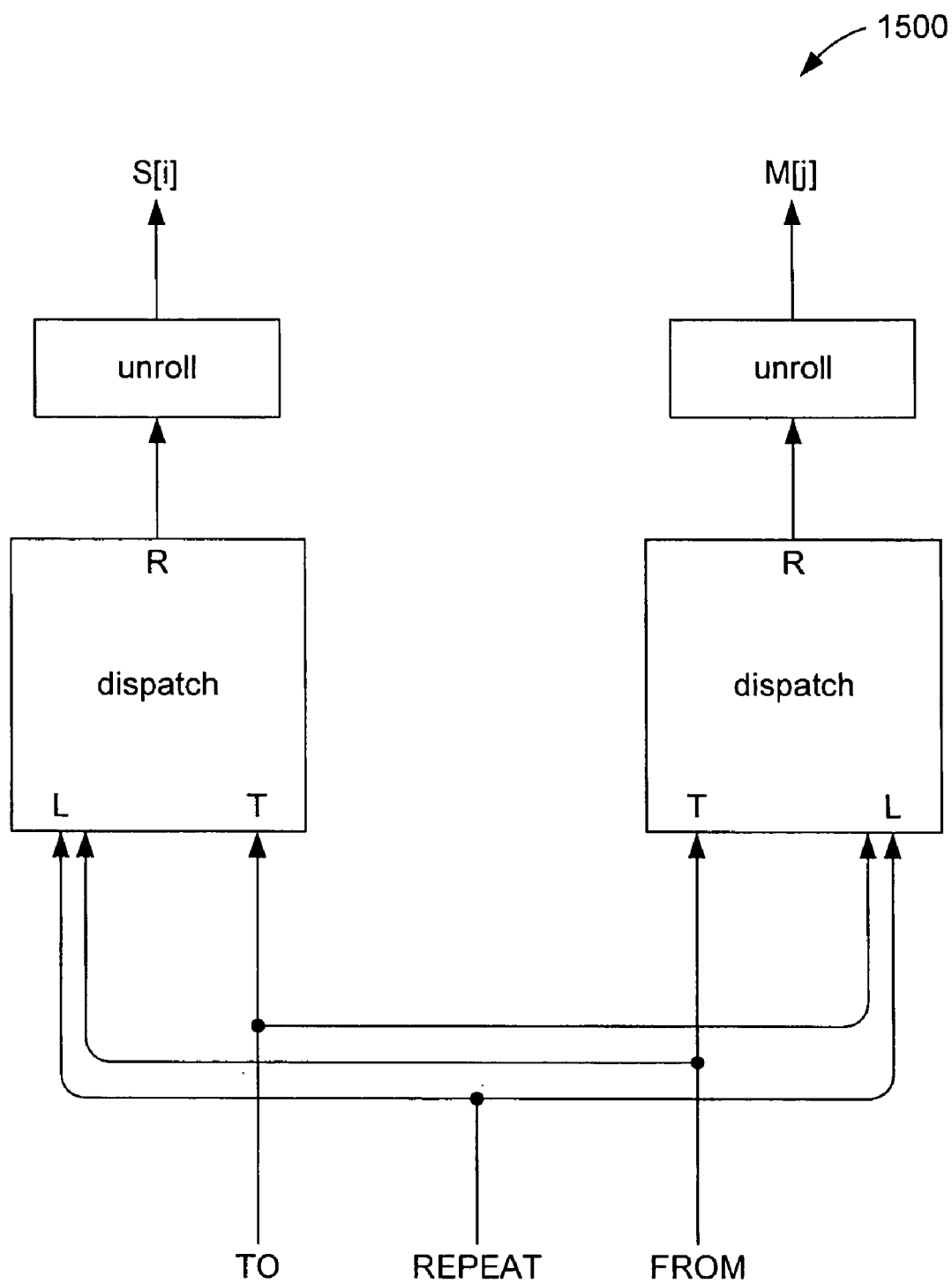
FIG. 15 is another representation of a dispatcher for use with any of a variety of crossbar circuits.

According to this embodiment, the first dispatch circuit dispatches the output port and repeat count to the specified input port. The second dispatches the input port and repeat count to the output port. That is, the move instruction is copied two ways, with either the input or output port serving as the S control for the corresponding dispatches. The repeat count is unrolled locally to the input and output ports. That is, the same crossbar control is reissued until the count is used up. A specific implementation of a dispatcher 1500 having two such dispatch circuits is shown in FIG. 15.

The use of the dispatchers ensures that the moves will be executed in the original program order if they have either port in common, but may execute them out of order or in parallel if they refer to different ports. The dispatchers are also capable of scaling up to a very large number of move instructions at once. This can be used as an optimization to avoid wasting power or bandwidth in the dispatcher, and also can greatly compress the original instruction stream.

Another embodiment of the invention facilitates use of a crossbar as a message passing communications interconnect.

According to this embodiment, it is assumed that each input port provides the desired destination port number on a TO channel, which becomes the S control of the crossbar. Each input port requests permission to use the desired output port. Each output port generates the M control by arbitrating among the requests from all inputs contending for access to the same output. An optional FROM channel can be sent with the output which may comprise, for example, a copy of the M control of the crossbar. Such an option may be useful, for example, with certain communication protocols in which it is desirable to know the identity of the sender.

The control per input copies the TO to S and uses it as the control for a split bus which sends a 1 of1 request channel req[i,j] to the intended output control. The control per output collects the requests from the input controls and arbitrates among them. The result of the arbitration is used as the M of the crossbar, and may also be copied to a FROM channel if desired.

Figure 16:
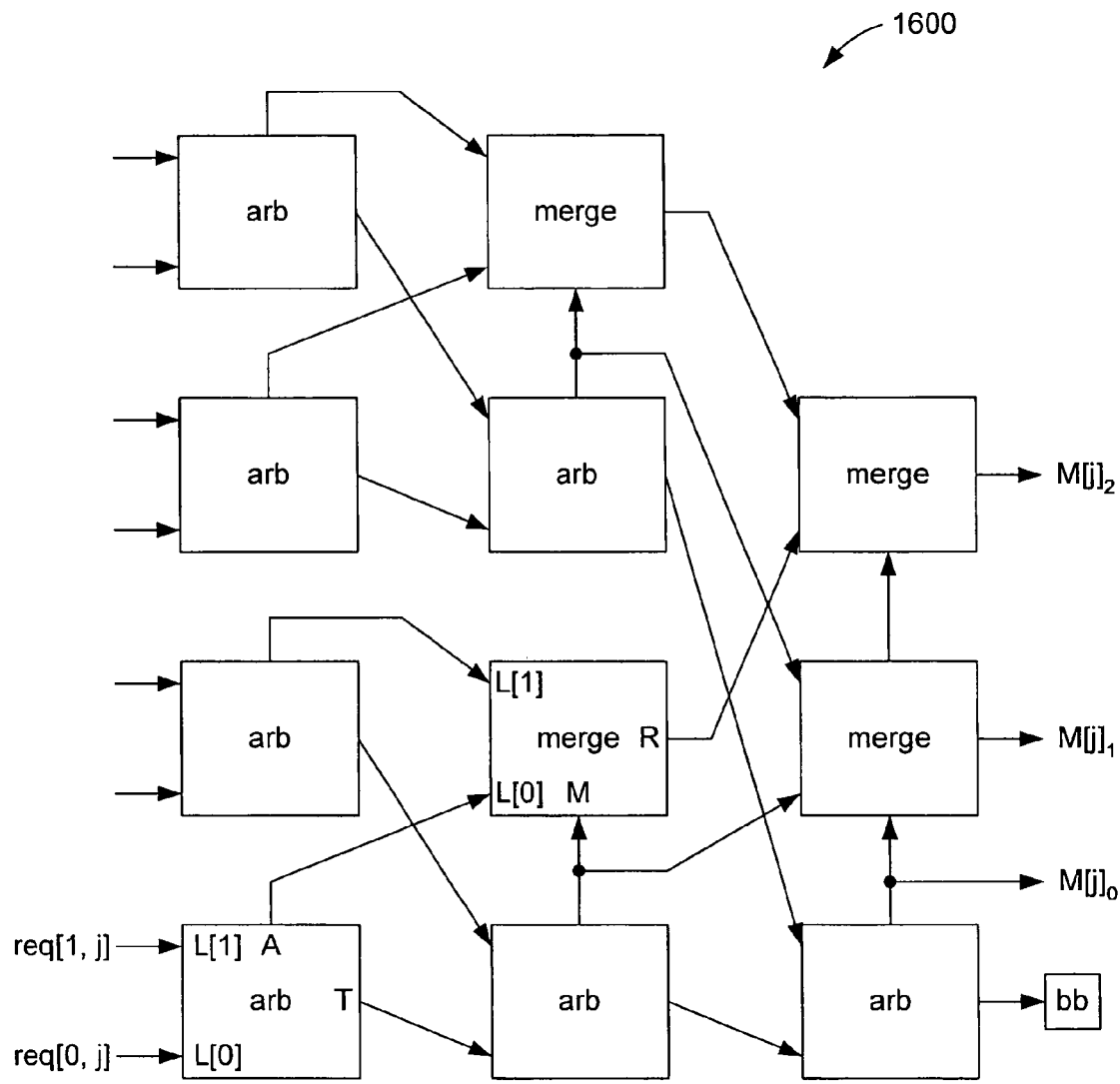
FIG. 16 is a representation of an arbiter for use with any of a variety of crossbar circuits.

According to one embodiment, a P-way arbiter which arbitrates among the requests is built as a binary tree, much like the combine of the last section. Each stage in the binary tree receives a request from either the left (e.g., lower indices) or right (e.g., higher indices) sides of the previous stage. It outputs a 1 of2 channel for the winner's MSB to a side tree of merge's which accumulate the index of the winner, just as for the combine. It sends a 1 of1 to request the next stage of the tree. FIG. 16 shows a tree structure 1600 for an 8-way arbiter.

Figure 17:
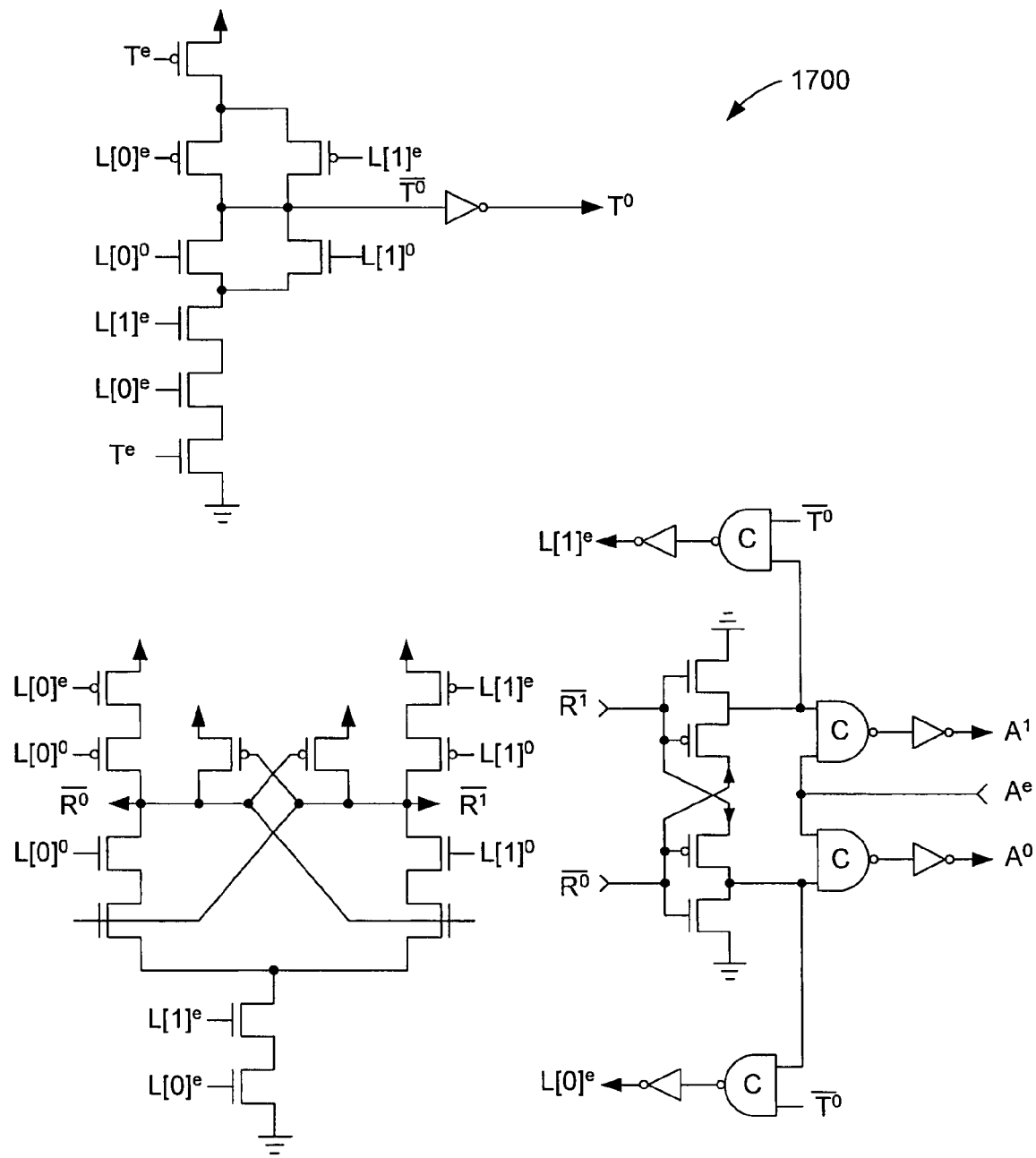
FIG. 17 is a schematic representation of an output controller portion of an arbiter.

According to a specific embodiment of an arbiter, the circuit for each stage of the arbiter includes metastability. The CSP is:

*[$\overline{L[0]}$→L[0]?, T!, A!0$\overline{L[1]}$→L[1]?, T!, A!1]

where L[0 . . . 1] are the trigger inputs, T is the trigger output, and A is the arbitration result. FIG. 17 shows one implementation of a circuit 1700 with this behavior. According to this embodiment, the output request is made by OR'ing the input requests and is not metastable. Only the side 1 of2 A output employs actual arbitration and a metastability filter. This arbiter tree is weakly fair, and works as first-come-first-serve if contending requests are spaced out enough in time. If the contending requests come faster, all requests will be serviced, but not necessarily at strictly fair rates.

According to a further embodiment, arbitrated control of a crossbar is facilitated by an arbiter which avoids deadlock conditions. As mentioned above, the crossbar controlled by such an arbiter may be any type of crossbar including, but not limited to, those described herein.

Suppose an input port A is trying to go to output C then D, and another input port B is trying to go to outputs D then C. Due to slack in the request and arbitration channels, it is possible under a delay insensitive timing model that A would win D and B would win C. But A is trying to send to C first, and B is trying to send to D first. Thus, the system deadlocks.

Thus, according to a specific embodiment, "slack" is eliminated so that an input can't make another request until the previous one has won its arbitration. This is done by introducing a "grant" token (e.g., a 1 of1 channel) which is returned by the output port to the input port when that input wins the arbitration. This mechanism prevents inputs from making more than one outstanding request.

Figure 18:
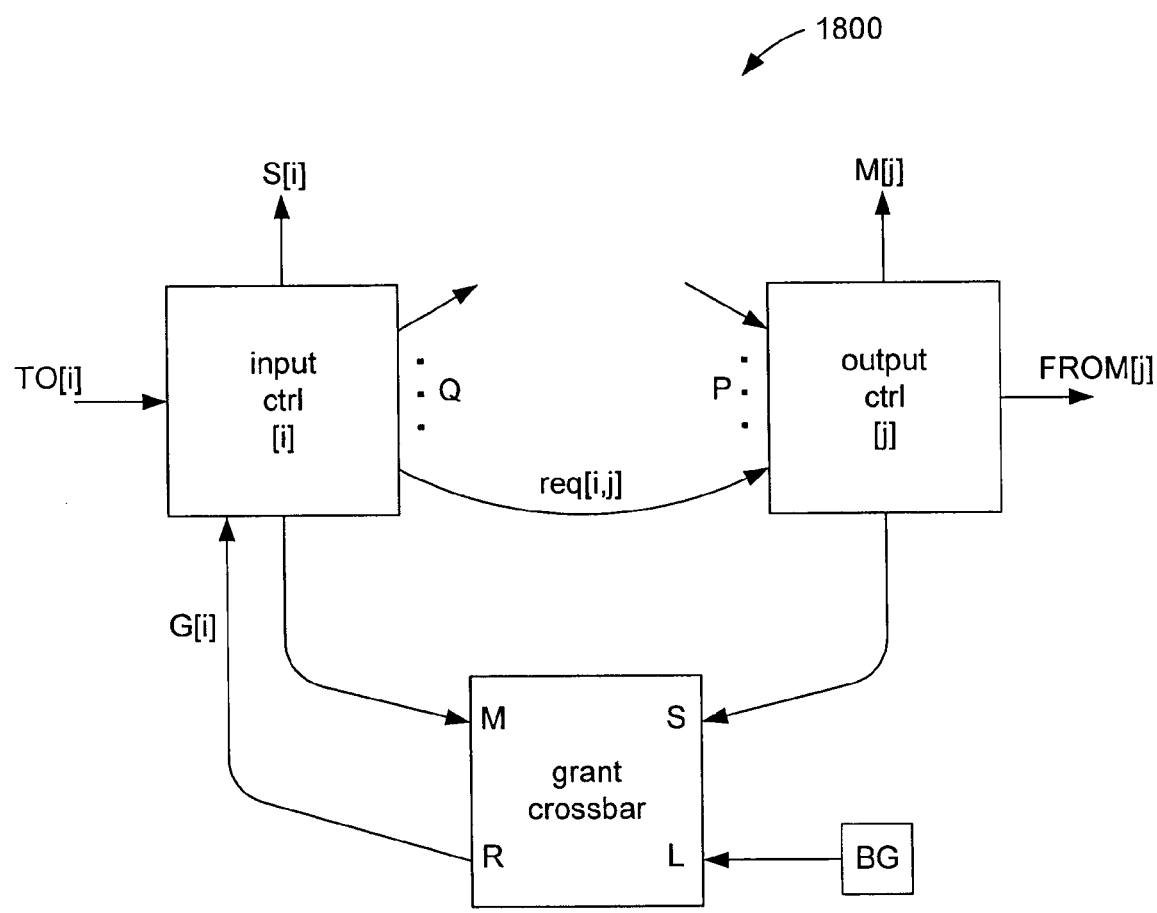
FIG. 18 is another representation of an arbiter for use with any of a variety of crossbar circuits.

According to one implementation, the grant is returned via a small crossbar with its S control copied from the output's M and its M control copied from the input's S. The output R 1 of1 data channel is fed into the input's split bus. The input side starts with a single grant token. FIG. 18 shows an arbiter 1800 for effecting arbitrated control for a crossbar using this grant scheme.

The grant crossbar of the present invention is also operable to establish a useful ordering relationship. Suppose an input sends some data to output B, then sends a notification to output C that the data is ready. If C then reads it from B, it will get the value that A wrote, because A's communication to B won the arbitration first. This satisfies the producer-consumer ordering model required by many bus protocols.

According to other embodiments of the invention, alternatives to using such a grant crossbar are provided. In general, to avoid deadlock, it is necessary to avoid winning the arbitrations in a different order from which they were requested. One way to do this is to implement the request/arbiter circuits with a total of1 or less slack, such that a second request will always be blocked until the first one has been granted. This avoids the need for a grant crossbar, and can be smaller. However, this zero-slack design reduces the throughput (since the circuits cannot precharge in parallel with another request starting) and requires different zero-slack implementations of the components instead of the usual pipelined building blocks. The grant crossbar is effectively a way of forcing the pipeline to have 1 slack even if it is built out more pipelined elements.

Transactions in a typical system interconnect often have atomic sizes larger than one word. That is, for one request and arbitration, many cycles of data may need to be transferred. This can be achieved according to one embodiment of the present invention by associating a "tail" bit with the data through the main crossbar. According to this embodiment, the tail bit is sampled both by the input and output ports, and is fed into a simple control unit which repeats the same control values until the tail bit is 1. According to other embodiments, a simple counter may be employed using information associated with the data itself (e.g., in a packet) or which comes with the control data controlling the crossbar. As will be understood, these are merely examples of mechanisms which embodiments of the invention may employ to effect the transfer of data of arbitrary size. The scope of the invention should not be so limited.

Figure 19:
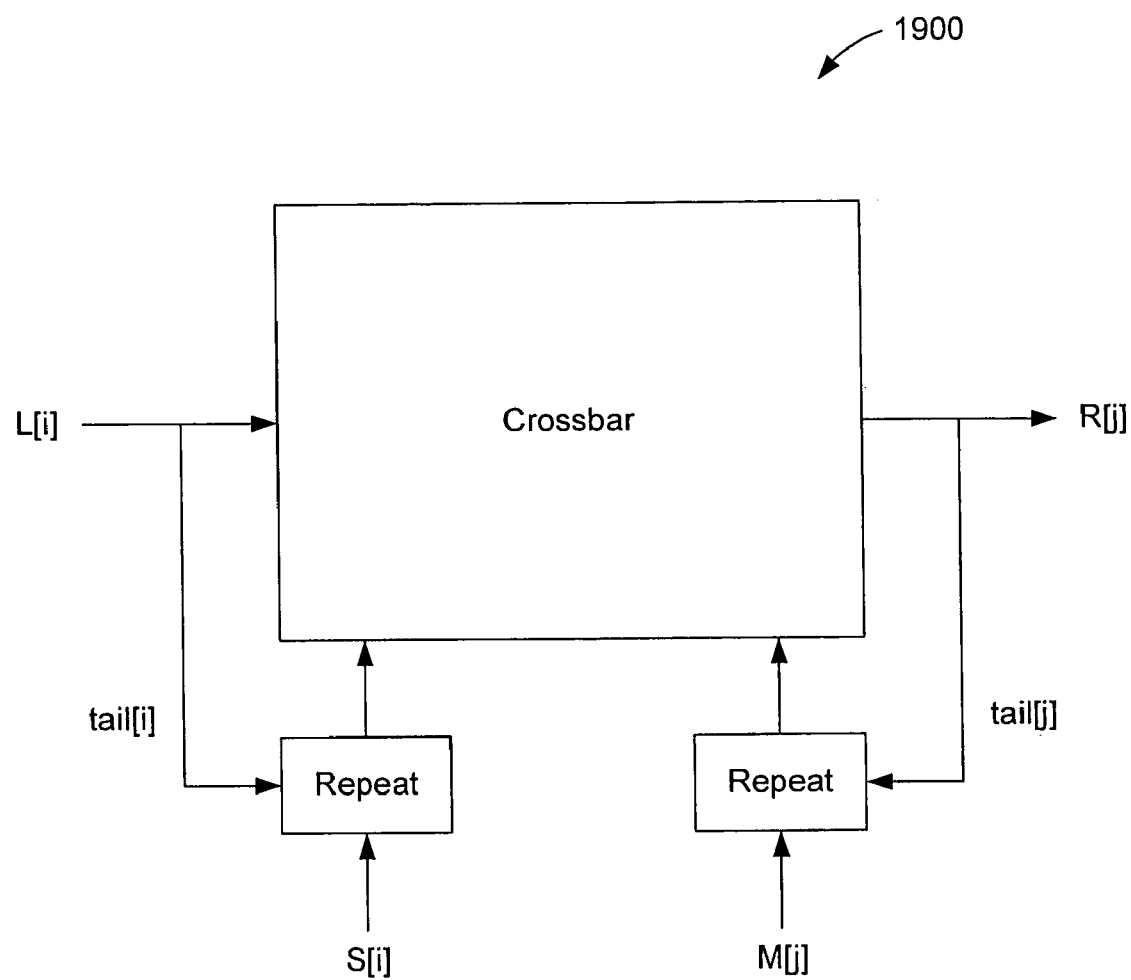
FIG. 19 is a representation of a datapath crossbar.

A request/arbitrate circuit designed according to specific embodiments of the present invention is concerned only with "packets" and sets up the datapath link according to the received control values. The datapath crossbar can transfer a large block of data, then release the link after the last cycle by setting the tail bit to 1. FIG. 19 shows a datapath crossbar 1900 with the extra repeaters on the control inputs. According to an alternate embodiment, a repeat count could be used instead of the tail bit. However, the tail bit may be easier to implement in the hardware, and doesn't prohibit also specifying lengths in the data packets.

According to further embodiments of the invention, two different crossbar datapaths are controlled using a single arbitrated control circuit to implement two-way transactions. According to one such embodiment, input and output 1 of2 channels LTYPE and RTYPE are added to an arbiter circuit designed according to the invention for each port. If the LTYPE channel is 1, the normal S/M control is also copied to become the M/S control of a second crossbar for a returning transaction. If the LTYPE channel is 0, the second crossbar isn't used. The information in the LTYPE channel is copied to the RTYPE channel of the output, so that the target unit knows whether or not to respond. This implementation can support a mixture of1-way transactions (e.g., store) and 2-way transactions (e.g., load, swap, read-modify-write). According to more specific embodiments, if the modules which are connected by the two crossbars are exclusively masters (initiators) or targets (responders), the two crossbars can be asymmetrically sized, (e.g., an 8×4 request crossbar and a 4×8 response crossbar). According to one such embodiment, this scheme is used to efficiently implement a shared memory bridge.

Some additional exemplary applications of the three types of asynchronous circuits described above will now be discussed. However, it will be understood that the crossbars, dispatchers, and arbiters of the present invention may be used in a wide variety of applications and that therefore the scope of the present invention is not limited to the applications described.

In one such exemplary application, a superscalar CPU with P-way instruction issue and Q pipelines could use a P×Q dispatcher to send instructions to the correct pipelines while preserving ordering to each pipeline. The TO control would be decoded from the instructions.

In other exemplary embodiments relating to RISC style superscalar asynchronous CPUs, crossbars can be used to route the Z result of any execution pipeline to any register, or to route the reads from any register to the X and Y operands of any pipeline. Each register could delay a write until the next access of that register, such that any data dependent read could be quickly bypassed. The latency from Z result to a dependent X or Y operand could be as little as 6 transitions, 2 each for the result crossbar, register itself, and operand crossbar. This low latency bypass feature eliminates the need for additional bypass circuitry. The control of these crossbars can be generated from parallel RISC instructions using variations on the "move" control scheme. This implementation is large, but allows significant reordering (i.e., it only retains the partial ordering projected on results, operands, and registers) and can scale to very wide issue designs. Even with a dual-issue CPU, this register file could often do more than two instructions at once for short bursts, which could help catch up after stalls.

According to various embodiments, an arbitrated crossbar designed according to the invention can be used to connect several modules on a chip. Each module would be given an input and output port on the crossbar. In some embodiments, each module would be able to send one-way tail-terminated packets to each of the other modules. Some modules could be memories, which could receive stores, and reply to load requests with load completion packets. Others could be I/O interfaces, especially those based on flow-controlled bidirectional FIFOs. Others could be CPU's or DSP's or ASIC's which can access the I/O's, memories, or send packets to each other. These packets could be used to implement cache coherence protocols or hardware supported message passing. In addition, legacy bus protocols such as PCI could be tunneled over such a crossbar since it supports the required ordering relationships.

According to further embodiments, an arbitrated crossbar designed according to the invention could act as a switch fabric for packet switching. Each incoming packet would have an in-band destination field which would be extracted for use as the TO control. The length of the packet would be converted into a tail bit sequence. The FROM output could be inserted back into the packet if desired. According to more specific embodiments, in the presence of contention, it may be desirable to add FIFOs on all inputs and outputs and make sure the whole system has a significant overspeed to recover from transient congestion.

It should be noted that although specific embodiments have been described herein with reference to a delay-insensitive handshake protocol, various embodiments of the invention are provided in which different types of timing assumptions are made in otherwise delay-insensitive circuits. For example, timing-assumptions may be used to make an otherwise delay-insensitive circuit faster and lower power at the cost of additional circuit verification engineering. The best timing assumption for a particular circuit depends on the critical path of the circuit and the amount of additional verification work a designer is willing to take on. Of particular interest are timing assumptions that are local to one four-phase handshake (described below), or one internal path within one cell between external handshakes. When this class of timing-assumptions is applied to complex cells with critical paths longer than the rest of the delay-insensitive circuitry, it is especially desirable. These timing assumptions apply to asynchronous circuits that use four-phase return to neutral handshakes, and generally use 1-hot data encoding.

In general, there are three types of timing assumptions which may apply to various embodiments of the invention. When the pulse timing assumption is applied to an otherwise delay insensitive four-phase handshake, all of the set conditions are completed, data validity, control validity, acknowledge validity, etc. However, the reset phase of the handshake is not completed and is assumed to happen with an adequate timing margin. In this scheme all signals, data, control, and all the acknowledge signals from output channels, are not checked in the reset-phase of the handshake, with the exception that occasionally an acknowledge signal is used opportunistically as a good pre-charge signal for the data. In some cases one may also forego checking the completion of the output data. This scheme requires that once the link is set up, nothing may block the data from being computed and the channels from going through the reset phase.

When the Implied-data-neutrality timing assumption is applied to an otherwise delay-insensitive four-phase handshake, the computed data on the output channels is completed in the set direction, but not in the reset phase. All acknowledges are still checked in all directions. This scheme requires that once the acknowledge of an output channel is set, no events may block the reset phase of the data channel.

Interfering operators are common in circuit design in general but are forbidden by the delay-insensitive timing model. Interference causes glitching. In delay-insensitive circuit design cut-off transistors prevent interference. However, with adequate timing margin, a circuit designer can guarantee glitch free operation in an otherwise delay-insensitive circuit.

A specific example of the use of such timing assumption in circuits designed according to the invention will be illustrative. A 16 to 16 ported 4-bit crossbar efficiently implemented according to a specific delay-insensitive approach of the present invention requires 20 transitions per cycle. However, a crossbar design with similar functionality may be implemented with the timing assumptions described above which requires only 12 transitions per cycle. This theoretically makes the circuit 67% faster.

Figure 20A:
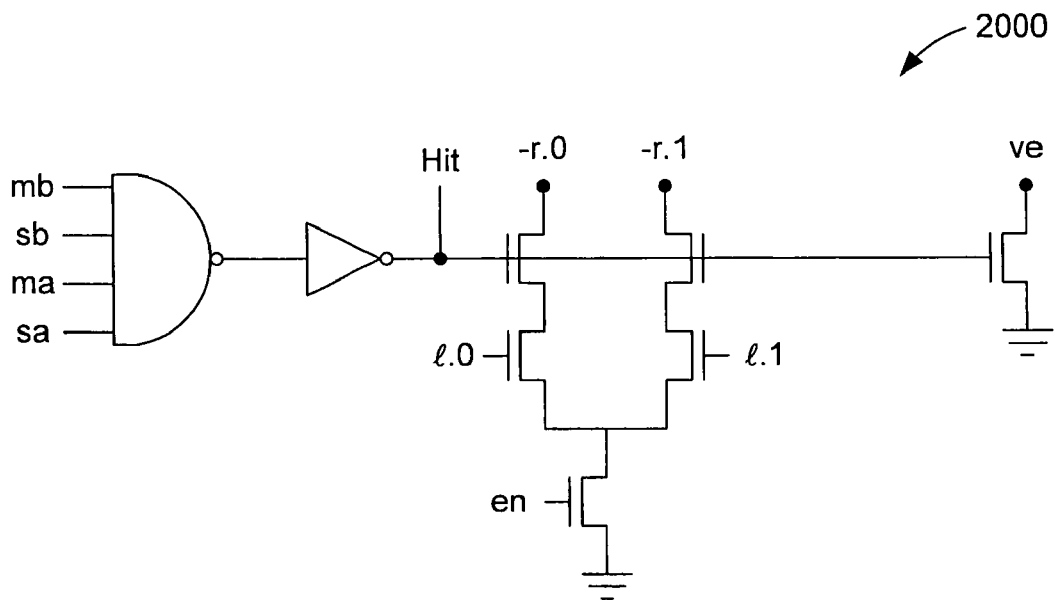
FIGS. 20A-20C show crossbar circuits for use in implementing a crossbar using various timing assumptions according to a specific embodiment of the invention.
Figure 20B:
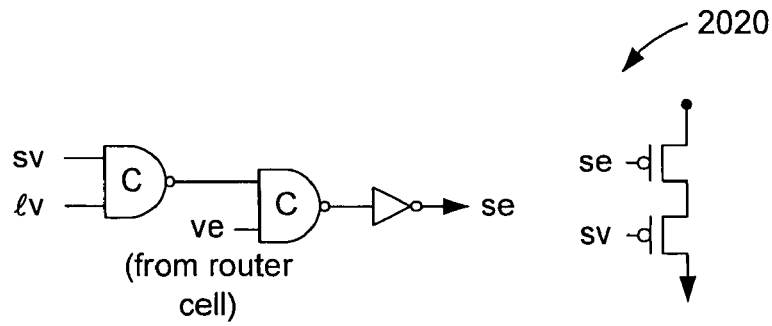
Figure 20C:
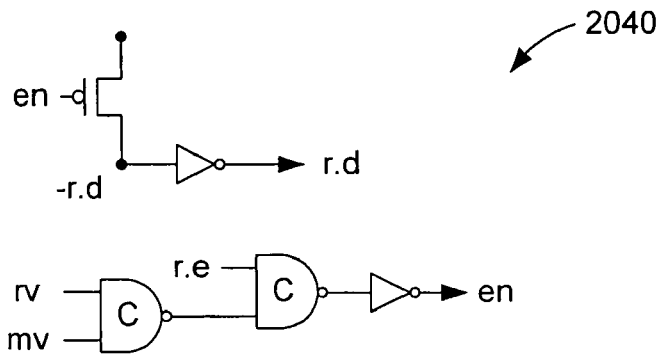

FIGS. 20A-20C show how the circuit diagrams for a router_cell 2000, a split_env 2020, and a merge_env 2040 may be modified with these timing assumptions (relative to their above-described counterparts) to create such a 12-transition per cycle crossbar. The sv and lv signals represent the input completion of the l and s channels. The rv and mv signals represent the completion of the output data on channel r and the input control data on channel m.

The pulse timing assumption is used in the main data transfer through split_env->router cell->merge_env. This allows the removal of 2 NAND gate completions, and the rv bus signal. It also reduces the response time from the L and S arrival to the SE (L and S acknowledge) from 9 transitions to 5. The interference timing assumption is used on the ve bus in the figure, however at a little extra cost one could produce a signal from the split_env and pass it into the ve bus to remove the interference timing assumption. In the buffers surrounding the split_env and merge_env, the implied-data-neutrality timing assumption is used to satisfy the non-blocking return-to-neutral requirement of the pulse timing assumption, and to keep the critical path of data completion on 2 1 of4 codes to 12 transitions per cycle. It should be understood that there are numerous small trade offs in timing-assumptions that can be made in such circuits, all of which are within the scope of this invention.

In addition, while several specific embodiments of the invention have been described in the context of asynchronous circuit design, it is possible to map the event driven architecture of the crossbars described herein into a synchronous environment with the introduction of a clock signal and still remain within the scope of the invention. According to one such embodiment, a crossbar circuit architecture similar to that described above is implemented with the underlying channel model of a synchronous request-grant FIFO rather than an asynchronous four-phase channel. Since the crossbar is still based on the four independent FIFOs L, S, M, and R, all of the properties that come from implementing the crossbar with independent flow-controlled FIFO channels still apply. The difference is that data transactions begin aligned to a clock-edge boundary. Such an approach may be desirable, for example, in a single clock domain synchronous system because it relieves the requirement of going through synchronous to asynchronous conversion and back again.

Figure 21:
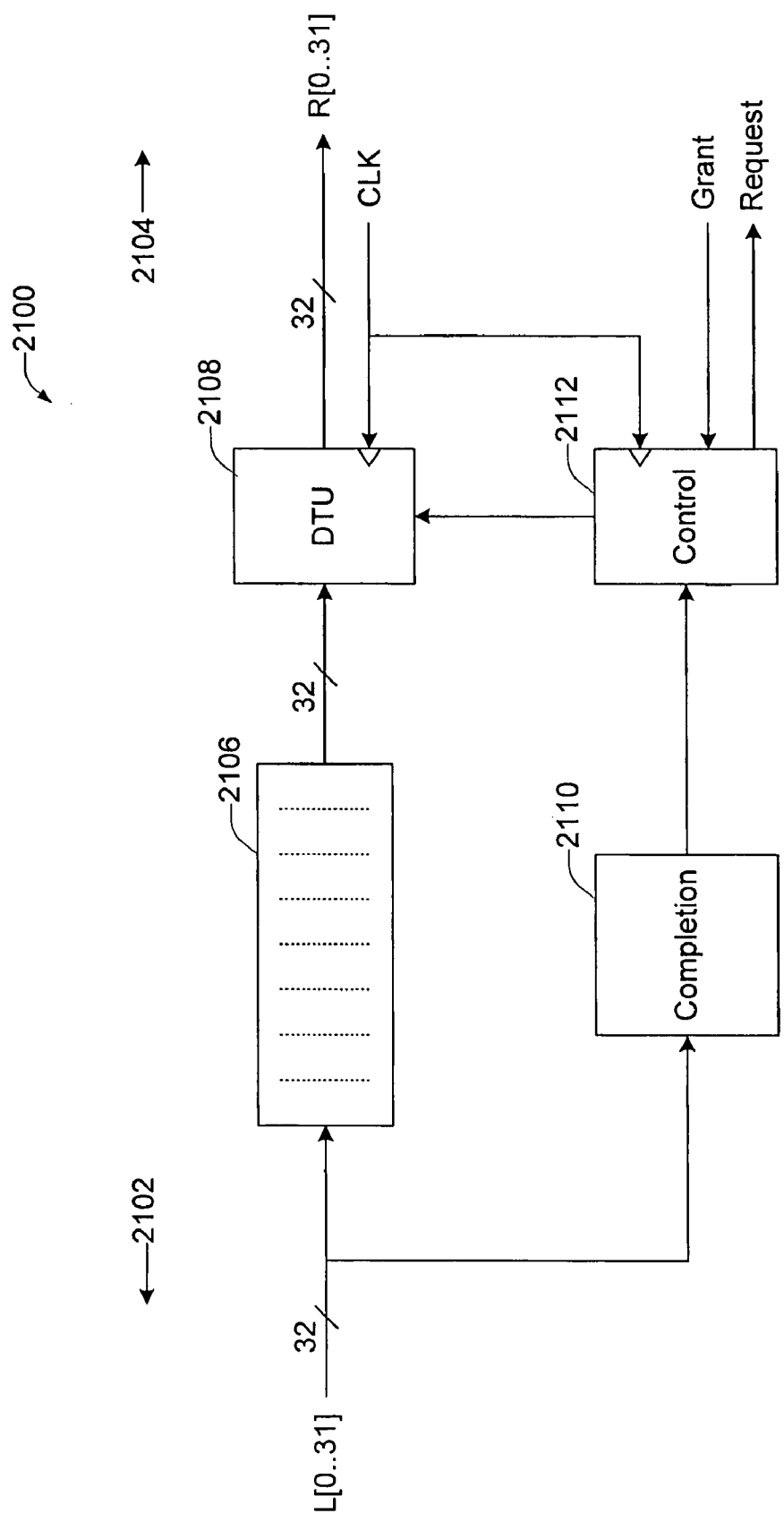
FIG. 21 is a simplified block diagram of an asynchronous-to-synchronous (A2S) interface designed according to a specific embodiment of the invention.

FIG. 21 is a simplified block diagram illustrating an exemplary interface 2100 for transferring data tokens from an asynchronous domain 2102 to a synchronous domain 2104 according to a specific embodiment of the invention. According to the embodiment shown, a 32-bit wide data token, i.e., L[0 . . . 31], encoded using 1 of2 encoding is assumed. However, it will be understood that data tokens having any number of bits and encoded in many different ways may be transferred from one domain to the other according to the described embodiment.

The 32-bit wide datapath includes a multi-stage buffer queue 2106 which receives and transfers the data tokens generated in the asynchronous domain from one stage to the next according to the delay-insensitive handshake protocol described above. Although buffer 2106 is shown having 8 stages, i.e., being capable of accommodating 8 data tokens, it will be understood that according to various embodiments, the length of this buffer may vary. As the transfer of each data token into buffer 2106 is achieved, completion of the transaction for each of the bits is signaled backwards by the first stage of buffer 2106 in accordance with the handshake.

The datapath also includes one or more asynchronous-to-synchronous (A2S) datapath transfer units (one for each bit of the data token) represented by DTU block 2108. As will be described, DTU 2108 effects the transfer of each data token to synchronous domain 2104 in response to an A2S "go" signal and the clock signal (CLK) associated with synchronous domain 2104. The manner in which the A2S "go" signal is generated according to a specific embodiment of the invention is described below.

In response to the indication that each of the bits of the token has been successfully transferred to buffer 2106 (i.e., the completed handshake), completion block 2110 generates a 1 of1 transfer token representing the completed transfer. According to a specific embodiment, completion block 2110 employs a pipelined architecture to minimize the impact of the latency inherent in generating a single transfer token from the completion signals for each of the bits of the data token. A specific implementation of such a completion block is described below.

The transfer token generated by completion block 2110 is received by control block 2112 which, in turn, generates a request signal to the synchronous domain indicating that valid data are available to be transferred. Upon receiving a grant signal from the synchronous domain and in response to a transition of the clock signal, control block 2112 generates the A2S "go" signal which causes DTU block 2108 to simultaneously latch all of the bits of the data token currently at the end of buffer 2106 to the synchronous domain. According to an alternative embodiment in which the synchronous domain is always ready for data, the grant and request signals may be omitted, the A2S "go" signal being generated in response to the transfer token and the clock signal.

According to a specific embodiment, distribution of the A2S "go" signal among the individual datapath transfer units in DTU 2108 is accomplished using a pipelined tree structure which minimizes the effect of the latency inherent in such a distribution. According to an alternative embodiment, the A2S "go" signal is distributed to the individual datapath transfer units using an electrically continuous conductor, e.g., a single wire.

Figure 22:
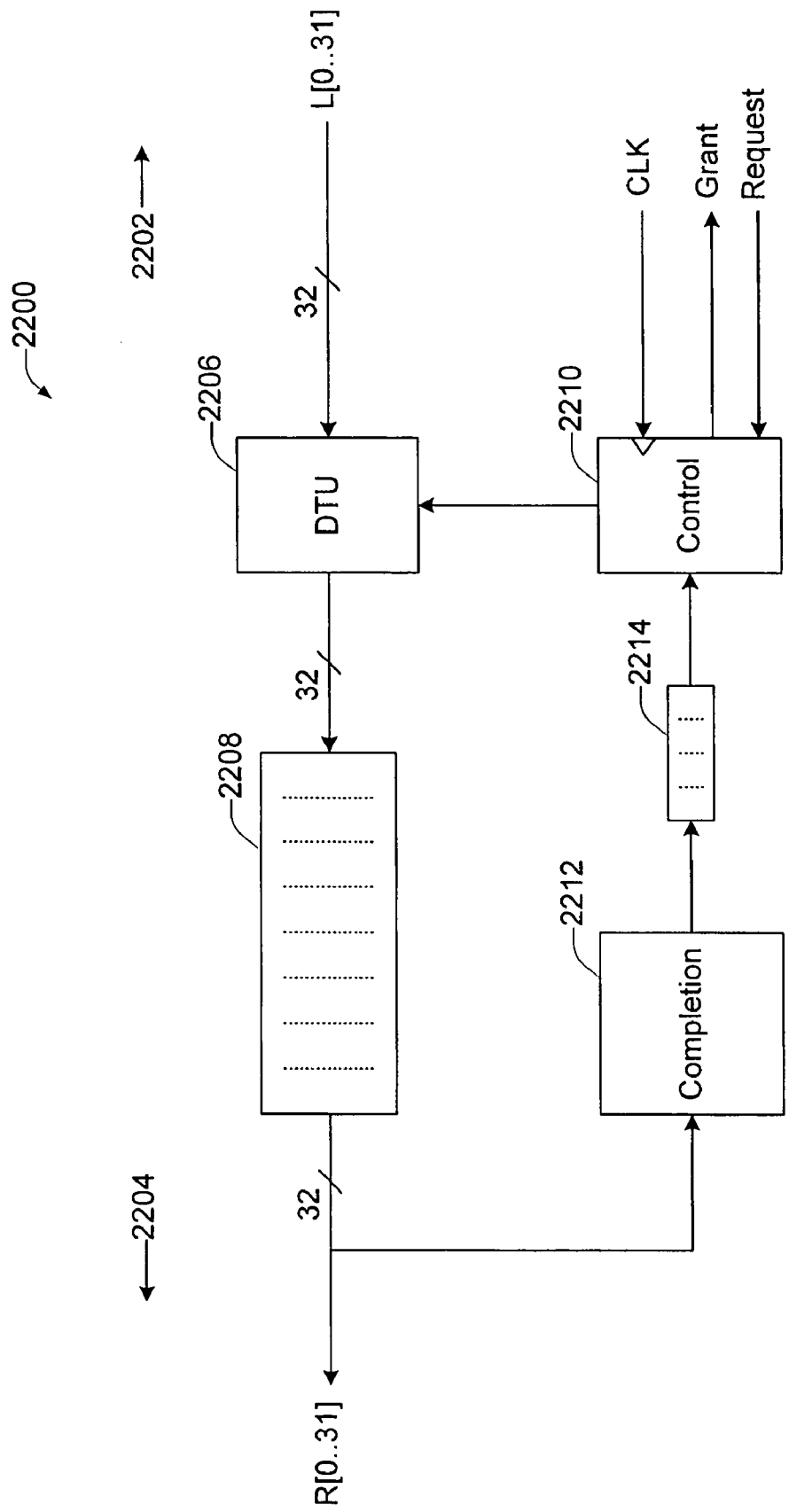
FIG. 22 is a simplified block diagram of a synchronous-to-asynchronous (S2A) interface designed according to a specific embodiment of the invention.

FIG. 22 is a simplified block diagram illustrating an interface 2200 for transferring data tokens from a synchronous domain 2202 to an asynchronous domain 2204 according to another specific embodiment of the invention. As with the embodiment discussed above with reference to FIG. 21, an exemplary 32-bit wide data token, i.e., L[0 . . . 31], is assumed. Data tokens generated in the synchronous domain are transferred to the asynchronous domain via a datapath which includes a plurality of synchronous-to-asynchronous (S2A) datapath transfer units (shown as DTU 2206) and a multi-stage buffer queue 2208.

Buffer 2208 receives and transfers the data tokens received from DTU 2206 from one stage to the next according to the delay-insensitive handshake protocol described above. And although buffer 2208 is shown having 8 stages, i.e., being capable of accommodating 8 data tokens, it will be understood that according to various embodiments, the length of this buffer may vary. Data tokens generated in the synchronous domain are transferred into buffer 2208 by DTU 2206 in response to an S2A "go" signal generated by control block 2210. Generation of this S2A "go" signal is described below.

In response to the indication that each of the bits of the data token at the end of buffer 2208 has been successfully transferred out of buffer 2208, completion block 2212 generates a 1 of1 transfer token representing the completed transfer and the fact that room is now available in buffer 2208 for at least one additional data token. According to a specific embodiment, completion block 2212 employs a pipelined architecture to minimize the impact of the latency inherent in generating a single transfer token from the completion signals for each of the bits of the data token. A specific implementation of such a completion block is described below.

The transfer token generated by completion block 2212 is received and transferred through the stages of transfer token buffer 2214 (which can accommodate multiple tokens) according to the delay-insensitive handshake protocol. The number of tokens in token buffer 2214 at any given time corresponds to the number of available spaces in buffer 2208 for additional data tokens to be transferred from the synchronous domain. The length of token buffer 2214 may vary according to different implementations, different buffer lengths being more suitable for particular datapath widths.

When control block 2210 receives a transfer token from buffer 2214 and there is an outstanding request from the synchronous domain for transfer of a data token, control block 2210 generates a grant signal indicating that the asynchronous domain is ready to receive the data token. Control block 2210 also generates the S2A "go" signal which enables the transfer of the data token by DTU 2206 to the first stage of buffer 2208. According to a specific embodiment, the S2A "go" signal is distributed among the individual datapath transfer units of DTU 2206 using a pipelined tree structure which minimizes the effect of the latency inherent in such a distribution. According to an alternative embodiment, the S2A "go" signal is distributed to the individual datapath transfer units using an electrically continuous conductor, e.g., a single wire.

According to various embodiments, and as will be understood with reference to FIGS. 21 and 22 and the corresponding discussion, the pipelining of the various elements which generate and distribute the "go" signals results in a low latency solution by which large data tokens may be transferred between asynchronous and synchronous domains. According to some embodiments, the latency for large datapaths, e.g., 32 or 64-bit, can be as little as one clock period.

For certain types of synchronous systems in which data transfers must occur in blocks of consecutive data and/or which are not tolerant of wait states, the foregoing A2S and S2A interfaces may not be sufficient by themselves to effectively transfer data between domains. Therefore, according to various specific embodiments of the invention referred to herein as "burst mode" interfaces, solutions are provided which ensure that the data transmission requirements of the synchronous domain are satisfied.

Figure 23:
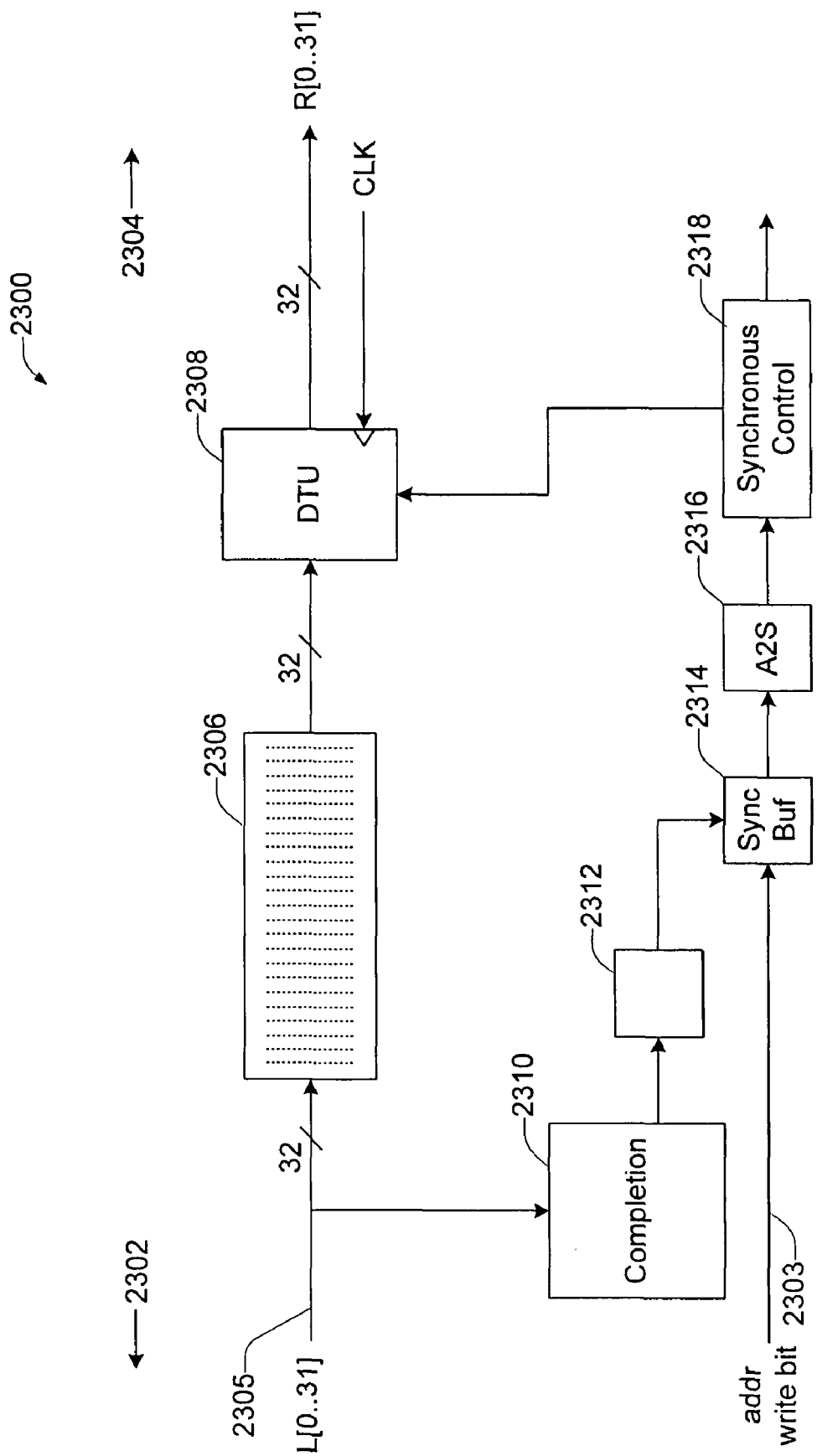
FIG. 23 is a simplified block diagram of a burst mode A2S interface designed according to a specific embodiment of the invention.

FIG. 23 is a simplified diagram illustrating an exemplary "burst mode" interface 2300 for transferring data tokens from an asynchronous domain 2302 to a synchronous domain 2304 according to a specific embodiment of the invention in which the synchronous domain expects data to be transmitted in uninterrupted blocks or "bursts" of consecutive tokens. It should be noted that although the term asynchronous may be used with respect to certain circuitry, the nature of the interfaces of the present invention mean that timing constraints exist on the asynchronous side, e.g., the buffer must be fast enough to feed one data token per clock cycle. While this is a fairly easy constraint to meet in that such a buffer feeds tokens through significantly faster than the typical clock cycle, it is a constraint nevertheless.

According to a more specific embodiment, synchronous domain 2304 is a synchronous memory architecture and interface 2300 is a "write" interface. It should be understood, however, that a burst mode interface designed according to the invention is more generally applicable than the specific implementation shown in FIG. 23. That is, various implementation details shown in FIG. 23 may not be necessary or may be replaced with other details for burst mode interfaces designed for other applications.

According to the embodiment shown, a 32-bit wide data token, i.e., L[0 . . . 31], encoded using 1 of2 encoding is assumed. However, it will be understood that data tokens having any number of bits and encoded in many different ways may be transferred from one domain to the other according to the described embodiment. Control information associated with the data token, e.g., a write command bit and the address to which the data are to be written, is split off from the data token and transmitted via control path 2303. The 32-bit data tokens are transmitted via data path 2305.

As will be understood, the nature of the control information will depend upon the type of memory architecture in the synchronous domain. As will also be understood, the data tokens may include dummy tokens where only specific words in a block of memory are to be written. These dummy tokens may be included in the bursts and may be identified, for example, by a mask bit associated with each of the tokens.

The 32-bit wide datapath includes a multi-stage buffer queue 2306 which receives and transfers the data tokens generated in the asynchronous domain from one stage to the next according to the delay-insensitive handshake protocol described above. Although buffer 2306 is shown having 24 stages, i.e., being capable of accommodating 24 data tokens, it will be understood that according to various embodiments, the length of this buffer may vary. As the transfer of each data token into buffer 2306 is achieved, completion of the transaction for each of the bits is signaled backwards by the first stage of buffer 2306 in accordance with the handshake.

The datapath also includes a plurality of asynchronous-to-synchronous (A2S) datapath transfer units (one for each bit of the data token) represented by DTU block 2308. As will be described, DTU 2308 effects the transfer of each data token to synchronous domain 2304 in response to an A2S "go" signal and the clock signal (CLK) associated with synchronous domain 2304. The manner in which the A2S "go" signal is generated according to a specific embodiment of the invention is described below.

In response to the indication that each of the bits of a token has been successfully transferred to buffer 2306 (i.e., the completed handshake for each bit), completion block 2310 generates a 1 of1 transfer token representing the completed transfer. According to a specific embodiment, completion block 2310 employs a pipelined architecture to minimize the impact of the latency inherent in generating a single transfer token from the completion signals for each of the bits of the data token. A specific implementation of such a completion block is described below.

According to a specific embodiment, buffer 2306 is implemented as a series of asynchronous stages each of which receives and transmits one 32-bit data token at a time via intervening buffer channels using the four-phase asynchronous handshake described above. According to an even more specific embodiment, each buffer stage comprises 16 buffer elements in parallel, each of which is responsible for receiving and transmitting two bits of the data using the handshake. As will be appreciated, there are a number of ways in which buffer 2306 and its buffer stages may be implemented without departing from the scope of the invention.

Figure 24:
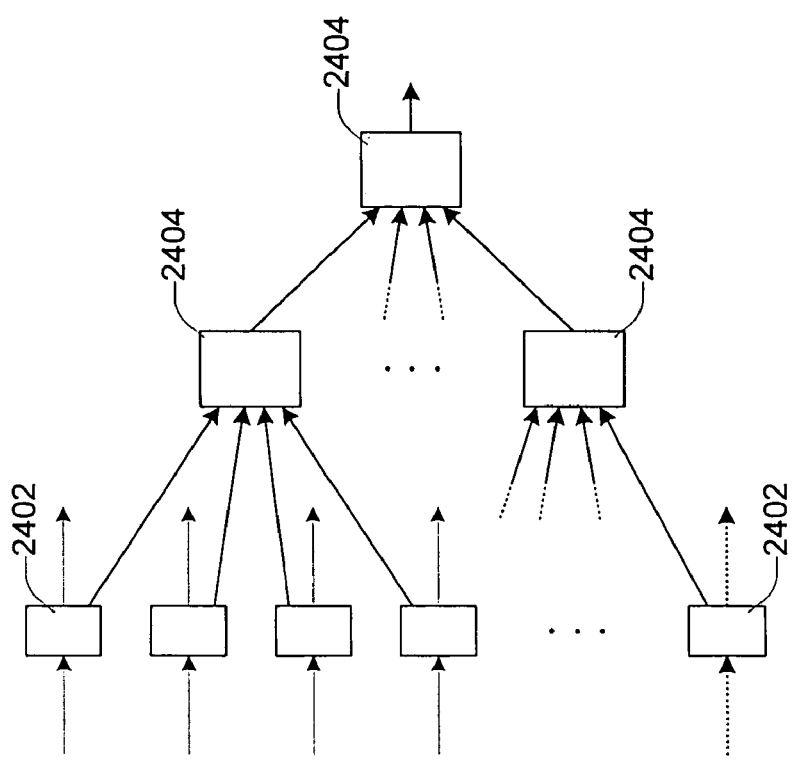
FIG. 24 is a simplified block diagram of a transfer token generation circuit according to a specific embodiment of the invention.

A transfer token is generated for every data token which is successfully transferred to the buffer for the purpose of tracking whether there are a sufficient number of tokens in the buffer for sending a burst. According to a specific embodiment, completion block 2310 employs a pipelined architecture to minimize the impact of the latency inherent in generating a single transfer token from the completion signals for each of the bits of the data token. More specifically, completion block 2310 is implemented as a tree structure which generates the transfer token from a copy of the data token sent to buffer 2306. An example of such a tree structure, including the circuit to copy the data token, is shown in FIG. 24.

Each buffer element 2402 receives and transmits two bits of data using an asynchronous handshake protocol. Each buffer element also generates a completion signal, e.g., a copy of the enable, when a successful transfer has occurred. This completion signal (along with three other completion signals for adjacent buffer elements) is received by a 4-way token collection circuit 2404 which generates a single token when all four completion signals are received. This token (along with three others generated by similar circuits 2404) are transmitted to a final 4-way token collection circuit 406 which generates the transfer token in much the same way. The CSP for an exemplary 4-way token collection circuit which may be used in such an implementation is given by *[<||i: 0 . . . 3: L[i] ?>; R!]. The CSP for an exemplary transfer buffer element which may be used in such an implementation is given by *[L?x; R!x, T!].

The transfer token is received by accumulator block 2312 which generates a single synchronization token when a specific number of transfer tokens have been accumulated indicating the presence of at least one burst of data in the buffer; e.g., if each data token is a single word of data and a burst must be 8 words of data, a synchronization token is generated for every 8 transfer tokens received.

Synchronization buffer 2314 is simply a buffer which copies its inputs to its outputs but won't let the control information on control path 2303, e.g., the address and write command, through until it receives the synchronization token from accumulator block 2312 which indicates that sufficient data are present in buffer 2306 to effect a write to the address identified by the control information. The control information is then transmitted to A2S interface 2316 which may comprise a simple buffer stage similar to the datapath transfer units of DTU block 2108 and 2308 described above. Alternatively, A2S interface 2316 may be implemented using something more elaborate such as, for example, A2S interface 2100 of FIG. 21.

Figure 25:
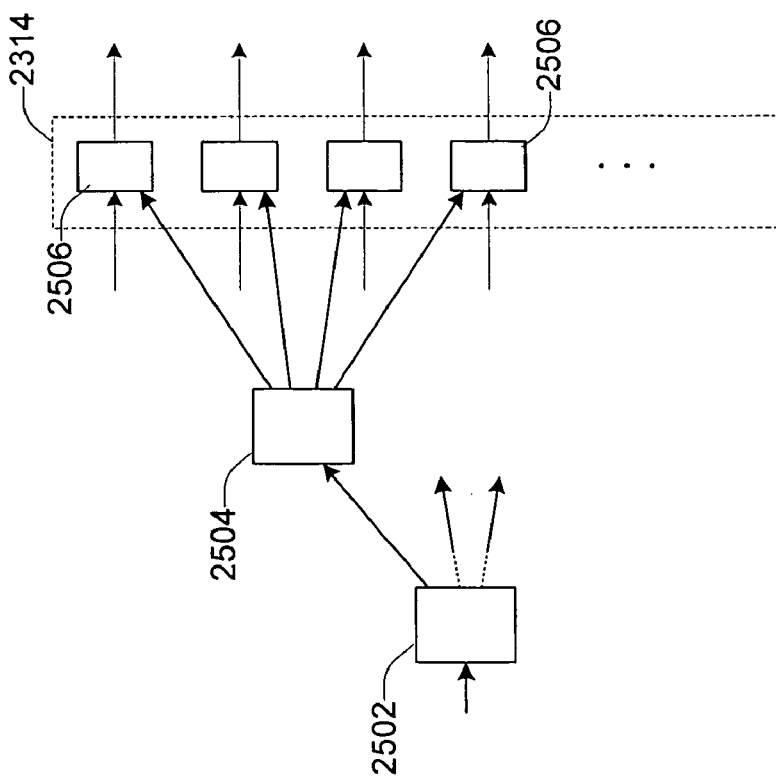
FIG. 25 is a simplified block diagram of a transfer token distribution circuit according to a specific embodiment of the invention.

According to a specific embodiment, the synchronization token generated by accumulator block 2312 is distributed to the individual buffer elements of synchronization buffer 2314 using a pipelined tree structure, a portion of which is shown in FIG. 25. As with the tree structure of FIG. 24 (which essentially works the reverse function), tree structure 2500 minimizes the impact of the latency inherent in distributing copies of a single token to each of the buffer elements.

As shown in FIG. 25, a 4-way token copy circuit 2502 receives the synchronization token and copies the token to each of a plurality of subsequent token copy circuits 2504 (which may have different numbers of outputs, e.g., 2-way, 3-way) until there are a sufficient number of copies to distribute to the individual buffer elements 2506 of synchronization buffer 2314. The CSP for an exemplary 4-way token copy circuit which may be used in such an implementation is given by *[L?; <||;: 0 . . . 3: R [i]!>]. The CSP for an exemplary synchronization buffer element which may be used in such an implementation is given by *[L?x, T?; R!x]:

In any case, once the control information, e.g., a write request, has been transmitted to the synchronous domain, the A2S "go" signal is asserted by synchronous control circuitry 2318 and, in response to the successive clock signals, DTU block 2308 transfers a burst of data tokens to be written to the specified memory locations according to the protocol by which the synchronous memory architecture is characterized. When the burst is complete, the "go" signal is deasserted.

Figure 26:
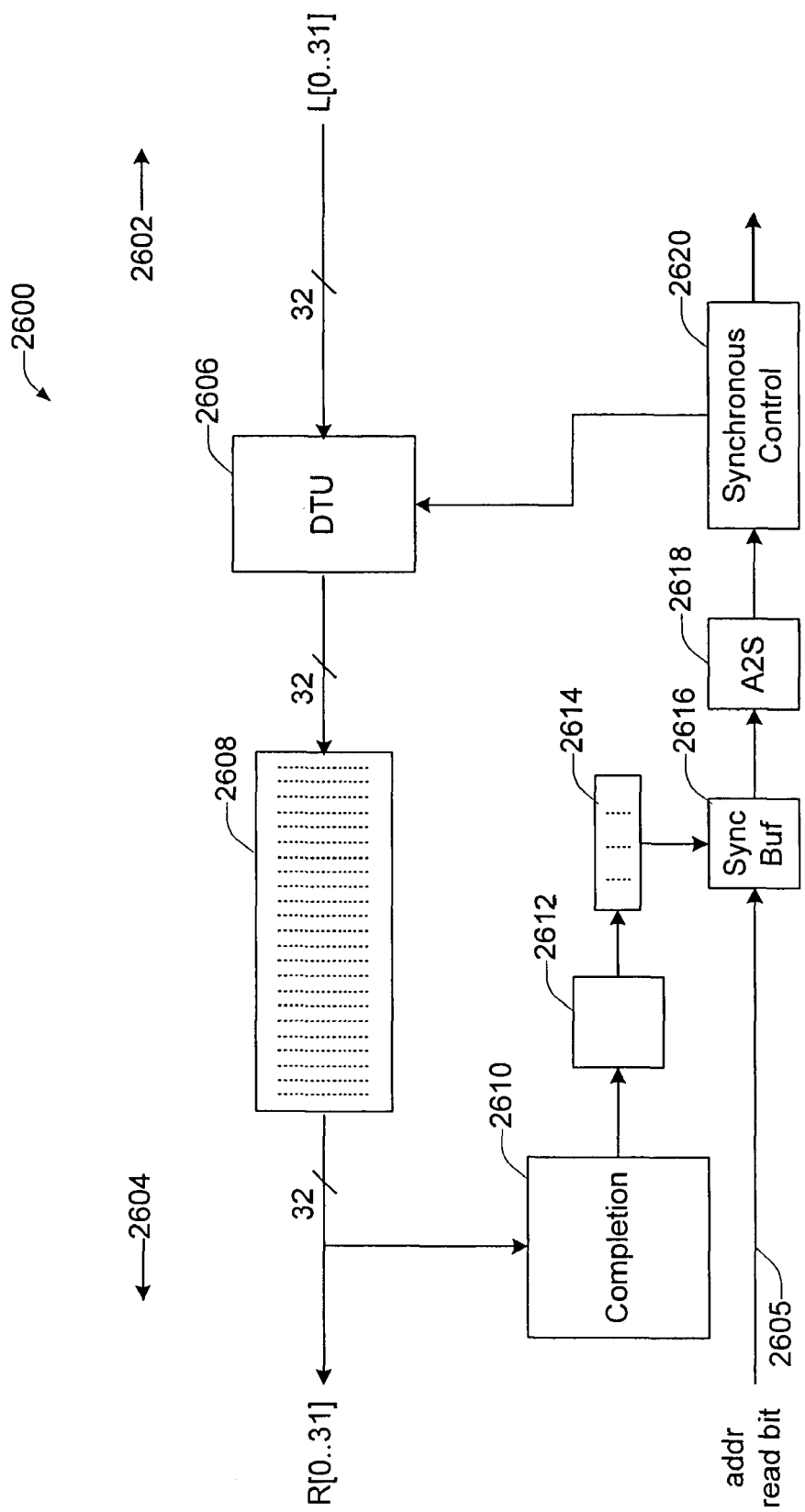
FIG. 26 is a simplified block diagram of a burst mode S2A interface designed according to a specific embodiment of the invention.

FIG. 26 is a simplified diagram illustrating an exemplary "burst mode" interface 2600 for transferring data tokens from a synchronous domain 2602 to an asynchronous domain 2604 according to a specific embodiment of the invention. In the embodiment shown, synchronous domain 2602 comprises a synchronous memory architecture, and interface 2600 is the read interface for use with the write interface of FIG. 23. According to various other embodiments, S2A interfaces similar to interface 2600 may be employed in any of a wide variety of contexts in which the synchronous domain is required to transfer data in bursts of consecutive tokens.

As with write interface 2300 of FIG. 23, a 32-bit wide data path, i.e., L[0 . . . 31], encoded using 1 of2 encoding is assumed. However, it will be understood that data tokens having any number of bits and encoded in many different ways may be transferred from one domain to the other according to the described embodiment. The datapath includes a plurality of synchronous-to-asynchronous (S2A) datapath transfer units (one for each bit of the data token) represented by DTU block 2606. As will be described, DTU 2606 effects the transfer of each data token to asynchronous domain 2604 in response to an S2A "go" signal and the clock signal (CLK) associated with synchronous domain 2304. The manner in which the S2A "go" signal is generated according to a specific embodiment of the invention is described below.

The 32-bit wide datapath also includes a multi-stage buffer queue 2608 which receives and transfers the data tokens from one stage to the next according to the delay-insensitive handshake protocol described above. Buffer 2608 is shown having 24 stages because in a particular embodiment, this provides space for three 8-token bursts of data. However, it will be understood that according to various embodiments, the length of this buffer may vary. As the transfer of each data token out of buffer 2608 is achieved, completion of the transaction for each of the bits is signaled backwards in accordance with the handshake.

As with write interface 2300, control information, e.g., a read command and address range, generated in asynchronous domain 2604 is not transmitted into synchronous domain 2602 until there is sufficient room in buffer 2608 to accept the expected burst of consecutive data tokens. According to one embodiment, the size of the bursts are constant. According to another embodiment, the size of the bursts vary and may be determined with reference to the control information. In any case, interface 2600 is configured to ensure that whatever the size of the data transfer from the synchronous domain there is sufficient buffer space to accommodate it.

According to a specific embodiment, this is achieved by keeping track of the number of tokens transferred out of buffer 2608 with completion block 2610 which generates a transfer token for every data token which is successfully transferred out of buffer 2608. According to a specific embodiment, completion block 2610 employs a pipelined architecture to minimize the impact of the latency inherent in generating a single transfer token from the completion signals for each of the bits of the data token. More specifically, completion block 2610 may be implemented as tree structure which generates the transfer token from the completion signals generated by the asynchronous circuitry subsequent to the final stage of buffer 2608. Alternatively, completion block 2610 may comprise its own buffer stage following buffer 2608. An example of such a tree structure is described above with reference to FIG. 24.

The transfer token generated by completion block 2610 is received by accumulator block 2612 which generates a single synchronization token when a specific number of transfer tokens have been accumulated indicating there is space in buffer 2608 for at least one burst of data; e.g., if each data token is a single word of data and a burst is 8 words of data, a synchronization token is generated for every 8 transfer tokens received. The synchronization tokens generated by accumulator block 2612 are stored in a token buffer 2614 for application to synchronization buffer 2616.

Token buffer 2614 is shown as being able to accommodate 3 synchronization tokens at a time. This corresponds to the number of data bursts which may be accommodated by buffer 2608. However, it will be understood that token buffer 2614 may vary in length along with buffer 2608 without departing from the scope of the invention. {Are there any timing assumptions associated with the length chosen for the token buffer or is it dictated by the number of bursts which can be accommodated by buffer 2608. It will also be understood that when the interface is powered up, token buffer 2614 is fully populated with synchronization tokens to reflect the fact that buffer 2608 is completely empty.

Synchronization buffer 2616 is simply a buffer which copies its inputs to its outputs but won't let the control information on control path 2605, e.g., the address range and read command, through until it receives the synchronization token from token buffer 2614 which indicates that sufficient space exists in buffer 2306 to effect a read of data from the address range identified by the control information. The control information is then transmitted to A2S interface 2618 which may comprise a simple buffer stage similar to the datapath transfer units of DTU block 2108 and 2308 described above. Alternatively, A2S interface 2618 may be implemented using something more elaborate such as, for example, A2S interface 2100 of FIG. 21.

As discussed above with reference to interface 2300, there are some timing constraints in the circuitry of interface 2600. That is, for example, interface 2600 is configured such that each time synchronization buffer 2616 receives a synchronization token from token buffer 2614 any data tokens in buffer 2608 have migrated far enough toward the end of the buffer such that there is sufficient space at the beginning of the buffer to accommodate the burst of data precipitated by transmission of the synchronization token. According to a specific embodiment, this may be achieved, at least in part, because of the speed with which buffer 2608 transfers tokens from stage to stage.

According to a specific embodiment, each synchronization token transmitted from token buffer 2614 is distributed to the individual buffer elements of synchronization buffer 2616 using a pipelined tree structure as discussed above with reference to FIG. 25.

In any case, once the control information, e.g., a read request, has been transmitted to the synchronous domain, the A2S "go" signal is asserted by synchronous control circuitry 2620 and, in response to the successive clock signals, DTU block 2606 transfers a burst of data tokens from synchronous domain 2602 to buffer 2608. When the burst is complete, the "go" signal is deasserted. Generation of such a "go" signal will be described below with reference to more specific embodiments.

More specific implementations of A2S and S2A interfaces will now be described with reference to FIG. 27 et seq. In the subsequent description, an asynchronous channel refers to a 1 ofN channel plus a handshaking "enable" wire. The enable wire is identified by an "e" superscript. Communication on these wires happens according to the asynchronous four-phase handshake protocol discussed above. "Validity" refers to the state of the 1 ofN channel. When one rail is high, the channel is said to be "valid". Otherwise, it is said to be "neutral" or invalid. A "token" is an abstraction referring to the propagation of valid states from one asynchronous channel to the next in a system.

The converter designs described below also make use of a pair of synchronous handshaking signals (referred to as $S^o$ and $S^i$) to implement flow control. According to a specific embodiment illustrated in FIG. 27, the handshake protocol used is the following: On a rising clock edge, if both A and B are high, the receiver reads the data. If A is high and B is low, the data channel contains an unread value, and the sender is waiting for the receiver to raise B. If A is low and B is high, the data channel is "empty". The receiver has read any previous value and is ready for the next one. If A and B are both low, the channel is empty and the receiver is not ready to read from the channel value.

The following abbreviations and notation are used to represent various signals, channels, and constants: CLK—Clock; Tclk—Clock period; $S^o$—synchronous handshake output signal; $S^i$—synchronous handshake input signal; $A_c$—PC 1 of1 output channel; go—Control signal to the DTU array indicating whether to transfer a token (either a synchronous single-rail broadcast or a 1 of1 four-phase asynchronous channel); and en—Internal enable signal in a cell (sometimes en is also the enable to its input channels, sometimes not).

Each of the embodiments described below implement high-performance conversion circuitry between clocked (synchronous) logic and locally-handshaking, (asynchronous) logic. In the asynchronous domain, the transfer of data occurs on 1 ofN rail channels, following a four-phase local handshaking protocol. In the synchronous domain, transfer of data happens according to timing relationships with the transitions of a clock signal. Any circuit which mixes the two communication conventions inevitably introduces metastability to the system. Localizing that metastability to a single signal per data token transfer while maintaining low-latency, high-throughput transfers is an objective of various embodiments described hereinafter.

Figure 28:
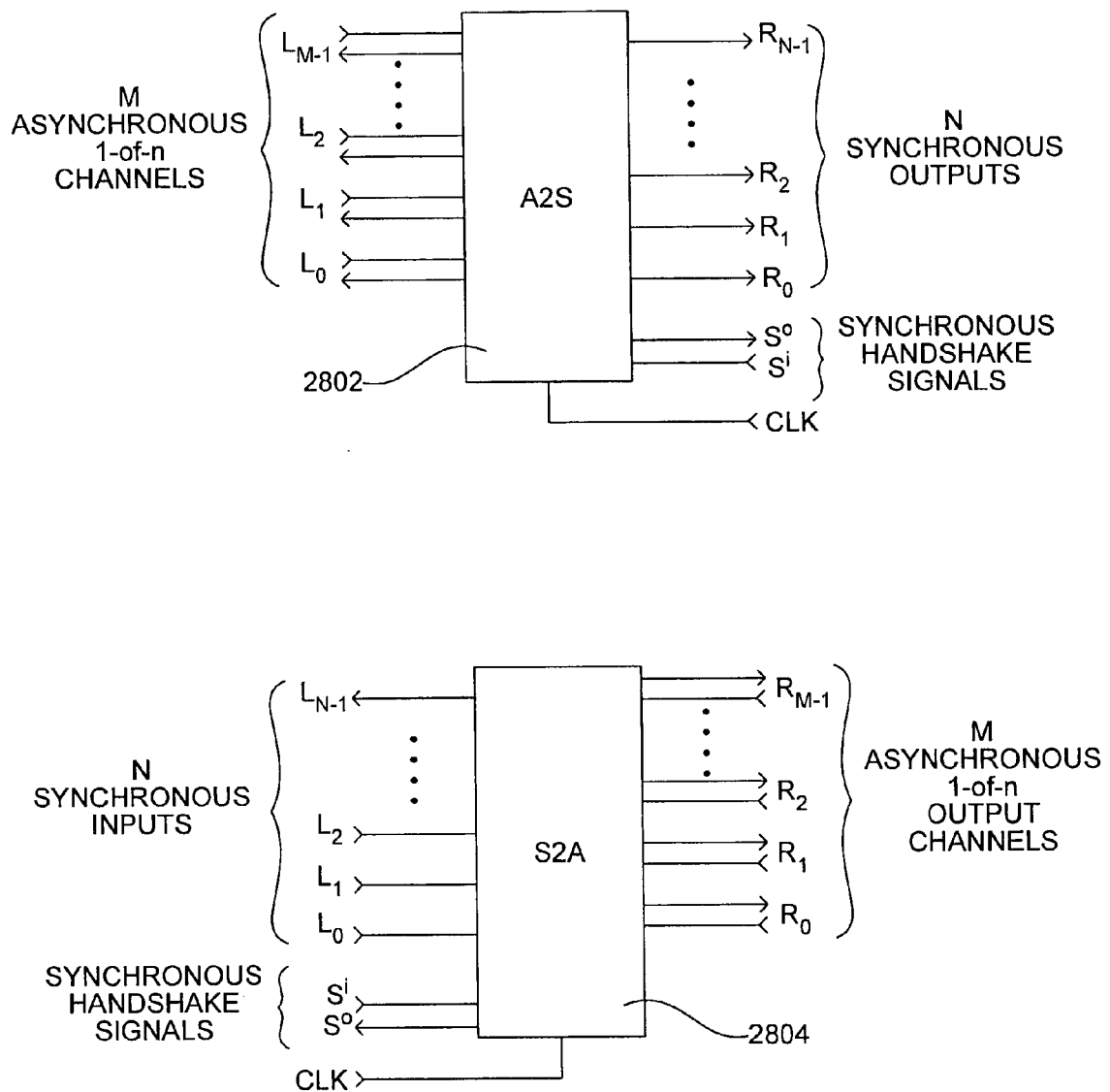

The port interfaces of the Asynchronous-to-Synchronous (A2S) and Synchronous-to-Asynchronous (S2A) converters 2802 and 2804, respectively, are illustrated in FIG. 28. It should be noted that in the following discussion all synchronous signals are assumed to be single-rail. However, embodiments of the invention can trivially accommodate other synchronous signaling conventions (e.g. dual-rail or differential).

A simplified description of the behavior of A2S interface 2802 is as follows:

1. An asynchronous token arrives on the L channel, indicated by all $L_0 \ldots L_{M-1}$, channels going valid.
2. On the next rising edge of CLK, if either $S^i$ is high or if $S^o$ is low, a transfer occurs (go to state 4). Otherwise,
3. The converter waits until a rising CLK transition when $S^i$ is high.
4. The data value on L is read (enables go low, the $L_0 \ldots L_{M-1}$ data rails go neutral). On the falling edge of CLK, the value is asserted on $R_0 \ldots R_{N-1}$, and $S^o$ is set high.
5. Operation returns to state 1. Until the next token arrives, on each rising CLK edge, if $S^i$ is high, $S^o$ is set low on the subsequent falling CLK transition.

This is a simplified description due to nonzero slack on the L channel internal to A2S converter 2802. The precise timing relationship between the L handshake and the converter's synchronized transfer is unknown (but can only happen at times earlier than those indicated above).

A similarly simplified description of the behavior of S2A interface 2804 is as follows:

1. The $R_0 \ldots R_{M-1}$, channels all go neutral, and the converter waits for all $R_i^e$ enables to be high (indicating readiness to receive a token). As long as at least one $R_i^e$ is low, $S^o$ is set low on the falling edge of CLK.

2. On the next rising edge of CLK, if $S^i$ is high, a transfer occurs (go to state 4). Whether or not a transfer occurs, $S^o$ is asserted high on the next falling CLK edge.

3. The converter waits until a rising CLK transition when $S^i$ is high.

4. The data value on $L_0 \ldots L_{N-1}$ is written to the R channels ($R_0 \ldots R_{M-1}$ go valid, the enables transition low). Operation returns to state 1.

The A2S interface and S2A interface designs described below implement the above-described behavior. In addition, specific implementations of the described embodiments are characterized by the following properties. With regard to timing, various designs of the present invention impose a minimum of timing assumptions on all signals. Races exist only against the clock, and on synchronous inputs which are assumed to conform to specified setup and hold times relative to the rising edge of CLK. Assuming all timing assumptions hold, metastability arises only at a single point in the design. This metastability is resolved by a Seitz arbiter. ½ Tclk (minus epsilon) is allowed for metastability resolution. All synchronous outputs transition during some range $[tO_{min}, tO_{max}]$ following CLK+.

According to various embodiments, both S2A and A2S directions can sustain one transfer per clock cycle. The maximum latency penalty of the conversion is one clock cycle (relative to a synchronous-to-synchronous transfer), suffered only in pathological cases. Completion of incoming A2S and outgoing S2A tokens is pipelined (with local DI handshakes) to keep cycle times low.

According to various embodiments, minimized synchronization to CLK allows "overclocking": correctness is maintained even as Tclk drops below its minimal value ("nop" cycles are introduced via synchronous handshaking). Assuming all timing races are met, the only possibility of metastability propagating beyond the arbiter is if the arbiter resolves during a period of one transition exactly Tclk/2 following CLK+.

Figure 29:
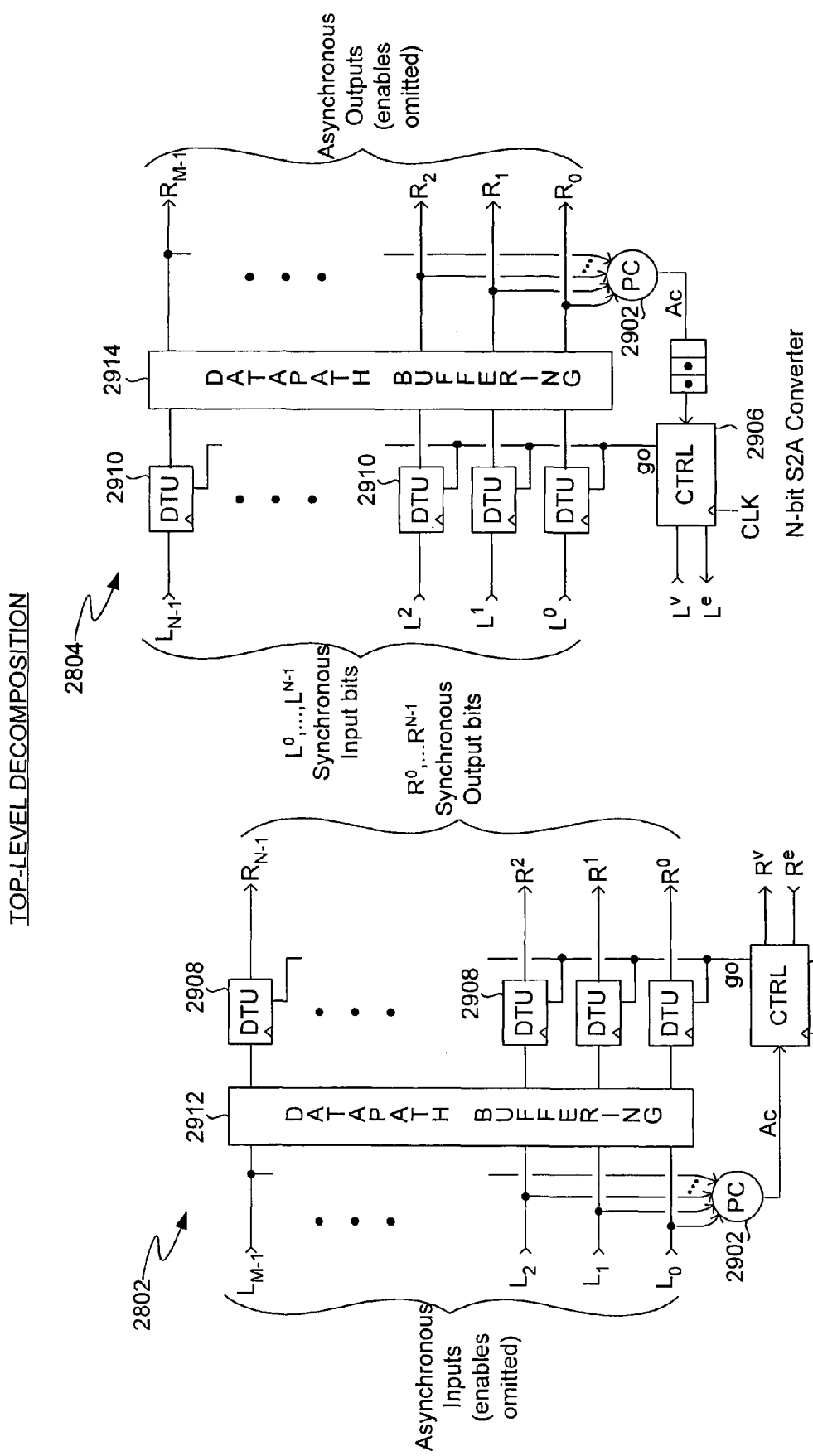

The internal high-level organization of the A2S and S2A converters 2802 and 2804 according to a specific embodiment is shown in FIG. 29. Each interface includes four high-level components:

1. Pipelined Completion (PC) 2902. The purpose of this component is to identify and acknowledge an incoming (A2S) or outgoing (S2A) data token. This "completion" logic involves feeding the OR'd data rails of each data channel into a tree of C-elements, i.e., condensing these data rails into a single "data valid" signal. For all but single-channel tokens, this combinational logic tree introduces too much forward-latency to sustain a high cycle rate. Therefore, according to a specific embodiment, the incoming token is completed in a pipelined manner, buffering intermediate completion signals at each stage.

According to a specific embodiment, PC 2902 is identical for both A2S and S2A converters of the same token size & type. It appears on the asynchronous side of each (i.e. at the input of the A2S, at the output of the S2A).

2. Control Processes (CTRL) 2904 and 2906 (e.g., see FIG. 30). CTRL processes 2904 and 2906 are responsible for (1) issuing a "go" signal to the datapath when both asynchronous and synchronous sides are ready for a transfer, (2) sequencing the asynchronous and synchronous handshaking signals ($A_c^d$, $A_c^e$) and ($S^i$, $S^o$), and (3) synchronizing as necessary to CLK.

The control processes for the A2S and S2A designs (CTRL 2904 and 2906, respectively) are nearly identical. The only difference between A2S CTRL 2904 and S2A CTRL 2906 is their reset state: A2S CTRL 2904's $S^o$ signal resets low, while S2A CTRL 2906's $S^o$ resets high. (The former reflects the empty state of the synchronous output channel, the latter reflects the empty state of the S2A's asynchronous capture buffer.)

3. Datapath Transfer Units (DTU) 2908 and 2910 (e.g., see FIG. 31). Generally, the DTU unit is responsible for transferring a data token across the synchronous/asynchronous boundary once a transfer ("go") signal is received from the associated CTRL process. The A2S and S2A datapath transfer units differ significantly. The details of each are described below.

4. Datapath buffering 2912 and 2914. Both the A2S interface and the S2A interface require additional stages of asynchronous buffers between their PC and datapath transfer units. The buffers either store data tokens prior to transfer (A2S buffer 2912) or prior to being consumed by subsequent asynchronous circuitry (S2A buffer 2914). In both cases, timing assumptions are imposed on these buffer stages. Specifically, the buffers are capable of passing tokens faster than the DTU units can consume or produce them. Stated another way, the buffer array has no critical cycles longer than the clock period.

Given the above high-level decomposition of A2S interface 2802, a more detailed description of its operation can now be provided. Beginning from the asynchronous L input, a token (comprising N 1 ofM channels following the four-phase handshake protocol) enters A2S converter 2802 and is immediately copied to two branches: one into Pipelined Completion (PC 2902), and the other into datapath buffers 2912 preceding the A2S DTU array. PC 2902 condenses the token into a single 1 of1 token through several stages of logic, the number of stages depending on the size of N and M. The 1 of1 token (on the "$A_c$" channel in FIG. 29) is then presented to A2S CTRL process 2904 as a notification that an asynchronous token has arrived and is ready to be converted.

A2S CTRL process 2904 samples the state of the 1 of1 $A_c$ channel on the next rising edge of CLK. Seeing that it contains valid data ($A_c^d$ asserted), it makes the decision whether to transfer the token to the synchronous domain or not, depending on the states of the output channel and the synchronous "grant" ($R^e$) signal. If the R channel is empty ($R^v$ low) or if the grant signal is high, A2S CTRL process 2904 will raise its request signal ($R^v$). If $R^e$ is also high, CTRL 2904 will assert the "go" datapath signal to the DTU array indicating that the datapath transfer units should acknowledge the asynchronous data token and latch the value to the synchronous $R^d$ bits. By this time, the asynchronous token will have propagated through buffer 2912 and will be ready for consumption by the array of DTUs 2908.

If, on the other hand, A2S CTRL process 2904 does not transfer the token, i.e., if $R^v$ was high and $R^e$ was low, then it will neither acknowledge the $A_c$ token nor assert "go". On some subsequent clock cycle when $R^e$ goes high (indicating the recipient has accepted the stale synchronous value on R), it will then transfer the asynchronous token as described above.

According to various embodiments, this operational description of A2S converter 2802 relies on several timing assumptions:

1. In order to maintain full-throughput transfers (i.e. one every clock period when neither side stalls), each asynchronous pipeline unit must be capable of completing its input and output handshake cycles in under one clock period. For example, it is the inability of a single-stage PC to complete a 32-bit datapath in a sufficiently short time which necessitates the pipelining of this unit.

Note that in particular the two branches on the input L path must satisfy this requirement when the pipelines are both at peak dynamic capacity (steady-state condition) and at peak static capacity (following a synchronous-side stall). The latter condition is more difficult to satisfy, but must be if the converter is to promptly respond to the case that $R^e$ goes high after several cycles of stalling low.

Also note that once this condition is satisfied within the A2S asynchronous circuitry, no further timing assumptions must be imposed on the asynchronous circuitry feeding into the A2S converter. Outside the A2S, the handshake can stall unpredictably for arbitrarily long times, and the A2S converter will always maintain correctness, converting tokens at peak throughput whenever possible.

2. The A2S must be able to sample the $A_c$ state at the rising edge of CLK and then, if it decides to transfer, it must assert the "go" signal to all A2S_DTU elements, which then must latch the L data value to $R^d$ bits, all within a single clock cycle, never exceeding some maximum output time. Given that the sampling of $A_c$ relative to clock fundamentally requires a nondeterministic period of time to reach a decision (due to metastability resolution), this timing assumption must be verified under the worst-possible arbitration time. If the sampling were ever to take longer than some critical amount (approximately half a clock cycle in this design), then the converter runs the risk of violating its max output time (or, more precisely, propagating a metastable state outside the A2S CTRL arbitration logic). This failure condition must be treated as catastrophic, and the probability of such a failure must be characterized. From this, the MTBF (Mean Time Between Failure) of the A2S converter can be determined, given some assumptions about input/output stall conditions.

3. The A2S converter must never change its synchronous outputs ($R^v$, $R^d$) too early following the rising edge of CLK. This is a standard synchronous timing ("hold time") constraint. The design presented here satisfies this by conditioning all output changes on ~CLK, i.e. as long as the hold times of the output synchronous circuitry are less than Tclk/2, there is no reason of failure. There is no reason to more aggressively optimize this minimum output time (in order to give the output synchronous circuitry more time for calculation within the clock cycle) since the design assumes a worst-case metastability resolution time of approximately Tclk/2. That is, the minimum possible max output time is also greater than Tclk/2.

In S2A converter 2804, the arrival of a token to transfer is indicated by the synchronous-side's assertion of $L_v$. S2A CTRL process 2906 decides whether to grant a transfer or not by sampling the state of the 1 of1 $A_c$ token at the rising edge of CLK. The presence of a token on $A_c$ indicates space in datapath output buffer 2914 for an additional token. In this case (when $A_c^d$ is set at the rising edge of CLK), S2A CTRL 2906 will set its $L^e$ grant line high and acknowledge the $A_c$ token. If both $L^e$ and $L_v$ go high, the "go" signal to the array of DTUs 2910 is asserted to transfer the synchronous input value to the asynchronous capture buffer.

As the output asynchronous circuitry consumes the converted tokens captured in S2A buffer 2914, copies are sent to Pipelined Completion (PC) 2902, becoming new $A_c$ tokens. In this manner the total number of $A_c$ tokens are conserved in the system, representing the fixed token capacity of S2A converter 2804. If at any point the output asynchronous circuitry stalls (stops draining buffer 2914 ), buffer 2914 fills up and no new $A_c$ tokens are produced. The A2S CTRL process 2906 then lowers its grant ($L^e$) line and stops converting tokens until the output logic reads from R, producing an $A_c$ token. Pictorial representations the reset condition, normal operation, and the asynchronous-side stall condition are illustrated in FIGS. 32A-32C, respectively.

S2A converter 2804 must satisfy the same three general categories of timing requirements described above with reference to A2S converter 2802. Namely:

1. All asynchronous pipeline cells within the S2A converter must be able to sustain clock period handshake cycles under all operating conditions.

In fact, the requirement on the asynchronous output buffer is even more critical for the S2A converter than it is on the A2S converter's input buffer. In the A2S converter, if the input asynchronous buffering "stutters" somewhat when transitioning from a full (previously stalled) to a dynamic condition, at worst an unnecessary send-stall "no-op" cycle will be introduced. In the S2A converter, however, if the output buffers cannot fully drain a single token in one clock cycle out of a full receiver-stall state, the S2A DTU array may not be able to transfer the granted token when the S2A CTRL process thinks it can. The result would be a lost or corrupted data token.

2. The S2A converter must be able to set its synchronous output signal ($L^e$) within some reasonable max output time in order to satisfy the setup time of the input synchronous circuitry, even under the worst-case metastability resolution time. This requirement is also imposed on the internal go synchronous control broadcast to the S2A datapath; go must not transition too late into the clock cycle in order for the datapath units to be able to transfer (or not) a token on the next clock cycle.

3. All synchronous outputs ($L^e$, go) must not transition too early in the clock cycle. As in the A2S converter, this requirement is satisfied by conditioning changes on ~CLK.

Implementation details of specific embodiments of the converter designs are given below. Some details of the circuits have been omitted for clarity. These include staticizers on the output nodes of all dynamic logic, and extra reset circuitry which any practical implementation would require. Both of these additions are straightforward to implement. The specifications of the units described below are given in CSP.

Figure 33:
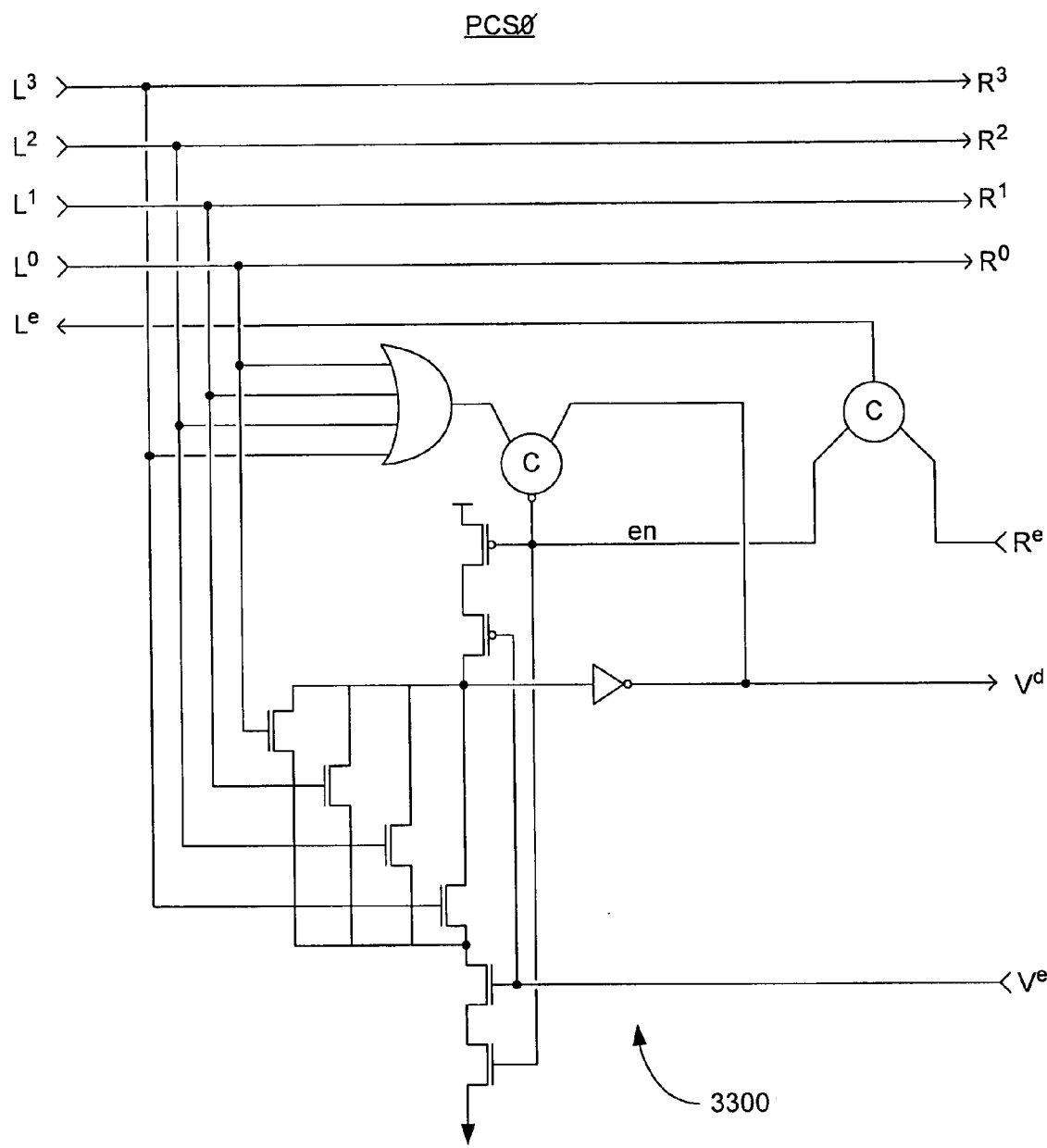
Figure 34:
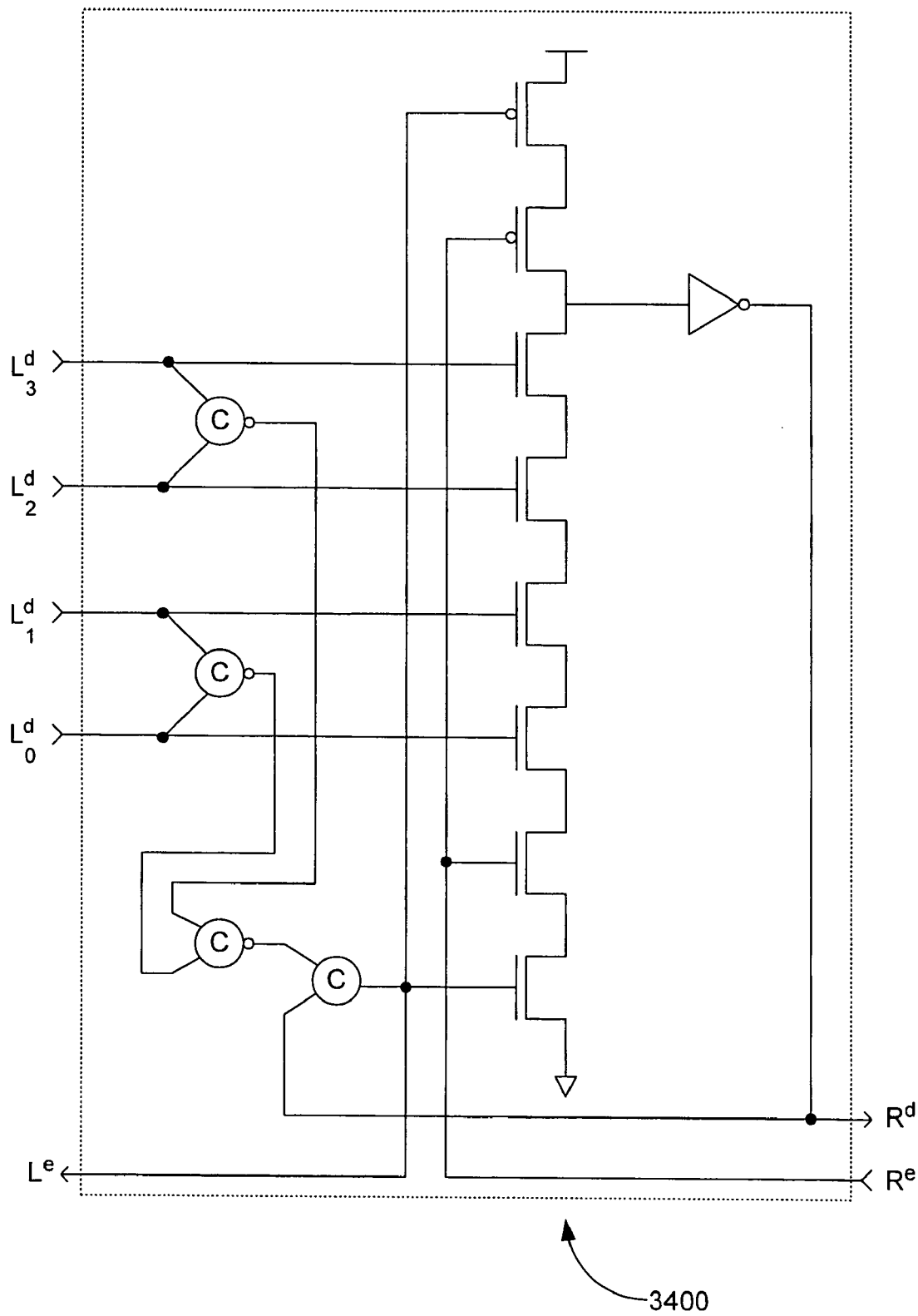

Pipelined Completion unit 2902 includes a validity detection element per input channel. An example of such a circuit is PCS0 3300 of FIG. 33 which has a 1 of4 input. PCS0 3300 is followed by a log(N)-deep tree of cells, an example of which is PCS1 cell 3400 of FIG. 34. PCS0 unit 3300 implements the simple CSP specification:

*[L?x; R!x, V!]

According to a specific embodiment, the "R!x" output operation is done in a "slack-zero" manner, i.e., the L and R data rails are wired together. When one of the L data rails goes high, a 1 of1 token is sent on V.

Figure 35:
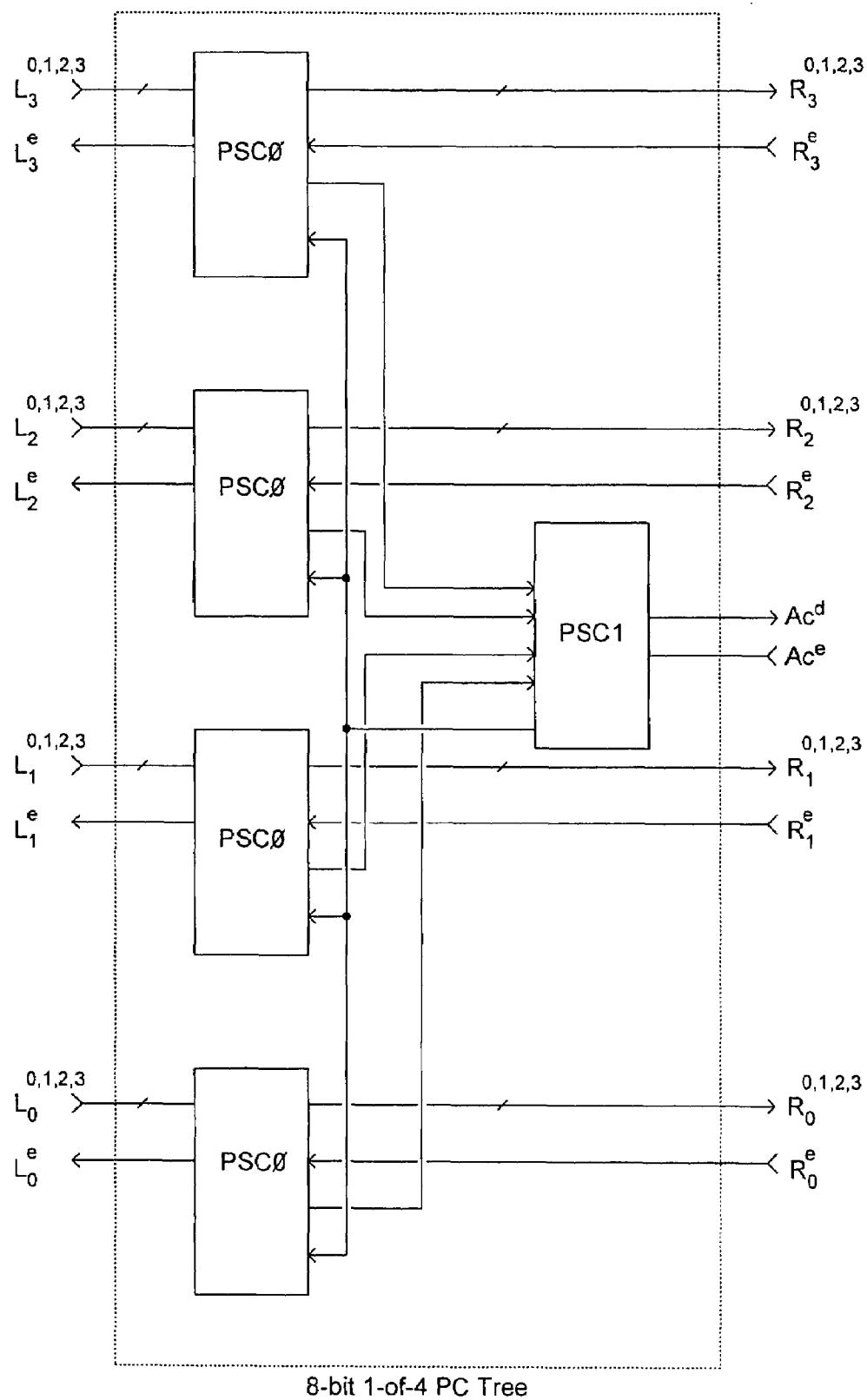

A four-input PCS1 unit 3400 implements the CSP specification:

*[L[0]?, L[1]?, L[2]?, L[3]?; R!]

i.e., it reads the 1 of1 inputs from four PCS0 units, and then outputs a single 1 of1 token. An example with N=4 1of4 input channels (i.e., 8 bits'worth of data) is shown in FIG. 35. The PCS1 units can be combined in a tree structure to complete arbitrarily large datapaths. Larger completion trees can be constructed in an analogous manner.

Figure 36:
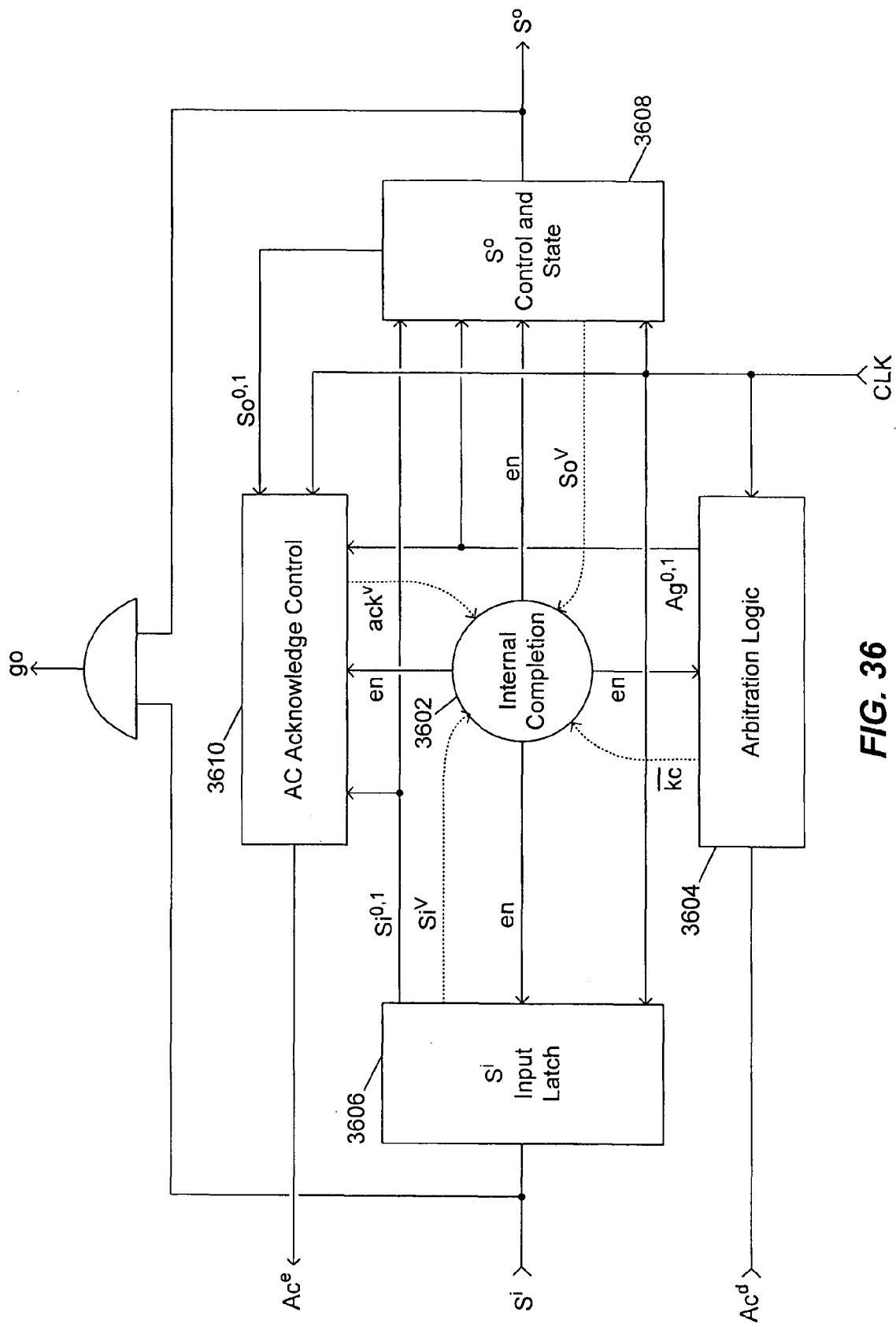

An exemplary CTRL process is shown in FIG. 36. The CSP specification of either of the A2S and S2A control processes is the following:

```
S° := so := so_init_state;
*[[ #Ac & CLK -> a := 1 | ~#Ac & CLK -> a := 0 ],
   [CLK -> si := S^i];
   [ ~a & (si | ~so) -> xso := 0 [ ] else xso := 1 ],
   [ a & (si | ~so) -> Ac?  [ ] else -> skip ];
   so := xso;
   [~CLK -> S° := so]]
 ||
*[go := S^i & S°]
```

It should be noted that for the A2S CTRL process, "so_init_state" is 0; for the S2A CTRL process it is 1.

The "$S^o$" output maps to the $R^v$ validity signal in the A2S converter. In the S2A converter, it maps to the $L^e$ enable signal. Likewise, in the A2S converter the "$S^i$" is the input $R^e$ and in the S2A converter it is $L^v$. The assertion of $S^o$ can be considered to indicate the presence of a token in the control process. For the A2S converter, it indicates that the converter has asserted a data token to be consumed by the synchronous circuitry; for the S2A converter, it indicates that the converter is ready to consume a data token.

On each rising clock edge, the control process probes the input asynchronous channel $A_c$ and sets the internal variable "a" high if the channel is ready to be read. The process also latches its synchronous input ($S^i$). If $A_c$ has valid data (a), or if the synchronous side is not ready ($S^i$ low), then xso (to become $S^o$) is set high. If $A_c$ does not have valid data (~a) and the synchronous side is ready, then xso is set low. In all other cases, xso ($S^o$) is left in its prior state.

If $A_c$ has valid data and either $S^i$ is high or $S^o$ is low, the $A_c$ token is consumed. This can happen when either $S^o$ was asserted (indicating ownership of a token in the CTRL process) and $S^i$ was high (indicating the consumption of that token on the clock cycle in question), or when $S^o$ was not asserted (indicating that the CTRL process can accept an $A_c$ token regardless of the synchronous side's state.) In this case of the logic, the process lowers the $A_c^e$ signal, it waits for $A_c^d$ to be de-asserted, and then it re-asserts $A_c^e$. In the circuit implementation given below, it is critical that the $A_c^d$ go low in response to $A_c^e$ within the clock cycle; if it remains high on the next rising edge of CLK, then the control process will duplicate the token. (The Pipelined Completion design outlined in the previous section satisfies this requirement.)

On the falling edge of the clock, the "so" internal state variable is written to the synchronous handshake output ($S^o$). Once high, $S^o$ will stay high until $S^i$ goes high.

In parallel to this process, the "go" signal is combinationally generated as the conjunction of $S^i$ and $S^o$. On any rising clock edge with $S^o$ and $S^i$ both high, the datapath sees an asserted "go", and a data token passes from one domain to the other.

As shown in the embodiment of FIG. 36, the circuit implementation of the control process includes five components: internal completion logic 3602 responsible for sequencing the enable signal, arbitration logic 3604, $S^i$ input latching circuitry 3606, $S^o$ output control and state logic 3608, and the $A_c$ acknowledge logic 3610.

Figure 37:
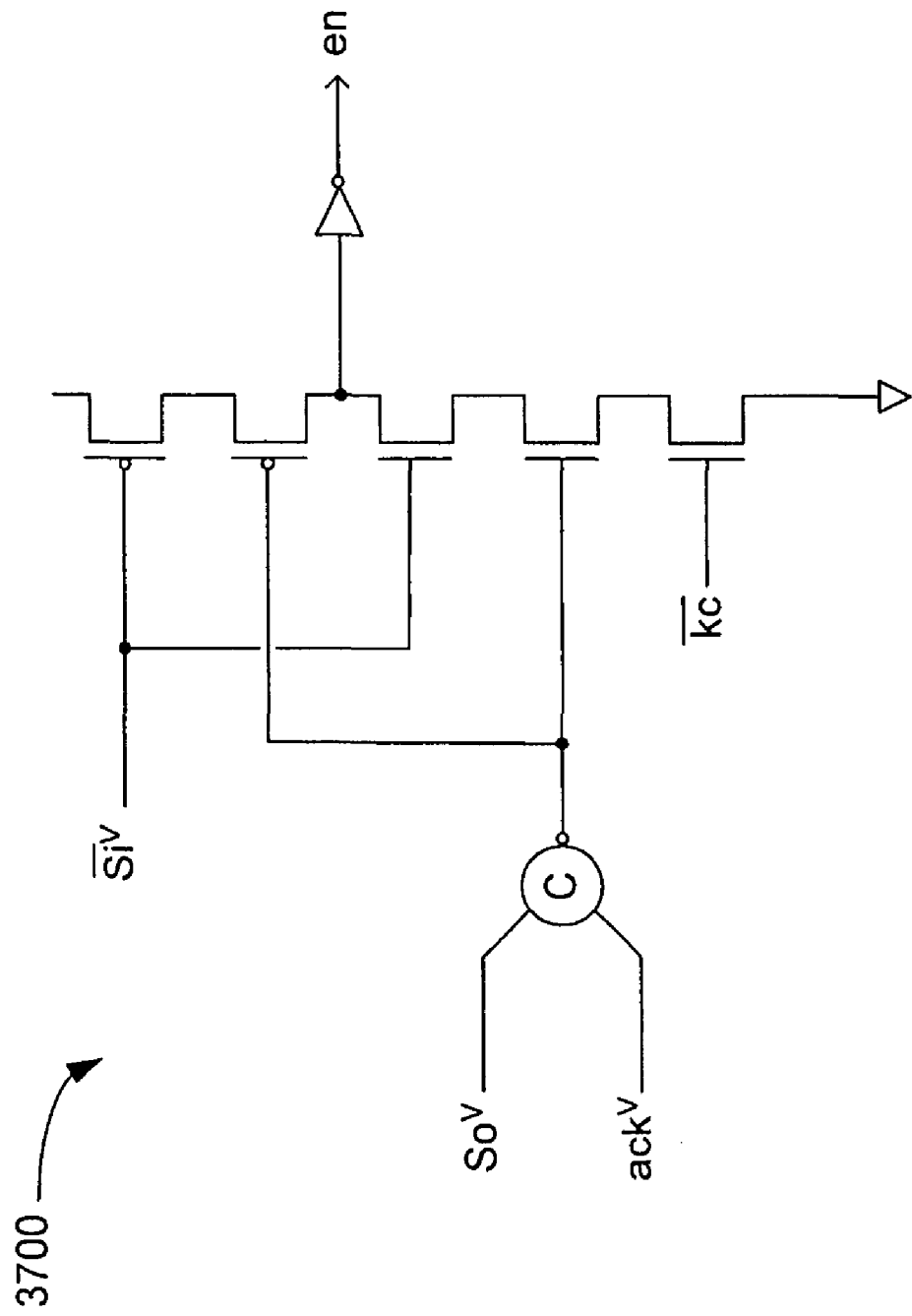

Central to the design of the control process is the internal enable signal ("en"), which triggers the set (en high) and reset (en low) phases of the internal dynamic logic. "en" is not strictly synchronized to CLK. It will cycle once per clock cycle, but "en" is sequenced by the validities if the internal signals, not CLK. A specific circuit implementation of the internal completion logic 3700 is shown in FIG. 37.

Figure 38:
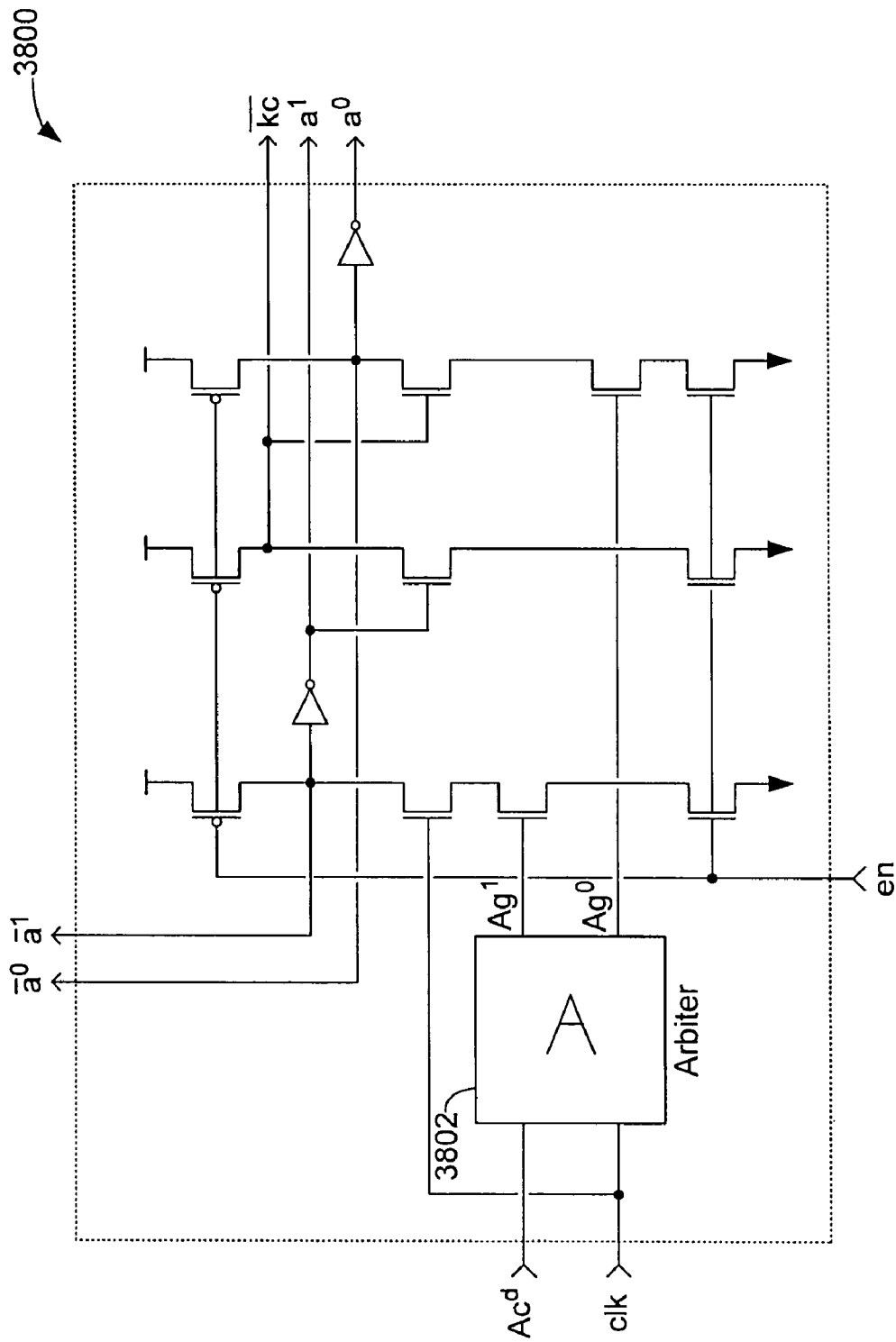

A specific implementation of an arbitration logic circuit 3800 for the control process is given in FIG. 38. Arbiter 3802 shown in this circuit can be any standard mutual exclusion element such as, for example, a Seitz arbiter or a QFR. The "a" variable is implemented as a dual-rail signal pair to allow the use of domino pull-down logic stages elsewhere in the circuit. Doing so facilitates the synchronized-QDI (quasi-delay insensitive) design style used throughout the converters.

For exemplary implementations of Seitz arbiter and QFR circuits, please refer to C. L. Seitz, *System Timing*, chapter 7, pp. 218-262, Reading, Mass., Addison-Wesley, 1980, and F. U. Rosemberger, C. E. Molnar, T. J. Chaney, and T. P. Fang, *Q-modules: Internally clocked delay-insensitive modules*, IEEE Trans. Computers, vol. 37, no.9, pp. 1005-1018, September 1988, respectively. The entire disclosures of each of these references are incorporated herein by reference for all purposes.

The $\overline{kc}$ signal in this logic is used to disable the arbitration logic's clock grant signal ($A_g^0$) once the $A_c^d$ input wins the arbitration ($A_g^1$ asserted). This must be done to protect the rest of the circuit from seeing a glitch on $A_g^0$ in the case that $A_c^e$ transitions negative while CLK and en are still high.

Figure 39:
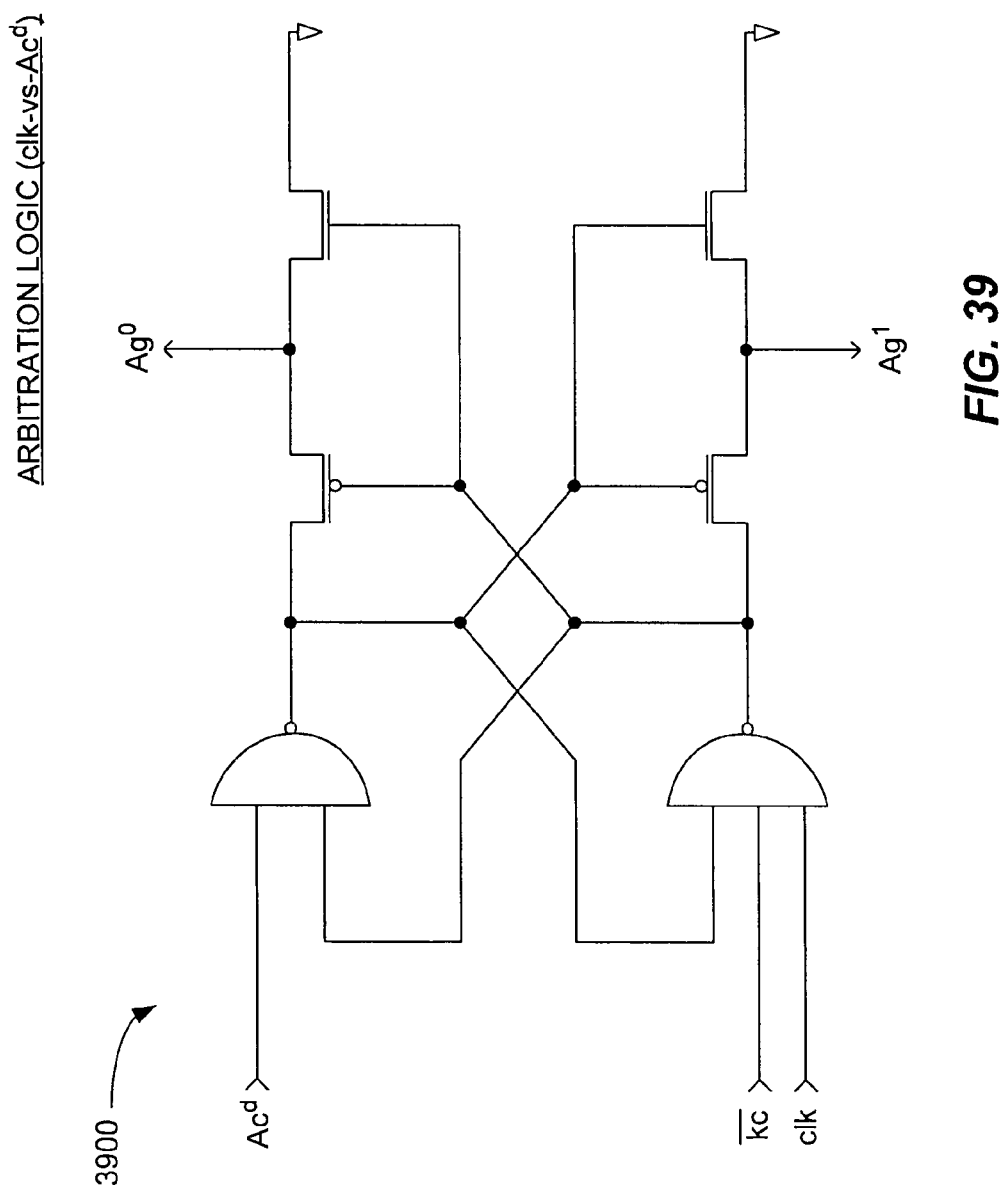

A more specialized arbitration circuit 3900 which incorporates the $\overline{kc}$ function into a variant of the Seitz arbiter is given in FIG. 39. This design removes the need for an extra dynamic logic stage to generate a. However, elsewhere in the CTRL unit logic stages, wherever "$a^1$" might have been used with the more general design, the series combination "$A_g^1$ & CLK" must be included instead (i.e., requiring an extra transistor).

The circuits in FIGS. 38 and 39 limit the metastability hazard to the case that an arbiter output resolves exactly as CLK transitions negative. In the case that $A_g^1$ wins, $A_g^1$ transitioning high as CLK transitions low can cause an unstable voltage on $a^1$ (or whatever logic stage depends on $A_g^1$). In the case that $A_g^0$ wins, $A_g^0$ transitioning high as CLK transitions low can cause $A_g^0$ to return low before it has completely pulled down $a^1$ (or some other logic stage in the more specialized design.) In either case, the metastable condition propagates beyond the arbiter. Note that if the arbiter were to resolve at some time past CLK transitioning low, then the metastable condition does not propagate: if $A_g^1$ wins at some point following CLK transitioning low, the transfer is simply deferred until the next rising clock edge; if $A_g^0$ does not win by CLK transitioning low, $A_g^1$ wins due to the CLK input's withdrawn request.

Thus the failure mode due to metastability is dependent on the time required for the CLK to transition low. Ensuring a fast slew rate for CLK's negative transition will help protect the circuits from this fundamental hazard.

Figure 40:
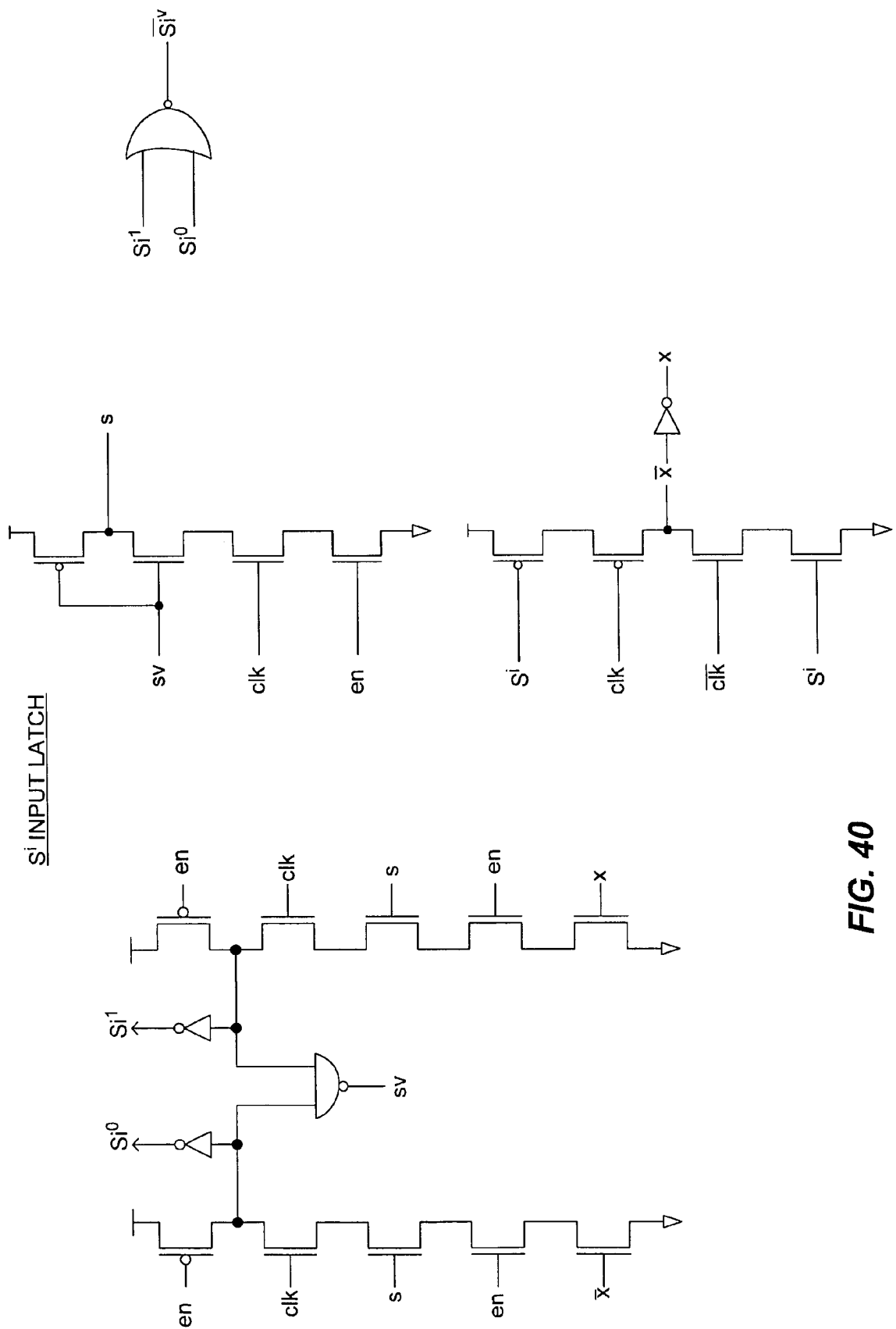

According to a specific embodiment, the $S^i$ input signal is captured using an edge-triggered, self-disabling single-rail to dual-rail circuit 4000 shown in FIG. 40. The en signal is used to set and reset the $s_i^{\{0,1\}}$ input rails and facilitates the use of asynchronous self-sequencing logic throughout the control process. Furthermore, the design relies on this latch's synchronizing relationship to the rising edge of CLK to keep the process from repeatedly cycling in a subtle case of the logic (when the clock period is significantly slower than the $A_c$ cycle time). The protection comes from the circuit's property that, once en transitions low and $s_i$ resets, the $s_i^0$ and $s_i^1$ rails remain low until the next rising edge of CLK.

The $s_i^v$ signal encodes the validity of the $s_i^{\{0,1\}}$ rails. It is used in the internal completion logic to allow safe, delay-insensitive sequencing of en.

Figure 41:
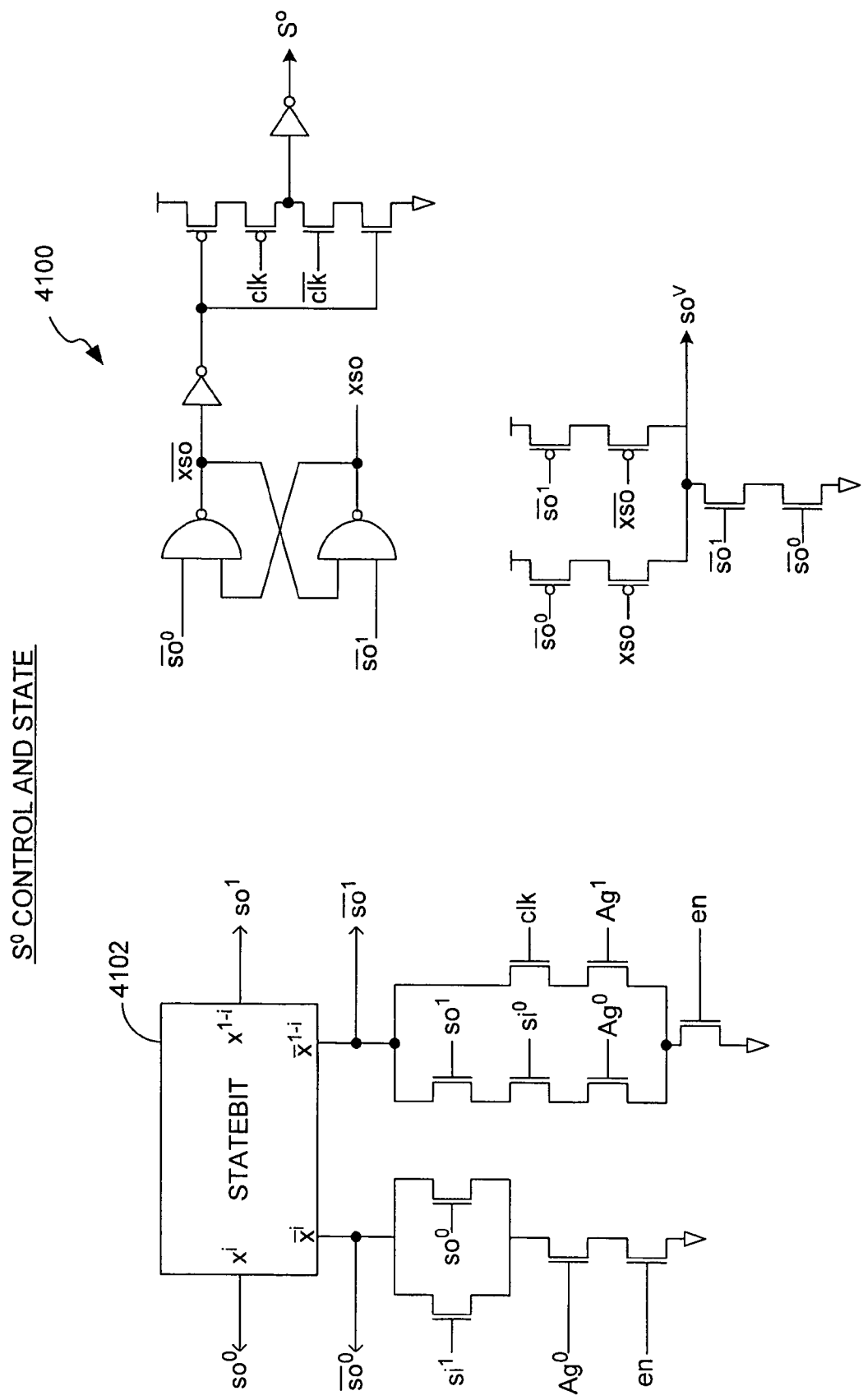
Figure 42:
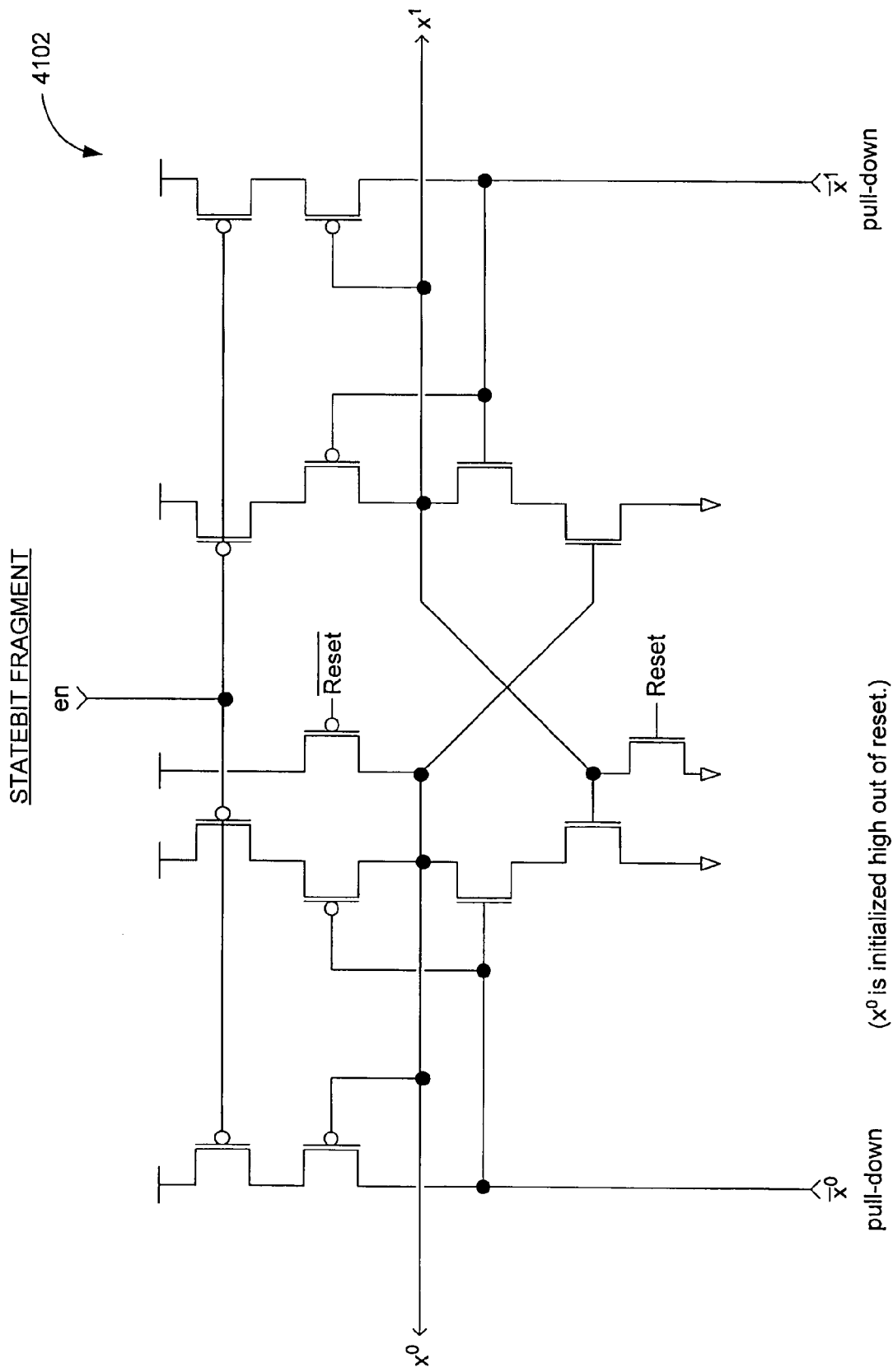

A specific implementation of a $S^o$ synchronous output control circuit 4100 is shown in FIG. 41. Since the control process must know the value of $S^o$ from the prior clock cycle, an asynchronous state element (i.e., STATEBIT circuit 4102) is used. A specific implementation of STATEBIT circuit 4102 is shown in FIG. 42. The STATEBIT circuit provides automatic sequencing of the $s_o^0$ and $s_o^1$ signals over the unit's internal cycle. An alternative design might use an additional input latch of FIG. 40 to resample the state from the synchronous $S^o$ signal, but such a design would require additional circuitry to complete the $s_o$ terms in the sequencing of en.

The cross-coupled NANDs and output latch of FIG. 41 provide a safe synchronization of the asynchronous $\overline{s_o}$ terms, which only pulse low during the en rising edge phase of the control process. The cross-coupled NANDs convert the pulse to a persistent value, and the output latch restricts the $S^o$ output from transitioning while CLK is high. Since only one of $\overline{s_o^0}$ or $\overline{s_o^1}$ can transition low at a time, and can only transition low while CLK is high, $S^o$ is set in an entirely synchronous manner.

Like the $s_i^v$ signal of the $S^i$ input latch, the $s_o^v$ signal encodes the validity of the $s_i$ state logic. Here, by including the xso and $\overline{xso}$ terms in the signal's pull-up logic, the assertion of $s_o^v$ additionally implies that the cross-coupled NANDs have successfully captured the appropriate $\overline{s_o^{\{0,1\}}}$ value.

Figure 43:
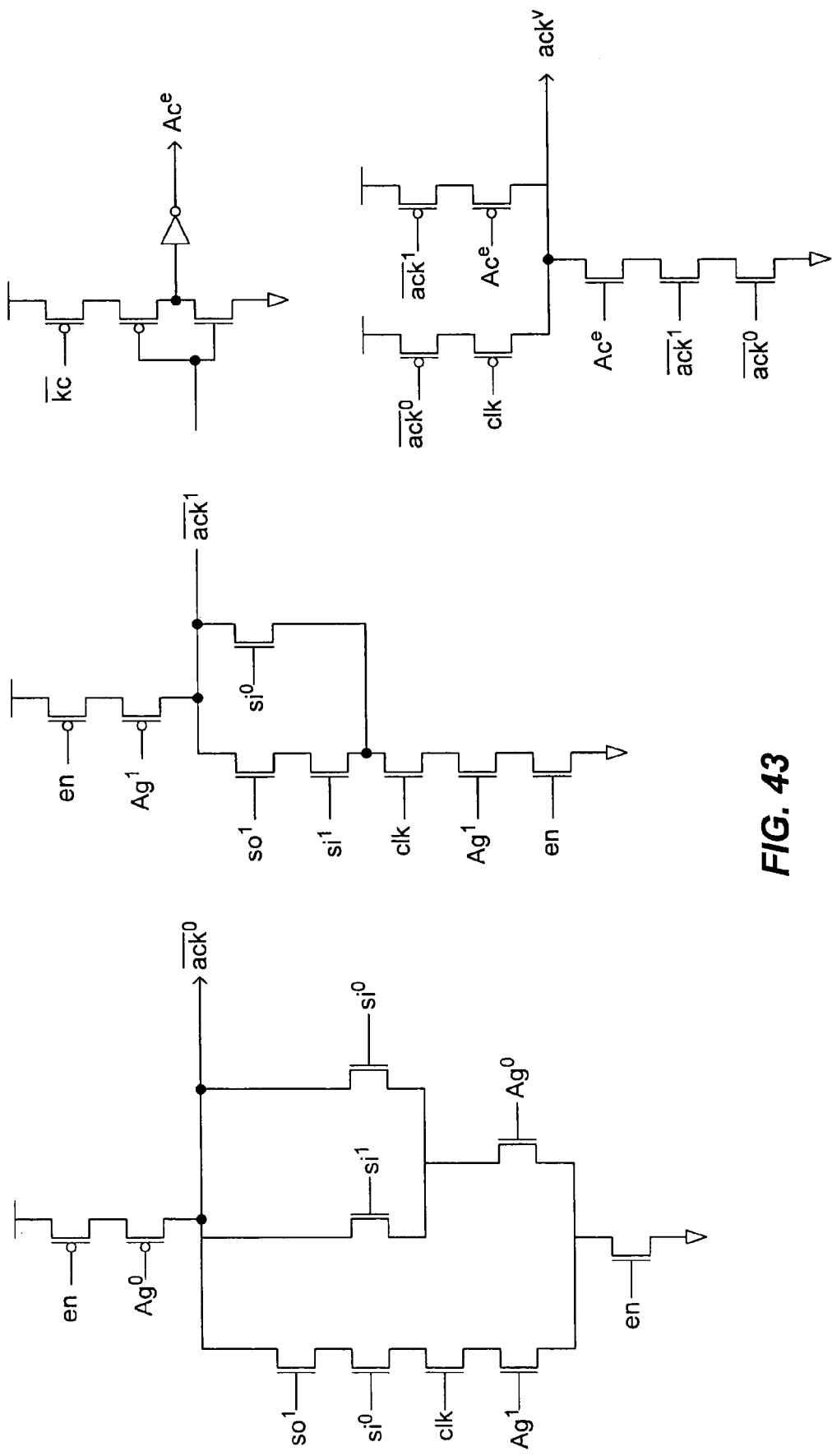

A specific implementation of an $A_c$ Acknowledge logic circuit 4300 is shown in FIG. 43. This circuit is a relatively straightforward dynamic logic stage, encoding the "a & (si!~so)->Ac?" expression of the cell's CSP. When "a" is set (meaning "$A_g^1$ & $\overline{CLK}$") and $s_i^1$ or $s_o^0$ is asserted, the $\overline{ack^1}$ rail is pulled low, causing $A_c^e$ to go low, acknowledging the $A_c$ input token.

The $\overline{kc}$ term is included in the $A_c^e$ sequencing to ensure that it has disabled the arbiter's clock selection by this time (to avoid the potential glitch on $A_g^0$ when $A_c^d$ goes low in response to the falling edge of $A_c^e$).

The $s_o^1$ term is redundantly included in the $\overline{ack^1}$ pull-down to prevent the repeated cycling scenario described above in the $S^i$ input latch section.

The $ack^v$, like the $s_i^v$ and $s_o^v$ signals, encodes the completion state of this block of logic. When $ack^0$ is selected, the $ack^v$ is delayed until the falling edge of CLK by including $\overline{CLK}$ in the pull-up; when $ack^1$ is selected, $ack^v$ additionally completes the $A_c^e$ negative transition. $ack^v$ does not return low until $A_c^{de}$ has been withdrawn (completed by the $A_g^1$ term in the $ack^1$ pull-up) and $A_c^e$ has returned to its asserted state.

According to a specific embodiment, the A2S and S2A datapath transfer units (e.g., DTUs 2908 and 2910 of FIG. 29) are single-channel converter elements which transfer tokens based on the value of their synchronous "go" input at various phases of the clock period. In order to avoid metastability hazards within these circuits, timing assumptions must be made on the asynchronous handshake transitions. For example, when the A2S DTU sees an asserted "go", it must also receive a token on its L input during that clock cycle. Likewise, when the S2A DTU receives an asserted "go", its $R^e$ must be high and ready to transition low once an R data rail is asserted. As discussed above, the high-level architecture of the A2S and S2A converters ensures that these assumptions are satisfied.

According to a specific embodiment, the A2S datapath transfer units have the following CSP specification:

```
*[[CLK]; [go -> L? [ ] else -> skip];
  *[~CLK -> [go -> R := #L? [ ] else -> skip]
  ]]
```

This process transfers the asynchronous L input to the synchronous R output on every cycle that "go" is asserted. The unit makes the assumption that go transitions high sometime following the falling edge of CLK but sufficiently before next rising edge of CLK to satisfy the setup time constraints of the recipient synchronous logic. When CLK transitions high on a cycle when go is asserted, L is acknowledged.

Figure 44:
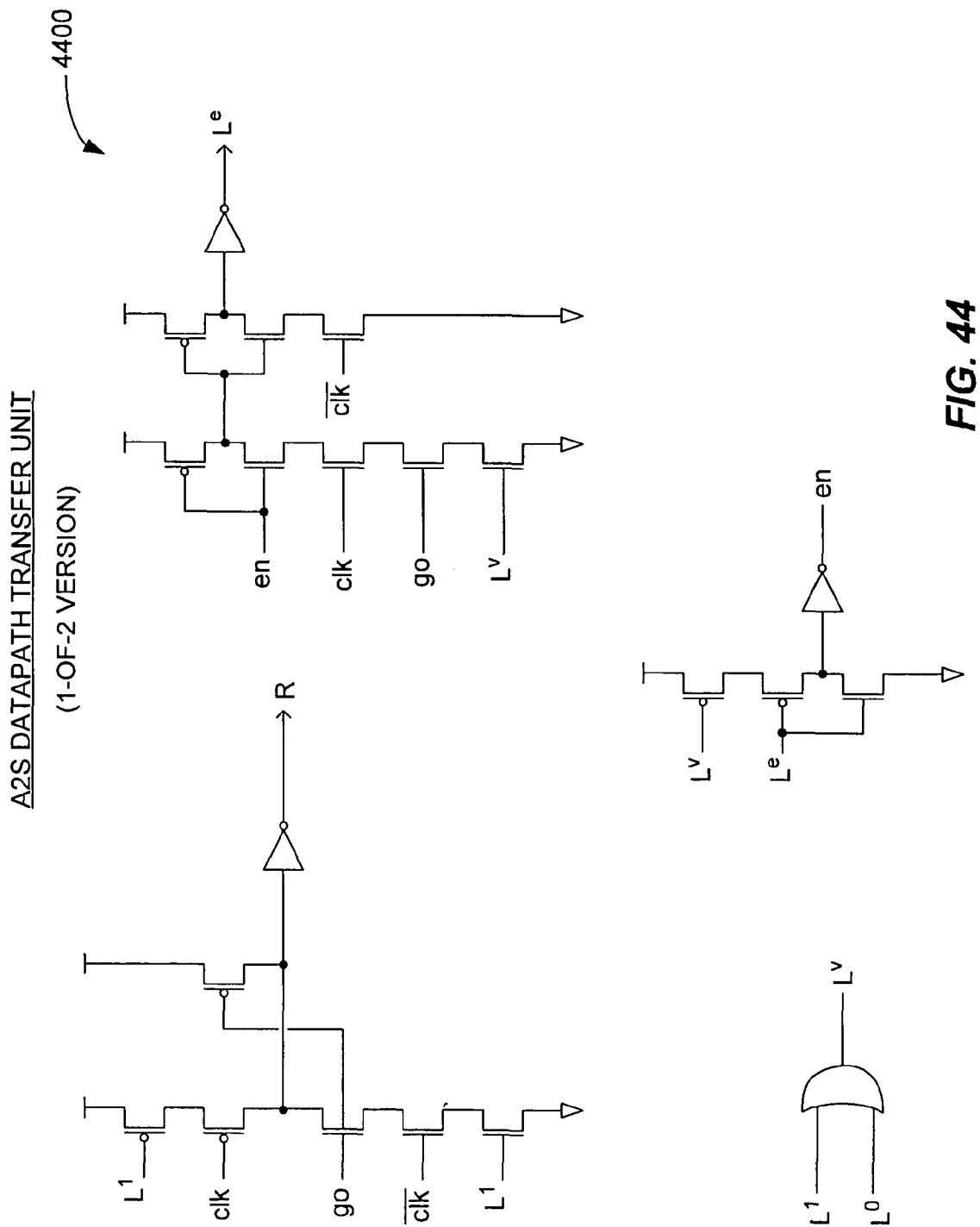

A circuit implementation of an exemplary A2S data transfer unit 4400 for a single 1 of 2 input is shown in FIG. 44. The data bit latch of R is transparent when CLK is low and go is high. When go is low, R is kept low to protect the output from transitioning unpredictably when L arrives.

In order to keep the circuit from repeatedly acknowledging L tokens within a single clock period, the $L^e$ negative transition is conditioned on the rising edge of CLK, and the $L^e$ positive transition is conditioned on the falling edge of CLK.

In order to avoid metastability hazards in this unit, the assumption is made that $L_v$ will transition low soon after the falling edge of $L^e$. That is, L must not ever stall in a valid state. This can be satisfied if the A2S input buffer units follow a PCHB or PCFB template as described in "Synthesis of Asynchronous VLSI Circuits," by A. J. Martin incorporated herein by reference above.

According to a specific embodiment, the CSP specification of the S2A datapath transfer unit is

```
*[[CLK]; [go->R!L[ ] else->skip]; [~CLK]]
```

Figure 45:
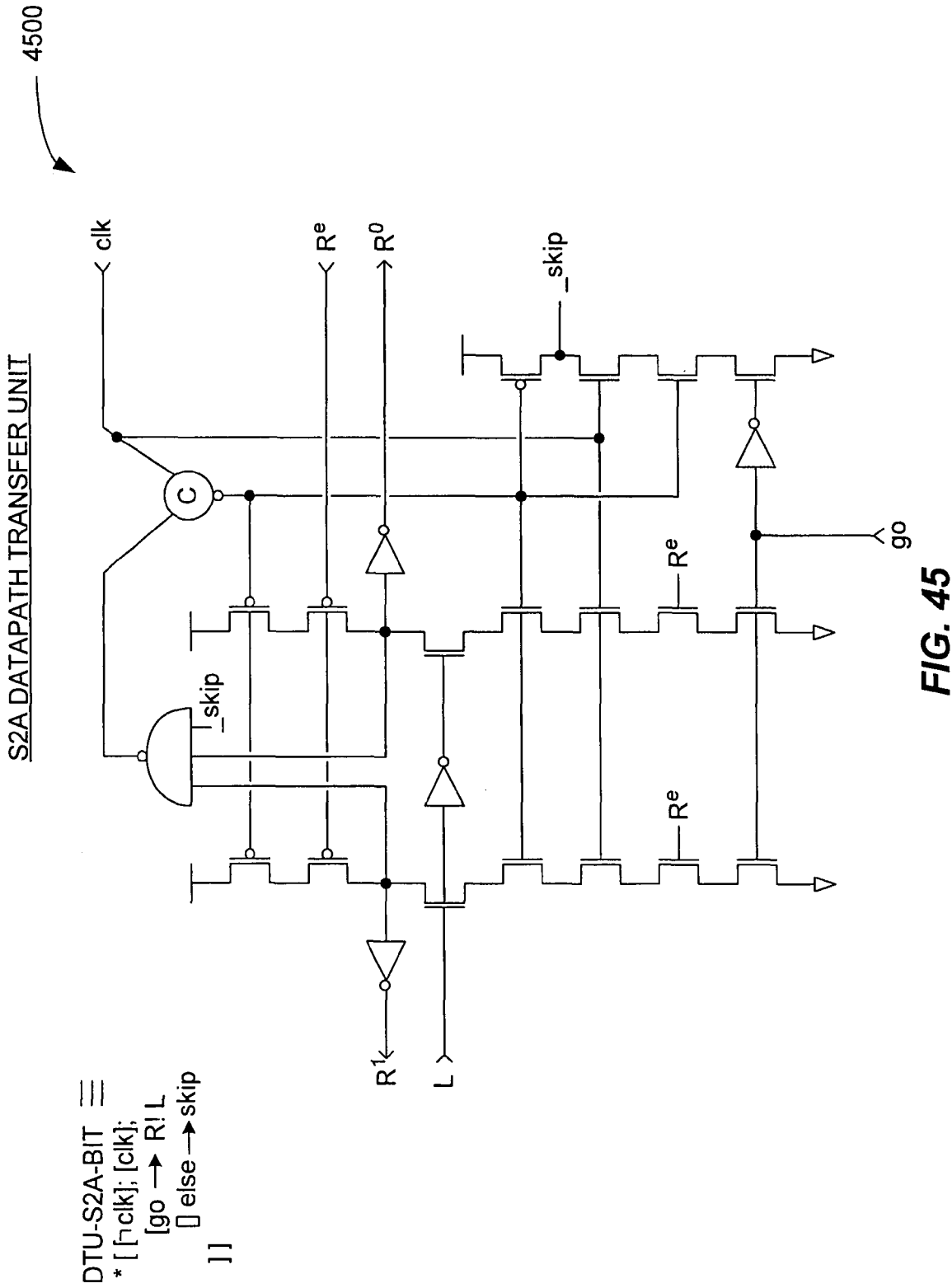

Aside from the handshake with the R output channel, this unit is entirely synchronous in nature; specifically, on each clock cycle, on the rising edge of CLK, it samples its inputs and evaluates some output condition. In this case, it checks if the "go" control signal from the S2A control process is set, and, if so, writes its L bit (or bits) to the R output channel in a 1 ofN rail encoding following the four-phase handshake protocol. FIG. 45 shows an exemplary one-bit circuit implementation of the S2A DTU 4500. This design can easily be extended to support a two-bit input, with a 1 of 4 rail output data encoding.

According to a specific embodiment, the A2S converter requires at least a single stage of buffering on the datapath, following the point that L is copied to the pipelined completion (PC) circuitry. The need for this is primarily due to performance considerations; i.e., in order to allow the PC to operate in a pipelined manner, it must not be bottlenecked by tokens backing up in the datapath branch. Essentially, the datapath is "slack matched" to the control (and completion) path.

Another reason for buffering the asynchronous data at the input of the DTU array is to ensure that the input to the DTU elements have the correct handshake properties. Namely, the A2S DTU described above relies on its input resetting (returning to its neutral state) promptly after the falling edge of $L^e$. This can be guaranteed by having a PCHB or PCFB buffer stage directly preceding the DTU array.

According to a specific embodiment, the S2A converter imposes a much stricter requirement for additional buffering. It needs several buffer stages between its datapath output and its output PC, as well as on the $A_c$ completion channel output of the PC. The $A_c$ channel buffers initializes "filled", i.e. with a number of tokens corresponding to the amount of slack available in the datapath (minus one token with which the S2A control process initializes out of reset.) At least two tokens must be present in the S2A datapath-to-completion loop in order to support a transfer on every clock cycle. One token is consumed by the S2A control process and DTU elements during a transfer. Since the asynchronous portion of the loop has non-zero latency, a second token must always be present in that branch in order to pipeline the transfers.

According to specific embodiments, both the datapath and completion branches have sufficient buffering to absorb the two tokens in the loop. If the datapath buffer capacity is insufficient, the S2A DTU output handshake will stall if the S2A's R output stalls, potentially causing metastability hazards in the datapath or lost tokens. If the completion path buffer capacity is insufficient, data tokens will be trapped in the output buffer when the synchronous side stalls. In this case, the S2A converter will not output a received R token until the next token is received by the converter, which may take an arbitrarily long amount of time.

A final performance-related factor influences the loop token (and therefore buffering) requirements of the S2A converter. When the forward latency through the PC becomes too great, additional tokens must be present in the loop to keep the pipeline at peak capacity.

Figure 46:
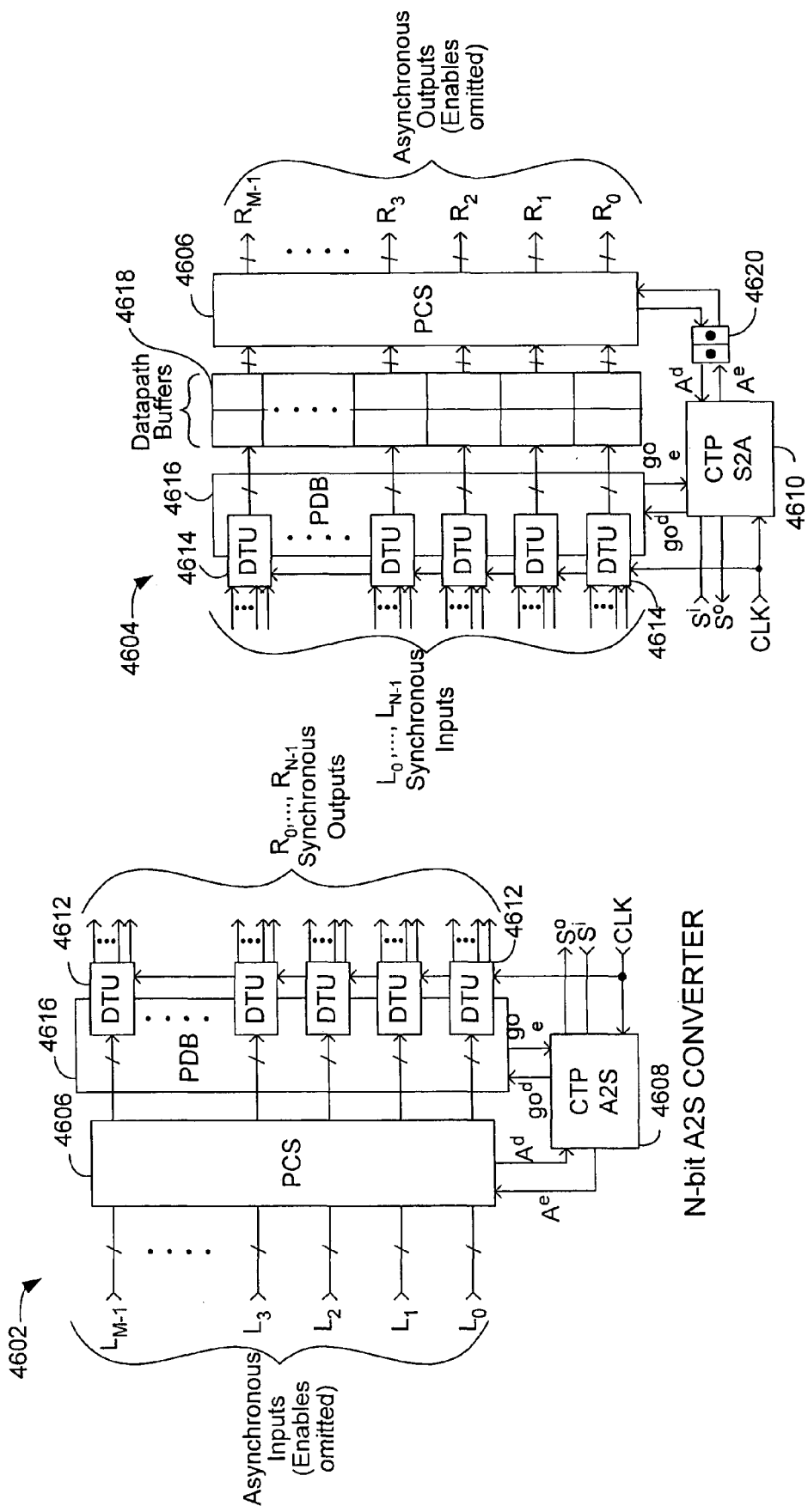

The internal high-level organization of A2S and S2A converters 4602 and 4604 according to an alternate embodiment is shown in FIG. 46. Each interface includes four high-level components:

1. Pipelined Completion Stage (PCS) 4606. This component is identical to the PC unit described earlier, although 4606 is drawn such that it includes the datapath copy circuitry described in PCS0 circuit 3300.

2. Control Processes (CTPs) 4608 and 4610. The CTP is responsible for (1) issuing a "transfer" signal to the datapath when both asynchronous and synchronous sides are ready for the transfer, (2) sequencing the asynchronous and synchronous handshaking signals ($A^d$, $A^e$) and ($S^i$, $S^o$), and (3) synchronizing as necessary to CLK. CTP_A2S 4608 and CTP_S2A 4610 share many circuit elements and have the same port interface, but are not identical. Details of each design, highlighting common functionality, are given below.

3. Datapath Transfer Units (DTU) 4612 and 4614. Generally, the DTU unit is responsible for transferring a data token across the synchronous/asynchronous boundary once a "transfer" (go) token is received from the CTP. In the DTU_A2S case, the unit latches an asynchronous 1 ofN data token to the synchronous side at a time acceptable to the synchronous clocking discipline (specifically some time after the falling edge of CLK and before the next rising edge). In the DTU_S2A case, the unit samples the synchronous input on the rising edge of CLK and converts the value to an asynchronous one-hot token once the asynchronous channel is ready (enable asserted).

Figure 47:
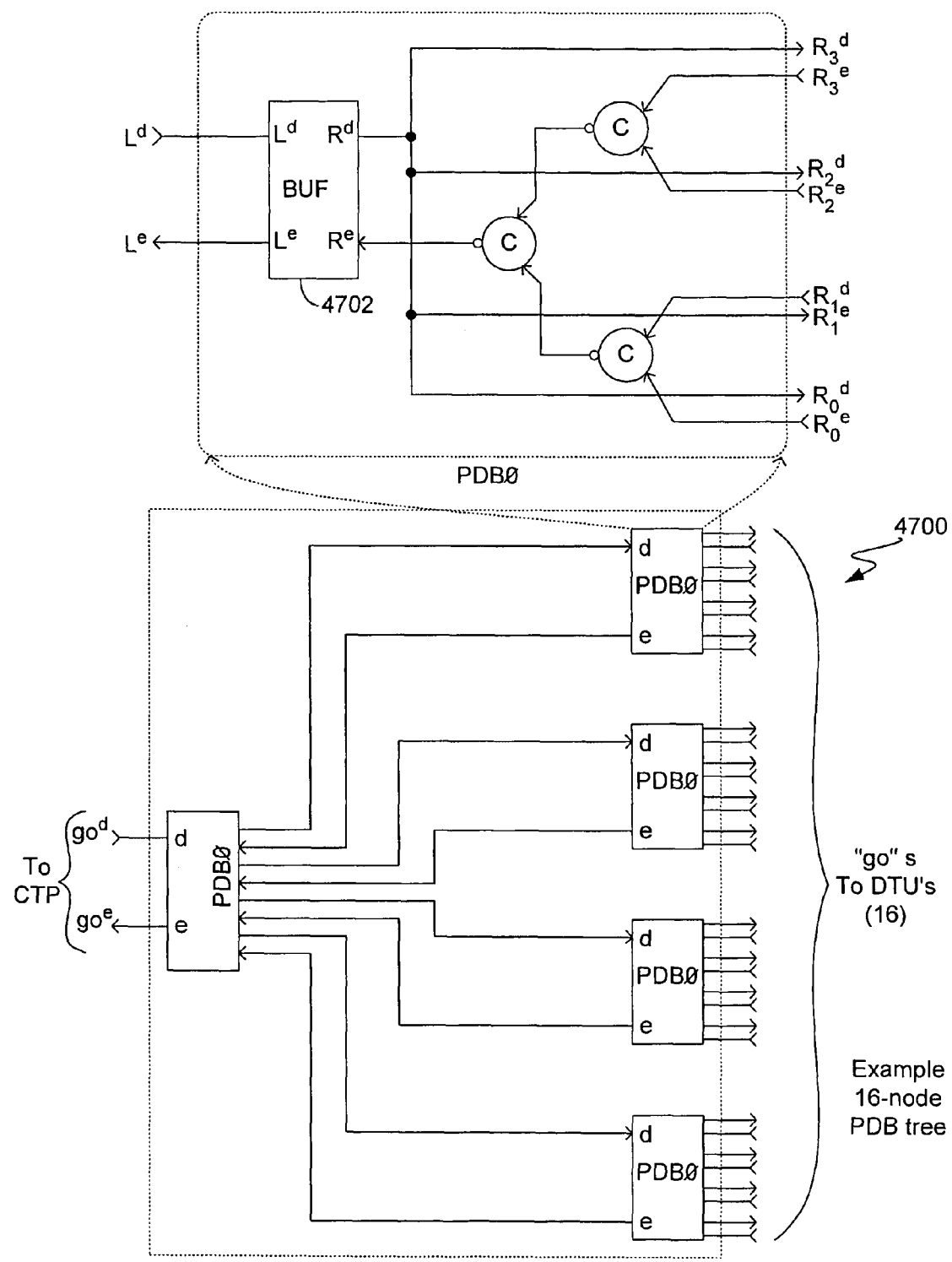

4. Pipelined Datapath Broadcast (PDB). An exemplary implementation of a PDB 4700 is shown in FIG. 47. This unit implements the complementary function of the PCS. That is, it distributes a single "transfer data" ($go^d$) signal to each DTU in the datapath. In this case, the N backward-going enable signals feed into a log(N)-deep C-element tree to generate the final $go^e$ signal. Pipelining the completion adds some forward latency the $go^d$ broadcast, but allows the handshake cycle time to stay low.

According to one embodiment, S2A converter 4604 additionally requires extra asynchronous buffering stages 4618 between its datapath output and its output PCS, and on the "A" channel output of the PCS (i.e., buffer 4620). These provide a guarantee that any transfer initiated by an "A" token can be absorbed in the datapath if the environment is not prepared to read.

Exemplary implementation details of converters 4602 and 4604 according to specific embodiments are given below. Some elements of the designs have been omitted for clarity. These include staticizers on the output nodes of all dynamic logic, and extra reset circuitry which any practical implementation would require. Both of these additions are straightforward to implement. Other circuit details (particularly of the control processes) are not covered since there are many different solutions, and all are fairly straightforward applications of the design style described herein.

An exemplary CSP specification of A2S control process 4608 is the following:

```
*[[ #A & CLK -> a := 1 | ~#A & CLK -> a := 0],
  [CLK -> si := S.i];
  [ a | ~a & ~si & x -> x':= 1 [ ] else -> x':= 0 ],
  [ a & (si | ~x) -> go!, A?  [ ] else -> skip ];
  x := x',
  [~CLK -> S.o := x']]
```

On each rising clock edge, the process probes the input asynchronous channel A and sets the internal variable "a" high if the channel is ready to be read. The process also latches its synchronous input ($S^i$, which indicates if the synchronous side is ready to receive data on that clock cycle). If A has valid data, or if the synchronous side is not ready to receive data and the synchronous datapath output holds an unread value ("x" high), then "x'" is set high. The "x'" variable sets the state of the synchronous datapath output channel ("x") on the next clock cycle. If the asynchronous channel A contains valid data (indicating the presence of an input data token to the datapath), and if either the synchronous side is ready to receive data or if the synchronous datapath output channel is empty ("x" low), then A is read and a "transfer" token ($go^d$) is sent to the datapath.

On the falling edge of the clock, the "x'" variable is written to the synchronous handshake output ($S^o$). This signal encodes the state of the datapath output to the synchronous logic: if it is high, a new data value is sitting on the wires. Once high, $S^o$ will stay high until $S^i$ goes high. On any rising clock edge with $S^o$ and $S^i$ both high, a data token passes from A2S to the synchronous-side logic.

According to a specific embodiment, S2A control process 4610 is somewhat simpler since it does not need to store the state of the synchronous datapath channel:

```
*[[ #A & CLK -> a := 1 | ~#A & CLK -> a := 0],
  [CLK -> si := S.i];
  [ a & si -> A? [ ] else -> skip ],
  [ x & si -> go! [ ] else -> skip ];
  x := a,
  [~CLK -> S.o := a]]
```

In this case, $S^i$ is a synchronous request to transfer a data token; $S^o$ grants the transfer, indicating to the synchronous side that the output (R) asynchronous channel is empty.

Figure 48:
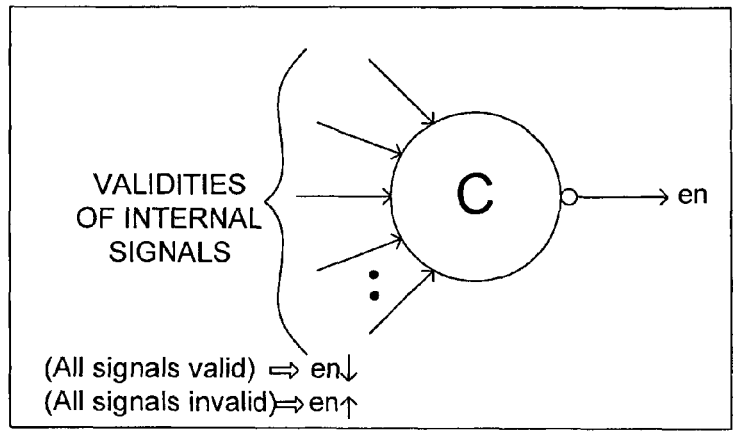

Implicit in the design of these control processes is the internal enable signal ("en"), which triggers the set (en high) and reset (en low) phases of the internal dynamic logic. "en" is not strictly synchronized to CLK. It will cycle once per clock cycle (except in the case that a cycle is missed due to a maximum arbiter resolve time), but "en" is sequenced by the validities if the internal signals, not CLK (as illustrated in FIG. 48).

Figure 49:
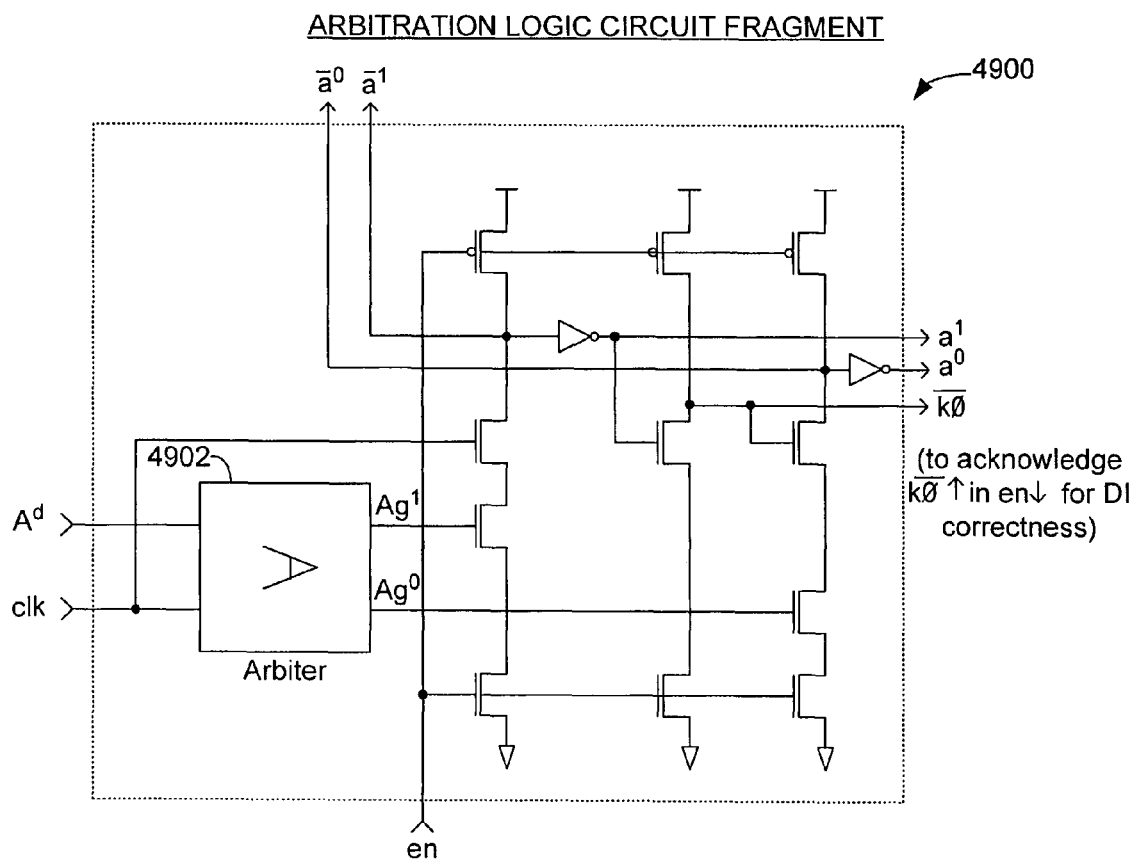

Several structural similarities between the two control processes described above are evident from their CSP descriptions. From the first line of each loop, an arbitrated select, it's clear that the same arbitration logic is used in both. A particular implementation of such arbitration logic 4900 is shown in FIG. 49. According to various embodiments, arbiter 4902 shown in this circuit can be any standard mutual exclusion element such as, for example, a Seitz arbiter or a QFR. The "a" variable is implemented as a dual-rail signal pair to allow the use of domino pull-down logic stages elsewhere in the circuit. Doing so facilitates the synchronized, quasi-delay-insensitive design style used throughout the converters.

The circuit in FIG. 49 limits the metastability hazard to the case that an arbiter output resolves exactly as CLK goes low. In the case that $A_g^1$ wins, the rising edge of $A_g^1$ as CLK goes low can cause an intermediate on $a^1$. In the case that $A^{g0}$ wins, the rising edge of $A_g^0$ as CLK goes low can cause $A_g^0$ to return low before it has completely pulled down $a^\circ$. In either case, the metastable condition propagates beyond the arbiter. Note that if the arbiter were to resolve at some time past CLK going low, then the metastable condition does not propagate: if $A_g^1$ wins at some point following the falling edge of CLK, the transfer is simply deferred until the next rising clock edge; if $A_g^0$ does not win by the falling edge of CLK, $A_g^1$ wins.

According to a specific embodiment, both control processes also share an internal state variable, "x". The A2S circuit sets this state based on an intermediate variable "x'", a logical expression of its inputs; the S2A circuit sets it directly from the arbiter component output z "a" (in this case, x':=$\bar{a}$).

Figure 50:
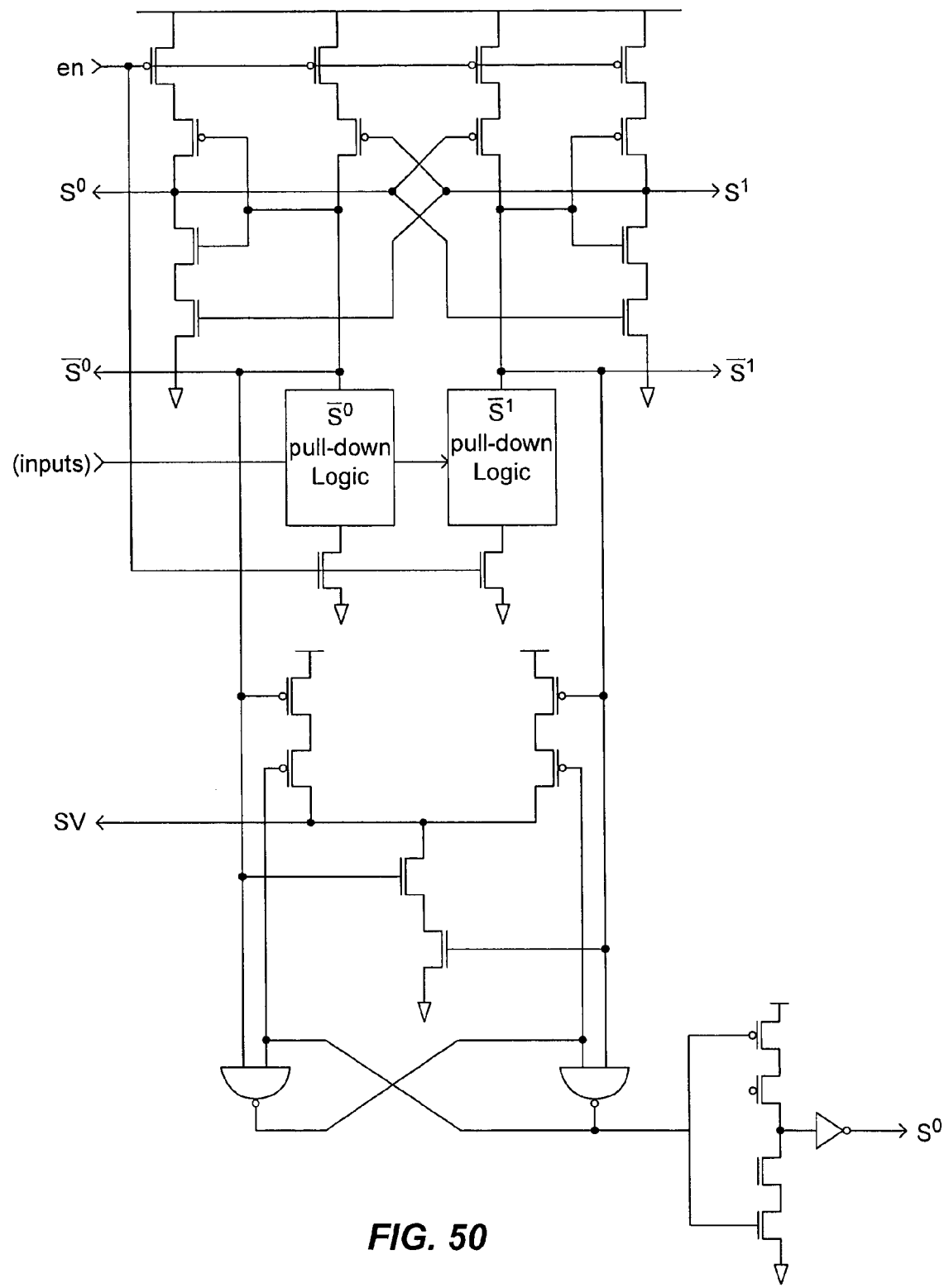

According to a specific embodiment, both control processes use the same state variable to set their synchronous output signal, $S^o$. FIG. 50 illustrates an exemplary combined statebit-to-synchronous-latch circuit. The "xv" signal shown in the diagram encodes the validity of the "x" variable (plus the following RS latch), needed for subsequent completion (i.e., "en" control). This combination of a dynamic pull-down stage ($\bar{x}$) followed by an RS flip-flop, followed by a clocked latch, plus the associated $\overline{xv}$ validity circuit, provides a convenient asynchronous-to-synchronous circuit fragment when the timing of $\bar{x}$ is sufficiently restricted to ensure stability of the output clocked latch. Specifically, $\bar{x}$ cannot go valid too close to the falling edge of CLK. This condition is satisfied in the CTP.

Figure 51:
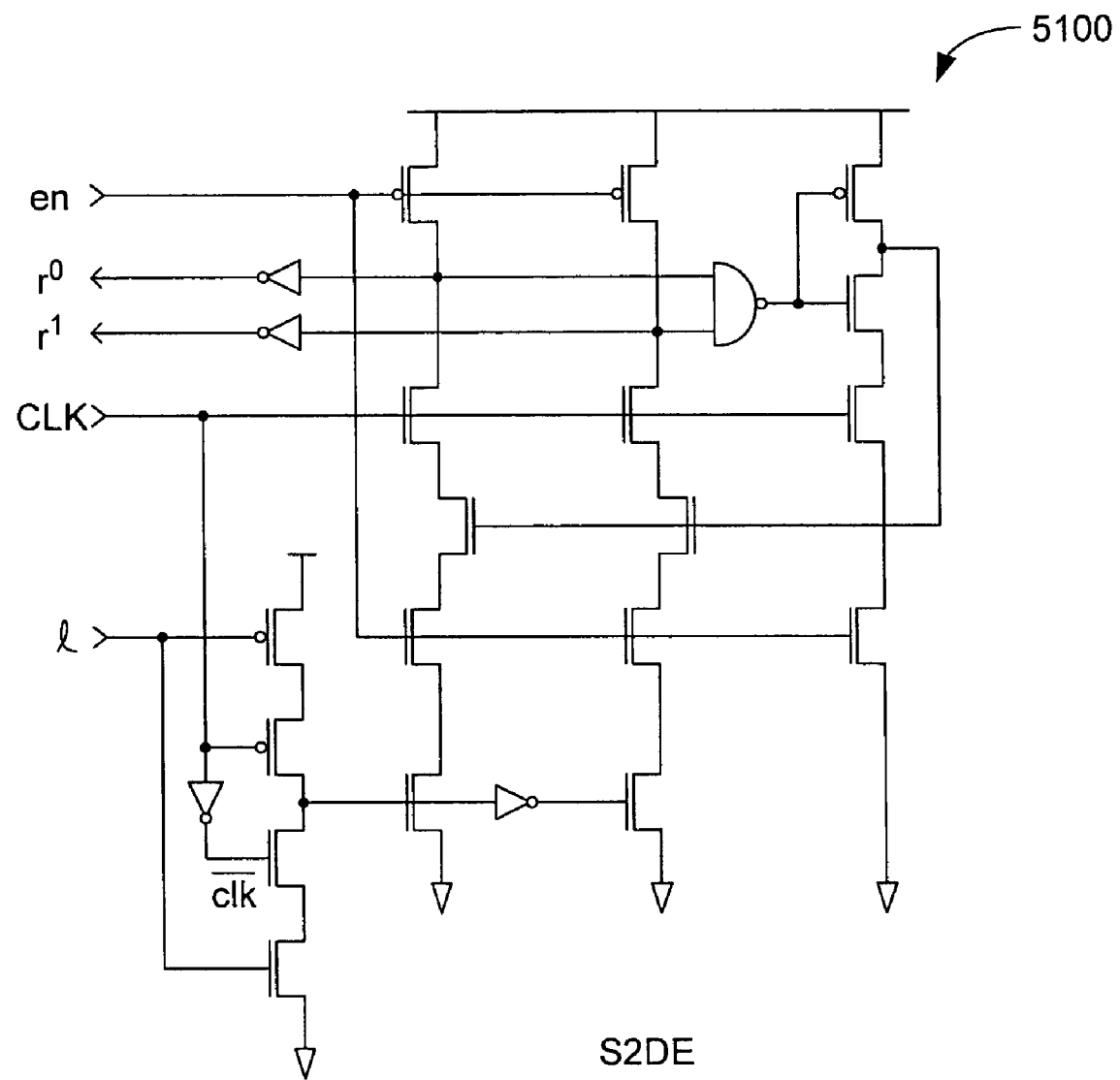

A final shared component of the designs according to a particular embodiments is the handling of the control processes' synchronous input $S^i$. To minimize the hold time requirement on the signal, the edge-triggered, self-disabling single-rail to dual-rail (S2DE) latch 5100 shown in FIG. 51 may be used. The S2DE latch provides a sufficiently safe synchronous-to-asynchronous conversion when it is possible to ensure that the rising edge of en will never coincide with the falling edge of CLK, which could cause a metastable condition on $s_r^{\{0,1\}}$. This requirement establishes the following timing constraint on the rising edge of en: given the latest time into a clock cycle that "a" may be set (the event which triggers all other sequencing in the processes), the rising edge of en must occur before the following cycle's CLK negative transition. The case of en going low then high before the falling edge of CLK of the transfer cycle must also be prohibited, but this can easily be ensured by conditioning the falling edge of en on the falling edge of CLK. The latest "a" may be set is at the falling edge of CLK (maximum arbiter resolution case), so the CTP has a maximum of one clock cycle to complete the en cycle.

Figure 52:
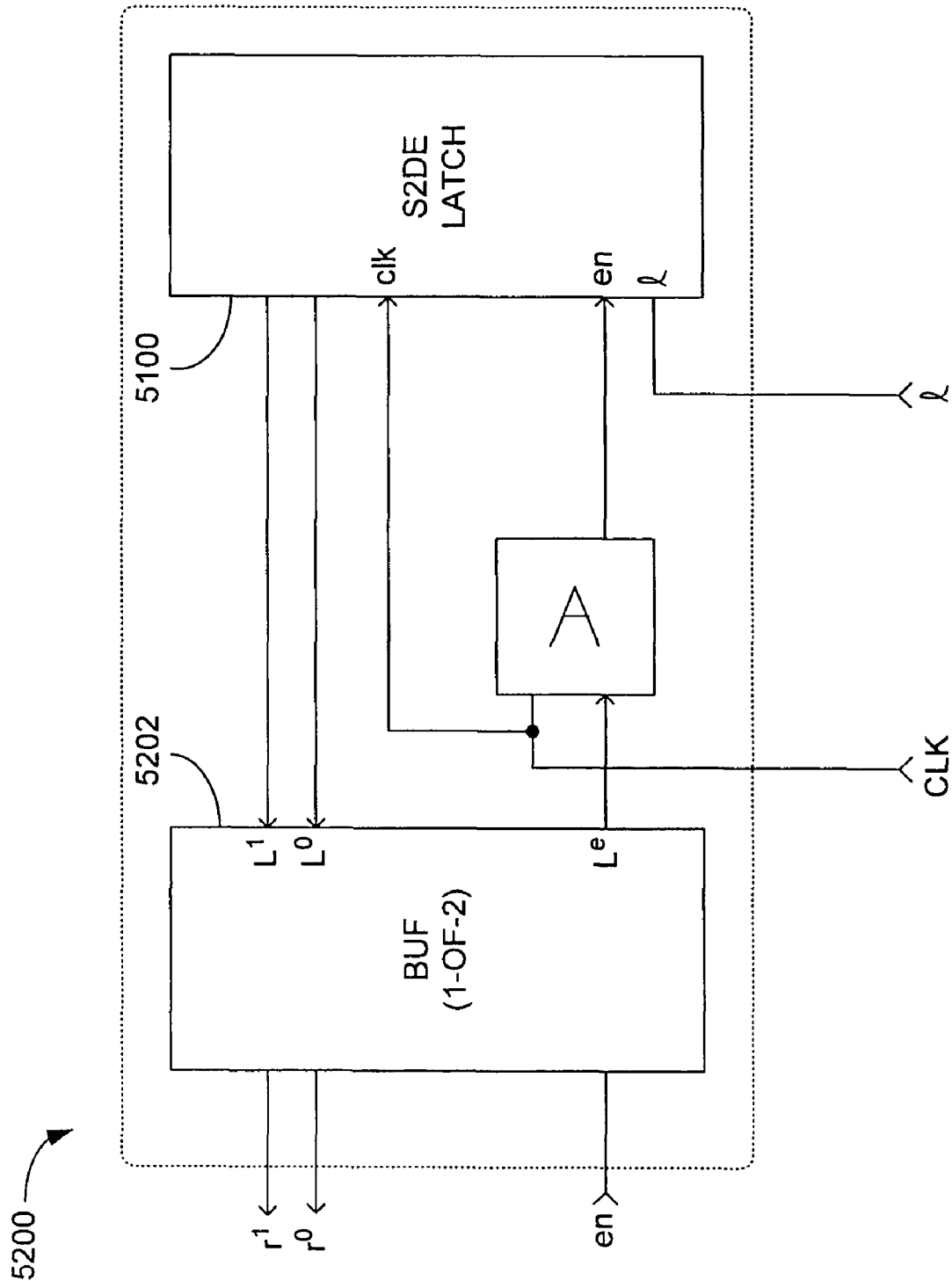

A more robust latch design (e.g., latch 5200 of FIG. 52) can be used to eliminate any potential metastability on $s_i^{\{0,1\}}$ at the expense of extra transitions on its handshake cycle and an additional arbiter. These extra transitions can be hidden by inserting a buffer stage 5202 (slack ½) between the central control process and the S2DE latch 5100.

The remaining details of these particular implementations of CTP_A2S 4608 and CTP_S2A 4610 can be implemented in a variety of ways according to various embodiments following the general production rule synthesis techniques of the quasi-delay-insensitive design style described in "Synthesis of Asynchronous VLSI Circuits," by A. J. Martin incorporated herein by reference above. This flexibility arises from different reshuffling possibilities of the A? and go! handshaking expansions, and from different transition completion strategies. Finally, internal timing races may be introduced to simplify and/or speed up the circuits.

According to a specific embodiment, the A2S datapath transfer units 4612 have the following CSP specification:

*[L?1, go?; [~CLK]; R:=1]

L is the asynchronous input channel from the PCS, "go" is the channel from the CTP indicating that a transfer should occur. The DTU_A2S reads from the L and go channels, waits for CLK to be low (note it may already be low), and then outputs the data value to the synchronous R output. As long as the forward latency of go$^d$ through the PDB is minimal, and assuming the PCS is properly slack-matched (as it is in the implementation discussed above), the behavior of the CTP_A2S guarantees that the L and go channels will both go valid during some bounded range surrounding the falling edge of CLK. The upper end of this range, accounting for the additional R:=1 latency of the DTU_A2S and the setup time on the R output signal, imposes an important lower bound on tau.

Figure 53:
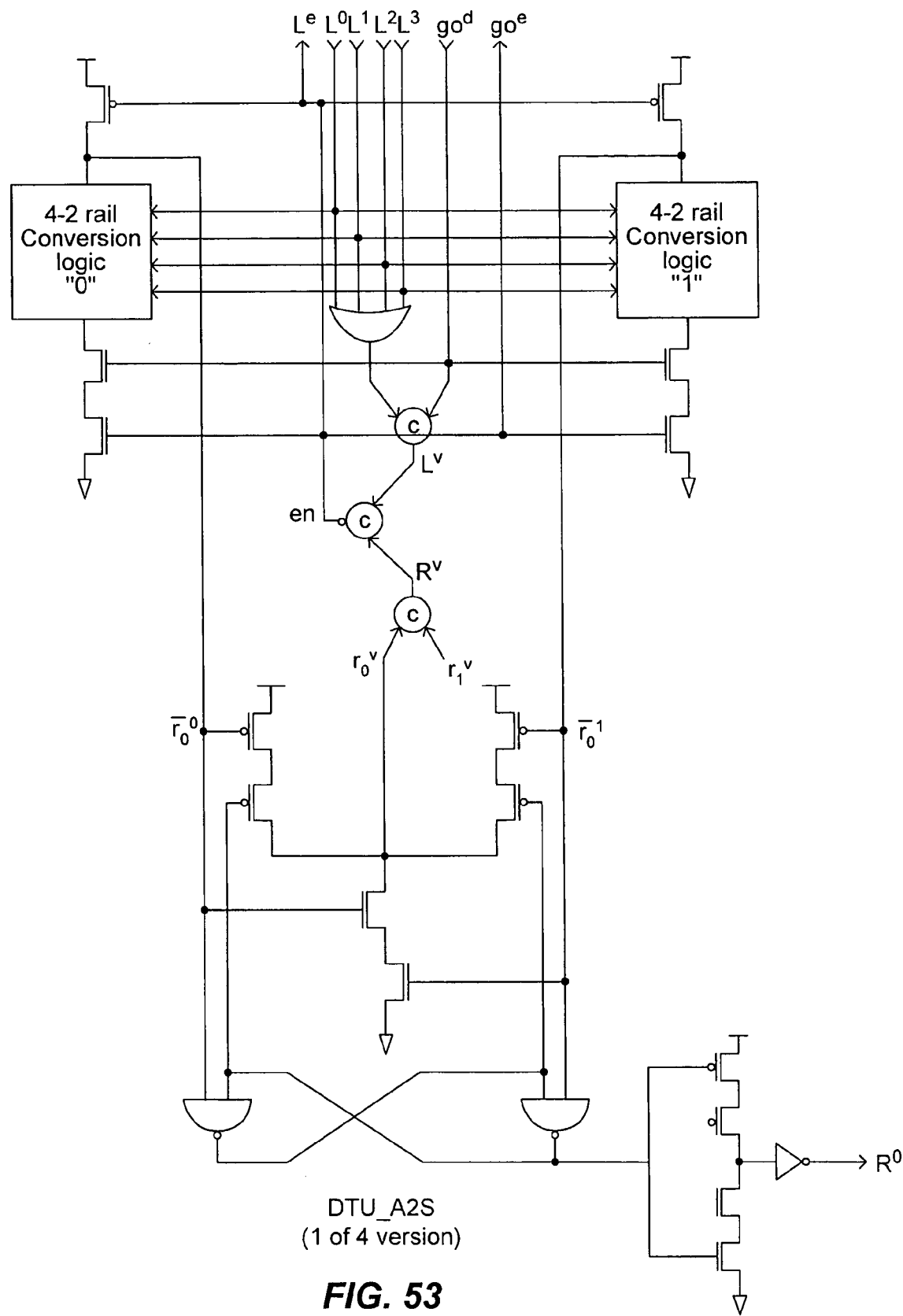

A specific circuit structure which implements the above CSP specification is given in FIG. 53. The $\bar{x}$-to-R latch and $\overline{xv}$ circuitry is identical to that used for the $S^o$ signal in the CTP circuits. The timing constraint on $\bar{x}$ (that it not go valid too close to the falling edge of CLK) is satisfied here.

The CSP specification of a particular implementation of S2A datapath transfer unit 4614 is given by:

*[[~CLK];[CLK]; x:=L]‖*[go?; R!x]

This implementation includes two parallel processes: one which captures the synchronous input L on every rising clock edge (and converts the single-rail data format into a 1ofN rail format), and another which writes the value to the asynchronous output channel (R) once a "go" transfer token is received. In the case that N is 4, the first process can be implemented using the S2Q sampler circuit 5400 shown in FIG. 54. S2Q circuit 5400 captures the values of its two synchronous inputs on every rising edge of CLK, and outputs their combined value on a 1 of4 channel, x. x transitions through its all-low state immediately following the rising edge of CLK before asserting the selected data rail. Similar circuits for N other than 4 can be implemented by changing the input combinational logic.

Figure 55:
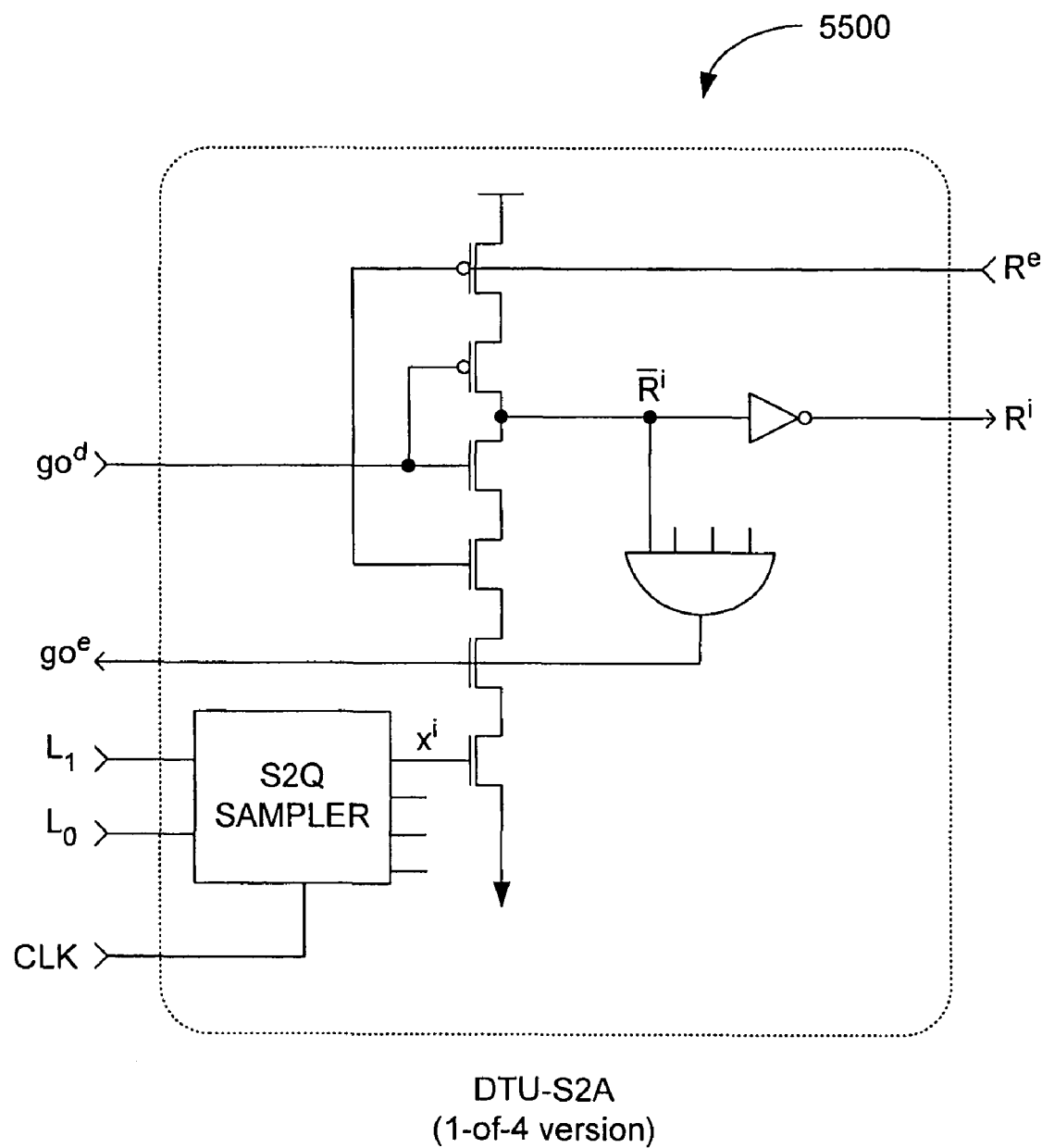

The second process in this DTU_S2A implementation is the circuit 5500 shown in FIG. 55. It is a WCHB stage (see "Synthesis of Asynchronous VLSI Circuits," by A. J. Martin incorporated herein by reference above) modified to accommodate its unstable x input. It treats x as an unacknowledged input, and writes its output R once go and x are valid. The inclusion of $R_1^e$ in the pull-down logic (a departure from the WCHB template) provides some protection if $R^e$ and $R_1^e$ do not transition low before the next validity phase of x (i.e., some time after the next rising edge of CLK), which might otherwise result in the assertion of multiple R rails. Doing so imposes less rigid synchronization of the transfer cycle to CLK.

The $x^i$ rails can be excluded from the $\overline{R^i}$ pull-up networks (another departure from the WCHB template) since the design guarantees that the $R_1^d$ low-to-high transition occurs during a range of the clock cycle surrounding the falling edge of CLK, excluding the rising edge of CLK. As long as the minimum time between the rising edge of CLK and the rising edge of $R_1^d$ is longer than the maximum x reset time (a timing assumption of the design), the unacknowledged x input poses no threat of destabilizing R.

A specific implementation of the pipelining of the "go" channel broadcast to the datapath is illustrated in FIG. 47. According to a specific embodiment, BUF element 4702 is a 1 of1 channel PCHB buffer. For a 16-node broadcast tree, four transitions are added to the rising edge of $go^d$ broadcast. In return, the CTP $go^d$ positive transition is acknowledged in three transitions instead of a minimum of seven, and the rising edge of $go^e$ can follow the falling edge of $go^d$ in a single transition compared to a minimum of seven. Thus the pipelining saves 10 transitions to what would otherwise be the critical cycle of the design.

As mentioned above and according to various embodiments, S2A converter 4604 of FIG. 46 requires extra asynchronous buffering stages 4618 between its datapath output and its output PCS, and on the "A" channel output of the PCS (buffer 4620). According to one such embodiment, the "A" channel buffers must initialize "filled", i.e., with a number of tokens corresponding to the amount of slack available in the datapath. This slack is defined by the number of data tokens a DTU plus its output buffers plus the PCS can hold before the $go^e$ signal would stall, i.e., not transition high following the falling edge of $go^d$.

According to a more specific embodiment, at least one unit of slack (two half-buffer stages) is needed between the DTUs and the PCS to ensure that the PCS can never issue an "A" token when its subsequent transfer at the datapath might stall. Specifically, validity on the DTU output channels should not by itself result in an "A" token to be generated, since the $R^e$'s of the DTUs (implied directly by the environment) may stall high. If a DTU's $R^e$ stalls high, its $go^e$ into the PDB stalls low. In this case, the CTP's $go^d$ transaction will not complete within a clock cycle, which the CTP_S2A specification above assumes.

According to various embodiments, when the outer-loop forward latency (i.e., rising edge of CLK to rising edge of $A^d$) becomes too great (inevitable with large word sizes), an additional unit of slack can be added to the DTU R channels and the A channel (with another initialization token). Doing so amortizes the outer loop latency over two clock cycles. The benefit of additional slack on these channels diminishes as the backward "hole" propagation latency becomes the critical cycle, incurred when the environment drains the outermost token in a full (previously stalled) state.

According to various embodiments, the A2S and S2A converter architectures described above can be adapted to handle burst-mode transfers. It will be understood that, although one specific category of protocols is used herein to illustrate a specific implementation, various embodiments of the invention support a wide variety of burst transfer protocols. The following definitions are useful for understanding the described burst mode implementations.

Burst Transfer: A conversion (either A2S or S2A) allowing more than one data token transfer per request/grant control handshake. For example, in implementations described above, one data token is transferred per clock cycle with both $S^i$ and $S^o$ high. By contrast, a burst transfer might transfer two, four, or any number of data tokens per clock cycle with both $S^i$ and $S^o$ high. According to a particular implementation, a maximum burst size is imposed, a constant referred to below as MAX_LEN.

Figure 56:
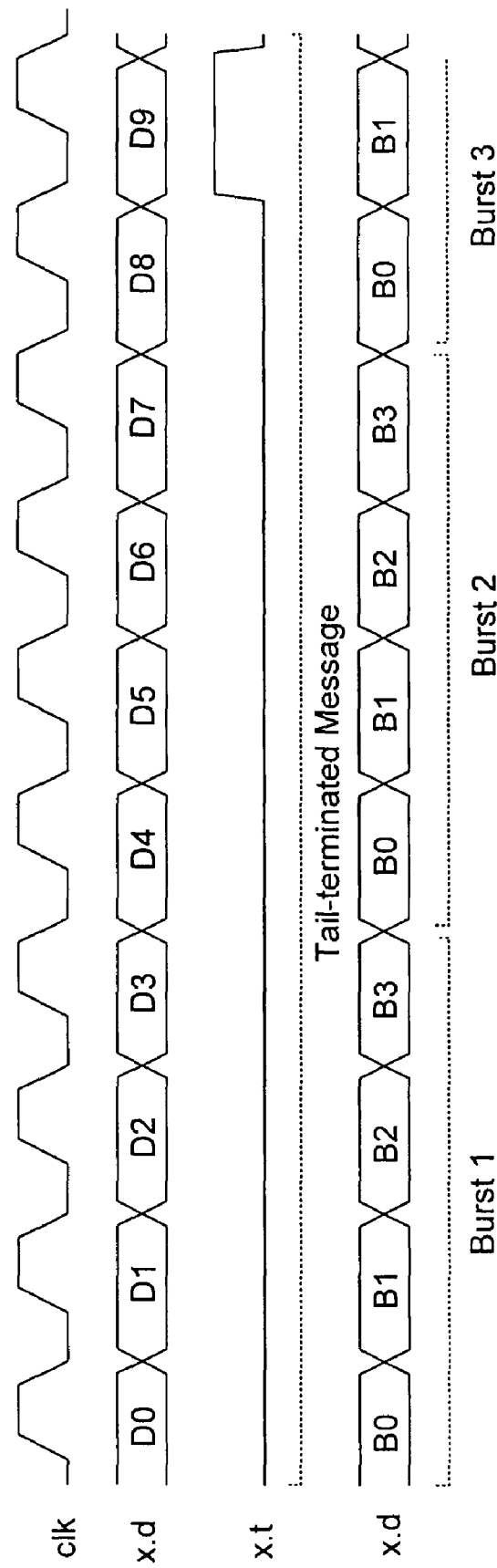

Message: A sequence of data tokens. According to a specific embodiment, each data token has an associated tail bit which is zero on every data phase except the last token in the sequence. In a particular implementation described below, a message may be of arbitrary length, and the converters segment the message into bursts of lengths up to MAX_LEN. FIG. 56 is a timing diagram which serves to illustrate such an implementation in which a message comprising data tokens D0-D9 is segmented into 3 bursts.

Figure 57:
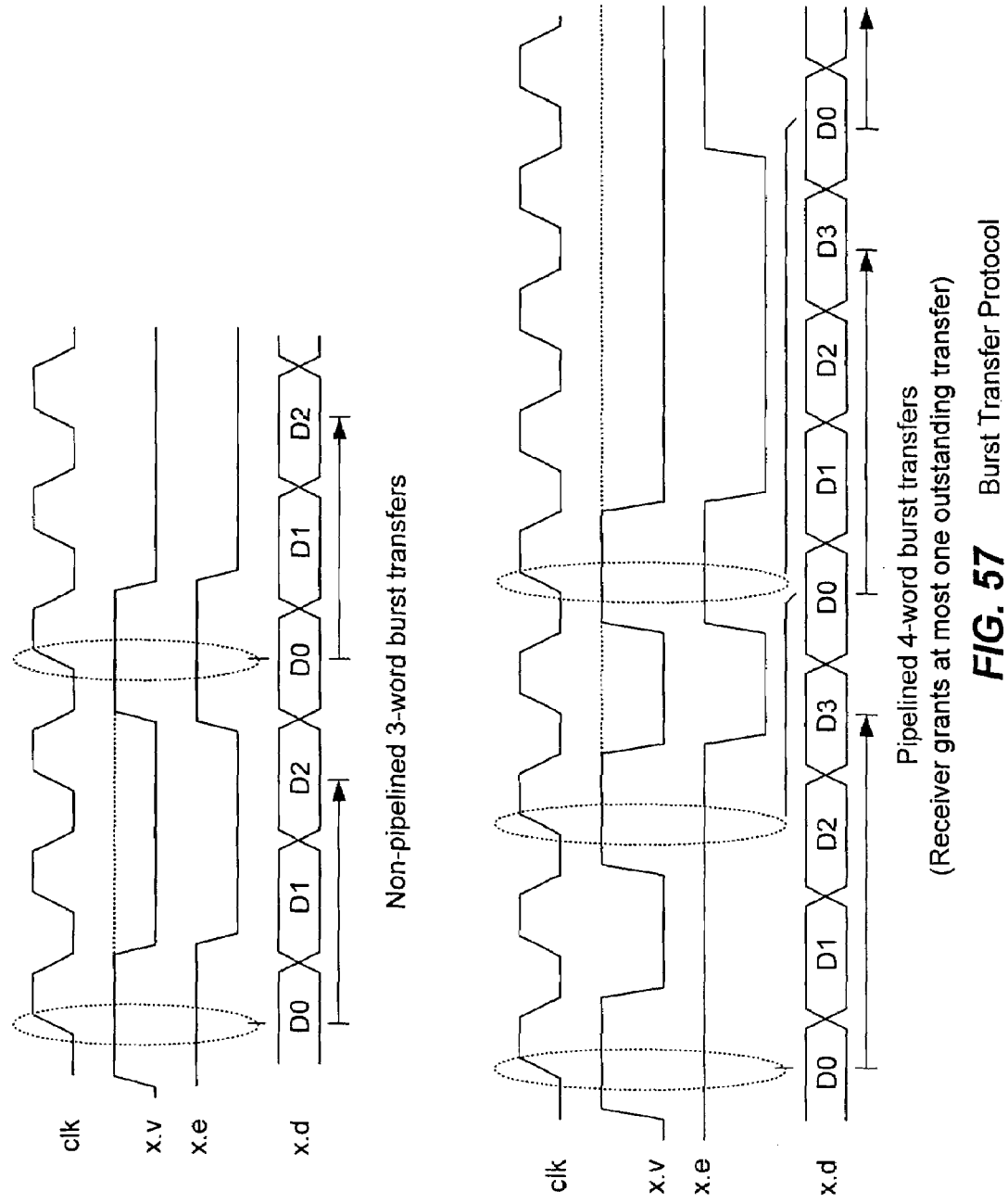

Pipelined Burst Transfer: A burst transfer protocol which allows the request/grant control phase of a burst transfer to take place during the transfer of a prior burst's message. The number of messages that the receiver will grant in advance of the communication of those messages is referred to herein as the number of grant control tokens in the sender-receiver loop. According to various embodiments, an arbitrary number of such tokens may be supported. A particular implementation imposes some finite maximum number of such outstanding granted bursts, a constant referred to as MAX_GRANT. FIG. 57 includes two timing diagrams, a first illustrating the signal timing for non-pipelined 3-word burst transfers, and a second illustrating signal timing for pipelined 4-word burst transfers.

Because a benefit of burst transfers arises from the receiver being able to commit to a sustained acceptance of data tokens, and therefore implying some finite amount of available buffer space, a limit to the length of each message is established (MAX_LEN). According to various embodiments, the message length may be fixed (e.g., as shown in FIG. 57) or, alternatively, messages can be allowed to have a variable length up to MAX_LEN.

A specific embodiment of a burst-mode converter designed according to the invention employs a message tail bit to support variable-length messages. Alternative embodiments employ other mechanisms for encoding variable message lengths (e.g., a burst count sent during the control handshake phase, or included in-band as a header word of the message). Alternative implementations eliminate such mechanisms where message sizes are fixed.

Figure 58:
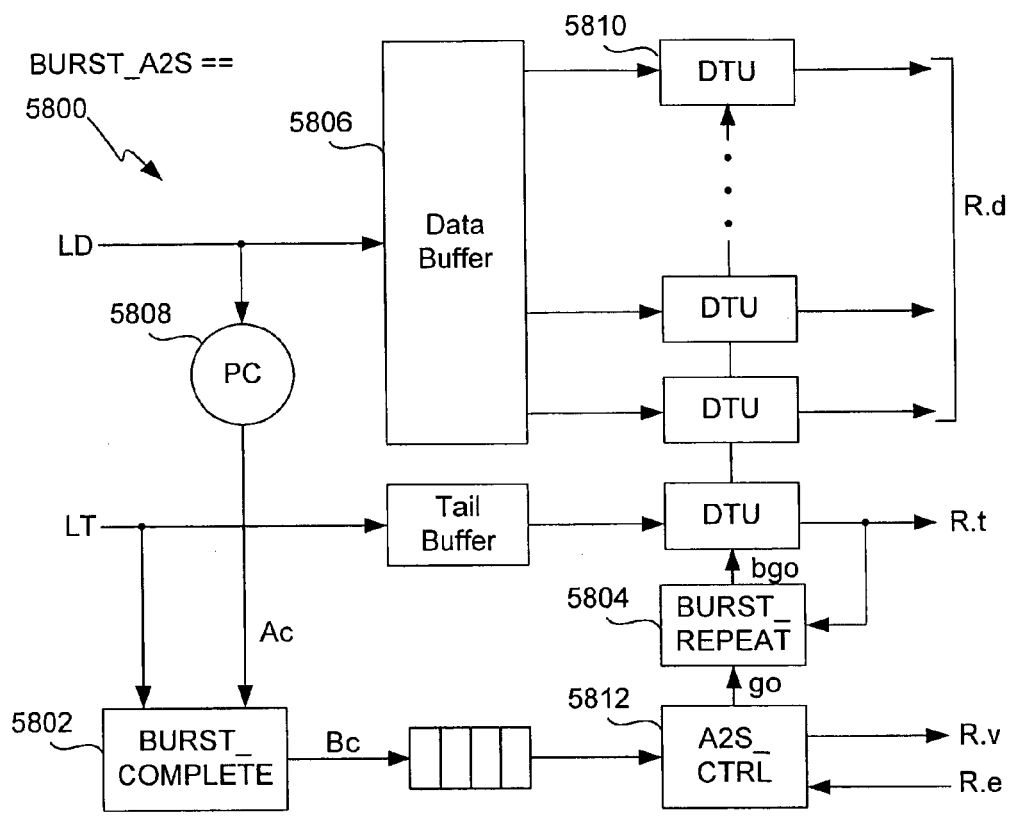

In order to support burst transfers, the A2S design described above with reference to FIGS. 46-55 includes two additional cells. Otherwise the general architecture is similar to that described above. FIG. 58 is a high level diagram showing such a burst mode A2S converter (BURST_A2S) 5800. The two new cells are burst complete logic (BURST_COMPLETE) 5802 and burst repeat cell (BURST_REPEAT) 5804.

According to one embodiment, burst complete logic 5802 is a simple asynchronous delay-insensitive logic unit with the following CSP specification:

```
BURST_COMPLETE ==
  i := 0;
  *[Ac?, T?t;
    [ ~t -> i := (i+1) % MAX_LEN
    [ ] t -> i := 0 ];
    [i == 0 -> Bc! [ ] else -> skip
  ]]
```

The unit reads an input tail token per pipelined completion token from the datapath and whenever the tail token is "1," or when it has received MAX_LEN tokens without a "1" tail token, it sends a 1 of1 "Burst Completion" token to its Bc output channel.

According to various embodiments, the implementation of the burst complete logic varies in relation to the value of MAX_LEN. For example, for small values of MAX_LEN (e.g., 2 to 4), the cell can be implemented in a single pipeline stage with internal state bits. For larger values, the cell may be decomposed into separate stages for incrementing the "i" internal variable and for comparing and reinitializing "i." A specific circuit implementation of the burst complete logic is described below for a fixed-size message variation of a burst mode A2S converter.

The burst repeat cell extends the "go" signal pulse to the datapath over several clock cycles corresponding to the length of the burst. According to various embodiments, the burst repeat cell may have the following specification:

```
BURST_REPEAT ==
  g := 0, bcnt := 0;
  *[[CLK]; xgo := go, t := T;
    [ xgo & ~t & (bcnt != MAX_LEN-1) -> g := g+1
    [ ] ~xgo & g>0 & (t | (bcnt = MAX_LEN-1)) -> g := g-1
    [ ] else -> skip
    ];
    [ ~t & (xgo | g>0) -> bcnt := (bcnt+1) % MAX_LEN
    [ ] t -> bcnt := 0
    [ ] else -> skip
    ];
    [~CLK];
  ]
  ||
  *[bgo := go | g>0]
```

According to specific embodiments, this cell may be implemented in a straightforward manner by applying standard synchronous design techniques. According to such embodiments, all of the cell's inputs and outputs are synchronous; that is, inputs are sampled on the rising edge of the clock and outputs (including state variables) can be expressed as combinational functions of its inputs (e.g., either registered, as for "g" and "cnt", or not, as for "bgo").

According to one embodiment, the burst repeat cell implements two counters: one tracking the number of outstanding bursts that have been granted by the control process (e.g., "g" incremented every time "go" is asserted within an active burst), and one tracking the length of the current active burst (e.g., "bcnt"). According to this embodiment, the "g" counter is required to support pipelined burst grants, and the "bcnt" counter is required to support segmentation of messages greater than MAX_LEN into multiple bursts. According to various implementations, the burst repeat cell may be simplified by eliminating either or both of these features.

Another difference in the burst mode A2S converter from the baseline A2S converter described above (e.g., A2S converter 2802 of FIG. 29) is the amount of internal buffering on the LD and LT channels. That is, in a particular implementation of the baseline A2S converter, only a single input buffer (i.e., static slack 1) is required for correctness, although various implementations might use more for performance optimization (e.g., slack-matching to the control-to-datapath branch.) By contrast and according to a specific embodiment of the invention, for the burst mode A2S converter a single message (e.g., of MAX_LEN words) of buffering is required for correctness. Since now the control path is used only once per message, slack matching to it is less of a consideration.

According to one embodiment, two requirements are placed on the message buffer:

1. It must be able to receive and source tokens once per clock cycle regardless of how full it is.
2. The forward latency through the buffer must be less than the control path to DTU latency.

In an alternate embodiment which supports pipelined burst transfers, additional messages' worth of buffering are added. In general, in order to support the requesting ofN burst transfers in advance, (N+1)*MAX_LEN amount of buffer space is provided.

It should be noted that as buffer slack needs increase, a linear array of PCHB/PCFB/WCHB buffers may become an inappropriate choice due to area implications and to difficulty satisfying the above timing constraints. Therefore, various such embodiments may employ a dual-ported FIFO memory implementation of this buffering.

According to a specific embodiment, the burst mode A2S converter of FIG. 58 has two asynchronous input channels: the datapath LD channel (a collection of N 1 ofM channels), and an LT tail bit 1 of2 channel. Each data token received by the burst mode A2S converter on LD is accompanied by a tail token on LT. For each data token except the last in a message, the LT token is "0." On the last data token, the value of LT is "1." The tail bit is also added to the burst mode A2S converter's synchronous output interface as another data bit (denoted "R.t" in the figure). As LD data words enter the burst mode A2S converter, they are copied to two units: message buffer 5806 and pipeline-completion (PC) unit 5808. Message buffer 5806 stores the token until the array of data transfer units (DTUs) 5810 is ready to transfer it. PC unit 5808 consumes the LD token and outputs a single 1 of1 Ac token to burst complete logic 5802.

The LT tail token associated with the LD data token is also copied to these two units: one copy is buffered with the data, and the other is sent to burst complete logic 5802.

Upon receiving both Ac and LT tokens, burst complete logic 5802 either increments its internal burst counter (if LT is "0" and the counter has not reached MAX_LEN), or else it sends a 1of1 token on its Bc output channel to A2S control unit 5812 (if LT is "1" or its counter has reached MAX_LEN).

Control unit 5812 handles the "Bc" token just as it handles the "Ac" token in the non-burst A2S design. Namely, it asserts its "S$^o$" handshake signal synchronously with CLK, waiting for its "S$^i$" input to be asserted. Once both are asserted, it asserts its output "go" signal to the datapath for a single clock cycle. In the burst mode A2S converter design, the assertion of "go" represents the granting of an entire burst (up to MAX_LEN tokens) of data, rather than the single word it granted in the non-burst A2S design.

Burst repeat cell 5804 provides the appropriate translation between the per-burst "go" signal from control unit 5812 and the per-word "bgo" control from datapath. Simply stated, it extends the single-cycle assertion of "go" over a number of cycles matching the length of the burst. In order to know when to end the burst, burst repeat cell 5804 both watches the output tail bit (i.e., R.t) and maintains an internal counter in case the message is longer than MAX_LEN (i.e., in case it must terminate the, burst and continue the message over a subsequent burst when "go" is reasserted). According to an embodiment in which pipelined burst transfers are support, burst repeat cell 5804 also increments a grant counter whenever it sees an asserted "go" from control unit 5812 while a burst is still in progress.

Figure 59:
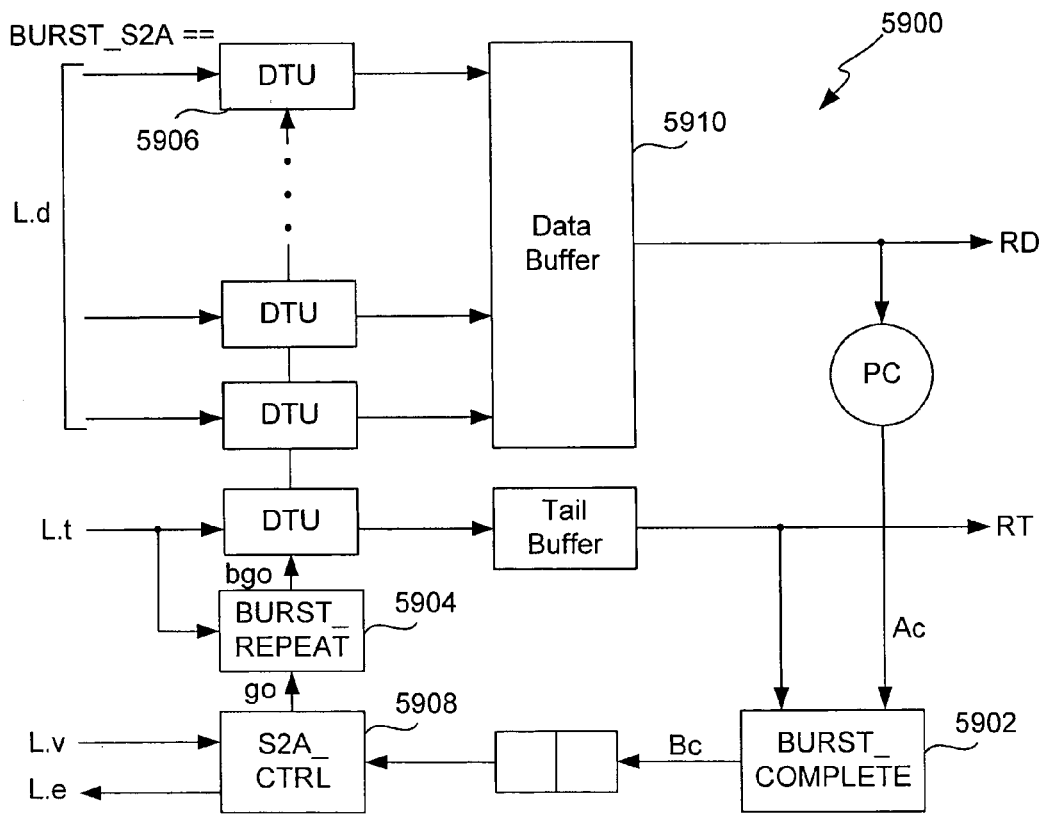

The modifications to the A2S design in order to implement the burst protocol described above may be applied in a symmetrical manner to the S2A converter. FIG. 59 is a high level diagram of such a burst mode S2A converter 5900 designed according to a specific embodiment of the present invention. According to a more specific embodiment, burst complete logic 5902 and burst repeat cell 5904 may be implemented as described above.

Burst mode S2A converter 5900 has the same synchronous interface as the baseline S2A converter (e.g., S2A converter 2804 of FIG. 29) with the addition of an L.t tail bit which can be considered an additional bit of data, its state serving to segment the data sequence on L.d into messages. The asynchronous output interface also remains unchanged except for the addition of the output tail bit, RT (a 1 of 2 channel). The data output channel "R" in the baseline S2A becomes "RD" in the burst mode S2A converter.

For every burst grant cycle negotiated by L.e and L.v, up to MAX_LEN data tokens are transferred by the burst mode S2A converter's array of DTUs 5906. The extension of the "go" signal of control unit 5908 over multiple clock cycles corresponding to the length of each burst is handled by burst repeat cell 5904 in a manner similar to that described above with reference to burst mode A2S converter 5800. If the L.t bit stays low for MAX_LEN cycles, burst repeat cell 5904 terminates the burst, requiring an additional grant control token to be negotiated (which may have happened concurrently if the implementation supports pipelined grants).

As bursts are collected in data buffer 5910 their words are completed to "Ac" 1 of 1 tokens which are then further completed by burst complete logic 5902 to "Bc" 1 of 1 tokens. The "Bc" tokens are returned to control unit 5908 indicating that a burst's worth of buffer space has drained. According to a specific embodiment, the burst mode S2A converter design initializes with its data buffer completely empty and the "Bc" channel initialized with as many tokens as data buffer 5910 and burst repeat cell 5904 will support. The number of initial "Bc" tokens greater than one corresponds to the number of pipelined grant tokens control unit 5908 will issue. Thus, the internal "g" counter of burst repeat cell 5904 must support counts up to this number.

According to specific embodiments in which all burst messages are of a fixed length MAX_LEN, there is no need to include a tail bit in the design. In such embodiments, the fixed-length burst mode A2S converter always sends MAX_LEN tokens per transfer, and the recipient synchronous logic counts the number of tokens transferred following a cycle with both $S^i$ and $S^o$ asserted to know when the message ends.

Likewise, the synchronous logic feeding a fixed-length burst mode S2A converter always provides valid data for MAX_LEN cycles beginning from a cycle with both $S^i$ and $S^o$ asserted (or following the end of the prior transfer when the control phase is pipelined). The asynchronous recipient logic then counts the data tokens it receives to know when messages begin or end.

Figure 60:
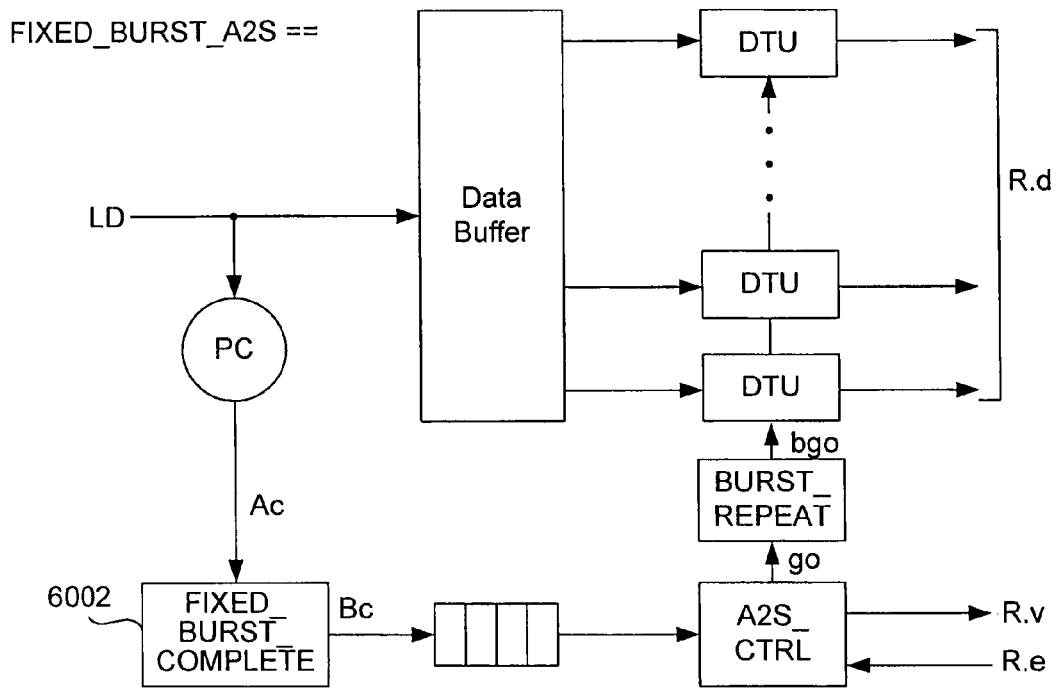
Figure 61:
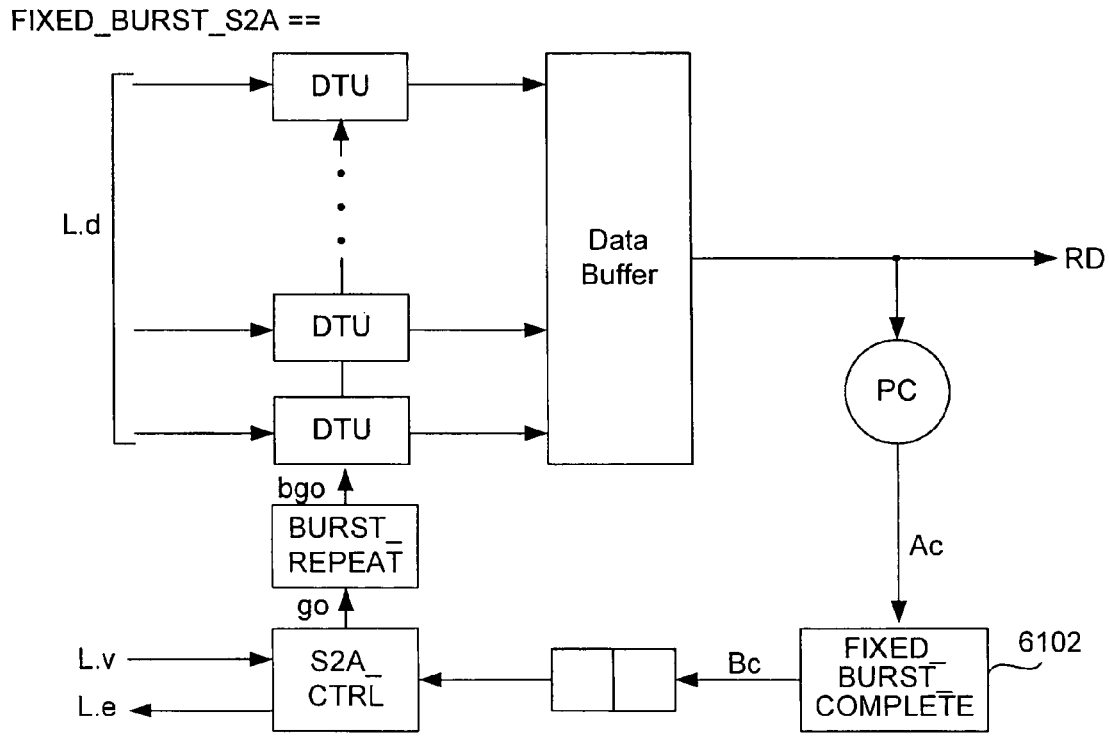

Block diagrams of these simpler burst converter designs are given in FIGS. 60 and 61 According to specific embodiments, fixed burst complete logic 6002 and 6102 are simply token counters which may be implemented as follows:

```
FIXED_BURST_COMPLETE ==
    i := 0;
    *[Ac?; i := (i+1)%MAX_LEN;
        [ i == 0 -> Bc!
        [ ] else -> skip
        ]]
```

The remainder of the converter blocks operate as described above with reference to FIGS. 58 and 59.

An example implementation of fixed burst complete logic when MAX_LEN equals two is given in FIG. 62 (DECIMATE2_1 of 1). When MAX_LEN is any power of two ($2^N$), a cascade of N DECIMATE_2_1 of 1 units may be used to implement the fixed burst complete logic. When MAX_LEN is not a power of two, or when the forward latency through cascaded DECIMATE2_1 of 1 units becomes unacceptably high, a more general counter design maybe used.

The fixed-length burst mode A2S and S2A converter designs may use the burst repeat cell described above by simply wiring the "T" tail bit input to logic zero. Alternatively, the unit may be simplified for this application by factoring out the tail bit logic from its implementation.

In certain applications it is desirable to transfer data tokens on both falling and rising edges of the synchronous clock, i.e., so-called double data rate (DDR) applications. As long as the application calls for an even number of data transfers per burst beginning on a rising edge of the clock, the only changes necessary to the burst mode A2S converter and burst mode S2A converters described above (e.g., in FIGS. 58-61) are to the respective Datapath Transfer Units.

According to a specific embodiment, the DDR version of the A2S Datapath Transfer Unit can be specified as follows:

```
A2S_DDR_DTU ==
    CLK0 := 0;
    *[[CLK != CLK0];
        [go -> L?R [ ] else -> skip],
        CLK0 := CLK
    ]
```

The unit waits for a transition on CLK, and when "go" is asserted, it reads from its asynchronous input "L" to its synchronous output "R".

According to a similar embodiment, the DDR version of the S2A Datapath Transfer Unit has the following specification:

```
S2A_DDR_DTU ==
    CLK0 := 0;
    *[[CLK != CLK0];
        [go -> R!L [ ] else -> skip],
        CLK0 := CLK
    ]
```

The unit waits for a transition on CLK, and when "go" is asserted, it sends its synchronous input "L" to its asynchronous output channel "R".

Figure 64:
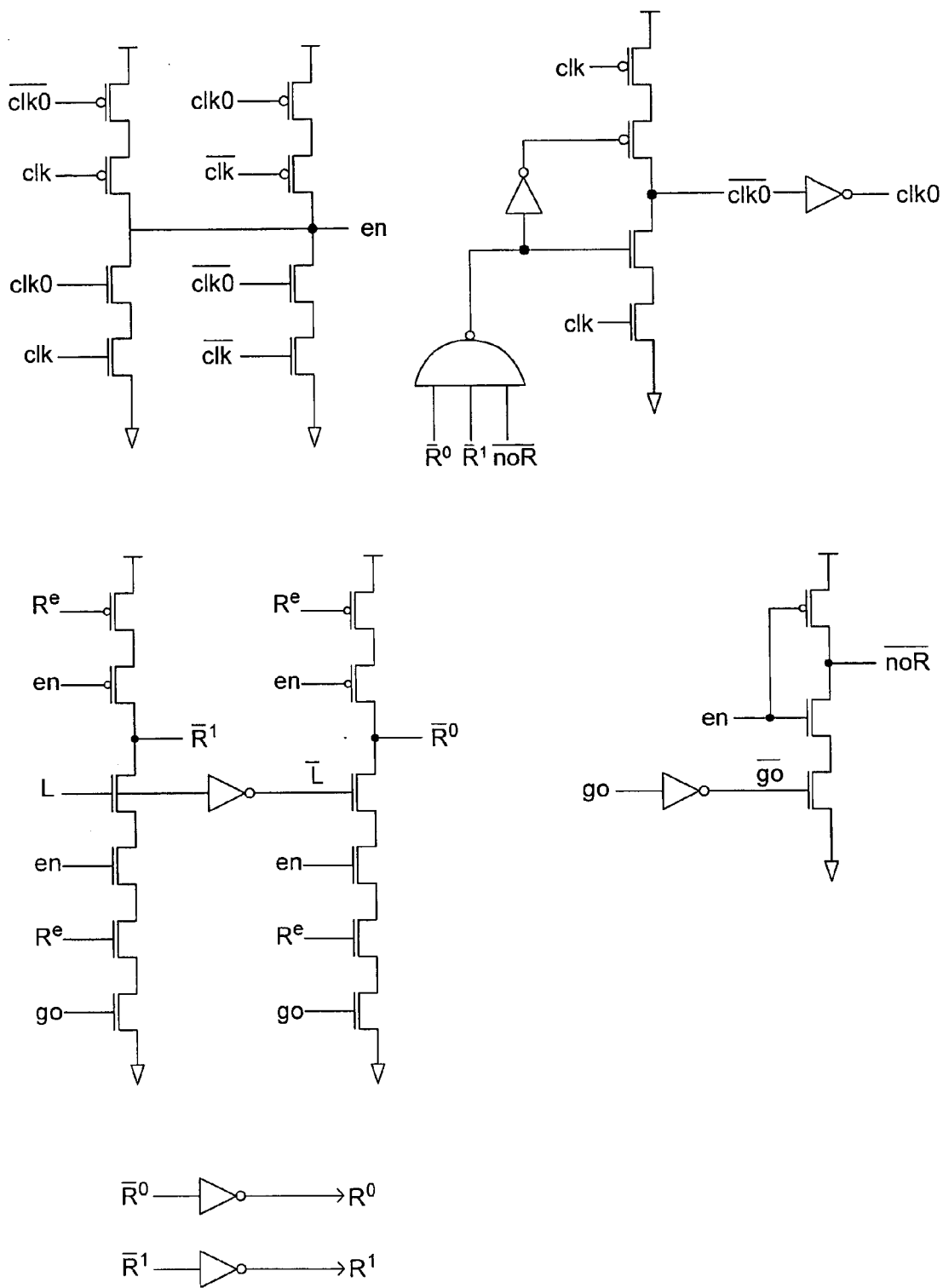
Figure 66A:
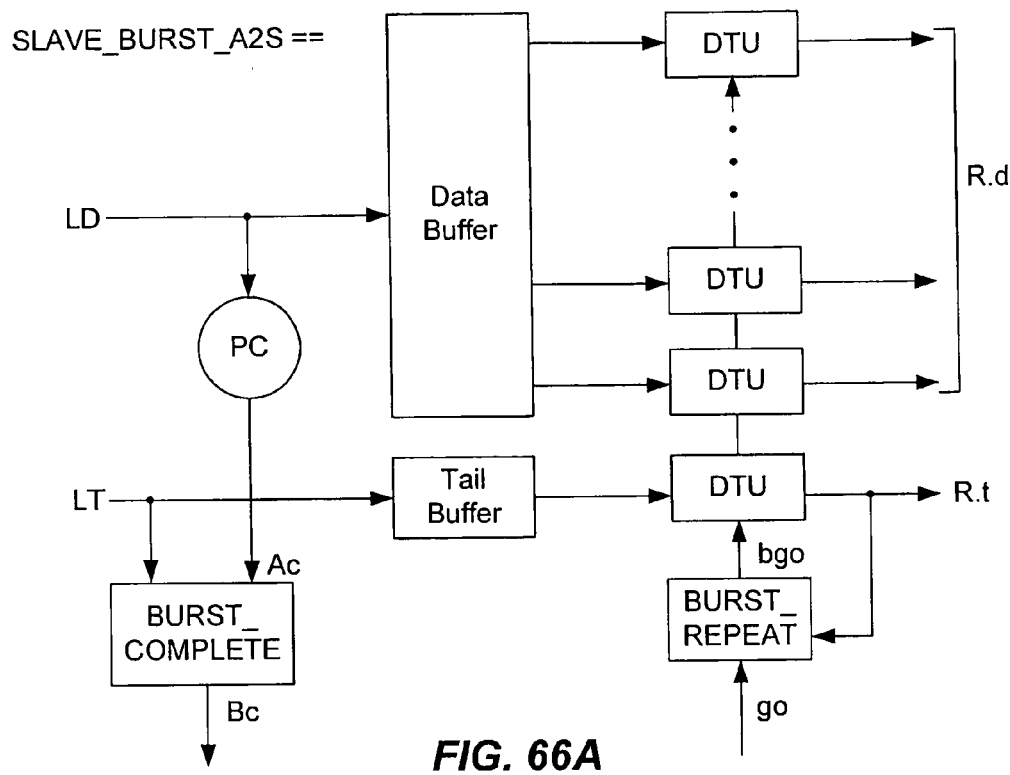
Figure 66B:
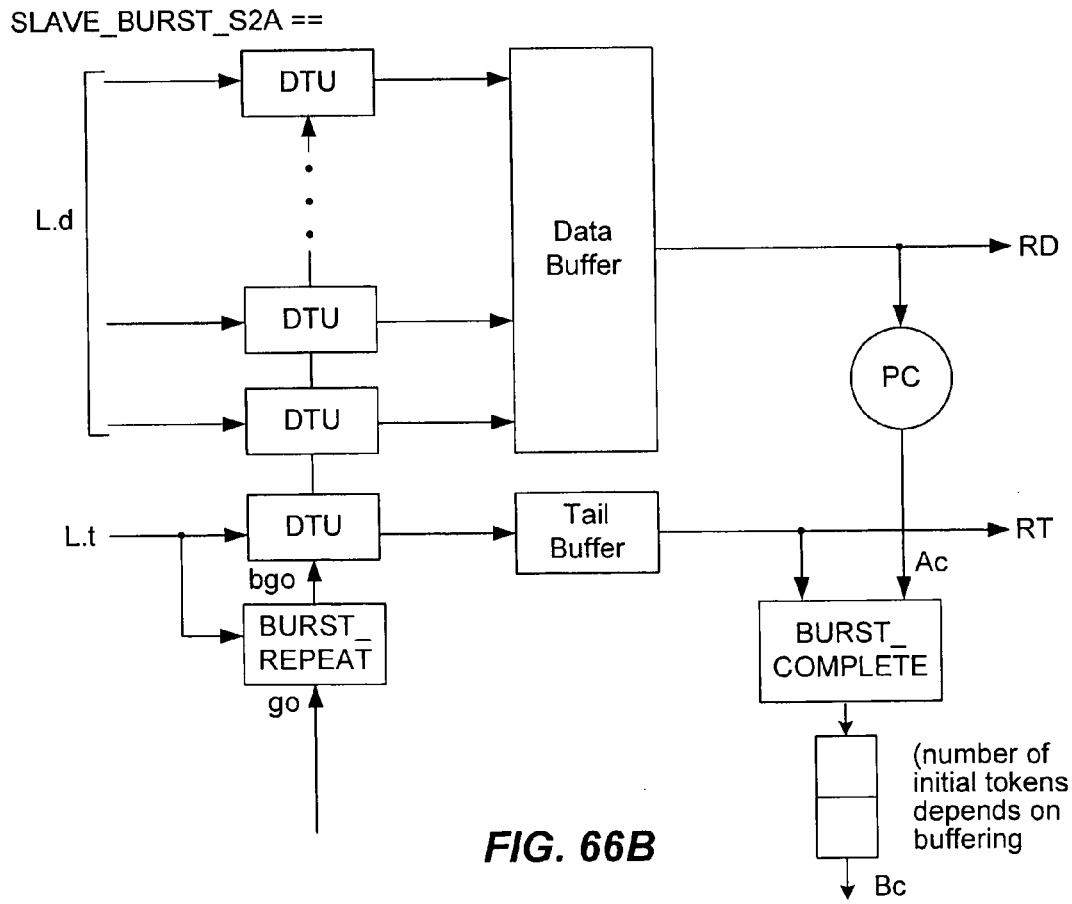
Figure 67A:
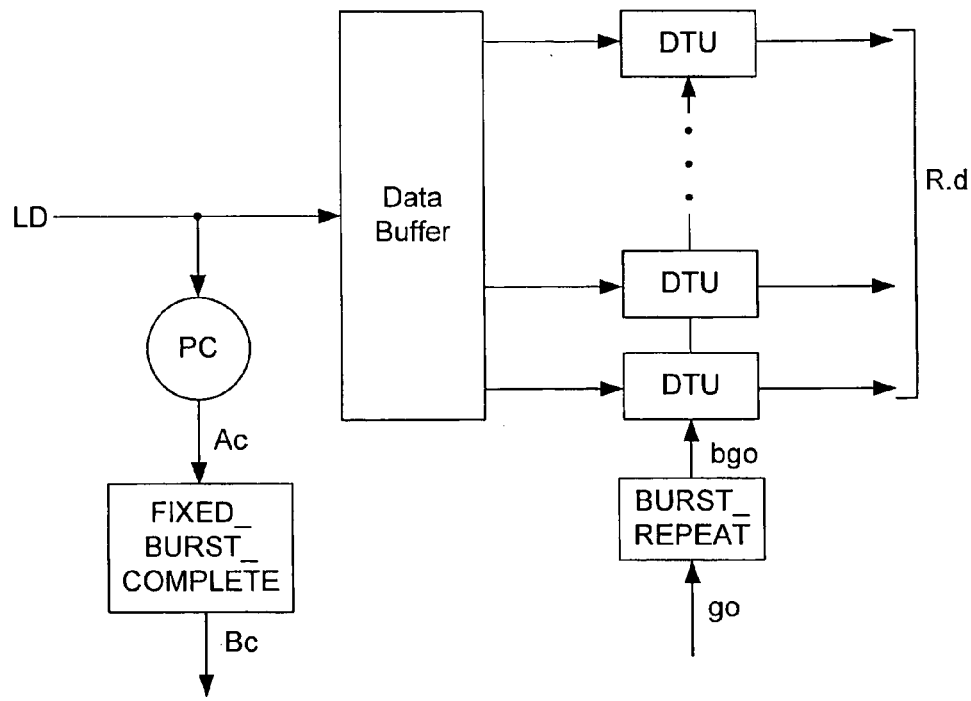
Figure 67B:
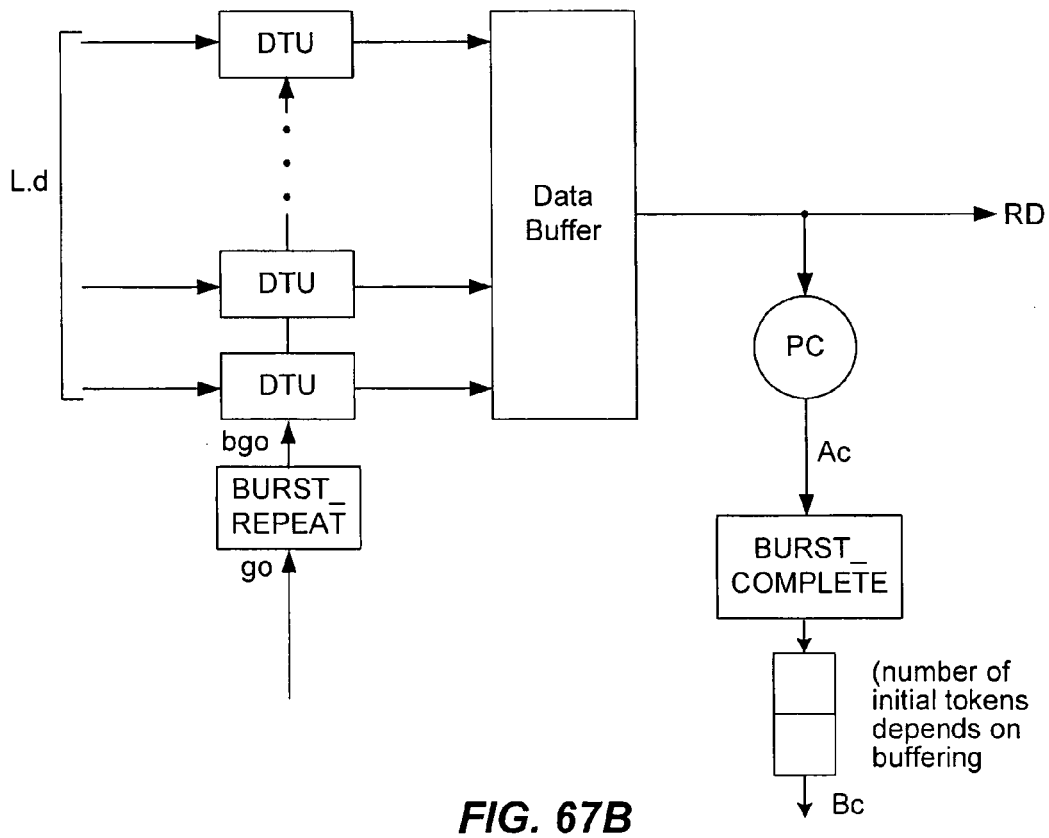

Circuit implementations of these DDR DTU variants are given in FIGS. 63 and 64. Note that when burst mode DDR A2S and S2A converters (and their fixed-length variants) are constructed using these datapath transfer units, the synchronous recipient or sender logic counts two tokens per clock cycle.

When using the variable-length burst designs (with tail bit control), the tail bit, like the synchronous handshake control signals $S^i$ and $S^o$, remains a single-data rate signal. Each tail bit value applies to the pair of data tokens transferred on that cycle.

According to yet other embodiments which will now be described with reference to FIGS. 65-69, A2S and S2A conversion circuits are used to implement a DDR-SDRAM interface. According to a specific embodiment, extensions to the circuits described above make such an implementation possible. These extensions include a master/slave converter system, which allows the conversion of different types of information to be linked, and a nop-counter, which can give increased performance when there are complex constraints on the minimum spacing between data items.

In one such embodiment, the SDRAM interface uses a master/slave design in which multiple slave converters are controlled by commands sent through a "master" A2S converter. Basically, the control process of each of the slave converters is replaced with a shared mechanism that generates "go" signals for each. Based on the command word transferred, the system may also trigger one or more of the slave converters, possibly after some number of clock cycles of delay.

As described here, the master converter is A2S. However, it will be understood that a similar system could be designed with a master S2A converter and still remain within the scope of the invention.

The DDR-SDRAM protocol specifies that data are transferred (read or write) in a continuous burst starting a specified number of clock cycles after the corresponding read or write command. Hence the asynchronous side must ensure that data are available for writing, or empty buffer space available for reading, before issuing the associated read or write command. This requires that the converters for commands and data be linked.

A slave A2S or S2A converter comprises a normal converter (such as any of those described above) with its control process removed. According to various embodiments, such normal converters may comprise, for example, single-word converters (e.g., FIG. 65), burst converters (e.g., FIGS. 66A and 66B), or fixed burst converters (e.g., FIGS. 67A and 67B). Such converters may also be double data rate (DDR) converters, but are not required to be so.

Deleting the control process leaves the slave converter with an input signal "go" and an output completion channel Ac. (For embodiments described above, the completion channel was called Ac for single-word converters and Bc for burst-mode converters). These channels will be referred to below as Ac for simplicity.

According to a particular implementation, a slave converter does not itself perform a synchronous handshake. Instead, it simply transfers data on every rising clock edge on which its input signal "go" is asserted. It is the responsibility of the larger system to satisfy the same conditions as are placed on the control unit of a standalone converter, i.e., to wait for a token on Ac, and perform any necessary synchronous flow control, before asserting the "go" signal. In a slave S2A converter, as described above with reference to a standalone S2A converter, the Ac channel is initialized with tokens to match the amount of datapath buffering.

Figure 68:
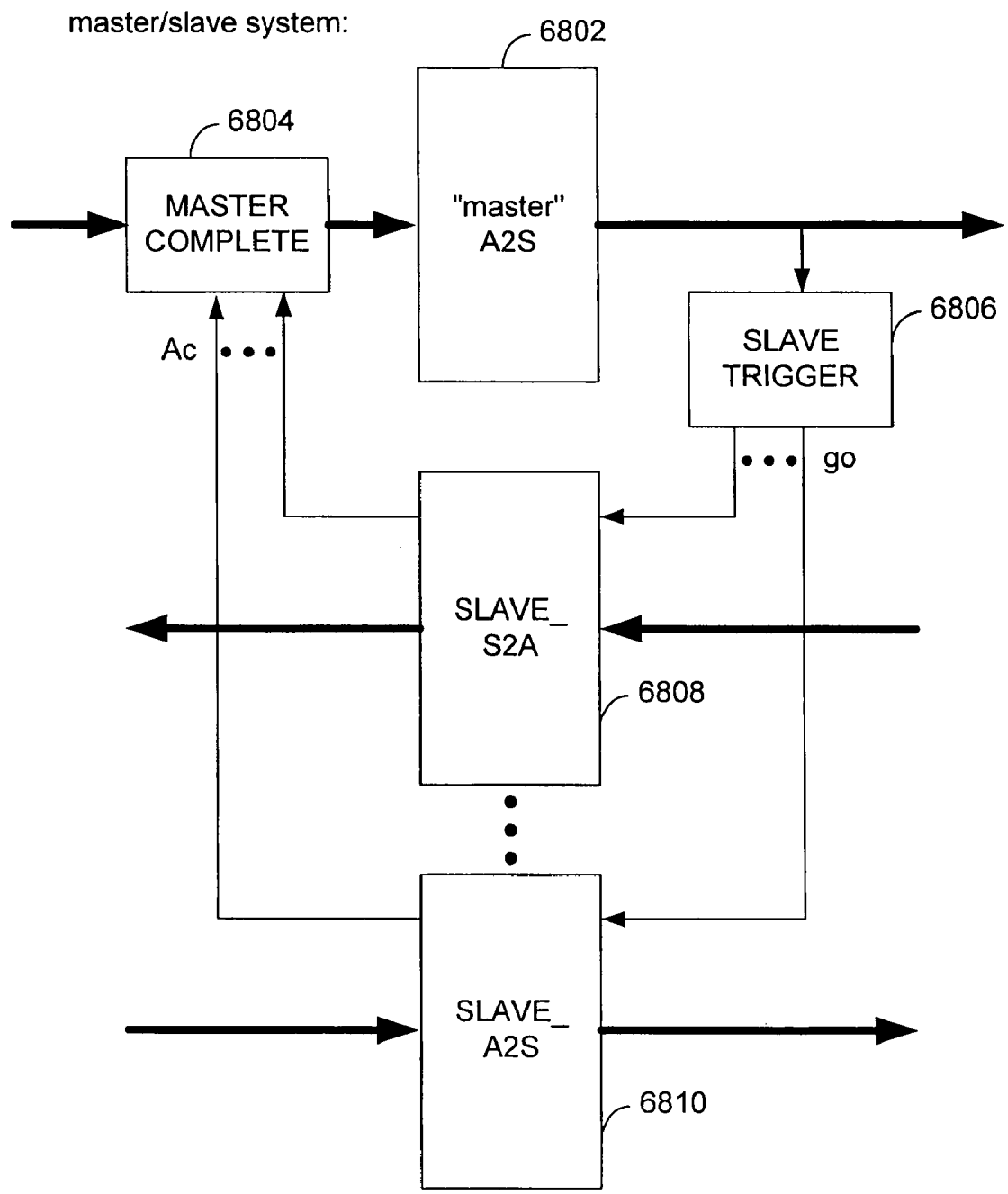

The general organization of an exemplary master/slave converter system is shown in FIG. 68. Before a command is sent to master A2S converter 6802, it passes through a control block MASTER_COMPLETE 6804 which checks that the necessary slave converters are ready. According to one embodiment, MASTER_COMPLETE 6804 executes the following operation, specified in pseudocode, for every command:

```
L?command;
for each slave converter S,
    if command requires a transfer on S,
        Ac[S]?;   // receive completion token from S
R!command
```

Once the command emerges from MASTER_COMPLETE 6804, it is passed through standalone A2S converter 6802 (the "master" converter).

On the synchronous side, a SLAVE_TRIGGER unit 6806 is responsible for raising the "go" signals of the appropriate slave converters at the appropriate times, depending on the command. A simple version of SLAVE_TRIGGER 6806 could observe the output channel C from master A2S converter 6802. On each rising clock edge, if C is valid (C.v and C.e both high) and the command C.d indicates a slave transfer, then the corresponding slave converter is triggered through a delay line. In a particular embodiment, the delay in each delay line is programmable and corresponds to an integer number of clock periods. In general, SLAVE_TRIGGER 6806 may be more complex including, for example, synchronous handshaking on the slave converters or other forms of synchronous control.

According to some embodiments, slave converters 6808 and 6810 have more datapath buffering than their standalone counterparts. That is, in place of the control process of the standalone converter, with its relatively small latency from Ac to "go", the control latency of the slave converter passes through MASTER_COMPLETE 6804, master A2S 6802, and SLAVE_TRIGGER 6806 (with the associated delays). Therefore, the datapath buffering of the slave converter is increased to match this greater latency. The number of initial tokens on the Ac channel of slave S2A converter 6808 (representing initial empty buffer space) may be increased accordingly.

According to various embodiment, the NOP_COUNTER is a synchronous unit the responsibility of which is to ensure that items sent through an A2S converter are separated by at least a minimum number of clock cycles. The number is given with each item, and specifies the minimum number of skipped cycles between that item and the previous one.

The DDR-SDRAM protocol has numerous requirements on the timing of commands which, for particular implementations, can all be expressed as minimums: before a certain command can be issued, there must have been at least a minimum number of cycles skipped (issuing null commands, or NOPs) since the previous command.

According to one embodiment, the required number of NOPs may be generated on the asynchronous side and passed through the A2S. According to such an implementation, it would then merely be necessary for the synchronous side to generate additional NOPs when no command was available. The disadvantage of this approach is that it may add unnecessary delay between commands that are already widely separated. The minimum number of NOPs is not known until the following command is known, so passing those explicit NOPs through the A2S before the following command would add extra delay even though more than enough delay may have already passed.

Figure 69:
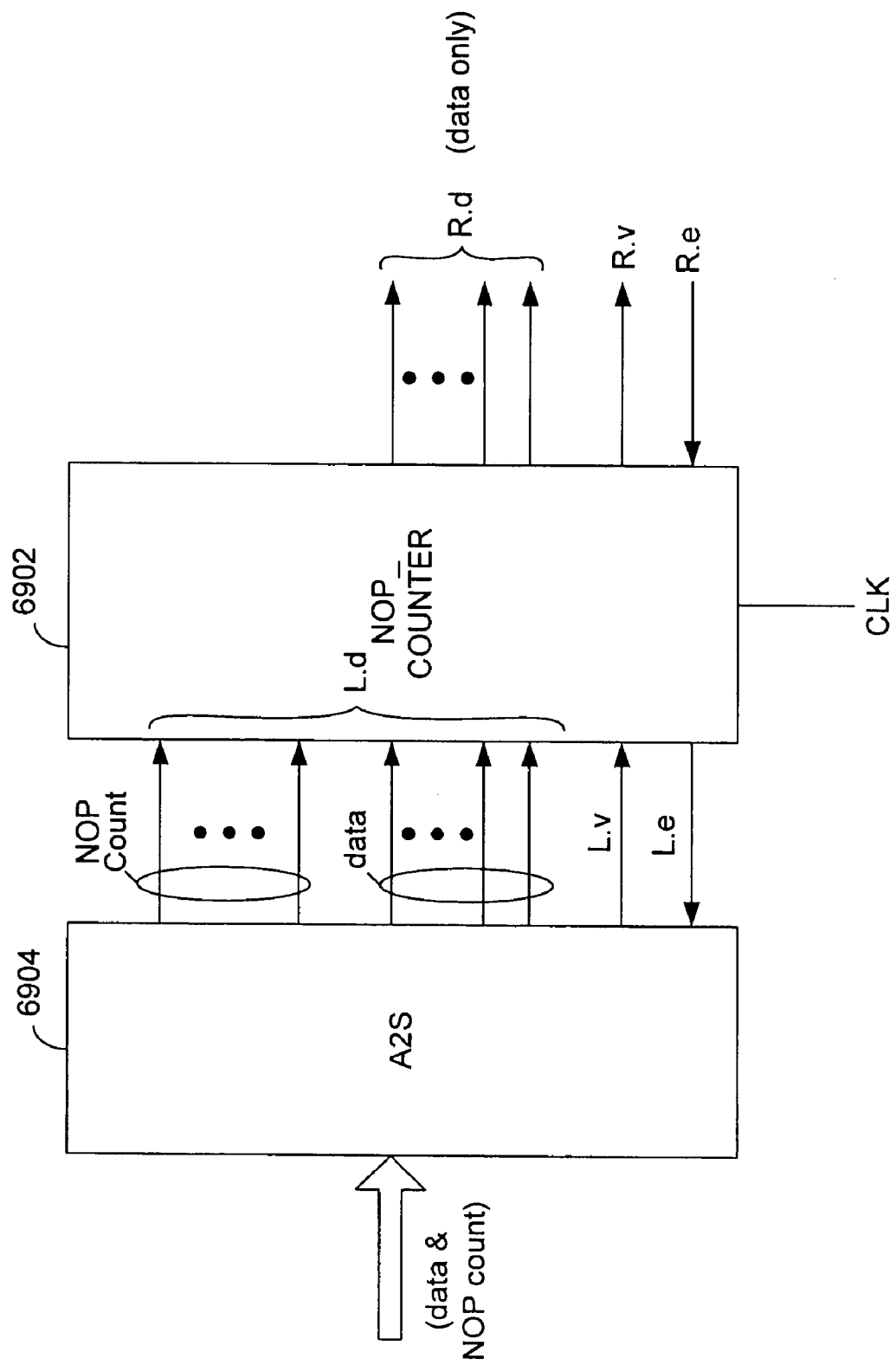

Referring now to FIG. 69, NOP_COUNTER 6902 is a synchronous block attached to the output of A2S 6904. Its input and output each comprise synchronous handshake channels. The input channel carries items (commands) with an associated minimum NOP count, and the output channel sends out those same items spaced by the required number of cycles. One possible CSP specification of this unit is the following:

```
count := lcount := rcount := 0;
has_l := has_r := false;
L.e := R.v := false;
*[[~CLK];
 [ has_r & (count >= rcount) -> R.d:=r, R.v:=true
 [ ]       else -> R.v:=false
 ],
 (L.e := ~has_l);
 [CLK];
 [ R.v & R.e -> count:=0, has_r:=false
```

-continued

```
[ ]     else -> count:=count+1
],
[ L.v & L.e -> (l,lcount):=L.d, has__l:=true
[ ]     else -> skip
];
[ has__l & ~has__r -> has__l:=false, has__r:=true, (r,rcount):=(l,lcount)
[ ]     else -> skip
];
]
```

In this program, the variable "count" holds the number of cycles since the last output on R. The pair (1,1count) holds the input data and associated minimum NOP count; this is copied to (r,rcount) for output. The Booleans has_1 and has_r indicate when each of these pairs hold valid tokens. Having two variable pairs allows the unit to input and output on the same clock cycle.

On each falling clock edge, NOP_COUNTER 6902 sets its output signals. When there is a token in r (has_r high), and the number of cycles since the last output is greater than rcount (count>=rcount), it sets R.d and R.v to send the value r; otherwise, it does not send. Also, if there is no token in 1(has_1 low), it raises L.e to enable input.

Data are transferred on the rising clock edge. If there is an output on R (R.v and R.e high), then the token is removed from r, and the count of cycles since the last output is reset to 0; otherwise, the count is incremented. If there is an input on L, the data and nop-count are read into a token in (1,1count). Finally, if there is now a token in 1 but not one in r, the token is transferred from 1 to r.

The SDRAM interface uses a NOP_COUNTER in conjunction with the master/slave design above. The NOP_COUNTER is attached to the master converter and may be considered part of the master converter for purposes of the rest of the design. In a particular implementation, the SLAVE_TRIGGER unit observes the output channel of the NOP_COUNTER as though it were the output of the master converter. This keeps the timing of the slave converters consistent with the command stream that emerges from the NOP_COUNTER and is visible to the other synchronous circuitry.

According to further embodiments of the invention, system interconnect solutions may be implemented using various combinations of various implementations of the circuits described above. According to one such embodiment, a system interconnect is implemented to facilitate integration of a system-on-a-chip (SOC) having a plurality of system modules each having its own clock domain. As will be seen, various embodiments of the invention allow the high-speed interconnection of disparate clock domains while simultaneously eliminating issues relating to synchronization of the various data rates. Even for systems which do not require high speed interconnection, the elimination of the clocking problem make the solutions provided by the present invention very attractive. In addition, because of the asynchronous nature of the interconnect, the various synchronous devices in such systems may easily be replaced by devices with higher data rates without impacting the interconnect design.

Figure 70:
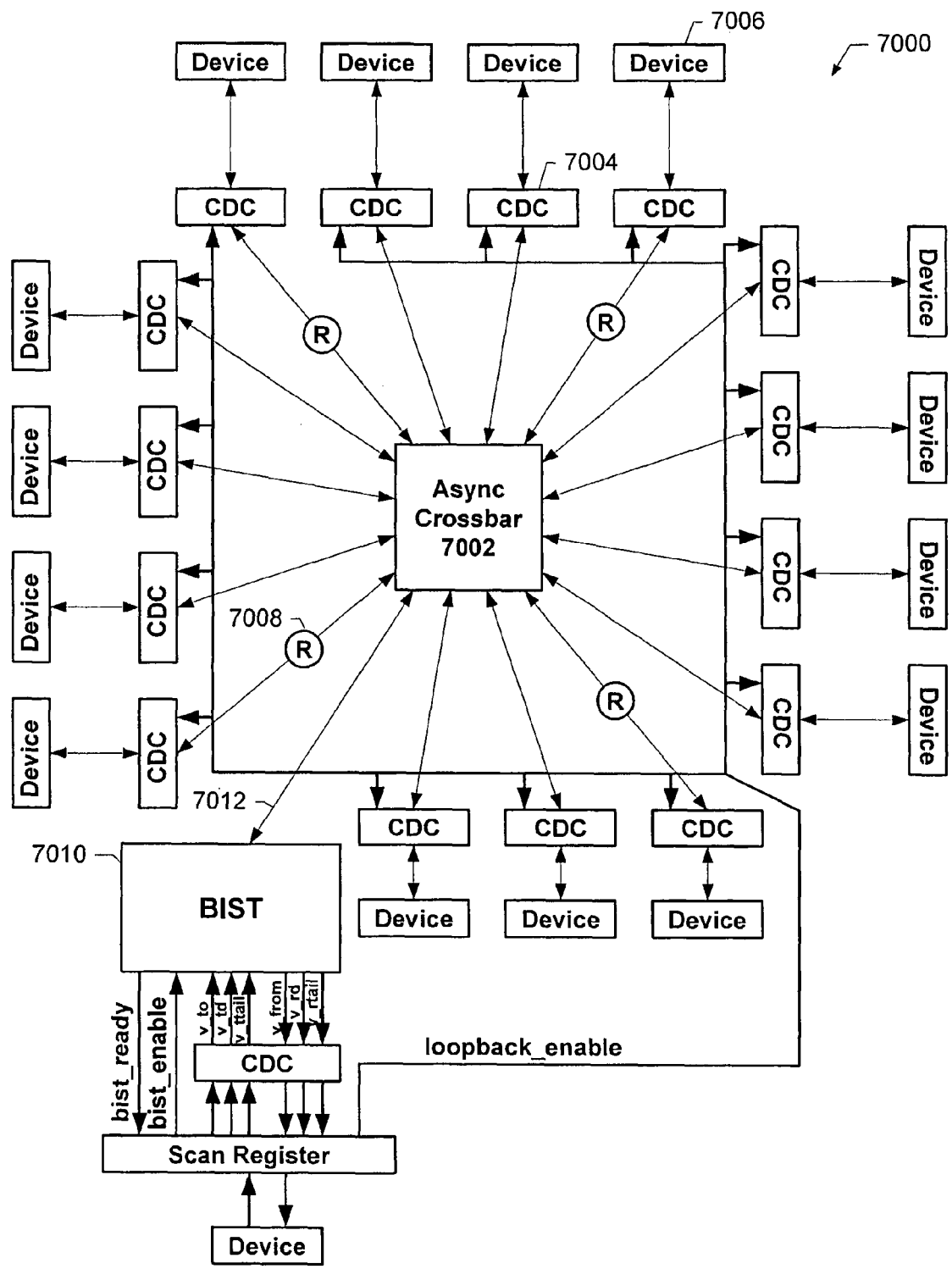
FIG. 70 is a block diagram illustrating a system interconnect solution implemented according to a specific embodiment of the invention.

An example of such a system 7000 is shown in FIG. 70. The interconnect portion of system 7000 includes four components that can be assembled as needed to serve a variety of SOC interconnect applications. Asynchronous crossbar 7002 is a compact and efficient multi-port non-blocking switch fabric that is used to interconnect multiple modules on chip with different data rates transparently and with very modest overhead. According to one exemplary implementation, crossbar 7002 has a total capacity in excess of 1 Tbps, while maintaining a modest footprint and power profile. A plurality of clock domain converters 7004 connect any of synchronous modules 7006 to crossbar 7002 at any data rate from DC to the maximum frequency of a crossbar port. According to a specific embodiment, each clock domain converter (CDC) includes one synchronous to asynchronous converter (S2A) and one asynchronous to synchronous converter (A2S), each converter corresponding to a pre-defined data path width including, for example, a 36-bit data path, a 4-bit destination field, and a tail bit. It will be understood, however, that the various embodiments of the invention are not limited to any specific data path.

Once converted, the data are transported asynchronously through crossbar 7002 and delivered to the clock domain converter associated with another synchronous module where the data are converted and delivered to the target module. Converters 7004 and crossbar 7002 provide seamless conversion between two clock domains in addition to transport across a large-scale SOC more efficiently than simple domain conversion in a typical synchronous SOC solution since in the case of a synchronous bus there may be two clock domain crossings. According to various exemplary implementations, the various asynchronous links in system 7000 may be implemented using any 1 ofN code. According to various specific embodiments, these links are implemented as 1 of1, 1 of2 or 1 of4 rail domino logic.

Figure 70A:
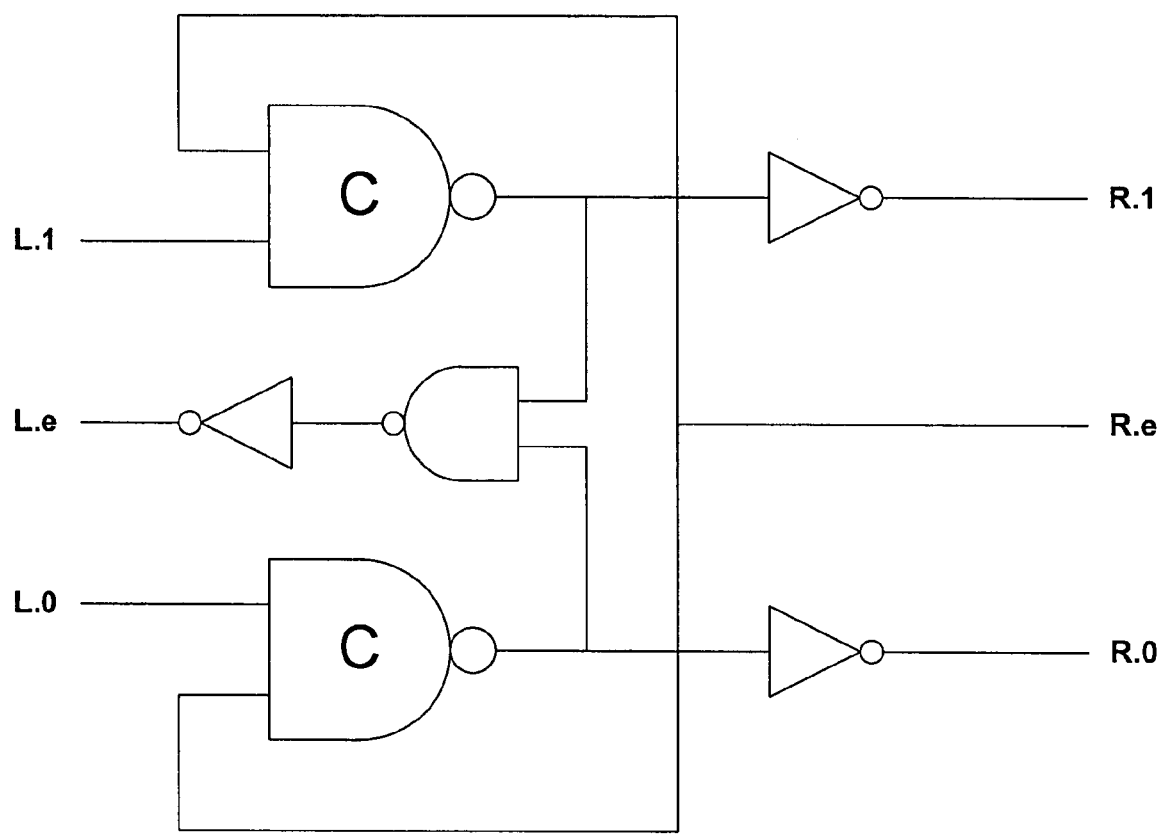
FIG. 70A is a simplified circuit diagram of a repeater which may-be used with various embodiments of the invention.

As will be understood, the channels that link on-chip modules to crossbar 7002 will vary in length as appropriate for a given implementation. Physically longer channels can have an adverse impact on throughput because of the added delay attributable to the asynchronous handshake. Therefore, for channels that span distances beyond a certain length, e.g., more than 1-2 mm in a 0.13 μm implementation, a pipelined repeater 7008 may be added to the channel to repeat the signal and maintain a high data rate. Repeaters 7008 are used to regenerate the asynchronous signals on long wires and are typically installed at the mid-point of a long bus between the clock domain converter and the crossbar. According to some embodiments, more than one repeater may be used without degrading total throughput. Because repeaters 7008 are asynchronous in nature, they have very low forward latency and create the effect of fine-grain pipelining. An exemplary circuit for such a repeater for use with specific embodiments of the invention is shown in FIG. 70A. It will be understood that a wide variety of circuits may be employed for this function.

According to a specific embodiment, a built-in-self-test (BIST) module 7010 is provided for facilitating testing of the interconnection portion of system 7000. In the embodiment shown, BIST module 7010 is disposed on the data path 7012 between crossbar 7002 and a particular CDC 7004, and provides pattern generation and checking for a selected datapath through the crossbar including one or more other CDCs 7004. According to a specific embodiment, BIST module 7010 has a simple command/response interface allowing an external tester or scan chain to do a complete fault and performance coverage of the system. The results can be used for speed binning, as well as for pass-fail analysis. It should be noted that BIST module 7010 does not necessarily need to be positioned as shown in FIG. 70. That is, if any of the ports of crossbar 7002 are unused, BIST circuitry can occupy one of such ports by itself.

According to a particular implementation, a simple link layer protocol is employed to communicate via the interconnect of system 7000. According to this protocol, the sending module specifies a target module and sends the target a variable length block of data terminated by a tail bit. Any contention between multiple modules trying to send to the same destination is resolved by asynchronous crossbar 7002 using, for example, the arbitration techniques described above. Various ordering relationships, such as producer-consumer, are automatically preserved. According to specific embodiments, load completion ordering may also be preserved if desired. Any of a wide variety of higher level protocols, such as load/store or send/receive may be mapped on top of the link layer protocol as required. It will be understood that the interconnect solution of the present invention may be scaled to fit a variety of applications, both in terms of number of ports, and in the number of bits per port (i.e., port throughput).

According to a specific embodiment, crossbar 7002 provides connectivity from any one of its ports to any other of its ports at data rates up to 36 Gbps per connection and direction using a 36-bit channel (32-bit data and 4-bit parity) operating at 1 GHz in a 0.13 µm CMOS implementation. According to other embodiments, higher speed are possible using higher density technology. Data rates up to 72 Gbps are supported for a 16-port 72-bit implementation. The crossbar supports simultaneous (i.e., non-blocking) data transmission between multiple modules with an efficiency that approaches the maximum per-port throughput of all blocks receiving data. According to a more specific embodiment, the crossbar employs a scattering algorithm to maintain fair access among the modules to the interconnect and to each other.

Figure 71:
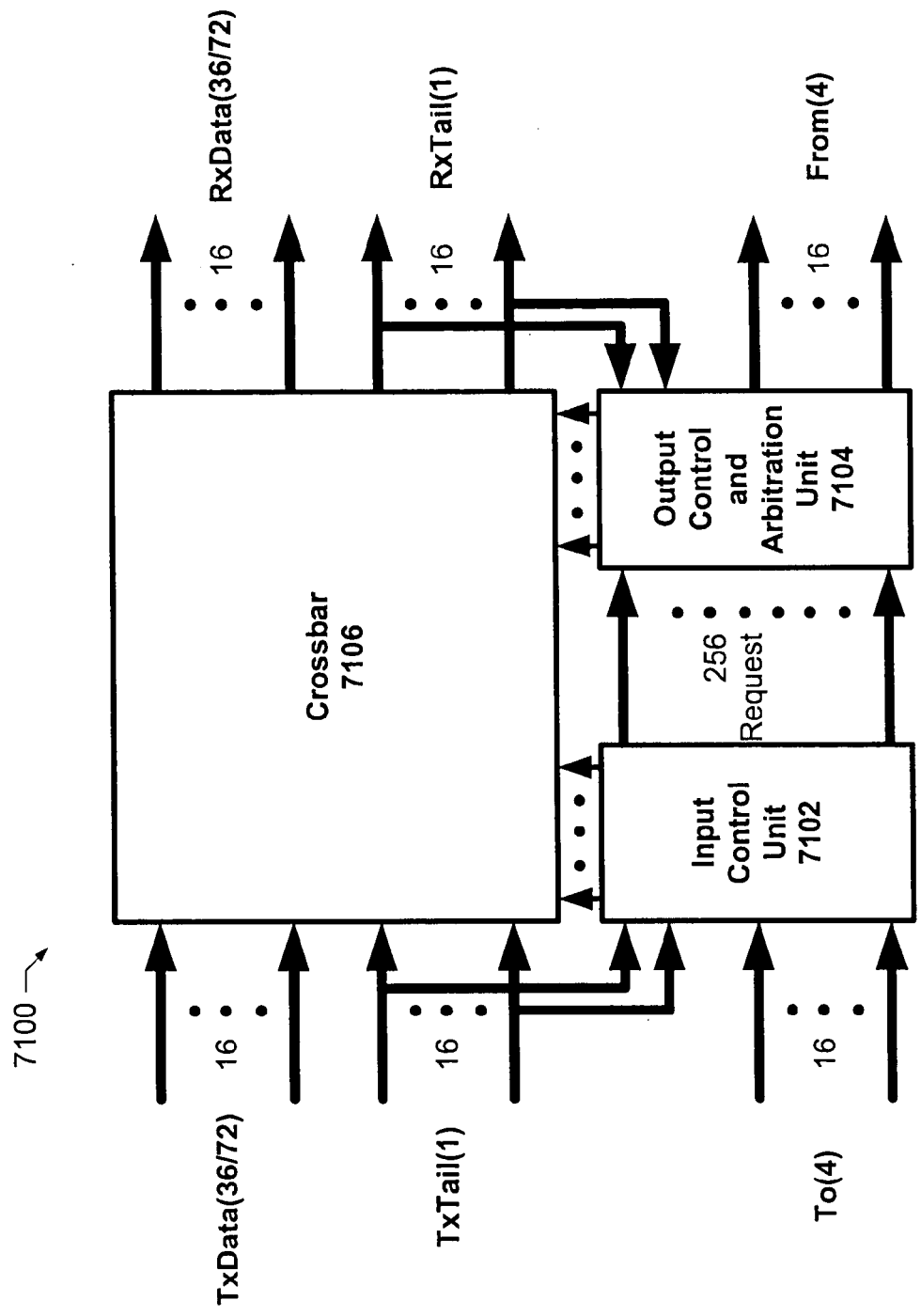
FIG. 71 is a block diagram of a crossbar and its control circuitry for use with a specific embodiment of the invention.

The FIG. 71 shows the block diagram of a 16-port crossbar 7100, each port comprising a plurality of bits, e.g., 36 or 72 bits. The crossbar includes three elements; an input control unit 7102, an output control and arbitration unit 7104, and the crossbar circuit 7106 itself Input control unit 7102 controls access to crossbar 7106. Output control and arbitration unit 7104 controls access to the output ports. Crossbar 7106 performs the actual connections.

Each transaction going through crossbar 7106 comprises a data burst of variable length which is delimited by a tail bit flagging the last element of the burst. Each transaction includes and arbitration phase and a data transfer phase. During the arbitration phase, the source CDC presents the desired destination on the To bus and the data on the TxData bus. The content of the To bus is decoded and a separate individual line is routed via one of 256 Request lines to output control and arbitration unit 7104. An arbiter for each output port arbitrates among the different requesters and grants one request while maintaining the other requests in a pending state.

The data transfer phase is started immediately after the arbitration phase is completed. The data transfer phase continues until the last data of the burst have been transferred, the last data being marked by the Tail bit (i.e., TxTail). Upon detection of the tail bit, the arbiter at the destination port will return to the arbitration phase.

Asynchronous arbiters are somewhat different from their synchronous counterparts. That is, a typical synchronous arbiter is a finite state machine which samples request lines on a clock edge, then makes a deterministic decision about what order to service requests. An asynchronous arbiter must make similar decisions, but must also deal with completely unaligned ("asynchronous") transitions on the request lines. This makes the asynchronous arbiter able to handle events at arbitrary times without reference to any clocks. In a particular implementation of the interconnect system of the present invention, asynchronous arbiters are used to decide the ordering of bursts from different sources contending for the same target port. If the target port isn't congested, the bursts will arrive in first-come first-serve order. If the target port is congested, the senders requests will be serviced fairly.

Figure 72:
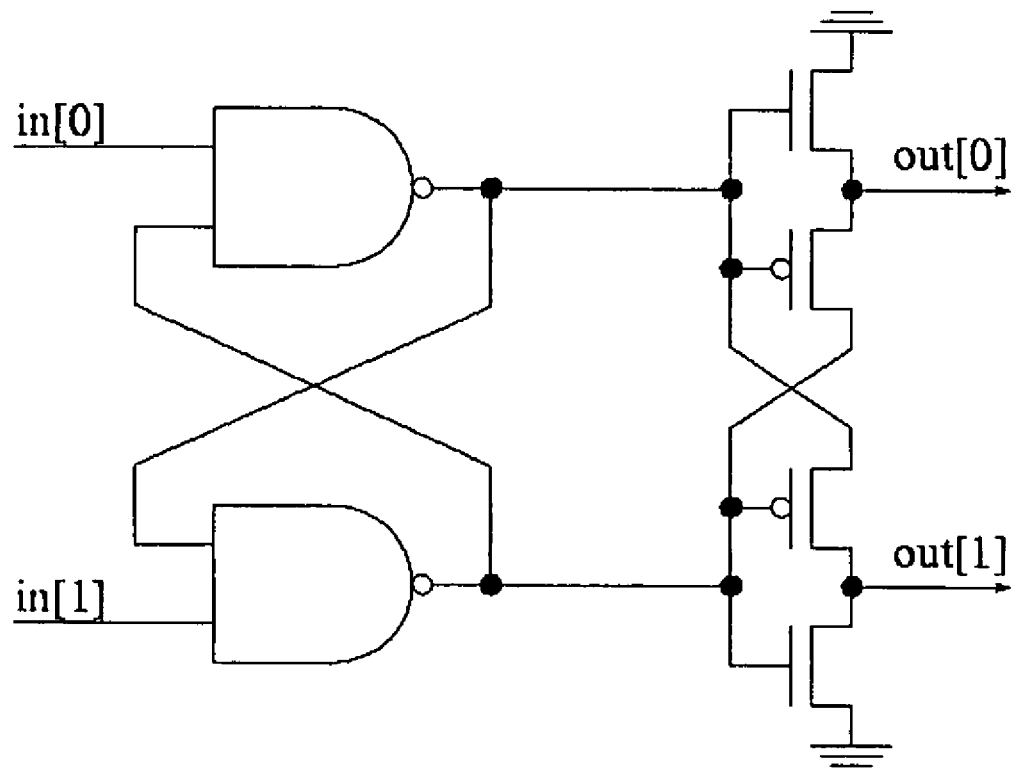
FIG. 72 is a schematic diagram of a arbiter circuit for use with various embodiments of the present invention.

FIG. 72 shows an asynchronous arbiter 7200 which may be employed with specific embodiments of the present invention. Arbiter 7200 is a two-input strictly fair arbiter. It is based upon the Seitz arbiter, which comprises cross-coupled NAND gates followed by a metastability filter. Arbiter 7200 takes two rising events in[0] and in[1] and produces mutually exclusive output rising events on out[0] or out[1] depending on which input arrived first. After the winner is selected, additional asynchronous circuitry is used to lower the winners input before making another request. This gives the other input time to win if it was waiting. If both inputs arrive at the same time, the cross-coupled NAND gates are metastable. Eventually, one or the other will win. The pass gate filter for the outputs guarantees that no output event will occur until the internal nodes have separated by at least a PMOS threshold, which indicates that the arbitration is over. In a delay-insensitive system, there is no danger of sampling the output before the arbitration is complete. That is, the metastability filter adds an unpredictable delay, but guarantees that the final decision will be stable and safe. If both inputs make requests as fast as they can, this arbiter will strictly alternate between the two.

According to a specific embodiment, multi-way arbitration may be accomplished by cascading these 2-way fair arbitration cells into binary trees. For example, a 16-way arbitration may be achieved using 15 2-way arbiters in a binary tree to select the winner per output port. If the output is relatively uncongested, the requests ripple straight up the binary tree to the root very quickly, and get serviced in first-come-first-served order. On the other hand, if the port backs up and becomes congested, then each two-way arbiter in the tree will alternate between its two inputs. Thus, all requests are serviced fairly without starvation. For 2-way contention, such a tree arbiter is still strictly fair. It should be noted, however, that if three ports are contending constantly, it is possible for one to get 50% and the other two 25% each, depending on where they are in the tree. The greatest possible mismatch for a 16-way tree arbiter would be one port with 50% and 8 others with 6.25% each. This possibility is only significant for sustained long-term contention.

The arbitration circuit described in the previous paragraph and shown in FIG. 72 has the advantages of low latency and small area. Other more complex arbitration circuits such as a round-robin or weighted round-robin can also possibly be implemented.

If the priority of a particular synchronous module in the interconnect of the present invention is unclear, its behavior can be modified according to various embodiments to enforce a particular priority in the system. According to some such embodiments, the synchronous module is enabled to rate-throttle its own requests. That is, requests following too quickly after a previous request are delayed. According to one embodiment, this is achieved simply by running low priority modules at lower clock rates.

Alternatively, it may be achieved using a leaky bucket shaping algorithm. For long term sustained congestion, this is an effective way of regulating the priority of traffic through a crossbar. Indeed, in a switch fabric system, it is often the responsibility of the traffic managers to shape different types of traffic appropriately such that the crossbar itself need only arbitrate in a simple way. A leaky bucket algorithm also has the advantage that the first request after a long wait will be made immediately without waiting. Only the streaming sustained data transfer is rate throttled.

On the other hand, purely rate throttling a sender has the drawback of not necessarily utilizing all the available bandwidth of the system. For strict real time flows or flows with fixed maximum data rates (such as slower I/O streams), this may not be a problem. However, if it is an issue, a module can be configured to actually sense the current congestion of the system by counting how often the ack line goes low. This indicates that a request was back-pressured due to downstream congestion. If this is detected, the module can enable rate throttling for a while. However, if the grant remains high, the module knows that the system is uncongested and it can continue making requests at its maximum possible rate.

Figure 73:
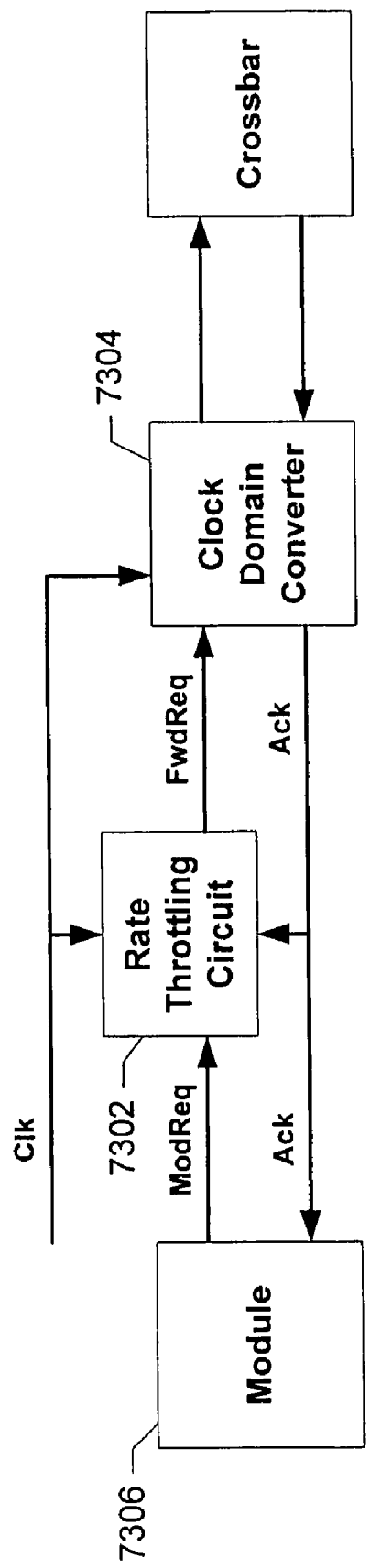
FIG. 73 is a block diagram showing the inclusion of a rate throttling circuit in a particular implementation.

FIG. 73 shows a simple throttling circuit 7302 installed between a clock domain converter 7304 and the associated synchronous module 7306 which is the originator of the transactions. Throttling circuit 7302 is controlled by two registers, a counter (the size of which is implementation dependent), and a throttling status bit. The request from the device is either passed transparently if throttling is not active or delayed if throttling is active. The Verilog listing for a particular implementation of rate throttling circuit 7302 is provided below.

```
/************************************************************************
 * Throttler.V
 *
 * The following circuit implements a throttler.
 *
 * Input: ModReq: The request from the original module
 *        Ack: The acknowledge from the SYNC/ASYNC circuit
 *        Tail: The indication that this burst is complete
 *        TrigLevel: The level at which the throttling is activated
 *        Pause: The duration of the throttling
 *
 * Output: Count: The current 'delay' counter
 *         FwdReq: The request forwarded to the SYNC/ASYNC circuit
 ************************************************************************/
module Throttler (ModReq,FwdReq,Ack,Tail,Clock,Count,TrigLevel,Pause);
input ModReq, Clock, Ack, Tail;
input [7:0] TrigLevel, Pause;
output FwdReq;
output [7:0] Count;
reg [7:0] Count;
reg Throttling;
/* The request is immediately forwarded if throttling is not active. */
assign FwdReq = ModReq * !Throttling;
always @ (posedge Clock)
  begin
  if ( Throttling )
    /* If throttling is active, then decrement current counter until
       it reaches 0 and then deactivate the throttling */
    begin
    if ( Count == 0 )
      begin
      Throttling = 0;
      Count = 0;
      end
    else
      Count = Count - 1;
      Throttling = 1;
    end
  else if ( ModReq && !Ack )
    /* If not at the end of one transaction and there is request but no ACK,
       indicating a delay in forwarding the request, then increment
       counter up to a maximum */
    begin
    Throttling = 0;
    if ( Count < 255 )
      Count = Count + 1;
    end
  else if ( ModReq && Ack && Tail )
    /* If at the end of the transaction, then check if counter exceed a
       threshold, if yes, then activate throttling, if not decrement counter
       by one to indicate that a delay of one clock is acceptable */
    begin
    if ( Count >= TrigLevel )
      begin
      Throttling = 1;
      Count = Pause;
      end
    else if ( Count > 0 )
      begin
      Count = Count-1;
      Throttling = 0;
      end
    end
  end
endmodule
```

According to another embodiment, this circuit may be enhanced to report throttling per destination allowing the originator module to forward transactions to free destinations and avoid the destinations that are busy.

As discussed above, the clock domain converter (CDC) allows interconnection of a synchronous bus to the asynchronous crossbar. According to various embodiments, the CDC is a transaction-oriented interface where each transaction includes a data burst of variable length terminated by a tail bit. The transaction may be as short as one word or as long as desired. For some embodiments, however, the transaction length is kept relatively short to minimize the latency during contention at the destination.

Figure 74:
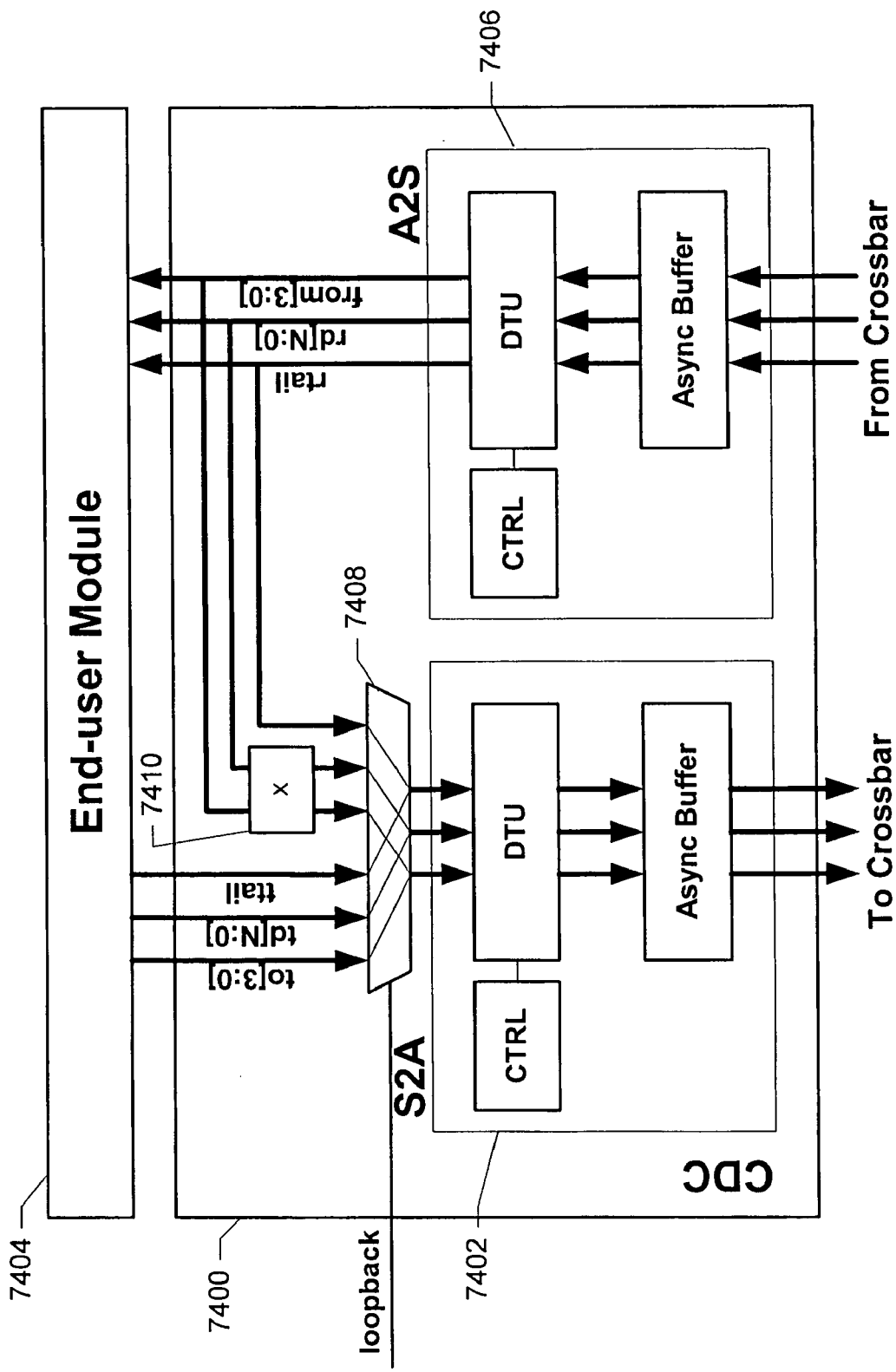
FIG. 74 is a block diagram of a clock domain converter according to a specific embodiment.

A block diagram of an exemplary CDC 7400 for use with the interconnect of the present invention is provided in FIG. 74. A synchronous-to-asynchronous (S2A) interface 7402 converts signals from the clock domain of synchronous module 7404 to the asynchronous domain. An asynchronous-to-synchronous (A2S) interface 7406 converts signals from the asynchronous domain to module 7404's clock domain. These interface may be implemented according to the various techniques described above.

CDC 7400 indicates that it is ready to receive a data word from module 7404, i.e., <to[3:0], td[N:0], ttail>, by asserting an enable signal (not shown). Module 7404 indicates the presence of a valid data word by asserting a valid signal (not shown) and by driving the data word prior to the rising edge of the clock. A data transfer thus occurs when both the enable and valid signals are asserted. The first word of the transaction should include a valid destination port in the to[3:0] bus. The content of this bus is ignored for all subsequent words of the transaction until a tail bit is detected.

According to a particular implementation, the CDC includes a loopback function that is activated to facilitate the BIST function. When the loopback function is enabled during testing, the data coming from the crossbar enters A2S interface 7406, is converted to a synchronous signal which is forwarded to module 7404 and S2A interface 7402 through a multiplexer 7408. Thus, during loopback, multiplexer 7408 routes the data from A2S interface 7406 back to the crossbar instead of routing the data from module 7404. Buffer 7410 swaps the from[3:0] and rd[3:0] lines on the first word of the transaction to force the transaction to go to another CDC via the crossbar. Thus, from a single location in the system, all paths through the interconnect may be tested. In addition, each path may be tested at full rate by successive application of test vectors, thus allowing verification of backpressure mechanisms.

Figure 75:
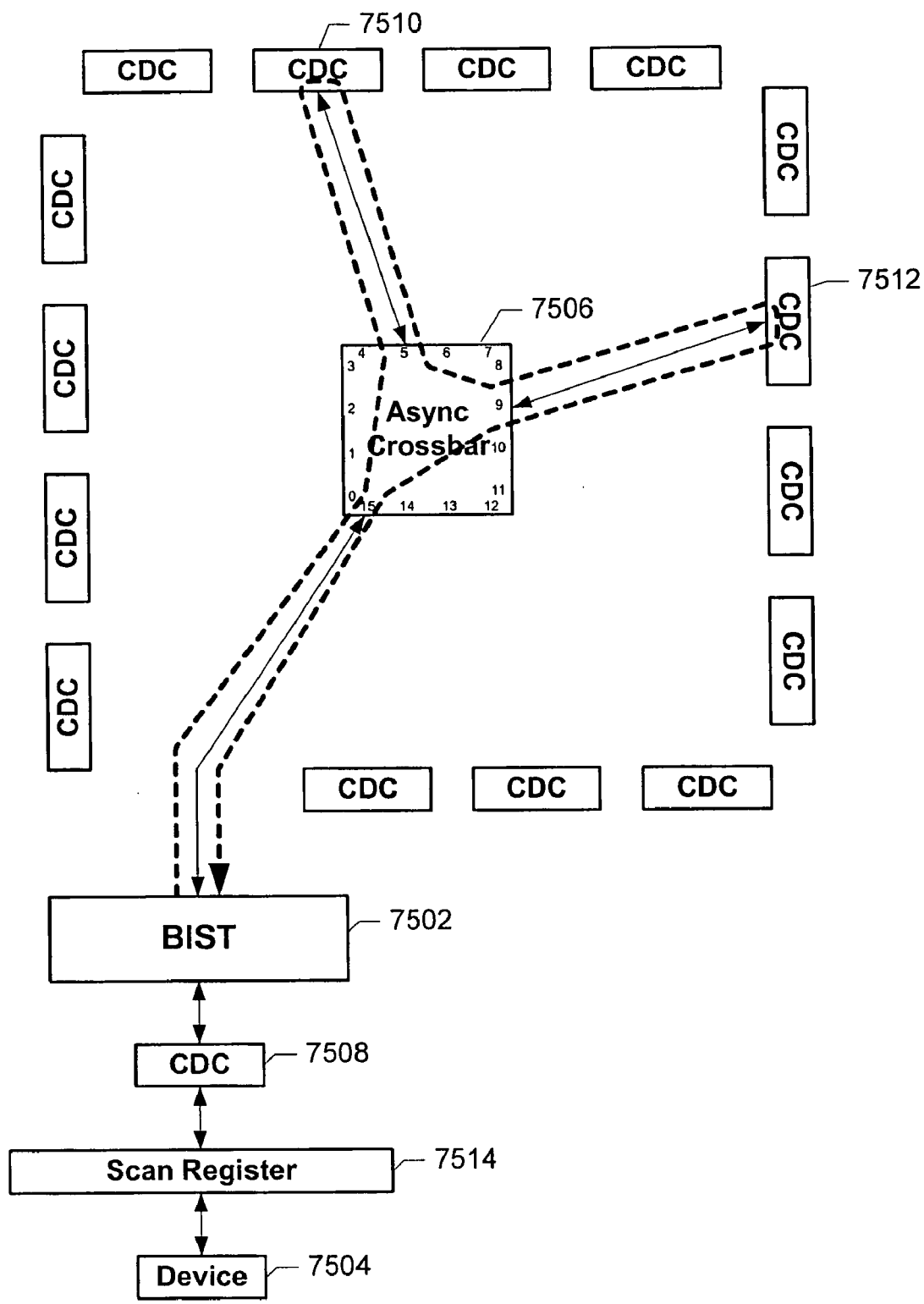
FIG. 75 is a block diagram for illustrating the operation of a built-in-self-test protocol according to a specific embodiment of the invention.

Operation of a specific embodiment of a built-in self test (BIST) module for use with various embodiments of the invention will now be described with reference to FIG. 75. As described above, BIST module 7502 is designed to provide access by external test equipment to the various data paths in the interconnect system 7500. According to this embodiment, BIST module 7502 has two modes of operation: active and inactive. In the inactive state, BIST module 7502 is transparent and relays transactions from an attached synchronous device 7504 to crossbar 7506 (via CDC 7508), or vice versa, without any interpretation of the transactions being passed.

In the active state, BIST module 7502 reroutes attached CDC interface 7508 to its own internal data path, executes a test vector requested on a vector_in input, and presents the result of the test on a vector_out output once the test requested has been executed. According to a specific embodiment, the structures of the vector_in and vector_out words are as shown in FIGS. 76A and 76B, respectively. The format of the transactions generated by BIST module 7502 according to this embodiment is shown in FIG. 76C.

The bits 0 to 3 of the nextnode field in FIG. 76C defines the next destination that the packet must take while bits 4 to 7 are reserved for future usage. The pattern is a replication of the 8-bit pattern defined in the input vector. FIG. 75 shows the path followed by an exemplary transaction originated from BIST module 7502 and going through two nodes (i.e., CDC 7510 and CDC 7512).

Upon reception of an input vector from scan register 7514, BIST module 7502 starts transmitting a first transaction to the first node, i.e., CDC 7510, which forwards the transaction to CDC 7512, which then forwards it back to BIST module 7502, which checks the integrity of data. As described above with reference to FIG. 74, the first and second CDCs determine the next hop by reading bits 0-3 of the first word of the transaction received, each of the CDCs also replacing the bits 0-3 with the content of the from field received with the transaction while leaving the subsequent words of the transaction unchanged. The swapping of the bits allow the transaction to fully test the data path.

Input and output scan registers (block 7514) are inserted in the data path between module 7504 and CDC 7508. According to various embodiments, the input scan register is 43 bits for a 36-bit wide version, and 79 bits for a 72-bit wide version, and is used to supply the input vector as well as controlling the status of the CDCs and the BIST mode. In addition to the input vector, one bit of the input scan register maps to an enable bit for the BIST module, while another maps to an enable bit for the loopback function described above.

The output scan register is 41 bits wide for a 36-bit wide version, and 77 bits wide for a 72-bit version, and is used to recover the output vector. In addition to the output vector, one bit of the output scan register indicates if the BIST module is ready to received a new vector (implying the previous vector has been processed).

Figure 77:
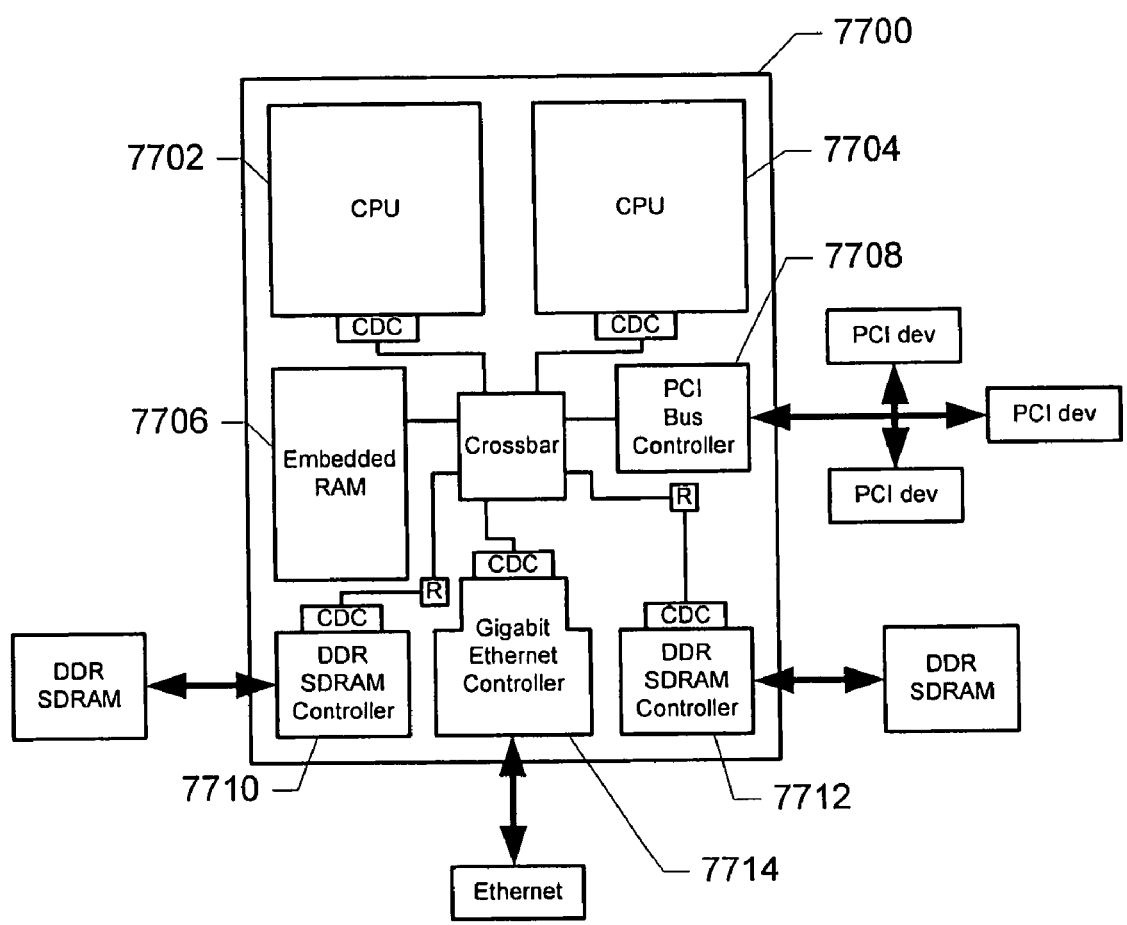
FIGS. 77 and 78 illustrate exemplary system-on-a-chip designs implemented according to various embodiments of the present invention.

FIG. 77 shows a multi-processor system-on-a-chip 7700 employing a particular implementation of the interconnect of the present invention. This design include a mixture of synchronous devices that act either as master devices, slave devices or both. A master device is a device capable of generating requests to other devices while a slave device is a device receiving and executing requests from master devices and, in some cases, transmitting a response to the originator.

Each of CPUs 7702 and 7704 is a master device which may generate requests to read (load) from or write (store) to any of the other devices (except the other CPU). Such requests could come, for example, from the instruction or data cache units, or the register file of the CPU. By contrast, embedded RAM 7706 is a slave device which receives load or store requests from any master devices, but never receives requests or responses from any other slave device. PCI Bus Controller 7708 is both a master and a slave device which generates load or store requests to slave devices, or receive load or store requests from master devices. DDR Controllers 7710 and 7712 are slave devices which receive load or store requests from any master devices, but not from any other slave device. Ethernet controller 7714 is both a master and a slave device which generates load or store to slave devices or may receive such requests from a master device.

According to a specific embodiment, the interconnect solution of FIG. 77 may be implemented without changing the current interfaces of the various synchronous modules by using an adaptation layer (AL) (not shown) to convert the higher level transactions from the synchronous modules into simple bursts compatible with the crossbar protocol. A different burst type would be used to represent each of the one-way, unicast transactions such as memory load, memory store, cache snoop and cache invalidate. The overall transaction is accomplished in the AL by unrolling any multicast operations and collecting the expected results. According to a more specific embodiment, three types of AL are employed. A master AL is used by a master device, e.g., a CPU, to initiate all types of transactions. A cache AL is used by a CPU to respond to snoop and invalidate transactions. A target AL is used by a slave device, e.g., memory, to respond to load and store transactions. According to a particular embodiment, each of the AL associated with a particular device employs its own interconnect port.

According to such an embodiment, CPUs 7702 and 7704 employ master and cache AL (not shown). Other devices, e.g., PCI controller 7708 or Ethernet controller 7714, employ master and target AL. Memory, e.g., memory controllers 7710 and 7712, employ target AL. The target AL simply pass through the bursts and may be omitted.

The master AL sends four types of requests, i.e., snoop, invalidate, load, and store. The snoop requests are transmitted to the cache AL of all other CPUs. The completions are collected and the data (if any) are returned. The invalidate requests are sent to the cache AL of all other CPUs. The completions are collected and summarized. The load requests are sent to the specified target AL and a completion is returned. The store request is sent to the specified target AL and nothing is returned.

The cache AL receives snoop requests, looks up the line in the associated cache, sends data and hit/miss/dirty information back in a completion message. The cache AL also receives invalidate requests, looks up the line in the cache, and sends back the appropriate completion message.

Separation of these functions into separate AL on different interconnect ports allows common parts of the system to be shared by the three different types of synchronous devices in the system. In addition, using separate ports for initiating transactions and responding to transactions increases overall system performance, and greatly simplifies system deadlock considerations. According to a particular embodiment, approach (along with the non-blocking crossbar) enables devices to keep making requests without concern for the amount of buffering at the target devices. That is, the system can rely on local flow control. The master AL must guarantee that any completions are drained when they arrive, but the target and cache AL need no buffering at all. Notwithstanding the foregoing, it should be noted that the AL of each device may share an interconnect port, but care must be taken to avoid mutual deadlock scenarios.

Figure 78:
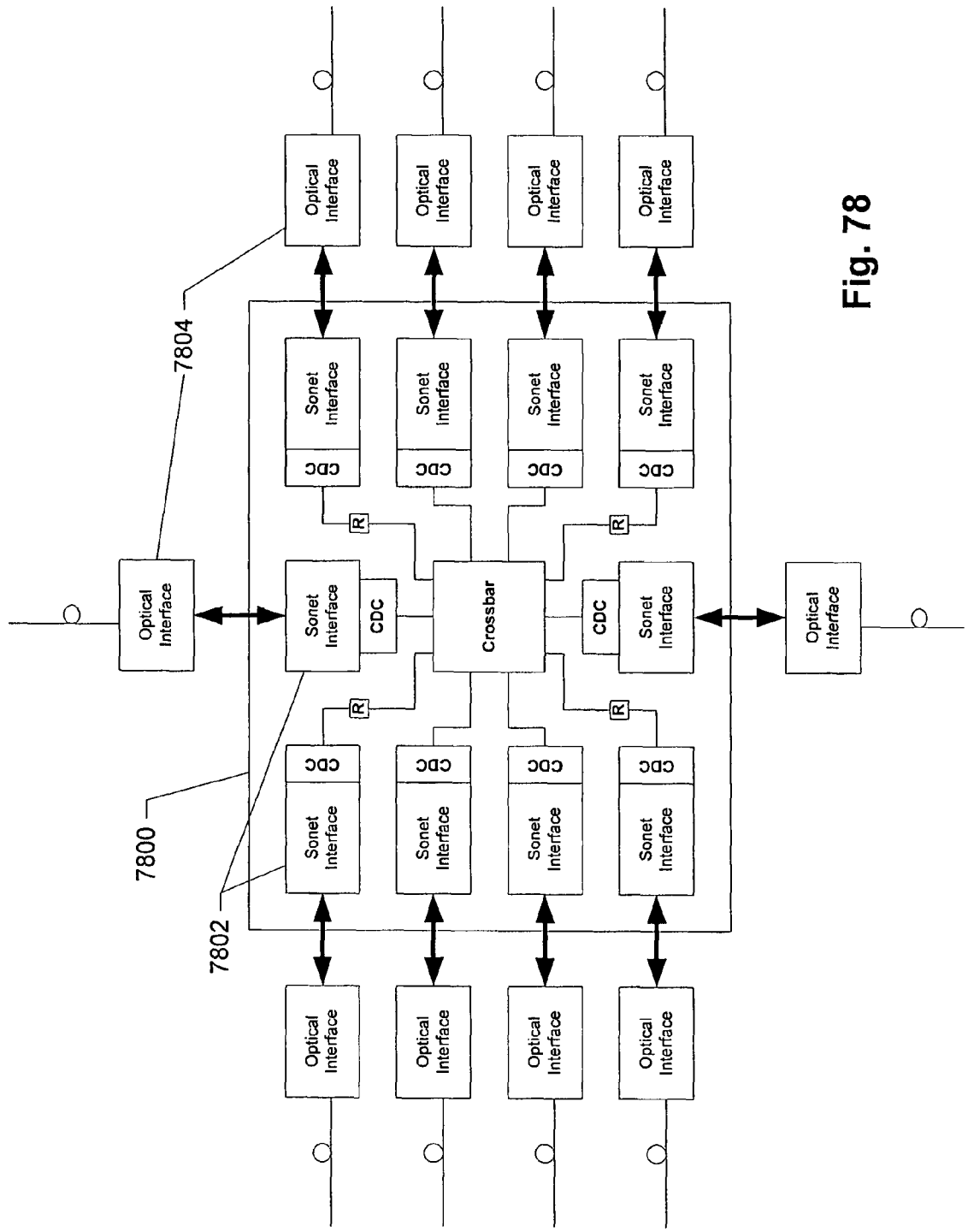

FIG. 78 is another example of a system-on-a-chip employing an interconnect designed according to the present invention. SONET interconnect switch 7800 includes a plurality of SONET interfaces 7802 interconnected according to the present invention, thus facilitating communication among external optical interfaces 7804. While the invention has been particularly shown and described with reference to specific embodiments thereof, it will be understood by those skilled in the art that changes in the form and details of the disclosed embodiments may be made without departing from the spirit or scope of the invention. For example, various interconnection solutions have been described herein with reference to a particular asynchronous design style. However, it will be understood that any of a variety of asynchronous domain types are within the scope of the invention. Moreover, the specific details of the circuits described herein are merely exemplary and should not be considered as limiting the invention. Rather, any circuits implementing the basic functionality of the circuits described herein are also within the scope of the invention. In addition, while some specific examples have been provided of systems which may employ the various interconnect solutions described herein, it will be understood that the scope of the present invention encompasses any system that employs any of the various interconnection solutions embodied by the invention.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. An integrated circuit, comprising:
a plurality of synchronous modules, each synchronous module having an associated clock domain characterized by a data rate, the data rates comprising a plurality of different data rates;
a plurality of clock domain converters, each clock domain converter being coupled to a corresponding one of the synchronous modules, and being operable to convert data between the clock domain of the corresponding synchronous module and an asynchronous domain characterized by transmission of data according to an asynchronous handshake protocol, each clock domain converter comprising a datapath operable to transfer a data token between the corresponding clock domain and the asynchronous domain, each clock domain converter further comprising control circuitry operable to enable transfer of the data token via the datapath in response to at least one transition of a clock signal associated with the corresponding clock domain and at least one completion of the asynchronous handshake protocol; and
an asynchronous crossbar coupled to the plurality of clock domain converters, and operable in the asynchronous domain to implement a first-in-first-out (FIFO) channel between any two of the clock domain converters, thereby facilitating communication between any two of the synchronous modules.

2. The integrated circuit of claim 1 wherein the datapath of each clock domain converter is operable to transfer the data token from the asynchronous domain to the corresponding clock domain, and the at least one completion of the asynchronous handshake protocol corresponds to receipt of the data token.

3. The integrated circuit of claim 2 wherein the data token comprises one of parallel and serial data.

4. The integrated circuit of claim 2 wherein a particular one of the clock domains requires a data transfer to comprise a block of consecutive data, the datapath of the corresponding clock domain converter further being operable to accumulate data tokens generated in the asynchronous domain to form the block of consecutive data, and wherein the control circuitry of the corresponding clock domain converter is operable to facilitate transfer of the accumulated data tokens to the particular clock domain via the corresponding datapath in response to a synchronous handshake with the particular clock domain and consecutive transitions of the clock signal, and after completion of the asynchronous handshake protocol for the data token.

5. The integrated circuit of claim 1 wherein the datapath of each clock domain converter is operable to transfer the data token from the corresponding clock domain to the asynchronous domain, and the at least one completion of the asynchronous handshake protocol corresponds to a previously transferred data token.

6. The integrated circuit of claim 5 wherein each of the data token and the previously transferred data token comprises one of parallel and serial data.

7. The integrated circuit of claim 5 wherein a particular one of the clock domains requires a data transfer to comprise a block of consecutive data, the control circuitry of the corresponding clock domain converter further being operable to facilitate transfer of a plurality of data tokens as the block of consecutive data to the asynchronous domain via the corresponding datapath in response to a synchronous handshake with the particular clock domain, consecutive transitions of the clock signal, and an enable signal generated in accordance with the asynchronous handshake protocol and indicating that the asynchronous domain has sufficient memory to receive the plurality of data tokens.

8. The integrated circuit of claim 1 wherein at least one of the clock domain converters is operable to transfer bursts of data tokens between the corresponding clock domain and the asynchronous domain.

9. The integrated circuit of claim 8 wherein the bursts of data tokens are variable in size.

10. The integrated circuit of claim 1 wherein the asynchronous crossbar is operable to route the data from any of a first number of input channels to any of a second number of output channels according to routing control information, each combination of an input channel and an output channel comprising one of a plurality of links, the crossbar being operable to route the data in a deterministic manner on each of the links thereby preserving a partial ordering represented by the routing control information, wherein events on different links are uncorrelated.

11. The integrated circuit of claim 10 wherein the crossbar is operable to transfer the data on at least one of the links based on at least one timing assumption.

12. The integrated circuit of clam 11 wherein the at least one timing assumption comprises any of a pulse timing assumption, an interference timing assumption, and an implied-data-neutrality timing assumption.

13. The integrated circuit of claim 1 wherein the asynchronous handshake protocol between a first sender and a first receiver comprises:
the first sender sets a data signal valid when an enable signal from the first receiver goes high;
the first receiver lowers the enable signal upon receiving the valid data signal;
the first sender sets the data signal neutral upon receiving the low enable signal; and
the first receiver raises the enable signal upon receiving the neutral data signal.

14. The integrated circuit of claim 1 wherein the asynchronous handshake protocol is delay-insensitive.

15. The integrated circuit of claim 1 further comprising at least one repeater, each repeater being coupled between a selected one of the clock domain converters and the asynchronous crossbar.

16. The integrated circuit of claim 15 wherein each repeater comprises an asynchronous half-buffer circuit.

17. The integrated circuit of claim 1 wherein the asynchronous crossbar is operable to arbitrate among multiple requests corresponding to a same destination synchronous module.

18. The integrated circuit of claim 17 wherein the asynchronous crossbar comprises arbitration circuitry to effect arbitration, the arbitration circuitry comprising at least one Seitz arbiter.

19. The integrated circuit of claim 1 further comprising a rate throttling circuit associated with a specific one of the synchronous modules which is operable to control transmission of the data to the corresponding clock domain converter.

20. The integrated circuit of claim 19 wherein the rate throttling circuit is operable to control transmission of the data by delaying transmission of the data in accordance with a priority associated with the specific synchronous module.

21. The integrated circuit of claim 19 wherein the rate throttling circuit is operable to control transmission of the data in response to congestion between the corresponding clock domain converter and the asynchronous crossbar.

22. The integrated circuit of claim 21 wherein the rate throttling circuit is operable to determine the congestion with reference to the asynchronous handshake protocol between the corresponding clock domain converter and the asynchronous crossbar.

23. The integrated circuit of claim 1 further comprising a built-in-self-test (BIST) module between one of the clock domain converters and the asynchronous crossbar, the BIST module being operable to transmit test vectors to and receive result vectors from each of the synchronous modules via the asynchronous crossbar.

24. The integrated circuit of claim 23 wherein the BIST module comprises a scan register for receiving the test vectors from external test equipment.

25. The integrated circuit of claim 23 wherein the BIST module is operable to transmit a first test vector to a first one of the synchronous modules via the asynchronous crossbar, the first synchronous module being operable to transmit a first result vector corresponding to the first test vector to a second one of the synchronous modules via the asynchronous crossbar, the second synchronous module being operable to transmit a second result vector to the BIST module via the asynchronous crossbar, the BIST module being further operable to verify the second result vector.

26. The integrated circuit of claim 1 wherein the integrated circuit comprises a multi-processor system, the plurality of synchronous modules comprising at least two central processing units with associated cache memory, at least one memory controller, at least one internal peripheral device, and at least one I/O interface.

27. The integrated circuit of claim 26 further comprising at least one repeater, each repeater being coupled between a selected one of the clock domain converters and the asynchronous crossbar.

28. The integrated circuit of claim 1 wherein the integrated circuit comprises a synchronous optical network (SONET) interconnect switch, the plurality of synchronous modules comprising a plurality of SONET interfaces.

29. The integrated circuit of claim 28 further comprising at least one repeater, each repeater being coupled between a selected one of the clock domain converters and the asynchronous crossbar.

30. The integrated circuit of claim 1 wherein the integrated circuit comprises any of a CMOS integrated circuit, a GaAs integrated circuit, and a SiGe integrated circuit.

31. At least one computer-readable medium having data structures stored therein representative of the integrated circuit of claim 1.

32. The at least one computer-readable medium of claim 31 wherein the data structures comprise a simulatable representation of the integrated circuit.

33. The at least one computer-readable medium of claim 32 wherein the simulatable representation comprises a netlist.

34. The at least one computer-readable medium of claim 31 wherein the data structures comprise a code description of the integrated circuit.

35. The at least one computer-readable medium of claim 34 wherein the code description corresponds to a hardware description language.

36. A set of semiconductor processing masks representing the integrated circuit of claim 1.

* * * * *